United States Patent
Hsieh et al.

(10) Patent No.: US 12,443,084 B2
(45) Date of Patent: Oct. 14, 2025

(54) LIQUID-CRYSTAL DISPLAY

(71) Applicant: MERCK PATENT GmbH, Darmstadt (DE)

(72) Inventors: Chia-Sheng Hsieh, Taipei (TW); I-Hua Huang, Taipei (TW); Cheng-Jui Lin, Taipei (TW)

(73) Assignee: Merck Patent GmbH (DE)

( * ) Notice: Subject to any disclaimer, the term of this patent is extended or adjusted under 35 U.S.C. 154(b) by 0 days.

(21) Appl. No.: 18/720,222

(22) PCT Filed: Dec. 14, 2022

(86) PCT No.: PCT/EP2022/085753
§ 371 (c)(1),
(2) Date: Jun. 14, 2024

(87) PCT Pub. No.: WO2023/110962
PCT Pub. Date: Jun. 22, 2023

(65) Prior Publication Data
US 2025/0068023 A1    Feb. 27, 2025

(30) Foreign Application Priority Data
Dec. 17, 2021  (EP) .................................. 21215397

(51) Int. Cl.
G02F 1/137    (2006.01)
G02F 1/1333   (2006.01)
G02F 1/1337   (2006.01)
G02F 1/1343   (2006.01)

(52) U.S. Cl.
CPC .... *G02F 1/13775* (2021.01); *G02F 1/133354* (2021.01); *G02F 1/1337* (2013.01); *G02F 1/134345* (2021.01); *G02F 1/13712* (2021.01)

(58) Field of Classification Search
CPC ............. G02F 1/13775; G02F 1/13712; G02F 1/133354; G02F 1/134345; G02F 1/1337
See application file for complete search history.

(56) References Cited

U.S. PATENT DOCUMENTS

| | | |
|---|---|---|
| 4,130,502 A | 12/1978 | Eidenschink et al. |
| 4,868,341 A | 9/1989 | Eidenschink et al. |
| 2013/0182202 A1 | 7/2013 | Graziano et al. |
| 2013/0271680 A1 | 10/2013 | Iwata et al. |
| 2014/0138581 A1 | 5/2014 | Archetti et al. |
| 2015/0166890 A1 | 6/2015 | Archetti et al. |

(Continued)

FOREIGN PATENT DOCUMENTS

| | | |
|---|---|---|
| DE | 2636684 A1 | 2/1978 |
| DE | 3321373 A1 | 12/1984 |

(Continued)

OTHER PUBLICATIONS

International Search Report (PCT/ISA/210) and Written Opinion (PCT/ISA/237) mailed on Feb. 15, 2023, by the Japan Patent Office as the International Searching Authority for International Application No. PCT/EP2022/085753. (12 pages).

(Continued)

*Primary Examiner* — Anne M Hines
(74) *Attorney, Agent, or Firm* — Buchanan Ingersoll & Rooney PC

(57) ABSTRACT

A liquid crystal display (LCD) of the chiral polymer stabilized alignment (C-PSA) mode, a method of its production and its use as an energy-saving display.

11 Claims, 4 Drawing Sheets

(56) References Cited

U.S. PATENT DOCUMENTS

2015/0252265 A1  9/2015  Archetti et al.
2017/0357131 A1  12/2017  Chen et al.

FOREIGN PATENT DOCUMENTS

EP  0364538 A1  4/1990
JP  2014038147 A  2/2014
WO  2012090776 A1  7/2012

OTHER PUBLICATIONS

Pure Appl. Chem., vol. 73, No. 5, pp. 845-895, 2001.
Tschierske et al., "Definitionen von Grundbegriffen mit Bezug zu nieder-molekularen und polymeren Flüssigkristallen", Angewandte Chemie, (Nov. 19, 2004), vol. 116, Issue 45, pp. 6340-6368.
Merck Liquid Crystals, Physical Properties of Liquid Crystals, Status Nov. 1997, Merck KGaA, Germany.

LIQUID-CRYSTAL DISPLAY

CROSS-REFERENCE TO RELATED APPLICATIONS

This application is a U.S. national stage application claiming priority under 35 U.S.C. §§ 120 and 365 (c) of and to PCT International Application No. PCT/EP2022/085753, filed Dec. 14, 2022, which claims priority under 35 U.S.C. §§ 119 (a) and 365 (b) of and to European Application No. 21215397.7, filed Dec. 17, 2021, each of which is incorporated herein in its entirety and for all purposes.

FIELD OF THE INVENTION

The present invention relates to a liquid crystal display (LCD) of the chiral polymer stabilized alignment (C-PSA) mode, a method of its production and its use as energy-saving display.

BACKGROUND OF THE INVENTION

Many LCD panels used for example in monitors or LCD TVs are using the polymer stabilized (PS) or polymer sustained alignment modes (PSA) modes, like the PS-VA (vertically aligned), PS-IPS (in-plane switching) or PS-FFS (fringe-field switching) mode or modes derived therefrom, or self-aligned (SA) modes like SA-VA which are polymer stabilized.

In the PS or PSA mode a small amount, typically from 0.1 to 1% of one or more polymerizable mesogenic compounds, also known as RMs (reactive mesogens), is added to the LC medium. After filling the LC medium into the display the RMs are then polymerized in situ by UV photopolymerization, while a voltage is applied to the electrodes of the display. Thereby a certain tilt angle is generated in the LC molecules of the LC medium, mainly in the regions close to the surfaces of the display cell, which is then stabilized by the polymerized RMs. The UV polymerization process, also referred to as "PSA process", is usually carried out in two steps, a first UV exposure step ("UV1 step"), with application of a voltage, to generate the tilt angle, and a second UV exposure step ("UV2 step"), without application of a voltage, to complete polymerization of the RMs.

In the SA-VA mode the alignment layers are omitted in the display. Instead, a small amount, typically 0.1 to 2.5%, of a self alignment (SA) additive is added to the LC medium, which induces the desired alignment, for example homeotropic or planar alignment, in situ by a self assembling mechanism. The SA additive usually contains an organic, mesogenic core group and attached thereto one or more polar anchor groups, for example hydroxy, carboxy, amino or thiol groups, which are capable of interacting with the substrate surface, causing the additives on the substrate surface to align and induce the desired alignment also in the LC molecules. The SA additive may also contain one or more polymerizable groups that can be polymerised under similar conditions as the RMs used in the PSA process. The LC medium may in addition to the SA additive also contain one or more RMs.

PSA displays for use in monitors are usually of the active matrix (AM) type. AM-LCDs are known in prior art. Non-linear elements which can be used for individual switching of the individual pixels are, for example, active elements like transistors, especially thin-film transistors (TFTs) on a glass plate as substrate. These can be selected for example from TFTs comprising compound semiconductors, such as, for example, CdSe, or metal oxide TFTs like IGZO (indium gallium indium zinc oxide), or TFTs based on polycrystalline or amorphous silicon. Especially the latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (e.g. pocket TVs) or high-information displays in automobile or aircraft construction.

In many MLC type PSA displays one of the two electrodes which are sandwiching the layer of the LC medium has a patterned structure, like for example a fishbone pattern with a central crosstype structure as exemplarily depicted in FIG. 1(a). In the addressed state (i.e. with a voltage applied to the electrodes) the LC molecules will change their initial vertical or tilted orientation to a planar orientation, wherein in addition the long axes of the LC molecules are oriented in a direction predominantly induced by the electric field which is given by the electrode pattern. However, in these displays it has been observed that the transmittance may still not be good enough. In particular, the appearance of dark trunk lines within a individual pixel and of dark edge lines between neighboured pixels has been observed, as shown in FIG. 2(a). This can be attributed to two aspects. One is that the LC alignment in the trunk area is parallel to the trunk and also parallel or perpendicular to the polarizer, which causes dark trunk lines there. The other is insufficient alignment of the LC molecules due to the inhomogeneous electric field created by the patterned electrode and also by the gaps between the pixelated electrodes.

The dark trunk lines can be partially overcome by adding a chiral dopant to the LC medium. This type of PSA (or PSVA) display mode comprising an LC medium with a chiral dopant is also known as C-PSA or C-PSVA mode.

The chiral dopant induces a helical twist in the planar oriented LC molecules in the addressed state, so that at least some LC molecules in the areas overlying the pixelated electrodes will have the desired alignment direction. As a result the appearance of dark trunk lines is suppressed and the overall transmittance is improved, as shown in FIG. 2(b). However, the dark edge lines in the gap regions between the pixels are still visible because of the inhomogeneous electric field near the edge areas.

SUMMARY OF THE INVENTION

It was therefore an aim of the present invention to provide novel displays of the C-PSA mode which show improved transmittance. In addition, the display should show advantageous properties like a low driving voltage and a good contrast ratio. Another aim of the invention is to provide a method for producing such PSA displays. Other aims of the invention are immediately evident to the skilled person from the following description.

It was found that these aims can be achieved by providing a display of the PSA mode as disclosed and claimed hereinafter. In particular, it was surprisingly found that, by adding a third electrode layer to the display on the side of the patterned, second electrode, wherein the second and third electrode are separated by an isolation layer, it is possible to suppress the appearance of both dark trunk lines and dark edge lines, as shown in FIG. 2(c). In addition, the third electrode does not only improve the dark trunk and edge lines, but also improves overall transmittance for the whole pixel, because it provides an even and straight electric field which can improve alignment of the twisted LC molecules compared to the electric field of the patterned electrode. Thereby a higher transmittance can be achieved. This does also allow energy saving e.g. by reducing the back light power.

The invention relates to a liquid crystal display (LCD) of the chiral polymer-stabilized alignment (C-PSA) mode, preferably of the chiral polymer stabilized vertical aligned (C-PSVA) mode comprising, in the following sequence
 a) a first substrate being equipped with a first electrode and optionally a first alignment layer, said first electrode optionally having a specific pattern and optionally being divided into multiple pixels,
 b) a layer comprising a nematic LC medium having negative dielectric anisotropy and containing a chiral additive and further comprising a polymer formed by one or more polymerizable compounds,
 c) a second substrate being equipped with a second electrode and optionally a second alignment layer, said second electrode having a pattern, preferably a fishbone pattern, and preferably being divided into multiple pixels,
 d) optionally a colour filter, preferably located in proximity to the second electrode,
 wherein the optional first and second alignment layers, if present, are located such that they are in contact with the LC medium,
 characterized in that the second substrate is further equipped with a third electrode and an electrically isolating layer between the second and third electrode, said third electrode optionally having a pattern and optionally being divided into multiple pixels,
 wherein the display further comprises non-linear elements for electronically addressing the individual pixels, preferably selected from active elements, more preferably transistors, very preferably thin-film transistors (TFTs), said non-linear elements contacting the second and/or third electrode or contacting the first electrode,
 and wherein the said one or more polymerizable compounds in the LC medium have been polymerized in situ, after the LC medium has been dispensed between the two substrates, while applying a voltage at least to the first and second electrodes, and preferably also to the third electrode.

The invention further relates to a method of manufacturing an LC display of the C-PSA mode, preferably of the C-PSVA mode, comprising the steps of
 a) providing a first substrate and a second substrate, the first substrate being equipped with a first electrode and optionally with a first alignment layer, the second substrate being equipped with a second electrode, optionally a second alignment layer, a third electrode, an electrically isolating layer between the second and third electrode and optionally a colour filter,
  wherein the first and/or the second substrate are preferably equipped with fixing means, preferably a sealant material and/or spacers, fixing the first and second substrate at a constant distance relative to each other and with their planes parallel to each other,
  wherein the second electrode has a pattern, preferably a fishbone pattern, and is preferably divided into multiple pixels, and the first and/or the third electrode optionally have a pattern and are optionally divided into multiple pixels,
  wherein the display further comprises non-linear elements for electronically addressing the individual pixels, preferably selected from active elements, more preferably transistors, very preferably thin-film transistors (TFTs), said non-linear elements either contacting the second and/or third electrode or contacting the first electrode,
 b) dispensing a nematic LC medium between the first and the second substrate, such that the LC medium is in contact with the first and second alignment layer if these layers are present,
  wherein the LC medium has negative dielectric anisotropy and comprises, preferably consists of,
  A) a liquid crystal component A (hereinafter also referred to as "LC host mixture") comprising, preferably consisting of, mesogenic or liquid-crystalline molecules,
  B) a polymerizable component B comprising, preferably consisting of, one or more polymerizable compounds,
  C) one or more chiral additives, preferably selected from chiral dopants,
  D) optionally one or more further additives, preferably selected from polymerization initiators, stabilizers and self-aligning additives,
 c) applying a voltage to the first and second electrode, and preferably also to the third electrode,
 d) while applying the voltage, polymerizing the polymerizable compounds of the polymerizable component B of the LC medium between the first and second substrate, preferably by exposure to UV radiation,
 e) optionally subjecting the LC medium to a second polymerization step, preferably by exposure to UV radiation, without applying a voltage to the first, second or third electrodes, thereby polymerizing any polymerizable compounds which have not reacted in step d).

The invention further relates to the use of an LC display of the C-PSA or C-PSVA mode according to the present invention as energy-saving display.

TERMS AND DEFINITIONS

Figure 1:
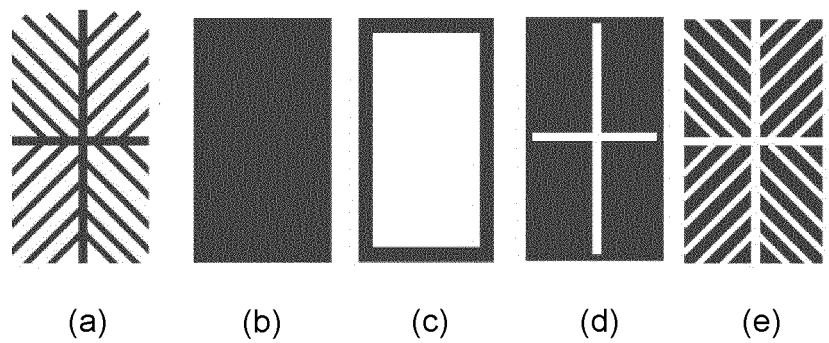
FIG. 1(a)-(e) shows suitable and preferred electrode patterns in a C-PSA display according to the present invention.

As used herein, the terms "tilt" and "tilt angle" are understood to refer to an orientation where the longitudinal axis of the LC molecules of the LC medium form an angle with the plane of the nearest substrate of the display cell.

As used herein, the term "director" or "LC director" is understood to mean the average direction of the long molecular axes of the LC molecules.

As used herein, the terms "polymerizabe mesogenic compound", "reactive mesogen" and "RM" will be understood to mean a compound containing a mesogenic or liquid crystalline skeleton, and one or more functional groups attached thereto which are suitable for polymerization and are also referred to as "polymerizable group" or "P".

Unless stated otherwise, the term "polymerizable compound" as used herein will be understood to mean a polymerizable monomeric compound.

Above and below, the description of an LC medium that comprises "a polymer formed/obtained by polymerizing one or more polymerizable compound(s)/component(s)" or is to be understood to cover both the embodiment wherein the polymer remains partially or completely dispersed in the LC medium, and the embodiment wherein the polymer precipitates from the LC medium and forms a polymer layer on one or both of the substrates, or on one or both of the alignment layers or the electrode structures deposited thereon.

As used herein, the term "low-molecular-weight compound" will be understood to mean to a compound that is monomeric and/or is not prepared by a polymerization reaction, as opposed to a "polymeric compound" or a "polymer".

As used herein, the term "unpolymerizable compound" will be understood to mean a compound that does not contain a functional group that is suitable for polymerization under the conditions usually applied for the polymerization of the RMs.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerization. Typical mesogenic groups are, for example, rigid rod- or disc-shaped units. An overview of the terms and definitions used in connection with mesogenic or LC compounds is given in *Pure Appl. Chem.* 2001, 73 (5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73 (5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerizable group(s) in a polymerizable mesogenic compound.

DETAILED DESCRIPTION OF THE INVENTION

The LC display according to the present invention is preferably a C-PSVA display. The preferred embodiments of the dispay according to the invention as described hereinafter (with an electrode structure comprising a third electrode and a polymerizable LC medium comprising a chiral dopant), do thus preferably relate to a display of the C-PSVA mode. However, they can also be applied to or used in other polymer stabilized (PS) display modes, like the PS-IPS mode, PS-FFS mode or polymer stabilized SA-VA mode. Any necessary changes to adopt the preferred embodiments to these other PS modes can be made by the person skilled on the art based on his/her general knowledge.

The structure of a display according to the invention corresponds to the usual geometry for PSA displays as described in the prior art. Geometries without protrusions are preferred, in particular those in which the electrode on the colour filter and TFT side is structured.

Figure 3:
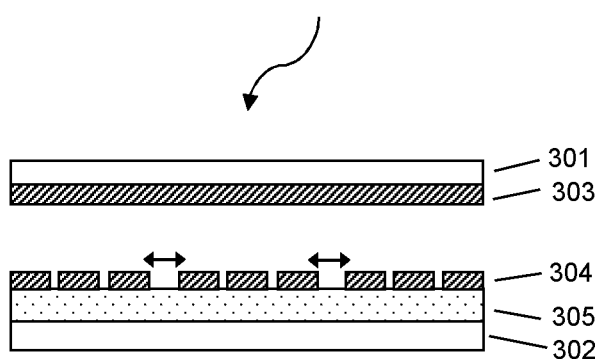
FIG. 3 shows the electrode configuration in a PSA display of prior art.

FIG. 3 exemplarily and schematically illustrates the electrode configuration in a PSA display according to prior art. The curved arrow indicates the viewing direction. The display comprises, from top to bottom, a first or top substrate (301), a second or bottom (302) substrate, a first or top, continuous electrode (303) provided on the first substrate (301), and a second or bottom, electrode (304) having a fishbone pattern provided on the second substrate (302).

In FIG. 3 three pixels of the PSA display are exemplarily shown, with a gap between the patterned electrode substructure of each pixel, as indicated by the double arrows. The PSA display further comprises components which are not shown, like alignment layers on the first and second electrodes, an RGB colour filter with each of the R, G and B regions corresponding to one pixel, and non-linear elements or addressing means for electronically addressing the individual pixels, preferably TFTs, which are located at the bottom and connected via electrical contacts to the second or bottom electrode (304). The non-linear elements are interconnected so that the pixels can be individually addressed by an active matrix driving scheme (AMD). The display then further comprises an isolation layer (305) to isolate the second electrode from the TFTs.

A layer of an LC medium with a polymerizable or polymerized compound is positioned between the first and second electrodes such that it is contacting the first and second alignment layers if these are present.

As mentioned above, the LC molecules in the areas overlying the patterned electrode may show insufficient rotation and alignment when a voltage is applied to the electrodes during operation of the display, due to the inhomogeneous electric field created by the patterned electrode.

Moreover, due to the pixelated structure of the second electrode as shown in FIG. 3, the layer of the LC medium will include LC molecules which are located in areas overlying the pixelated electrodes and LC molecules which are located in areas overlying the gaps between the pixelated electrodes. When a voltage is applied to the electrodes during operation of the display, the LC molecules in the areas overlying the gaps are therefore not subjected to the same orienting force of the electric field as the LC molecules in areas overlying the pixelated electrodes. This may lead to insufficient orientation and rotation of the LC molecules in the gap regions.

Due to the reasons stated above, the transmittance of the display in the addressed state (i.e. with a voltage applied to the electrodes) may be reduced.

In the display according to the present invention, this problem could be solved by applying an additional third electrode below the patterned, second electrode.

Figure 4:
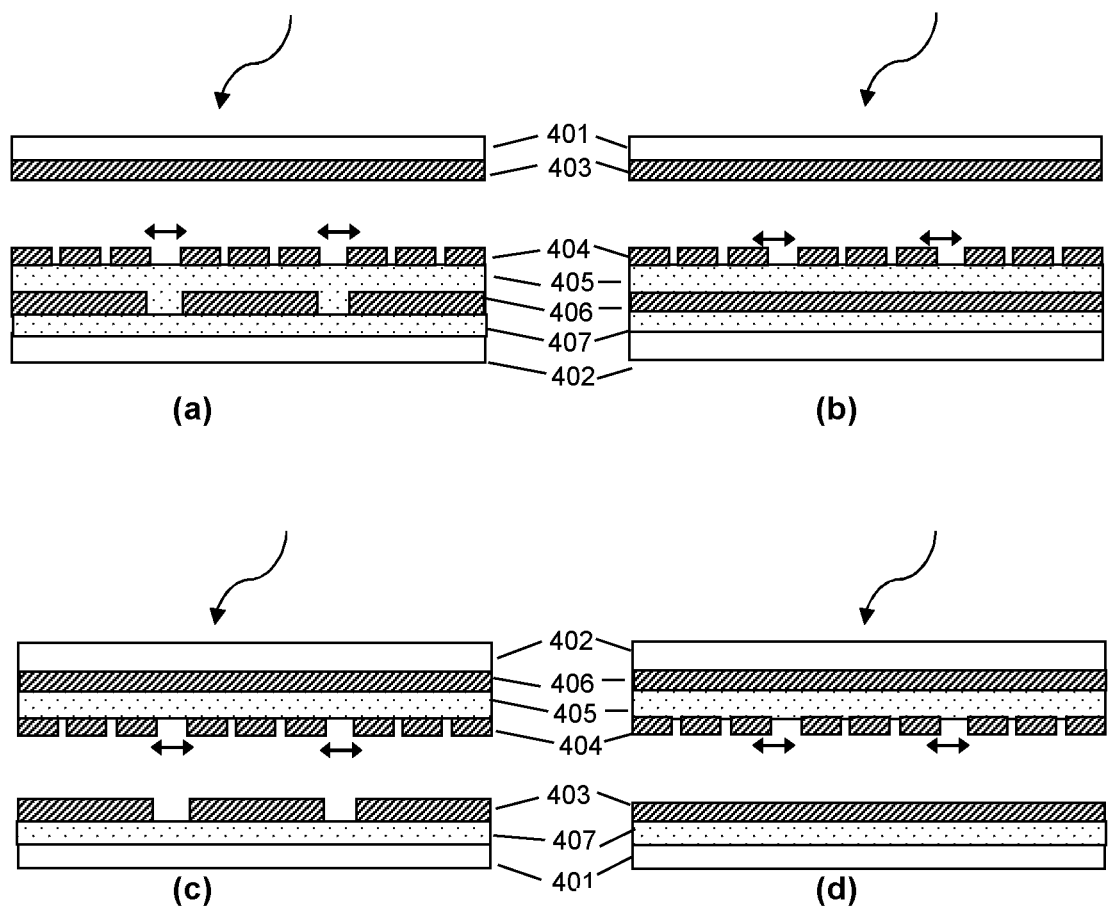
FIG. 4(a)-(d) shows preferred electrode configurations in a C-PSA display according to the present invention.

FIG. 4 exemplarily and schematically illustrates the electrode configurations in a C-PSA display according to a first (a), second (b), third (c) and fourth (d) preferred embodiment of the present invention. The curved arrow indicates the viewing direction. The display comprises a first substrate (401), a first electrode (403) provided on the first substrate (401), a second substrate (402), a second ITO electrode (404) having a fishbone pattern and an isolation layer (405) provided on the second substrate (402), and a third ITO electrode (406) provided between the second substrate (402) and the isolation layer (405).

In each of FIG. 4(*a*)-(*d*) three pixels of the C-PSA display are exemplarily shown, with a gap between the patterned electrode substructure of each pixel, as indicated by the double arrows. The C-PSA display further comprises elements which are not shown, like alignment layers on the first and second electrodes, an RGB colour filter with each of the R, G and B regions corresponding to one pixel, and non-linear elements or addressing means, preferably TFTs, very preferably TFTs comprising CdSe or being based on polycrystalline or amorphous silicon, or oxide TFTs like IGZO, which are located at the bottom and connected via electrical contacts to the second electrode (404) and the third electrode (406). The display preferably further comprises a second isolation layer (407), for example of SiNx, to isolate the second and third electrodes from the TFTs.

A layer of an LC medium with a polymerizable or polymerized compound is positioned between the first and second electrodes such that it is contacting the first and second alignment layers if these are present.

Like in the prior art display shown in FIG. 3, in the C-PSA display of the present invention as shown in FIG. 4(*a*)-(*d*) the layer of the LC medium will include LC molecules which are located in areas overlying the pixelated electrodes and LC molecules which are located in areas overlying the gaps between the pixelated electrodes.

However, in the C-PSA display of the present invention, when a voltage is applied to the electrodes during operation of the display, the LC molecules both in the areas overlying the patterned electrode and in the areas overlying the gaps between the pixelated electrodes are now subjected to the additional straight electric field force of the third electrode.

Figure 5:
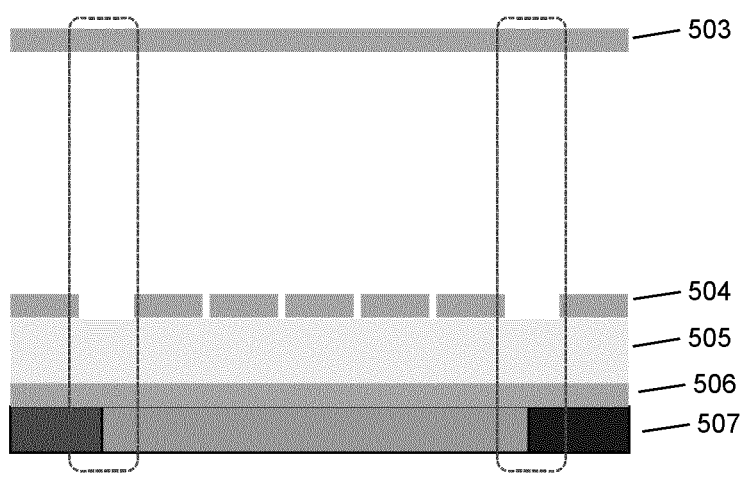
FIG. 5 shows the gap regions between individual pixels in a C-PSA display according to the present invention.

This is schematically illustrated in FIG. 5 which shows a detail enlargement of a pixel of the display shown in FIG. 5, including the first or top electrode (503), second or bottom, patterned electrode (504), isolation layer (505), third electrode (506) and RGB colour filter (507). The dotted lines indicate the areas of the LC molecules overlying the gaps between the pixelated second electrode (504) which are now subject to the additional field force of the third electrode (506). This results in a better orientation of the LC molecules for the whole pixel and thereby in an improved transmittance in the addressed state.

In addition, during the PSA process, which is the part of the display manufacturing process wherein the pretilt angle is generated in the LC molecules close to the substrates, by polymerizing the polymerizable component in the LC medium while a voltage is applied, the electric field generated by the patterned second electrode will align the tilted LC molecules at an azimuthal angle within the plane of the substrate which is defined by the fishbone pattern of the electrode, also known as multi-domain alignment. As a consequence, during operation of the display in the addressed (i.e. driven or field-on) state the LC molecules throughout the LC layer will be predominantly aligned into the horizontal direction corresponding to the azimuthal angle of the pretilted LC molecules close to the substrates in the non-addressed (i.e. undriven or field-off) state.

As will be shown below, the third electrode can increase uniformity of the alignment of the LC molecules along the azimuthal angle during the PSA process, both in the areas overlying the patterned electrode and in the areas overlying the gaps between the pixelated electrode structure. This contributes to a more uniform alignment of the LC molecules in the addressed state and to an overall improvement of the transmittance.

In the C-PSA display according to the first preferred embodiment as shown in FIG. 4(*a*), the first substrate (401) is the top substrate (i.e. facing the viewer) and the first electrode (403) is the top electrode, while the second substrate (402) is the bottom substrate (i.e. facing away from the viewer) and the second electrode (404) and third electrode (406) are the bottom electrodes, and are both connected to the non-linear elements like TFTs. Also, the third electrode (406) has a patterned structure, preferably corresponding to the individual pixels, while the first electrode (403) is an unpatterned (i.e. continuous) electrode.

In the C-PSA display according to the second preferred embodiment as shown in FIG. 4(*b*), the first substrate (401) is the top substrate and the first electrode (403) is the top electrode, while the second substrate (402) is the bottom substrate and the second electrode (404) and third electrode (406) are the bottom electrodes, and are both connected to the non-linear elements like TFTs. Also, both the first electrode (403) and the third electrode (406) are unpatterned (i.e. continuous) electrodes.

In the C-PSA display according to the third preferred embodiment as shown in FIG. 4(*c*), the second substrate (402) is the top substrate and the second electrode (404) and third electrode (406) are the top electrodes, while the first substrate (401) is the bottom substrate and the first electrode (403) is the bottom electrode and is connected to the non-linear elements like TFTs. Also, the first electrode (403) has a patterned structure, preferably corresponding to the individual pixels, and the third electrode (406) is an unpatterned (i.e. continuous) electrode.

In the C-PSA display according to the fourth preferred embodiment as shown in FIG. 4(*d*), the second substrate (402) is the top substrate and the second electrode (404) and third electrode (406) are the top electrodes, while the first substrate (401) is the bottom substrate and the first electrode (403) is the bottom electrode and is connected to the non-linear elements like TFTs. Also, both the first electrode (403) and the third electrode (406) are unpatterned (i.e. continuous) electrodes.

The first (403), second (404) and third (406) electrodes are preferably transparent electrode layers, and are preferably comprising, very preferably consisting of, ITO (indium tin oxide).

The second electrode (404) is a patterned electrode having a fishbone pattern, preferably as illustrated in FIG. 1(*a*). The second electrode (404) is preferably a pixelated electrode defining pixel areas.

The first electrode (403) is preferably a continuous electrode layer, which may be disposed on the entire portion of the substrate facing the other substrate.

In another preferred embodiment the first electrode (403) also has a pattern, for example a fishbone pattern, and is also a pixel electrode defining pixel areas, the pixel electrode being connected to a non-linear switching element disposed in each pixel area and optionally including a micro-slit pattern.

The third electrode (405) may be a continuous electrode or a patterned electrode. having for example a fishbone pattern.

Preferred electrode patterns for the first (403) and third electrode (405) are shown in FIGS. 1(b),(c),(d) and (e), wherein the dark regions show the electrode material (like ITO).

The respective bottom electrodes are connected to non-linear elements or addressing means, preferably TFTs, very preferably TFTs based on polycrystalline or amorphous silicon or metal oxide material like IGZO.

Further modifications to the electrode structure can be designed and carried out by the skilled person depending on the individual display type. For example for PS-VA displays a multi-domain orientation of the LC molecules can be induced by providing electrodes having slits and/or bumps or protrusions in order to create two, four or more different tilt alignment directions.

The substrates (401, 402) used in the C-PSA display according to the present invention are preferably glass substrates. For flexible displays preferably plastic substrates are used. These plastic substrates preferably have a low birefringence. Examples of suitable and preferred plastic substrates are polycarbonate (PC), polyethersulfone (PES), polycyclic olefine (PCO), polyarylate (PAR), polyetheretherketone (PEEK), or colourless polyimide (CPI) substrates.

At least one of the first and second substrate (401, 402) should be transmissive for the photoradiation used for polymerizing the polymerizable compounds used in the process according to the present invention.

The first and/or second substrate (401, 402) may carry further layers or components including but not limited to a colour filter, TFT arrays, a black matrix, a polyimide coating, or other components typically provided on a substrate of a PSVA display.

Preferably at least one of the first and second substrate (401, 402), more preferably each of the first and second substrate (401, 402), is equipped with an alignment layer which is usually applied on the electrodes such that it contacts the LC medium.

The alignment layer controls the alignment direction of the LC molecules of the LC layer. In the C-PSA display according to the present invention the alignment layers are selected such that they impart to the LC molecules vertical alignment, i.e. wherein the longitudinal axis of the LC molecules is perpendicular to the surface of the nearest substrate, and wherein the longitudinal axis of the LC molecules is also slightly tilted relative to the surface of the substrate. Such an alignment layer may for example comprise a polyimide, which may also be rubbed, or may be prepared by a photoalignment method.

In case the substrates (401, 402) are equipped with alignment layers that are prepared by photopolymerization and/or photoalignment, at least one substrate should be transmissive for the photoradiation used for photopolymerization or photoalignment of the alignment layer material or its precursor.

Preferably the tilt angle of the longitudinal axis of the LC molecules located in proximity to the surface of a substrate relative to said substrate is from >0° to 20°, preferably from 0.1° to 20°, very preferably from 0.2° to 3.5°.

Preferably the C-PSA display according to the present invention comprises both a first and second alignment layer, preferably comprising or consisting of polyimide.

In a preferred embodiment the alignment layer is formed by depositing a solution of an alignment layer material like for example polyimide, or a precursor thereof like for example a polyimide precursor, on the substrate, and optionally curing the alignment layer material or its precursor by exposure to heat and/or actinic radiation, for example UV radiation.

The alignment layer material, or precursor thereof, can be deposited on the substrate for example by coating or printing methods.

In case a solvent is used for deposition of the alignment layer material, it is preferably dried off or evaporated off after deposition. Solvent evaporation can be supported for example by applying heat and/or reduced pressure.

Preferred methods for curing the alignment layer are thermal curing and photocuring, very preferably photocuring. Photocuring is for example carried out by exposure to UV radiation. Suitable curing conditions can be selected by the skilled person depending on the precursor material used, based on his/her common knowledge and/or as described in the literature. In case of commercially available materials suitable processing and/or curing conditions are often provided together with the sales or sampling of the material.

The C-PSA display according to the present invention may comprise further elements, like a colour filter, a black matrix, a passivation layer, optical retardation layers, transistor elements for addressing the individual pixels, etc., which are not shown in FIG. 4. These components are well known to the person skilled in the art and can be employed without inventive skill.

The invention further relates to a method of manufacturing an LC display of the C-PSA mode comprising the steps a) to e) as described above and below.

Figure 6:
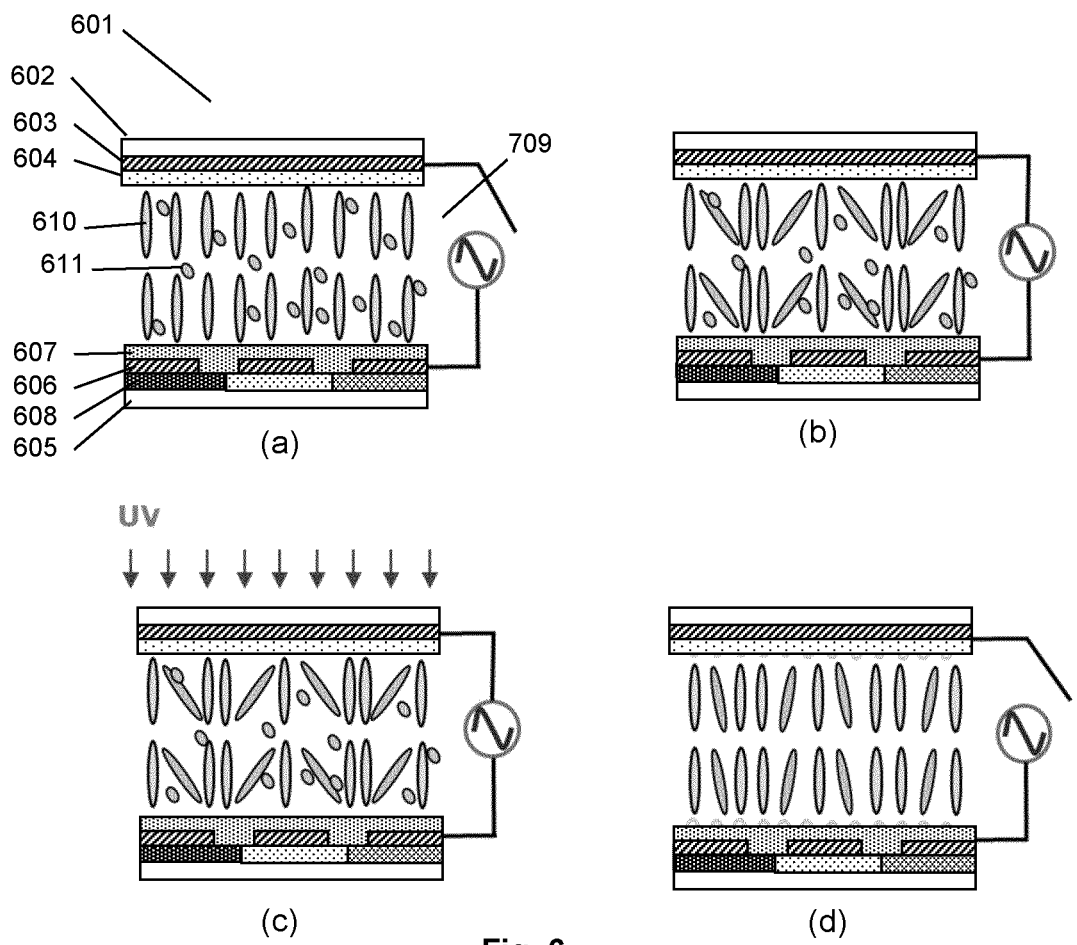
FIG. 6(a)-(d) shows the PSA process in a PSA display according to prior art.
Figure 7:
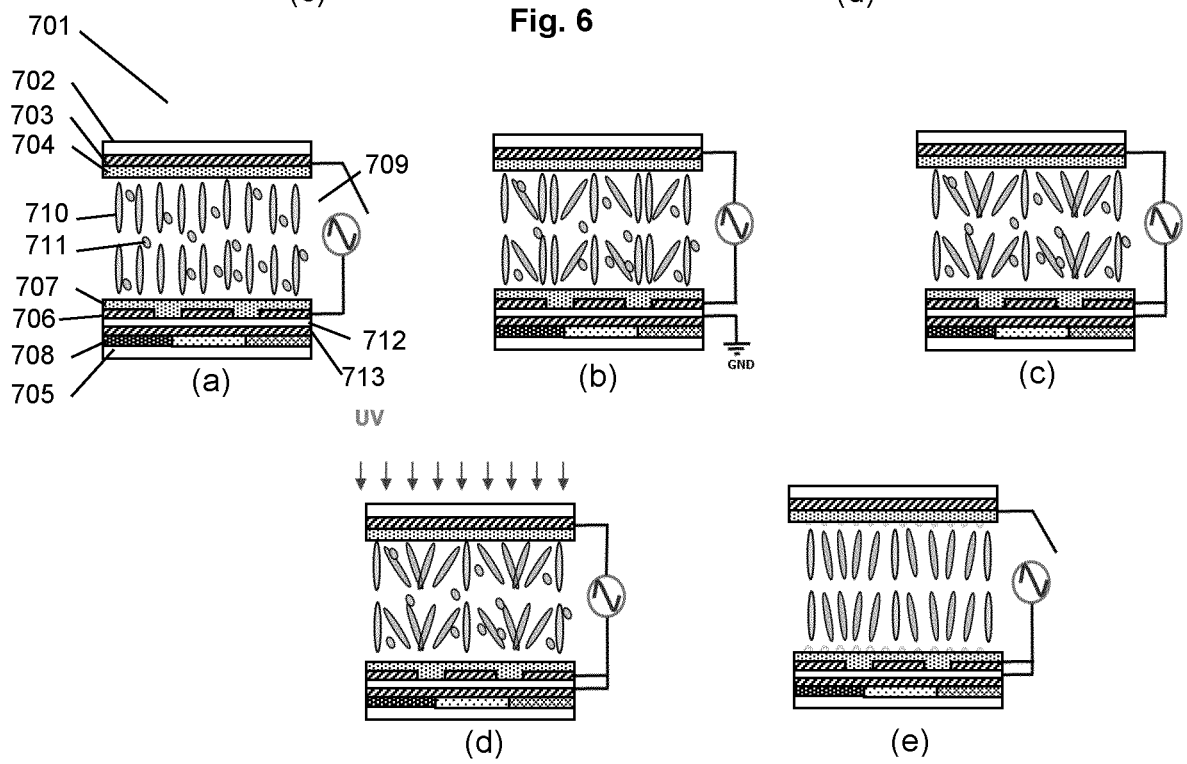
FIG. 7(a)-(e) shows the PSA process in a C-PSA display according to the present invention.

FIG. 6 and FIG. 7 do exemplarily illustrate the process of preparing a C-PSA display according to prior art (FIG. 6) in comparison to the process of preparing a C-PSVA display according to the present invention (FIG. 7).

FIG. 6(a) shows a C-PSA display (601) according to prior art, including a first (602) substrate with a first, unpatterned ITO electrode (603) and an alignment layer e.g. of polyimide (604), a second substrate (605) with a second ITO electrode (606) having a fishbone pattern and an alignment layer of e.g. polyimide (607), a colour filter (608), and a layer of an LC medium (609) comprising LC molecules (610), polymerizable compound(s) (611) and chiral dopant (not shown).

Upon applying a voltage to the first and second electrodes (603, 606) as shown in FIG. 6(b), the LC molecules (610) will be oriented into a tilted alignment with a certain pretilt angle.

Moreover, as mentioned above, the electric field generated by the patterned second electrode will align the tilted LC molecules at an azimuthal angle within the plane of the substrate that is defined by the fishbone pattern of the second electrode (606), also known as multi-domain alignment. The azimuthal angle will lead to a preferred orientation direction of the horizontally oriented LC molecules in the addressed (i.e. driven or field-on) state.

Upon irradiation with UV light as shown in FIG. 6(c), the polymerizable compound(s) (611) are polymerized and form a polymer structure on the substrates. Thereby the pretilt angle and the azimuthal angle (or multidomain alignment) of the LC molecules are permanently fixed even after the voltage has been switched off as shown in FIG. 6(d). However, in the areas overlying the gaps between the pixelated second electrode the generated tilt is non-uniform and the LC molecules tend to be more vertically oriented.

FIG. 7(a) shows a C-PSA display (701) of the present invention, including a first (702) substrate with a first, unpatterned ITO electrode (703) and an alignment layer e.g. of polyimide (704), a second substrate (705) with a second, patterned ITO electrode (706) having e.g. a fishbone pattern and an alignment layer of e.g. polyimide (707), a colour filter (708), and a layer of an LC medium (709) comprising LC molecules (710), polymerizable compound(s) (711) and chiral dopant (not shown). The display further includes an isolating layer (712) and a third, unpatterned electrode (713).

First, a voltage field is applied to the first and second electrodes (703, 706) while the third electrode is grounded (to prevent it becoming floating by capacitive coupling with the loaded nearby electrodes), as shown in FIG. 7(b), causing orientation of the LC molecules (710) into a slightly tilted alignment with a certain pretilt angle and multidomain orientation in the same way as in the display of FIG. 6.

Then a voltage is also applied to the third electrode (713), as shown in FIG. 7(c). Preferably the third electrode is switched to same potential as the second electrode. This creates an electric field with even straight field lines that is overlapping the inhomogeneous field generated by the second electrode (706). As a result it generates homogeneous alignments of the LC molecules in the areas overlying the gaps between the pixelated second electrode.

Moreover, the additional electric field force generated by the third electrode will improve alignment of the LC molecules in the direction along the azimuthal angle, both in the areas overlying the patterned electrode and in the areas overlying the gaps between the pixelated electrode structures. As a result, the uniformity of the multidomain alignment of the planar oriented LC molecules in the addressed (i.e. driven or field-on) state, which is given by the azimuthal angle, will be improved.

Upon irradiation with UV light as shown in FIG. 7(d), the polymerizable compound(s) are be polymerized and form a polymer structure on the substrates. Thereby the pretilt angle and the multidomain alignment along the azimuthal angle are permanently fixed even after the voltage has been switched off as shown in FIG. 7(e).

Overall, the third electrode will thus improve the alignment of the LC molecules in the driven display and thereby lead to increased transmittance.

In a preferred embodiment the C-PSA LC display according to the present invention additionally comprises a first compensation film and a second compensation film (not shown in FIG. 7) sandwiching the display, which are preferably selected from biaxial compensation films.

The first and second compensation films are preferably selected from compensation films that are known from prior art for use in PSVA displays. Preferably a polymer film, like for example a COP (cycloolefin polymer) film (available for example as Zeonex® from Nippon Zeon) is used which is stretched, preferably biaxially stretched, to provide the desired retardation in the film plane and in the thickness direction.

Preferably the first and second biaxial compensation films exhibit the optical properties of an A plate and a C plate, which can be achieved for example by biaxial stretching. Preferably the retardation in the film plane, $R_0$, is from 30 to 80 nm, most preferably 50 nm, and the retardation in the thickness direction, $R_{th}$ is from −150 to −200 nm, most preferably −175 nm.

The individual process steps a) to e) will be discussed in more detail below.

In step a) a C-PSA display is provided comprising the components as described above and below.

In step b) a layer of an LC medium having negative dielectric anisotropy, and containing components A, B, C and optionally D as described above and below, is dispensed between the first and the second substrate, such that the LC medium is in contact with the first and second alignment layer in case such an alignment layer is present. The LC medium preferably has a nematic phase at room temperature.

The LC medium can be dispensed or filled onto the substrates or into the display, respectively, by methods that are conventionally used by display manufacturers.

Preferably the LC medium is deposited onto the substrate by using one of the following deposition methods: one drop filling (ODF), ink jet printing, spin coating, slit coating, flexo printing, or a comparable method.

A preferred method is ink jet printing.

Another preferred method is ODF method, preferably comprising the following steps b1) dispensing a droplet or an array of droplets of the LC medium on the first substrate, and b2) providing the second substrate on top of the first substrate with the dispensed droplets of the LC medium, preferably under vacuum conditions, causing the droplets of the LC medium to spread and form a continuous layer between the two substrates.

The applied LC medium forms a thin, uniform film with the thickness of the targeted final cell gap of the display.

Preferably the display according to the present invention comprises a fixing means, fixing the first and second substrate at a constant distance relative to each other and with their planes parallel to each other. Preferably the fixing means comprises a sealant material and a spacer material, in order to maintain a constant cell gap and LC layer thickness.

Preferably the first and second substrate are fixed or glued together by the fixing means, for example a sealant material, that is provided on the substrates, preferably in the region close to the edges of the substrates.

Preferably the sealant material is deposited onto the first substrate, or between the first and the second substrate, before the LC medium is dispensed between the first and the second substrate.

The sealant material is provided on the first substrate, or between the first and the second substrate, preferably in the region between the LC medium and the edges of the respective substrate. The sealant material is for example a crosslinked polymer which is formed from a curable polymer precursor. The sealant material is then cured, preferably after the first and second substrates are assembled to form an LC cell, but before photopolymerization of the polymerizable compounds contained in the LC medium. Preferably said sealant material is cured by exposure to heat and/or photoradiation.

The spacer material for example consists of transparent glass or plastic beads. In a preferred embodiment the spacer is dispensed between the substrates together with the LC medium.

In another preferred embodiment, in order to maintain a constant cell gap and LC layer thickness, the display contains a spacer material, for example a photospacer, outside the LC layer, for example above the black matrix, and the LC layer does not contain a spacer material.

Suitable sealants and spacers are known to the skilled person and are commercially available.

The thickness of the layer of the LC medium is preferably from 0.5 to 10 µm, very preferably from 2 to 3.5 µm.

The optical retardation of the layer of the LC medium is preferably from 200 to 1000 nm, very preferably from 400 to 500 nm.

The helical pitch created in the LC medium by the chiral dopant(s) is preferably from 4 to 30 µm, preferably from 8 to 20, very preferably from 12 to 16 µm.

In step c) a voltage is applied to the first and second electrode and preferably the third electrode to generate a pretilt angle in the LC molecules relative to the substrates as discussed above. A suitable voltage can be selected by the skilled person based on general and common knowledge. A preferred voltage range is for example from 5 to 50 V, more preferably from 10 to 40 V, very preferably from 15 to 30 V.

In step d) the polymerizable compounds contained in the LC medium are then polymerized by in-situ polymerization in the LC medium between the substrates while the voltage is applied to the electrodes.

Upon polymerization the polymerizable compounds form a polymer, which causes a certain tilt angle of the LC molecules in the LC medium. Without wishing to be bound to a specific theory, it is believed that at least a part of the crosslinked polymer, which is formed by the polymerizable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerization can be carried out in one step. In a preferred embodiment the polymerization is carried out in two steps.

In the first step, which corresponds to step d) of the process as described above and below, the polymerizable compounds are polymerized by in-situ polymerization in the LC medium between the substrates while the voltage is applied to the electrodes, in order to generate the tilt angle. In the second step, which corresponds to step e) of the process as described above and below, the polymerizable compounds which have not reacted in the first step are polymerized without an applied voltage ("end curing").

Suitable and preferred polymerization methods are, for example, thermal or photopolymerization, preferably photopolymerization, in particular UV induced photopolymerization, which can be achieved by exposure of the polymerizable compounds to UV radiation.

Preferred embodiments for a process of preparing a C-PSA display according to the present invention include one or more of the following features:

the polymerizable medium is exposed to UV light in the display in a 2-step process, including a first UV exposure step ("UV1 step"), with application of a voltage, to generate the tilt angle, and a second UV exposure step ("UV2 step"), without application of a voltage, to complete polymerization, the polymerizable medium is exposed to UV light in the display generated by an UV-LED lamp, preferably at least in the UV2 step, more preferably both in the UV1 and UV2 step, the polymerizable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process, the polymerizable medium is exposed to UV light in the display generated by a UV lamp with a radiation spectrum that is shifted to longer wavelengths, preferably ≥340 nm, more preferably from 350 to <370 nm, very preferably from 355 to 368 nm, to avoid short UV light exposure in the PSA process.

Both using lower intensity and a UV shift to longer wavelengths protect the organic layer against damage that may be caused by the UV light.

A preferred embodiment of the present invention relates to a process for preparing a C-PSA display as described above and below, comprising one or more of the following features, including any combination thereof:

the polymerizable LC medium is irradiated by UV light in a 2-step process, including a first UV exposure step ("UV1 step"), with application of a voltage, to generate the tilt angle, and a second UV exposure step ("UV2 step"), without application of a voltage, to complete polymerization, the polymerizable LC medium is irradiated by UV light generated by a UV lamp having an intensity of from 0.5 mW/cm$^2$ to 10 mW/cm$^2$ in the wavelength range from 300-380 nm, preferably in the UV2 step, and optionally also in the UV1 step, the polymerizable LC medium is irradiated by UV light having a wavelength of ≥340 nm and ≤420 nm, preferably >350 nm, preferably in the range from 340 to 400 nm, more preferably in the range from 350 to 390 nm, very preferably in the range from 360 to 380 nm, most preferably in the range from 360 to 368 nm, irradiation by UV light is carried out using a UV-LED lamp.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths 2 of 300-400 nm is desired, UV exposure can be carried out using a wide band pass filter being substantially transmissive for wavelengths 300 nm<λ<400 nm. When irradiation with UV light of wavelength λ of more than 340 nm is desired, UV irradiation can be carried out using a cut-off filter being substantially transmissive for wavelengths λ>340 nm.

Preferably UV irradiation is carried out using a UV-LED lamp.

The use of UV-LED lamps, which have with only one narrow emission peak, in the PSA process provides several advantages, like for example a more effective optical energy transfer to the polymerizable compounds in the LC medium, depending on the choice of the suitable polymerizable compounds that shows absorption at the emission wavelength of the LED lamp. This allows to reduce the UV intensity and/or the UV irradiation time, thus enabling a reduced tact time and savings in energy and production costs. Another advantage is that the narrow emission spectrum of the lamp allows an easier selection of the appropriate wavelength for photopolymerization.

Very preferably the UV light source is an UV-LED lamp emitting a wavelength in the range from 340 to 400 nm, more preferably in the range from 350 to 390 nm, very preferably in the range from 360 to 380 nm, most preferably in the range from 360 to 368 nm. UV-LED lamps emitting UV light with a wavelength of 365 nm are especially preferred.

Preferably the UV-LED lamp emits light having an emission peak with a full width half maximum (FWHM) of 30 nm or less.

UV-LED lamps are commercially available, for example from Dr. Hoenle A G, Germany or Primelite GmbH, Germany, or IST Metz GmbH, Germany, with emission wavelengths e.g. of 365, 385, 395 and 405 nm.

This preferred process enables the manufacture of displays by using longer UV wavelengths, thereby reducing or even avoiding the hazardous and damaging effects of short UV light components.

UV radiation energy is in general from 6 to 100 J, depending on the production process conditions.

Preferably the LC medium used in the display according to the present invention comprises
- A) a liquid crystal component A comprising mesogenic or liquid-crystalline molecules,
- B) a polymerizable component B comprising one or more polymerizable, preferably polymerizable mesogenic, compounds,
- C) one or more chiral additives, preferably selected from chiral dopants,
- D) optionally one or more further additives, preferably selected from stabilizers and polymerization initiators.

The liquid-crystalline component A) of an LC medium as used in the display according to the present invention is hereinafter also referred to as "LC host mixture", and preferably contains only LC compounds that are selected from low-molecular-weight compounds which are unpolymerizable.

The polymerizable compounds of the polymerizable component B of the LC medium are preferably selected from formula M $$R^a\text{-}B^1\text{-}(Z^b\text{-}B^2)_m\text{-}R^b \qquad M$$

in which the individual radicals, on each occurrence identically or differently, and each, independently of one another, have the following meaning:

$R^a$ and $R^b$ P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where, if $B^1$ and/or $B^2$ contain a saturated C atom, $R^a$ and/or $R^b$ may also denote a radical which is spiro-linked to this saturated C atom, wherein at least one of the radicals $R^a$ and $R^b$ denotes or contains a group P or P-Sp-, P a polymerizable group, Sp a spacer group or a single bond, $B^1$ and $B^2$ an aromatic, heteroaromatic, alicyclic or heterocyclic group, preferably having 4 to 25 ring atoms, which may also contain fused rings, and which is unsubstituted, or mono- or polysubstituted by L, $Z^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, $R^0$ and $R^{00}$ each, independently of one another, denote H or alkyl having 1 to 12 C atoms, m denotes 0, 1, 2, 3 or 4, n1 denotes 1, 2, 3 or 4, L P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxy-carbonyloxy having 1 to 25 C atoms, in which, in addition, one or more H atoms may be replaced by F, Cl, P or P-Sp-, P and Sp have the meanings indicated above, $Y^1$ denotes halogen, $R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or hetero-aryloxy group having 2 to 40 C atoms.

Particularly preferred compounds of the formula M are those in which $B^1$ and $B^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Particularly preferred compounds of the formula M are those in which $B^1$ and $B^2$ each, independently of one another, denote 1,4-phenylene, 1,3-phenylene, naphthalene-1,4-diyl or naphthalene-2,6-diyl.

Very preferred compounds of formula M are selected from the following formulae:

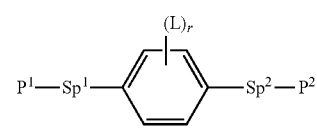

M1

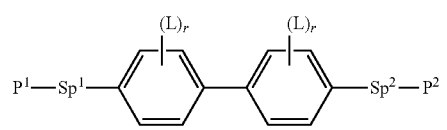

M2

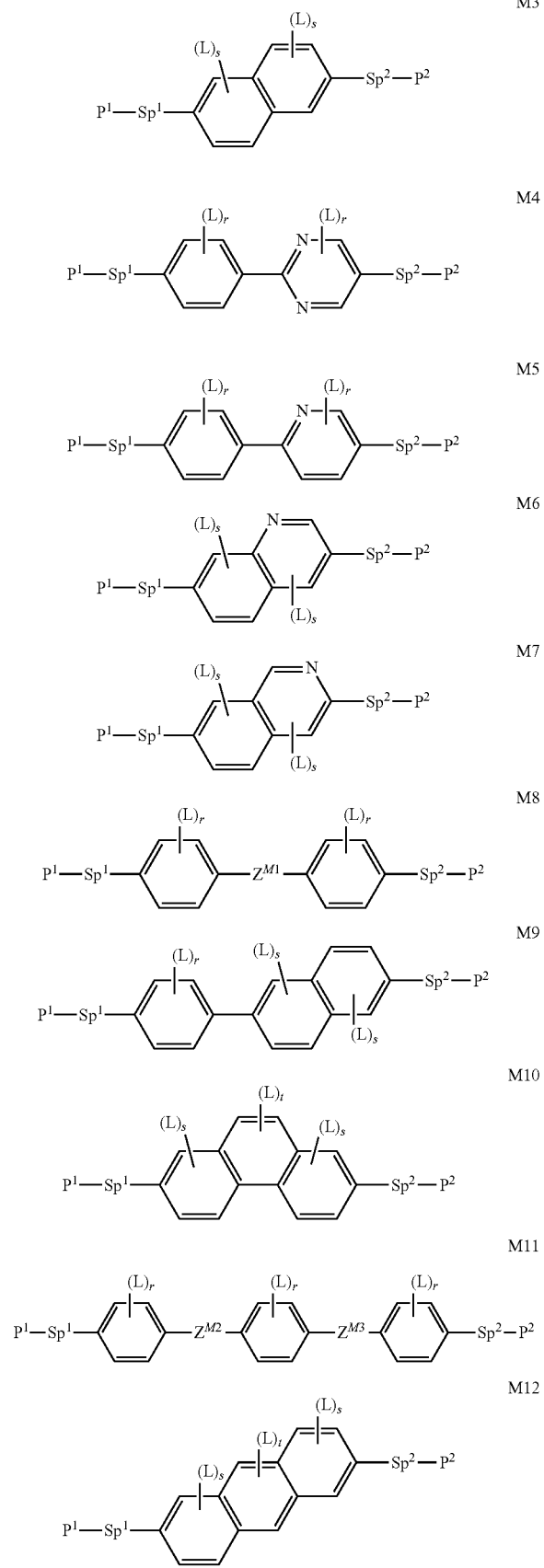
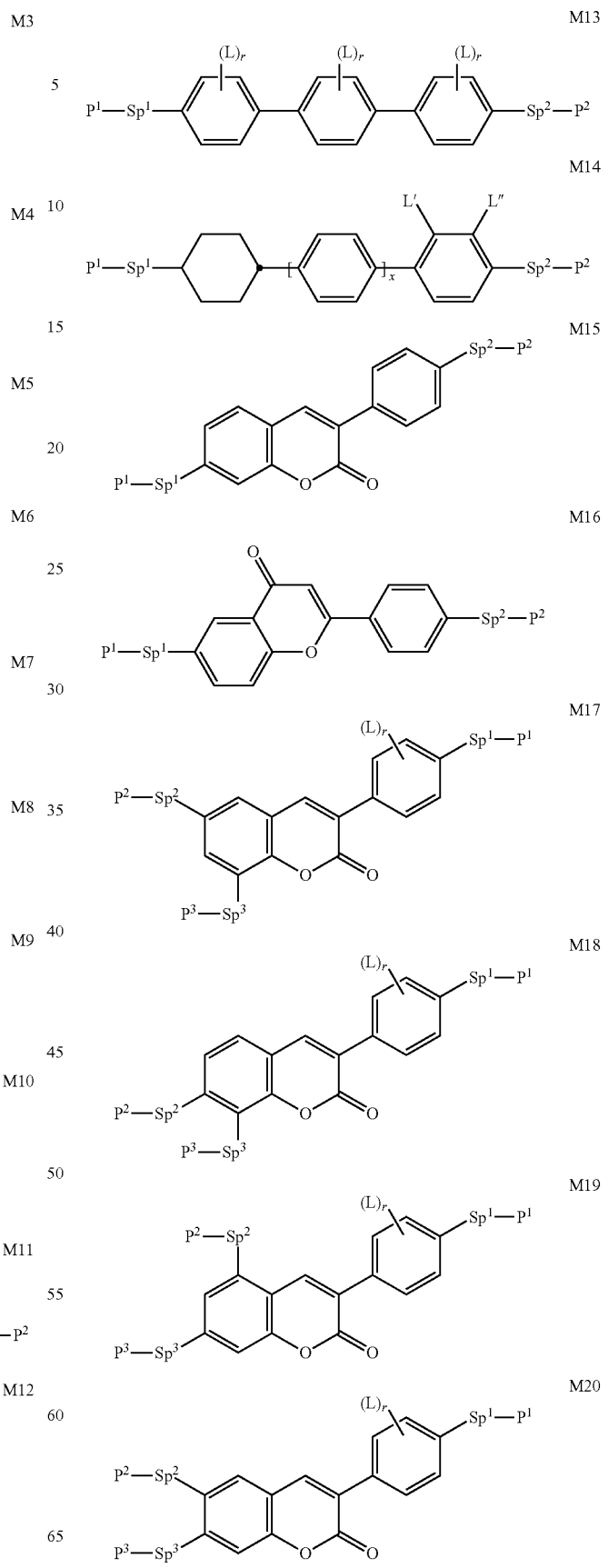

-continued

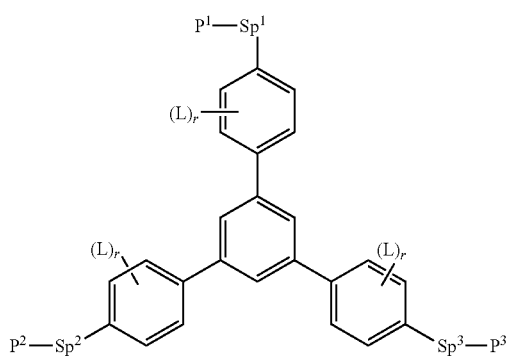

M21

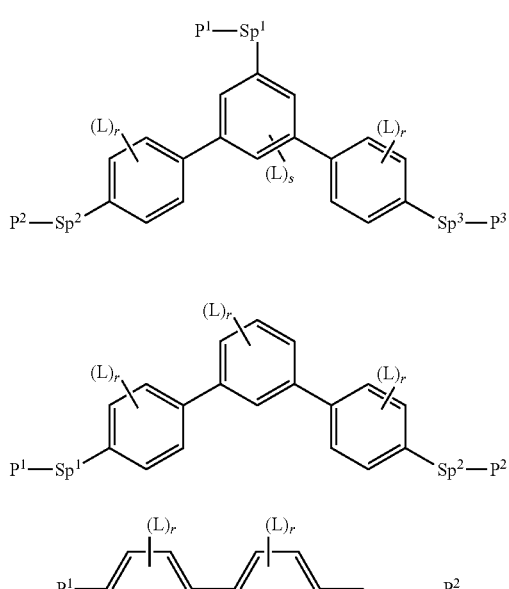

M22

M23

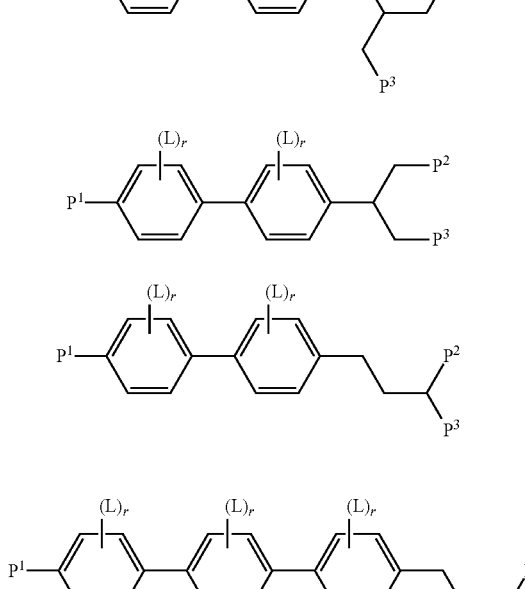

M24

M25

M26

M27

-continued

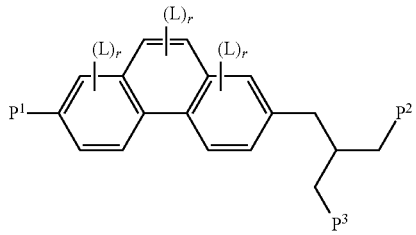

M28

M29

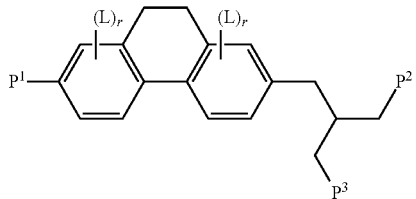

M30

M31

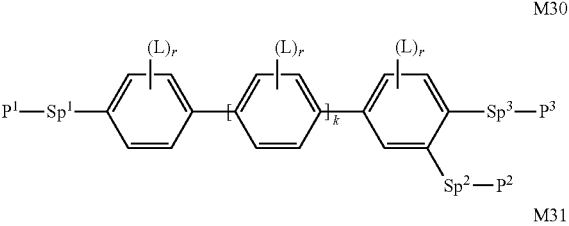

M32

M33

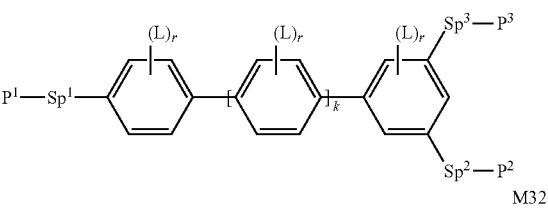

in which the individual radicals, on each occurrence identically or differently, and each, independently of one another, have the following meaning:

$P^1$, $P^2$, $P^3$ a polymerizable group, preferably selected from vinyloxy, acrylate, methacrylate, fluoroacrylate, chloroacrylate, oxetane and epoxy, $Sp^1$, $Sp^2$, $Sp^3$ a single bond or a spacer group where, in addition, one or more of the radicals $P^1$-$Sp^1$-, $P^2$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, preferably —$(CH_2)_{p1}$—, —$(CH_2)_{p1}$—O—, —$(CH_2)_{p1}$—CO—O— or —$(CH_2)_{p1}$—O—CO—O—, wherein p1 is an integer from 1 to 12, $R^{aa}$ H, F, Cl, CN or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P$^1$-Sp$^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), and wherein R$^{aa}$ does not denote or contain a group P$^1$, P$^2$ or P$^3$ R$^0$, R$^{00}$ H or alkyl having 1 to 12 C atoms, R$^y$ and R$^z$ H, F, CH$_3$ or CF$_3$, X$^1$, X$^2$, X$^3$ —CO—O—, —O—CO— or a single bond, Z$^{M1}$ —O—, —CO—, —C(R$^y$R$^z$)— or —CF$_2$CF$_2$—, Z$^{M2}$, Z$^{M3}$ —CO—O—, —O—CO—, —CH$_2$O—, —OCH$_2$—, —CF$_2$O—, —OCF$_2$— or (CH$_2$)$_n$—, where n is 2, 3 or 4, L F, Cl, CN or straight-chain or branched, optionally mono- or polyfluorinated alkyl, alkoxy, thioalkyl, alkenyl, alkynyl, alkylcarbonyl, alkoxycarbonyl, alkylcarbonyloxy or alkoxycarbonyloxy having 1 to 12 C atoms, L', L" H, F or Cl, k 0 or 1, r 0, 1, 2, 3 or 4, S 0, 1, 2 or 3, t 0, 1 or 2, X 0 or 1.

Very preferred are compounds of formulae M2, M13 and M33, especially direactive compounds containing exactly two polymerizable groups P$^1$ and P$^2$.

Further preferred are compounds selected from formulae M17 to M32, in particular from formulae M20, M22, M24, M27, M30 and M32, especially trireactive compounds containing exactly three polymerizable groups P$^1$, P$^2$ and P$^3$.

In the compounds of formulae M1 to M33 the group

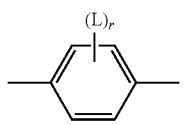

is preferably

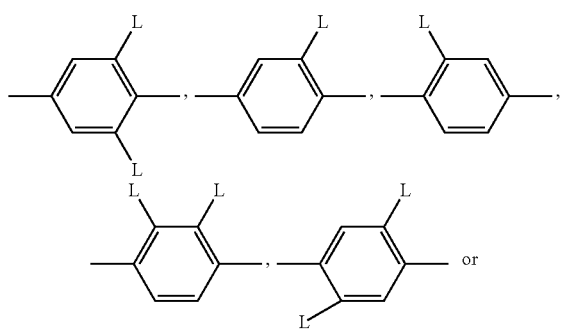

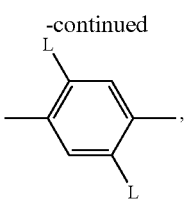

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, —CH=CH$_2$, C(CH$_3$)=CH$_2$, SCH$_3$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, —CH=CH$_2$, C(CH$_3$)=CH$_2$, SCH$_3$, OCH$_3$, COCH$_3$, OCF$_3$ or P-Sp-, more preferably F, Cl, CH$_3$, —CH=CH$_2$, C(CH$_3$)=CH$_2$, SCH$_3$, OCH$_3$, COCH$_3$ or OCF$_3$, most preferably F, SCH$_3$ or OCH$_3$.

Preferred compounds of formulae M1 to M33 are those wherein P$^1$, P$^2$ and P$^3$ denote an acrylate, methacrylate, oxetane or epoxy group, very preferably an acrylate or methacrylate group, most preferably a methacrylate group.

Further preferred compounds of formulae M1 to M33 are those wherein Sp$^1$, Sp$^2$ and Sp$^3$ are a single bond.

Further preferred compounds of formulae M1 to M33 are those wherein one of Sp$^1$, Sp$^2$ and Sp$^3$ is a single bond and another one of Sp$^1$, Sp$^2$ and Sp$^3$ is different from a single bond.

Further preferred compounds of formulae M1 to M33 are those wherein those groups Sp$^1$, Sp$^2$ and Sp$^3$ that are different from a single bond denote-(CH$_2$)$_{s1}$—X"—, wherein s1 is an integer from 1 to 6, preferably 2, 3, 4 or 5, and X" is X" is the linkage to the benzene ring and is —O—, —O—CO—, —CO—O, —O—CO—O— or a single bond.

Particularly preferred are LC media comprising one, two or three polymerizable compounds of formula M.

Further preferred are LC media comprising two or more direactive polymerizable compounds of formula M, preferably selected from formulae M1 to M16 and M33, very preferably selected from formulae M2, M13 and M33.

Further preferred are LC media comprising one or more direactive polymerizable compounds of formula M, preferably selected from formulae M1 to M16 and M33, very preferably from formulae M2, M13 and M33, and one or more trireactive polymerizable compounds of formula M, preferably selected from formulae M17 to M32, very preferably from formulae M20, M22, M24, M27, M30 and M32.

Further preferred are LC media comprising one or more polymerizable compounds of formula M wherein at least one r is not 0, or at least one of s and t is not 0, very preferably selected from formulae M2, M13, M22, M24, M27, M30, M32 and M33, and wherein L is selected from the preferred groups shown above, most preferably from F, OCH$_3$ and SCH$_3$.

Further preferred are LC media comprising one or more polymerizable compounds which show absorption in the wavelength range from 320 to 380 nm, preferably selected from formula M, very preferably from formulae M1 to M33.

Further preferred are LC media comprising one or more polymerizable compounds selected from Table D. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122, R-139, RM-142, RM-143, RM-148 to RM-158, RM-164, RM-165 and RM-166 to RM-178 are particularly preferred.

Further preferred compounds of formulae M1 to M33 are those selected from Table D below, especially those selected from the group consisting of formulae RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-92, RM-102, RM-103, RM-109, RM-116, RM-117, RM-120, RM-121, RM-122, RM-139, RM-140, RM-142, RM-143, RM-148, RM-152, RM-154, RM-155, RM157, RM-158, RM-164, RM-165 and RM-166 to RM-178.

Particular preference is given to LC media comprising one, two or three polymerizable compounds selected from formula M or formulae M1 to M33.

Preference is further given to LC media in which the polymerizable component B) consists exclusively of polymerizable compounds of formula M.

In another preferred embodiment component B) comprises, in addition or alternatively to the polymerizable compounds of formula M according to the preferred subformulae and subgroups as described above, one or more polymerizable mesogenic compounds which contain one or more polymerizable groups and one or more polar anchor groups selected for example from hydroxy, carboxy, amino or thiol groups. These compounds can serve as self-aligning (SA) additives and are useful for SA mode displays according to the present invention. Suitable and preferred polymerizable mesogenic SA additives of this type are selected from compounds of formulae I or M1 to M31 wherein at least one group $B^1$, $B^2$, $R^a$, $R^b$, $R^x$, L, Sp, $Sp^1$, $Sp^2$, $Sp^3$ or $R^{aa}$ is substituted by a hydroxy, carboxy, amino or thiol group, preferably a hydroxy group. Further preferred polymerizable mesogenic SA additives of this type are selected from formula SA-9 to SA-34 in Table E.

Preferably the proportion of the polymerizable compounds of component B) in the LC medium is from 0.05 to <3%, more preferably from 0.1 to 2.5%, very preferably from 0.1 to 1.5%, most preferably from 0.2 to 1.0%. In another preferred embodiment the proportion of the polymerizable compounds of component B) in the LC medium is <1.5%, more preferably from 0.05 to 1.0%, very preferably from 0.1 to 0.8%, most preferably from 0.1 to 0.5%.

The polymerizable compounds of the formulae I and M1 to M33 can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP). Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

In addition to the component A and B, the LC medium contains a component C comprising one or more optically active compounds, preferably selected from chiral dopants.

The helical twisting power of the chiral dopant(s) and their proportion in the LC medium are preferably selected such that the helical pitch created in the LC medium is from 4 to 30 μm, more preferably from 8 to 20 μm, very preferably from 12 to 16 μm.

The proportion of the chiral dopant(s) in the LC medium is preferably from 0.01 to 6%, very preferably from 0.05 to 4%, more preferably from 0.1 to 2%.

Suitable and preferred chiral dopants are mentioned below in Table B. Preferred chiral dopants are for example selected from R- or S-1011, R- or S-2011, R- or S-3011, R- or S-4011, or R- or S-5011.

In another preferred embodiment the LC medium contains one or more polymerization initiators.

Suitable conditions for the polymerization and suitable types and amounts of initiators are known to the person skilled in the art and are described in the literature. Suitable for free-radical polymerization are, for example, the commercially available photoinitiators Irgacure651®, Irgacure184®, Irgacure907®, Irgacure369® or Darocure1173® (Ciba AG).

If a polymerization initiator is added to the LC medium, its proportion is preferably from 0.001 to 1% by weight, particularly preferably from 0.001 to 0.5% by weight.

The polymerizable compounds according to the invention are also suitable for polymerization without an initiator, which is accompanied by considerable advantages, such, for example, lower material costs and in particular less contamination of the LC medium by possible residual amounts of the initiator or degradation products thereof.

The polymerization can thus also be carried out without the addition of an initiator. Thus, in another preferred embodiment, the LC medium does not contain a polymerization initiator.

In another preferred embodiment the LC medium additionally comprises one or more stabilisers in order to prevent undesired spontaneous polymerization of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076.

If stabilisers are employed, their proportion, based on the total amount of RMs or the polymerizable component (component A), is preferably 10-50,000 ppm, particularly preferably 50-5,000 ppm.

In another preferred embodiment of the present invention the LC media contain one or more further stabilisers, preferably selected from the the group consisting of the following formulae

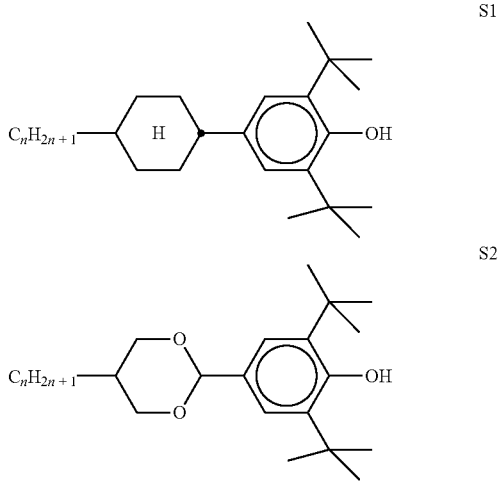

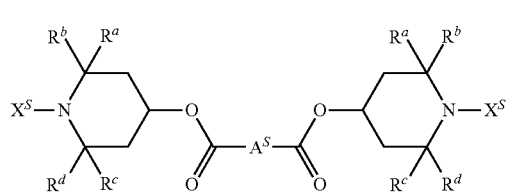

S3 wherein the individual radicals, independently of each other and on each occurrence identically or differently, have the following meanings $R^{a-d}$ straight-chain or branched alkyl with 1 to 10, preferably 1 to 6, very preferably 1 to 4 C atoms, most preferably methyl, $X^S$ H, CH$_3$, OH or O$^\bullet$, $A^S$ straight-chain, branched or cyclic alkylene with 1 to 20 C atoms which is optionally substituted, n an integer from 1 to 6, preferably 3.

Preferred stabilisers of formula S3 are selected from formula S3A

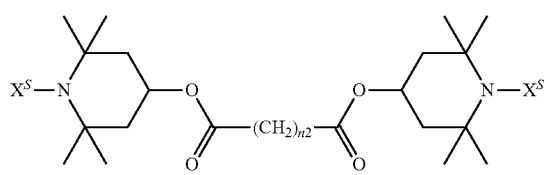

S3A wherein n2 is an integer from 1 to 12, and wherein one or more H atoms in the group (CH$_2$)$_{n2}$ are optionally replaced by methyl, ethyl, propyl, butyl, pentyl or hexyl.

Very preferred stabilisers are selected from the group consisting of the following formulae

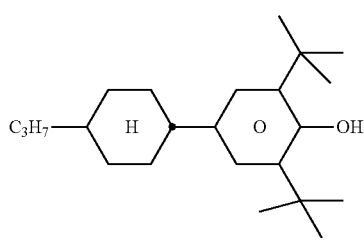

S1-1

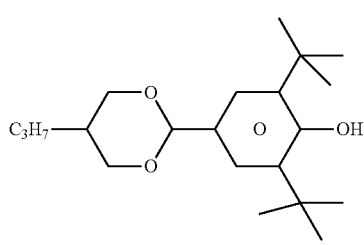

S2-1

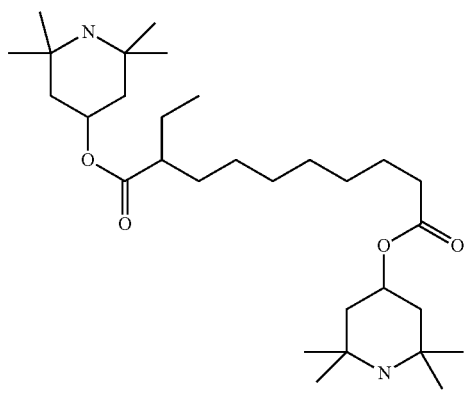

S3-1

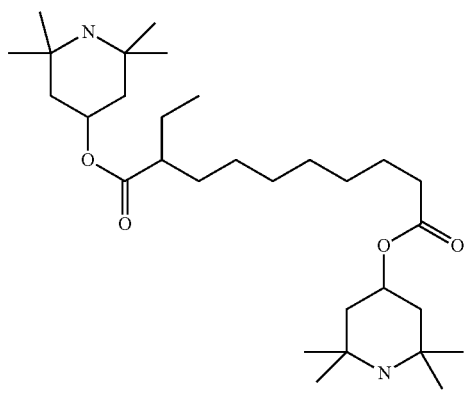

S3-2

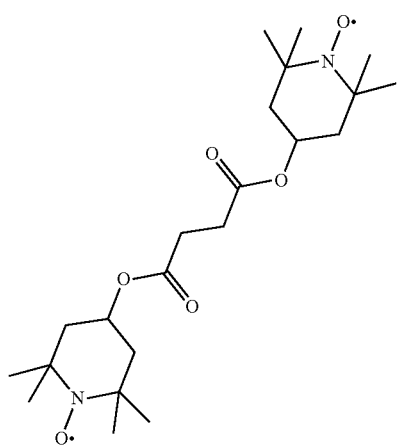

S3-3

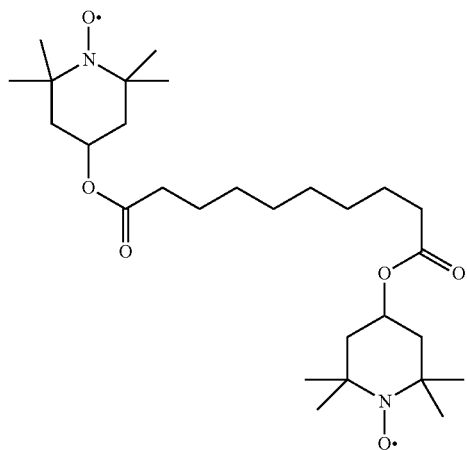

S3-4

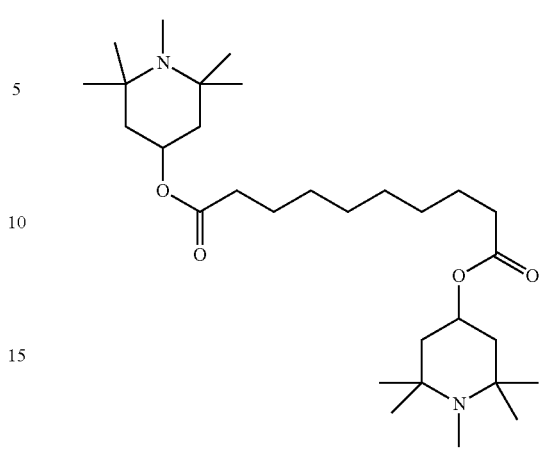

S3-7

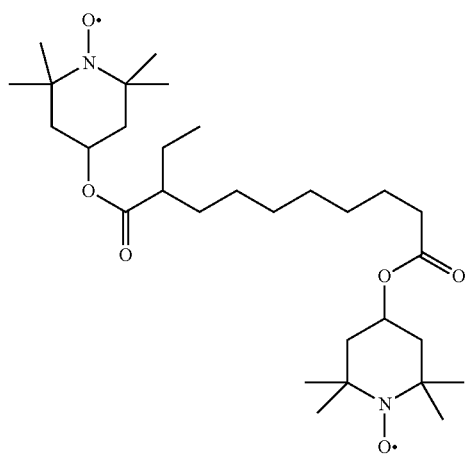

S3-5

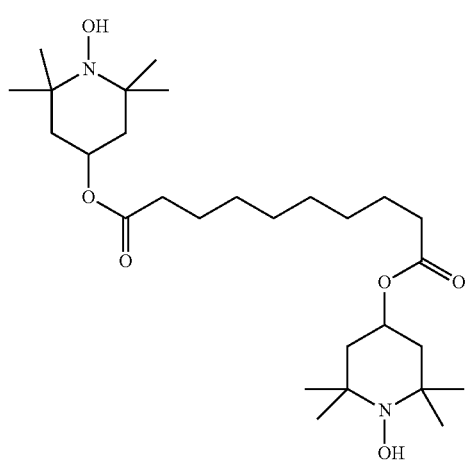

S3-6

In a preferred embodiment the LC medium comprises one or more stabilisers selected from the group consisting of formulae S1-1, S2-1, S3-1, S3-1 and S3-3.

In a preferred embodiment the LC medium comprises one or more stabilisers selected from Table C below.

Preferably the proportion of stabilisers, like those of formula S1-S3, in the LC medium is from 10 to 500 ppm, very preferably from 20 to 200 ppm.

In another preferred embodiment the LC medium according to the present invention contains a self alignment (SA) additive, preferably in a concentration of 0.1 to 2.5%.

In another preferred embodiment the LC medium according to the present invention contains a self alignment (SA) additive, preferably in a concentration of 0.1 to 2.5%.

In a preferred embodiment the SA-VA display according to the present invention does not contain a polyimide alignment layer. In another preferred embodiment the SA-VA display according to preferred embodiment contains a polyimide alignment layer.

Preferred SA additives for use in this preferred embodiment are selected from compounds comprising a mesogenic group and a straight-chain or branched alkyl side chain that is terminated with one or more polar anchor groups selected from hydroxy, carboxy, amino or thiol groups.

Further preferred SA additives contain one or more polymerizable groups which are attached, optionally via spacer groups, to the mesogenic group. These polymerizable SA additives can be polymerized in the LC medium under similar conditions as applied for the RMs in the PSA process.

Suitable SA additives to induce homeotropic alignment, especially for use in SA-VA mode displays, are disclosed for example in US 2013/0182202 A1, US 2014/0138581 A1, US 2015/0166890 A1 and US 2015/0252265 A1.

In another preferred embodiment an LC medium or a polymer stabilised SA-VA display according to the present invention contains one or more self alignment additives selected from Table E below.

In another preferred embodiment the LC medium according to the present invention contains one or more SA additives, preferably selected from Table E, in a concentration from 0.1 to 5%, very preferably from 0.2 to 3%, most preferably from 0.2 to 1.5%.

The LC medium according to the invention may also comprise further additives for example selected from the list including but not limited to antioxidants, free-radical scavengers, surfactants, defoaming agents, wetting agents, lubricating agents, dispersing agents, hydrophobing agents, adhesive agents, flow improvers, deaerators, diluents, reactive diluents, auxiliaries, colourants, dyes, pigments and nanoparticles.

The LC medium preferably has a nematic LC phase at room temperature.

Besides the polymerizable compounds and additives described above, the LC medium for use in the LC displays according to the invention comprises an LC mixture ("host mixture") comprising one or more, preferably two or more LC compounds which are selected from low-molecular-weight compounds that are unpolymerizable, and at least one of which is a compound of formula II. These LC compounds are selected such that they stable and/or unreactive to a polymerization reaction under the conditions applied to the polymerization of the polymerizable compounds.

Particularly preferred embodiments of such an LC medium are shown below.

Preferably the LC medium or its component A) (host mixture) comprises one or more compounds of formula II

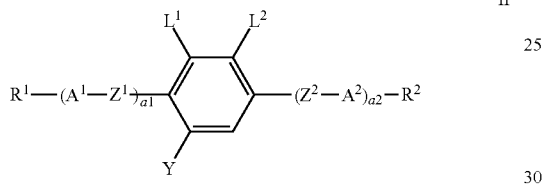

II wherein the individual radicals, independently of each other and on each occurrence identically or differently, have the following meanings $R^1$ and $R^2$ straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O—, $CR^0=CR^{00}$—, —C≡C—,

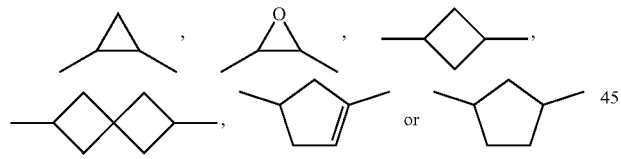

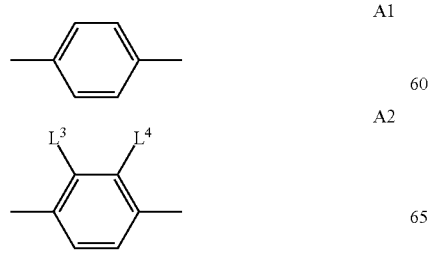

or in such a manner that O- and/or S-atoms are not directly connected with each other, and wherein one or more H atoms are each optionally replaced by F or Cl, preferably alkyl or alkoxy having 1 to 6 C atoms, $R^0$ and $R^{00}$ H or alkyl with 1 to 12 C atoms, $A^1$ and $A^2$ a group selected from the following formulae

A1

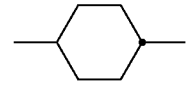

A2

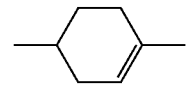

-continued

A3

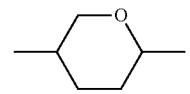

A4

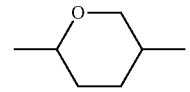

A5

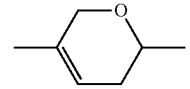

A6

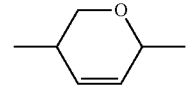

A7

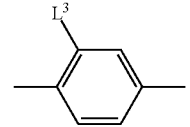

A8

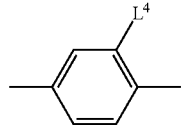

A9

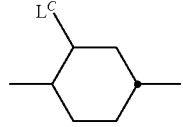

A10

A11

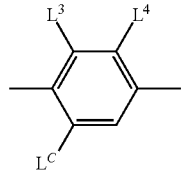

A12

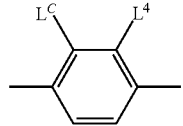

A13

A14

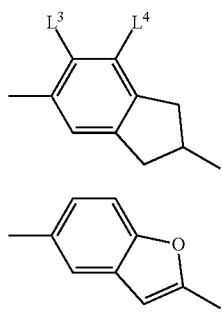

preferably from formulae A1, A2, A3, A4, A5, A6, A9 and A10, very preferably from formulae A1, A2, A3, A4, A5, A9 and A10, $Z^1$ and $Z^2$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^1$, $L^2$, $L^3$ and $L^4$ F, Cl, OCF$_3$, CF$_3$, CH$_3$, CH$_2$F or CHF$_2$, preferably F or Cl, very preferably F, Y H, F, Cl, CF$_3$, CHF$_2$ or CH$_3$, preferably H or CH$_3$, very preferably H, $L^c$ CH$_3$ or OCH$_3$, preferably CH$_3$, a1 1 or 2, a2 0 or 1.

Preferably the LC medium contains one or more compounds of formula II selected from the group consisting of compounds of the formulae IIA, IIB, IIC and IID

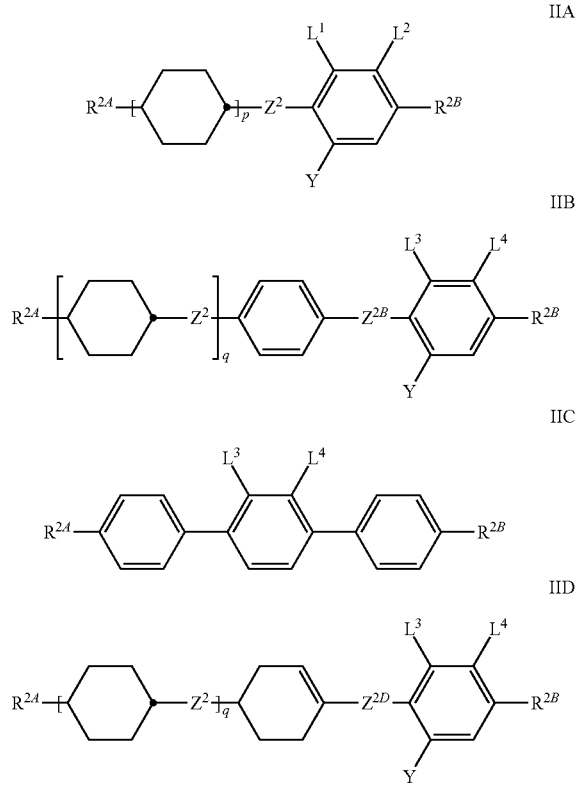

in which $R^{2A}$ and $R^{2B}$ each, independently of one another, denote H, an alkyl or alkenyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

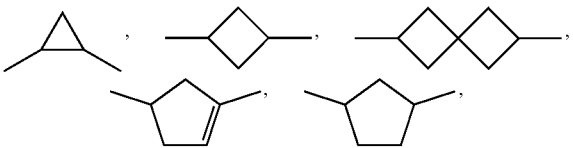

—C≡C—, —CF$_2$O—, —OCF$_2$—, —OC—O— or —O—CO— in such a way that O atoms are not linked directly to one another, $L^1$ to $L^4$ each, independently of one another, denote F, Cl, CF$_3$ or CHF$_2$, Y denotes H, F, Cl, CF$_3$, CHF$_2$ or CH$_3$, preferably H or CH$_3$, particularly preferably H, $Z^2$, $Z^{2B}$ and $Z^{2D}$ each, independently of one another, denote a single bond, —CH$_2$CH$_2$—, —CH=CH—, —CF$_2$O—, —OCF$_2$—, —CH$_2$O—, —OCH$_2$—, —CO O—, —OCO—, —C$_2$F$_4$—, —CF=CF—, —CH=CHCH$_2$O—, p denotes 0, 1 or 2, and q on each occurrence, identically or differently, denotes 0 or 1.

Preferred compounds of the formulae IIA, IIB, IIC and IID are those wherein $R^{2B}$ denotes an alkyl or alkoxy radical having up to 15 C atoms, and very preferably denotes (O)C$_v$H$_{2v+1}$ wherein (O) is an oxygen atom or a single bond and v is 1, 2, 3, 4, 5 or 6.

Further preferred compounds of the formulae IIA, IIB, IIC and IID are those wherein $R^{2A}$ or $R^{2B}$ denotes or contains cycloalkyl or cycloalkoxy radical, preferably selected from the group consisting of

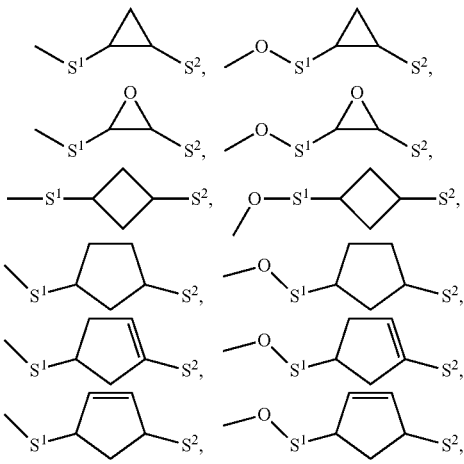

wherein $S^1$ is C$_{1-5}$-alkylene or C$_{2-5}$-alkenylene and $S^2$ is H, C$_{1-7}$-alkyl or C$_{2-7}$-alkenyl, and very preferably selected from the group consisting of

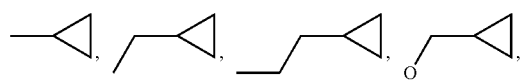

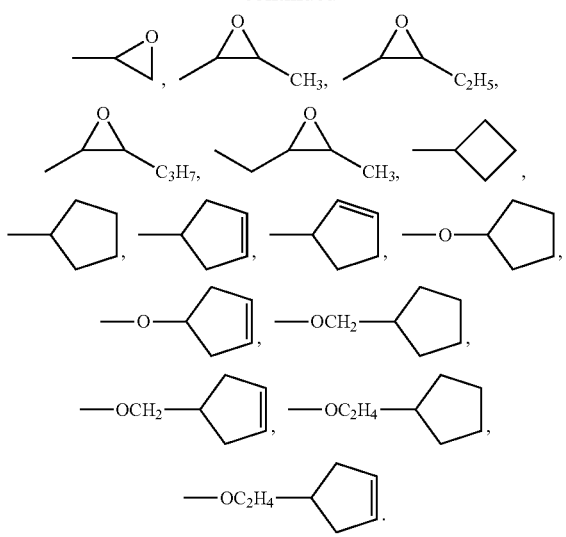
Further preferred compounds of the formulae IIA, IIB, IIC and IID are indicated below:
IIA-1
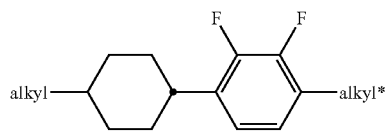
IIA-2
IIA-3
IIA-4
IIA-5
IIA-6
IIA-7
IIA-8
IIA-9
IIA-10
IIA-11
IIA-12
IIA-13
IIA-14
IIA-15
IIA-16
IIA-17
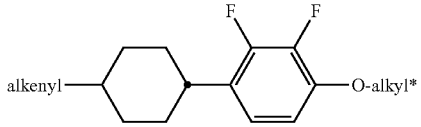
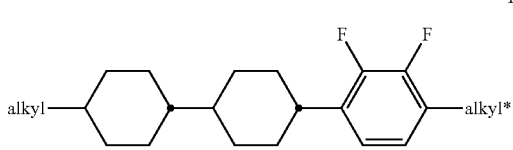
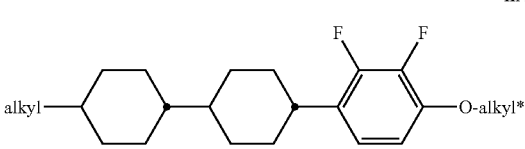
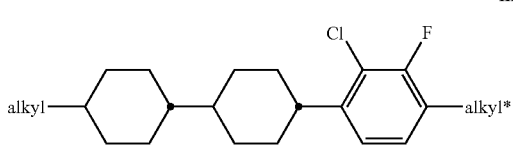
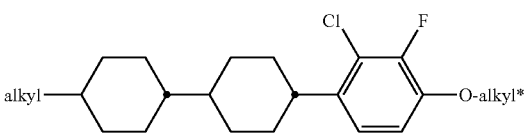
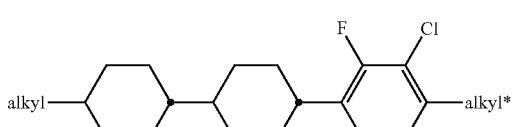
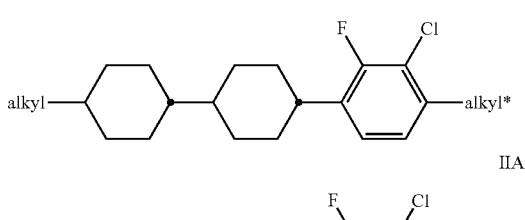
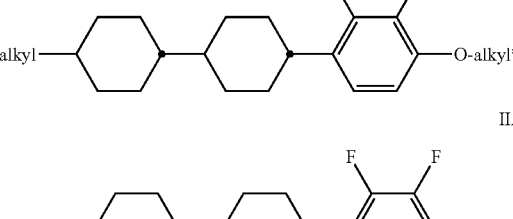
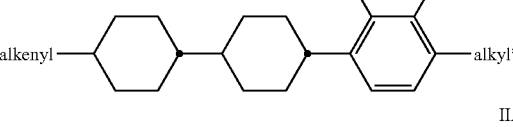
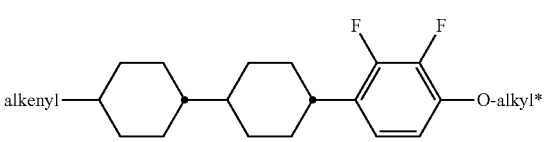
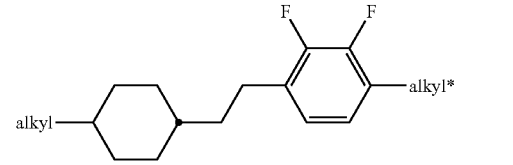

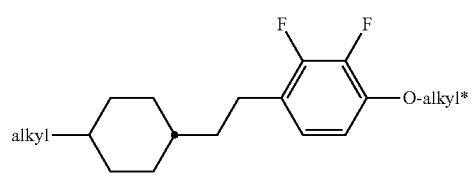 IIA-18
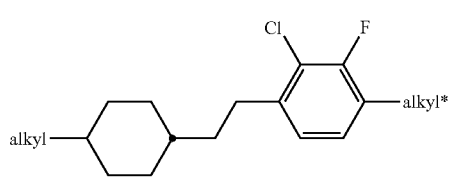 IIA-19
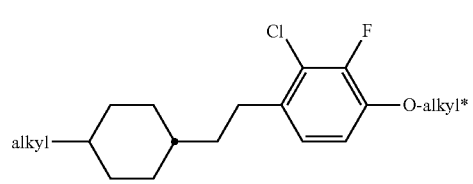 IIA-20
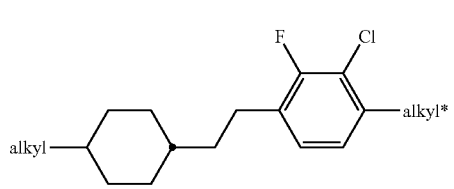 IIA-21
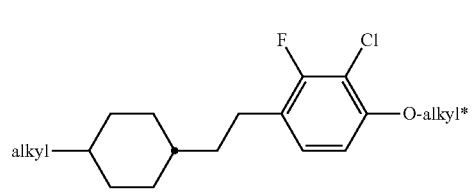 IIA-22
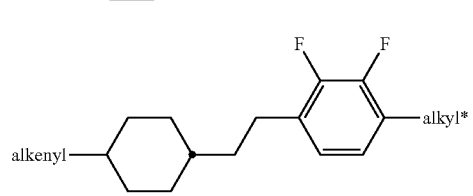 IIA-23
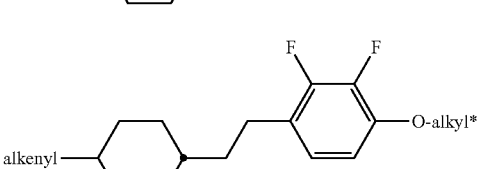 IIA-24
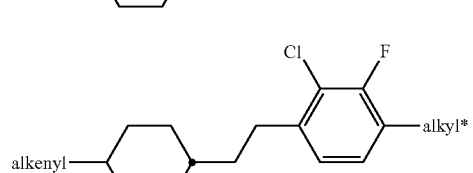 IIA-25
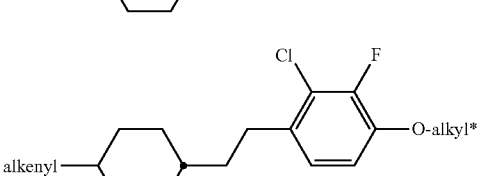 IIA-26
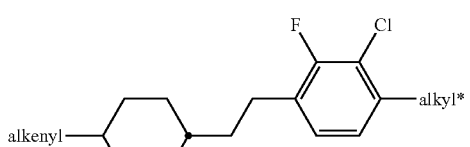 IIA-27
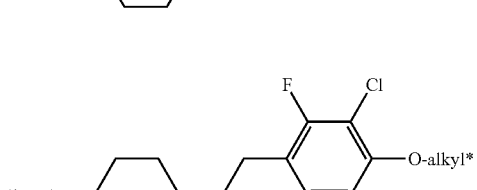 IIA-28
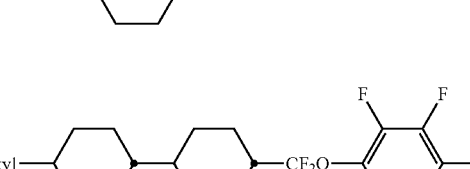 IIA-29
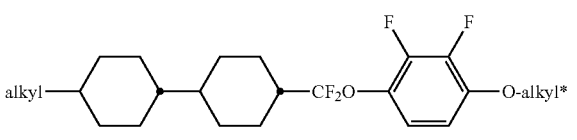 IIA-30
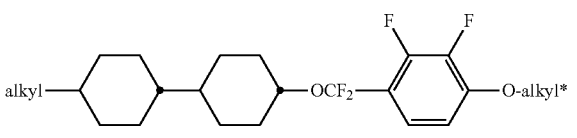 IIA-31
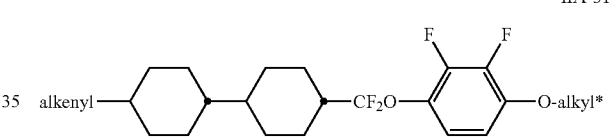 IIA-32
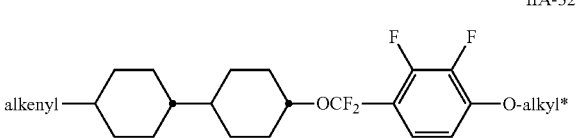 IIA-33
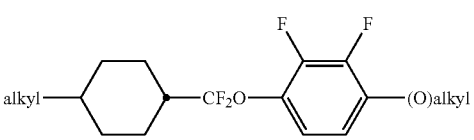 IIA-34
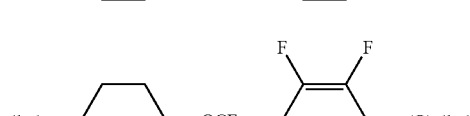 IIA-35
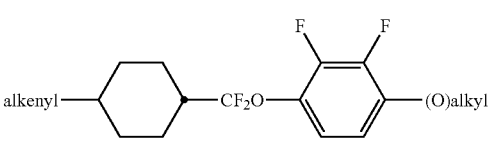 IIA-36
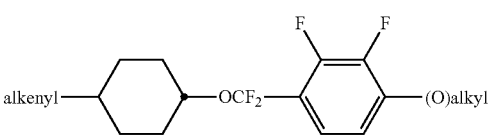

IIA-37
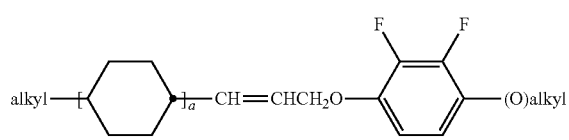
IIA-38
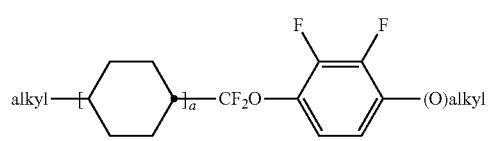
IIA-39
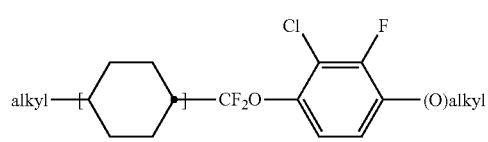
IIA-40
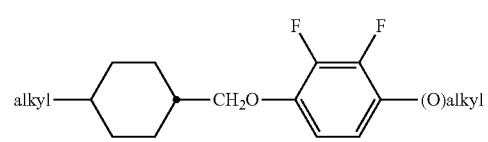
IIA-41
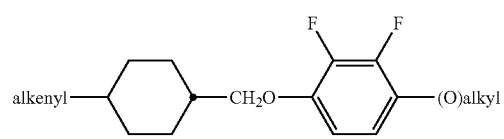
IIA-42
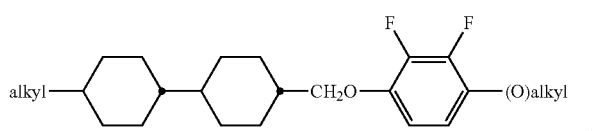
IIA-43
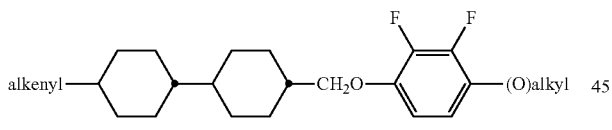
IIA-44
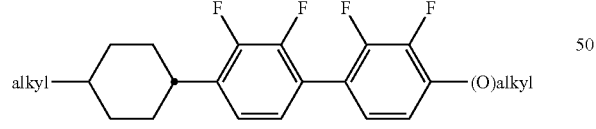
IIA-45
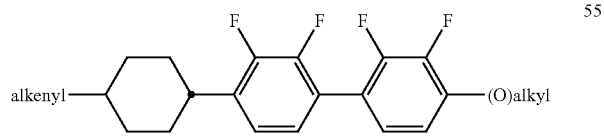
IIA-46
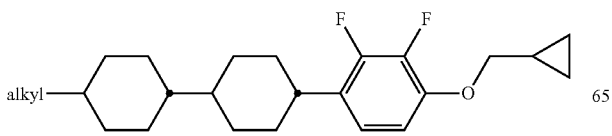
IIB-1
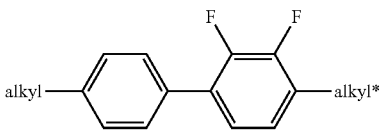
IIB-2
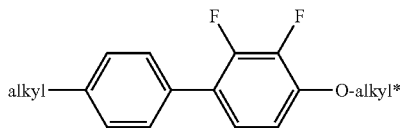
IIB-3
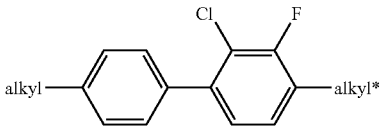
IIB-4
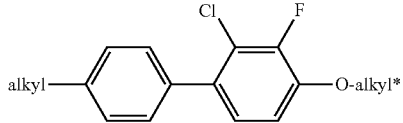
IIB-5
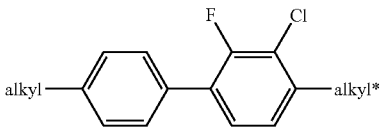
IIB-6
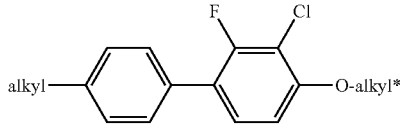
IIB-7
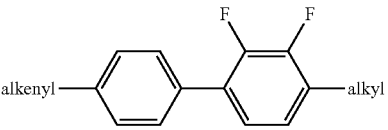
IIB-8
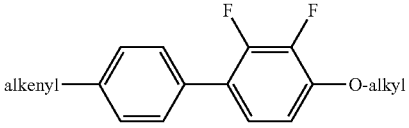
IIB-9
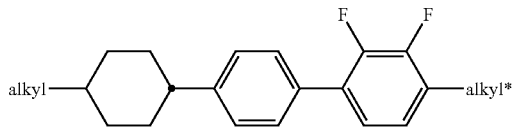
IIB-10
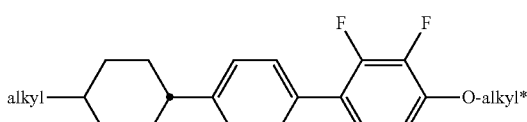

IIB-11
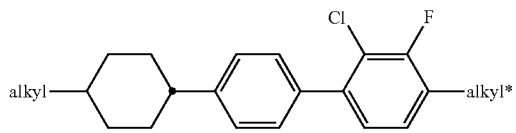
IIB-20
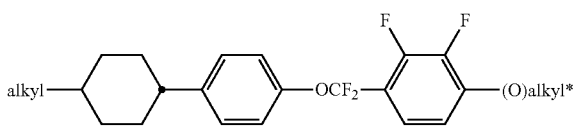
IIB-12
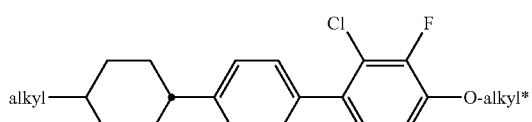
IIB-21
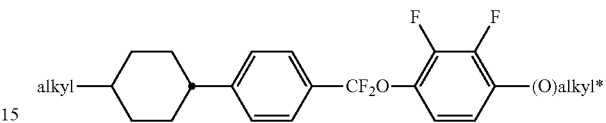
IIB-13
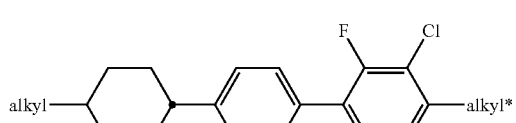
IIB-22
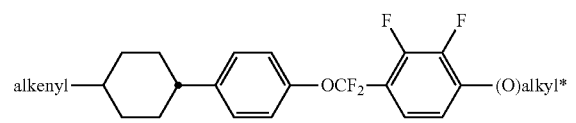
IIB-14
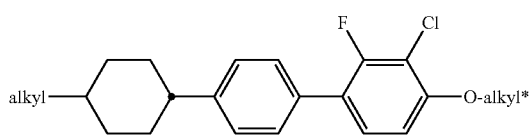
IIB-23
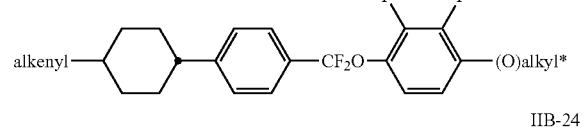
IIB-15
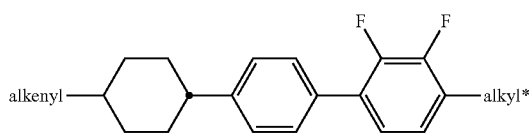
IIB-24
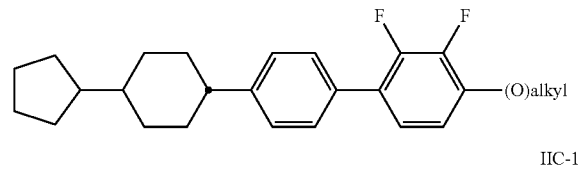
IIB-16
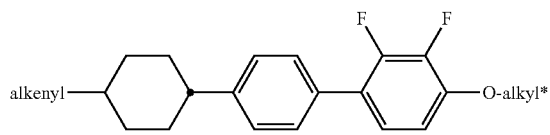
IIC-1
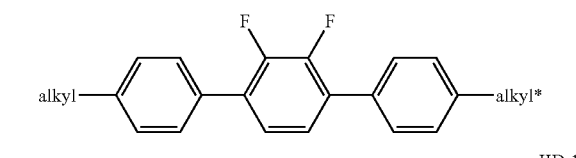
IIB-17
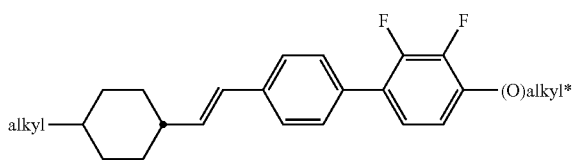
IID-1
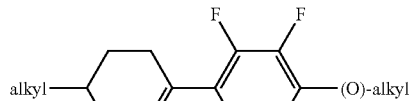
IID-2
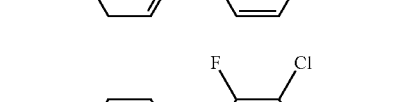
IIB-18
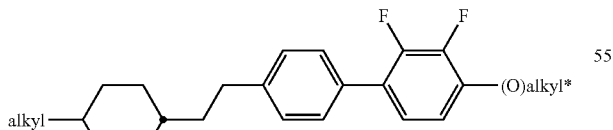
IID-3
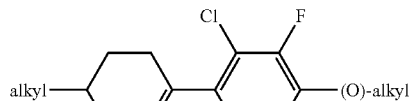
IIB-19
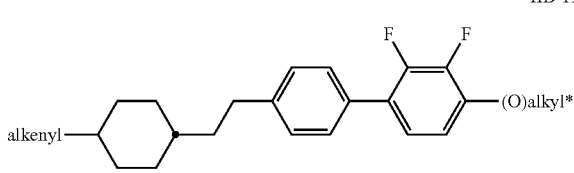
IID-4
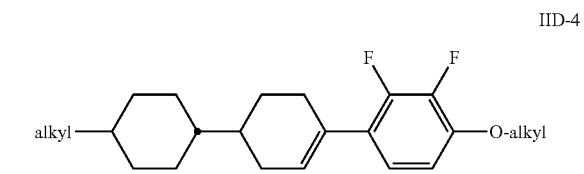

-continued

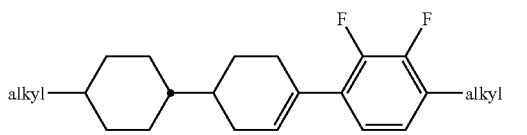
IID-5

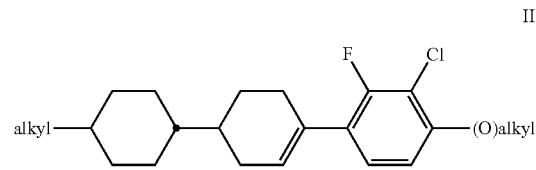
IID-6

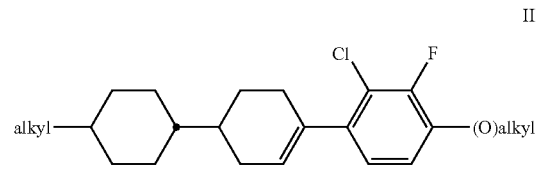
IID-7 in which the parameter a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred LC medium according to the invention comprises one or more compounds of the formulae IIA-2, IIA-8, IIA-10, IIA-16, II-18, IIA-40, IIA-41, IIA-42, IIA-43, IIB-2, IIB-10, IIB-16, IIC-1, and IID-4.

The proportion of compounds of the formulae IIA and/or IIB in the mixture as a whole is preferably at least 20% by weight.

In another preferred embodiment the LC medium comprises one or more compounds of formula III

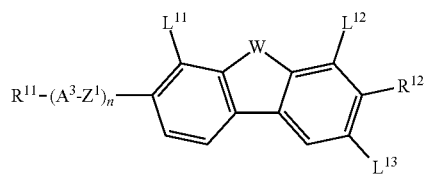
III in which
$R^{11}$ and $R^{12}$ each, independently of one another, denote H, an alkyl or alkoxy radical having 1 to 15 C atoms, where one or more $CH_2$ groups in these radicals may each be replaced, independently of one another, by

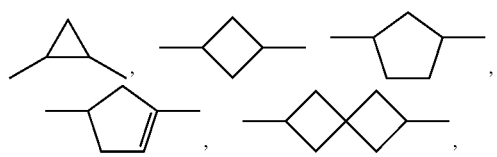

$-C\equiv C-$, $-CF_2O-$, $-OCF_2-$, $-CH=CH-$, by $-O-$, $-CO-O-$ or $-O-CO-$ in such a way that O atoms are not linked directly to one another, and in which, in addition, one or more H atoms may be replaced by halogen, $A^3$ on each occurrence, independently of one another, denotes
a) 1,4-cyclohexenylene or 1,4-cyclohexylene radical, in which one or two non-adjacent $CH_2$ groups may be replaced by $-O-$ or $-S-$,
b) a 1,4-phenylene radical, in which one or two CH groups may be replaced by N, or
c) a radical selected from the group consisting of spiro[3.3]heptane-2,6-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl, wherein the radicals a), b) and c) may be mono- or polysubstituted by halogen atoms,
n denotes 0, 1 or 2, preferably 0 or 1, C
$Z^1$ on each occurrence independently of one another denotes $-CO-O-$, $-O-CO-$, $-CF_2O-$, $-OCF_2-$, $-CH_2O-$, $-OCH_2-$, $-CH_2-$, $-CH_2CH_2-$, $(CH_2)_4-$, $-CH=CH-CH_2O-$, $-C_2F_4-$, $-CH_2CF_2-$, $-CF_2CH_2-$, $-CF=CF-$, $-CH=CF-$, $-CF=CH-$, $-CH=CH-$, $-C\equiv C-$ or a single bond,
$L^{11}$ and $L^{12}$ each, independently of one another, denote F, Cl, $CF_3$ or $CHF_2$, preferably H or F, most preferably F,
$L^{13}$ denotes H or $CH_3$, preferably H, and
W denotes O or S.

In a preferred embodiment of the present invention the LC medium comprises one or more compounds of the formula III-1 and/or III-2

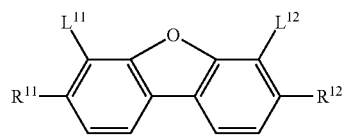
III-1

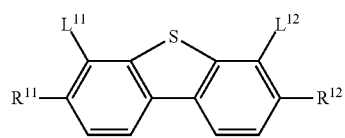
III-2 in which the occurring groups have the same meanings as given under formula III above and preferably
$R^{11}$ and $R^{12}$ each, independently of one another, an alkyl, alkenyl or alkoxy radical having up to 15 C atoms, more preferably one or both of them denote an alkoxy radical and
$L^{11}$ and $L^{12}$ each preferably denote F.

In another preferred embodiment the LC medium comprises one or more compounds of the formula III-1 selected from the group of compounds of formulae III-1-1 to III-1-10, preferably of formula III-1-6,

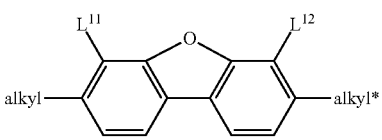
III-1-1

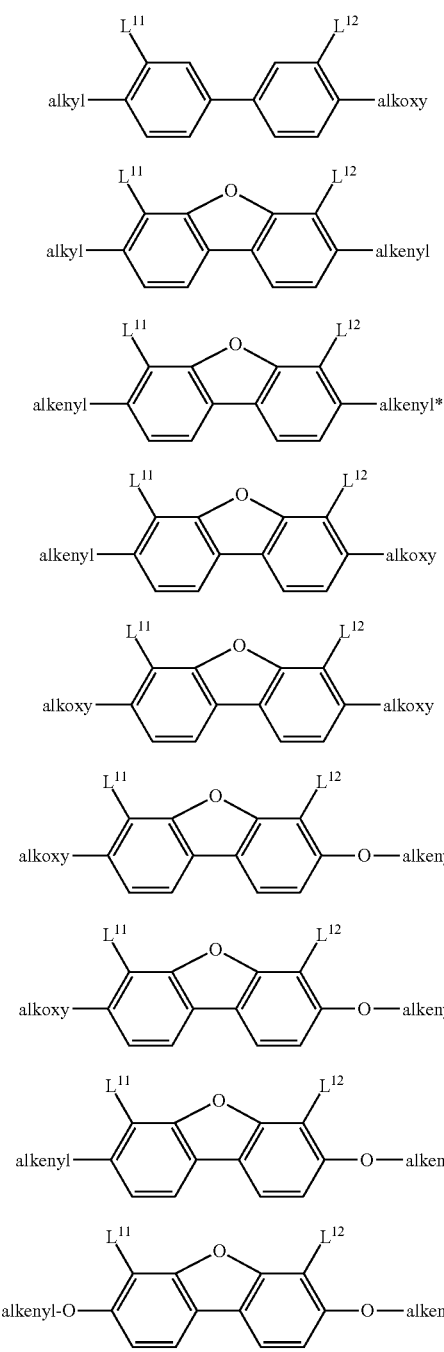
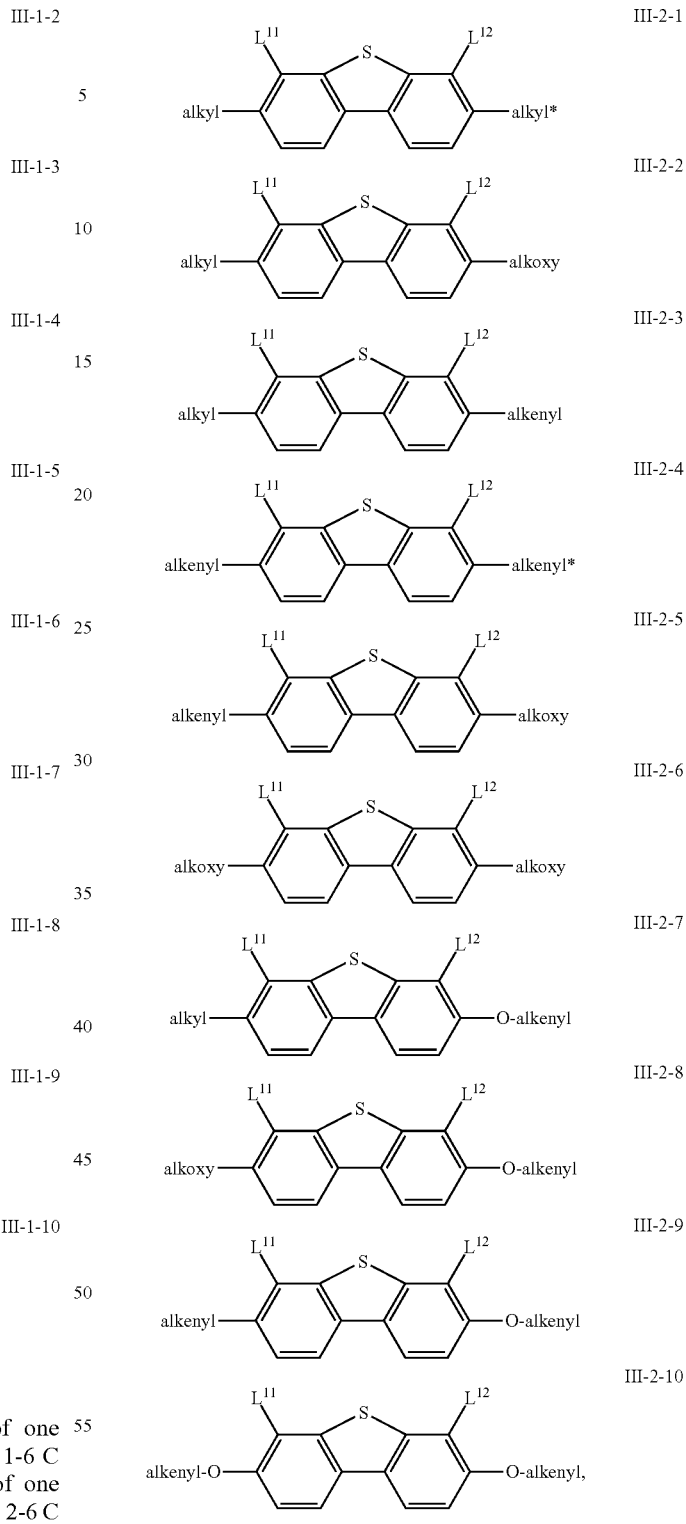

in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^{11}$ and $L^{12}$ each, independently of one another, denote F or Cl, preferably both F.

In another preferred embodiment the LC medium comprises one or more compounds of the formula III-2 selected from the group of compounds of formulae III-2-1 to III-2-11, preferably of formula III-2-6, in which alkyl and alkyl* each, independently of one another, denote a straight-chain alkyl radical having 1-6 C atoms, alkenyl and alkenyl* each, independently of one another, denote a straight-chain alkenyl radical having 2-6 C atoms, alkoxy and alkoxy* each, independently of one another, denote a straight-chain alkoxy radical having 1-6 C atoms, and $L^1$ and $L^2$ each, independently of one another, denote F or Cl, preferably both F.

In another preferred embodiment of the present invention the LC medium comprises one or more compounds of the formula IIIA-1 and/or IIIA-2

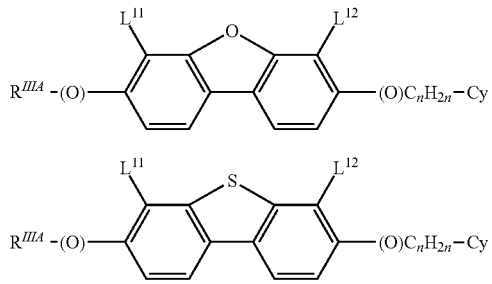

in which $L^{11}$ and $L^{12}$ have the same meanings as given under formula III, (O) denotes O or a single bond,
$R^{IIIA}$ denotes alkyl or alkenyl having up to 7 C atoms or a group Cy-$C_mH_{2m+1}$—,
m and n are, identically or differently, 0, 1, 2, 3, 4, 5 or 6, preferably 1, 2 or 3, very preferably 1, and
Cy denotes a cycloaliphatic group having 3, 4 or 5 ring atoms, which is optionally substituted with alkyl or alkenyl each having up to 3 C atoms, or with halogen or CN, and preferably denotes cyclopropyl, cyclobutyl or cyclopentyl.

The compounds of formula IIIA-1 and/or IIIA-2 are contained in the LC medium either alternatively or additionally to the compounds of formula III, preferably additionally.

Very preferred compounds of the formulae IIIA-1 and IIIA-2 are the following:

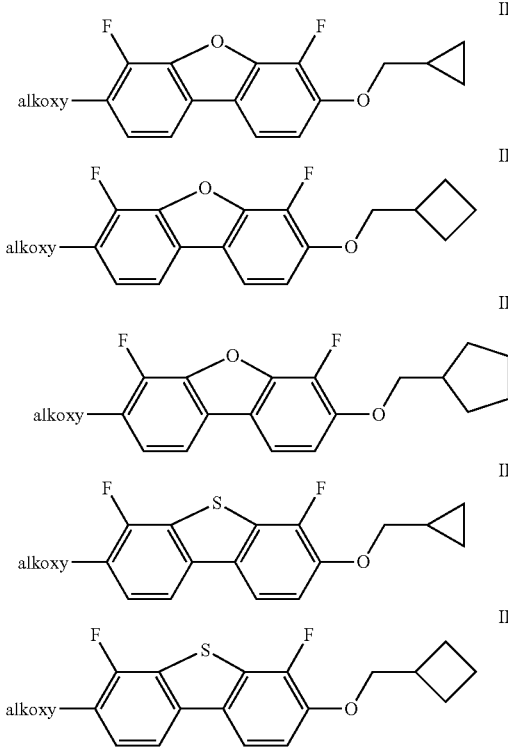

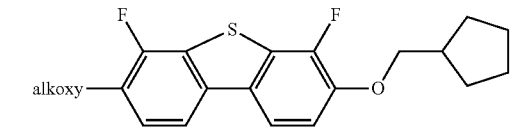

in which alkoxy denotes a straight-chain alkoxy radical having 1-6 C atoms.

In a preferred embodiment of the present invention, the LC medium comprises one or more compounds of formula III-3

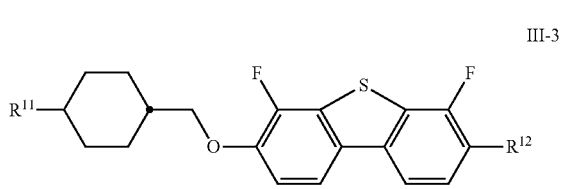

in which
$R^{11}$, $R^{12}$ identically or differently, denote H, an alkyl or alkoxy radical having 1 to 15 C atoms, in which one or more $CH_2$ groups in these radicals are optionally replaced, independently of one another, by —C≡C—, —$CF_2$O—, —$OCF_2$—, —CH=CH—,

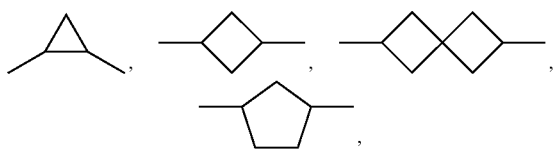

—O—, —CO—O— or —O—CO— in such a way that O atoms are not linked directly to one another, and in which, in addition, one or more H atoms may be replaced by halogen.

The compounds of formula III-3 are preferably selected from the group of compounds of the formulae III-3-1 to III-3-10:

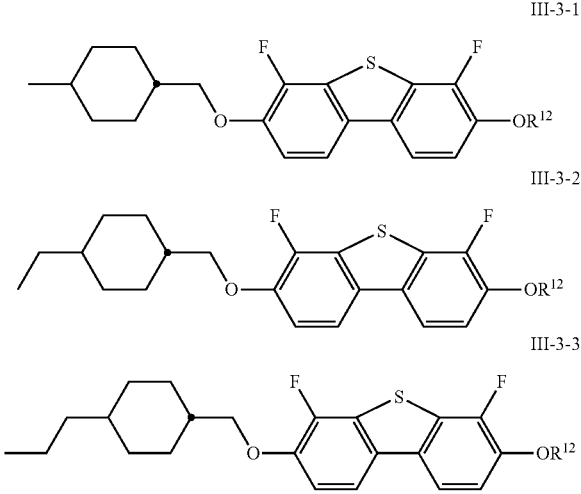

-continued

III-3-4
III-3-5
III-3-6
III-3-7
III-3-8
III-3-9
III-3-10

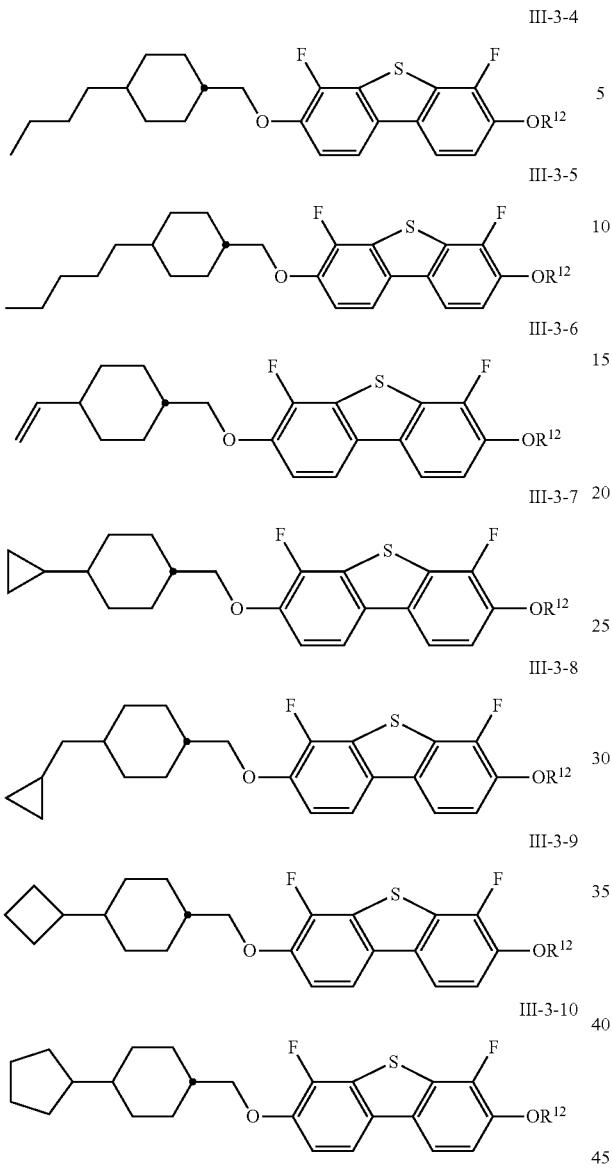

in which $R^{12}$ denotes alkyl having 1 to 7 C-atoms, preferably ethyl, n-propyl or n-butyl, or alternatively cyclopropylmethyl, cyclobutylmethyl or cyclopentylmethyl.

In another preferred embodiment of the present invention, the LC medium comprises one or more compounds of the formulae III-4 to III-6, preferably of formula III-5,

III-4
III-5

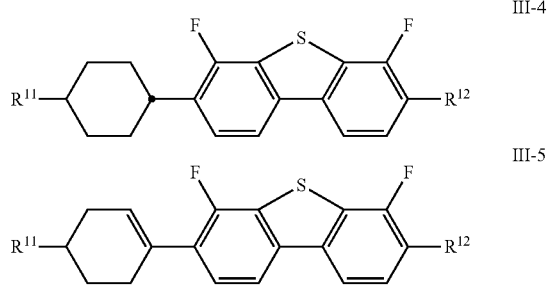

-continued

III-6

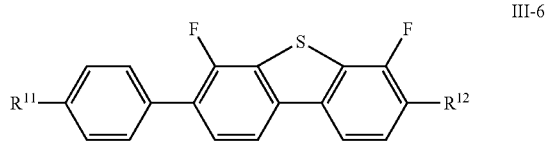

in which the parameters have the meanings given above, $R^{11}$ preferably denotes straight-chain alkyl and $R^{12}$ preferably denotes alkoxy, each having 1 to 7 C atoms.

In another preferred embodiment the LC medium comprises one or more compounds of the formula I selected from the group of compounds of formulae III-7 to III-9, preferably of formula III-8,

III-7
III-8
III-9

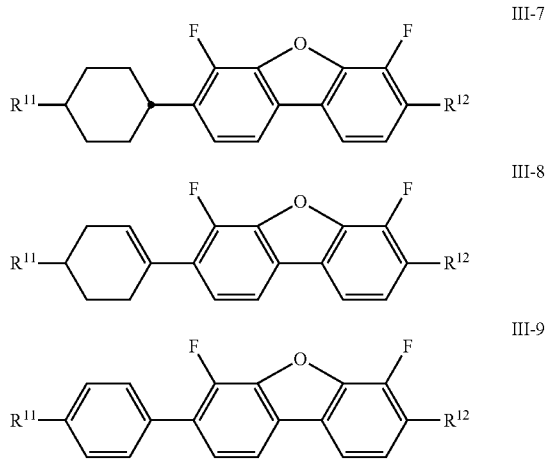

in which the parameters have the meanings given above, $R^{11}$ preferably denotes straight-chain alkyl and $R^{12}$ preferably denotes alkoxy each having 1 to 7 C atoms.

In a preferred embodiment, the medium comprises one or more compounds of the formula IV,

IV

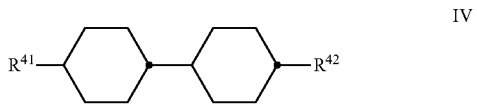

in which
$R^{41}$ denotes an unsubstituted alkyl radical having 1 to 7 C atoms or an unsubstituted alkenyl radical having 2 to 7 C atoms, preferably an n-alkyl radical, particularly preferably having 2, 3, 4 or 5 C atoms, and
$R^{42}$ denotes an unsubstituted alkyl radical having 1 to 7 C atoms or an unsubstituted alkoxy radical having 1 to 6 C atoms, both preferably having 2 to 5 C atoms, an unsubstituted alkenyl radical having 2 to 7 C atoms, preferably having 2, 3 or 4 C atoms, more preferably a vinyl radical or a 1-propenyl radical and in particular a vinyl radical.

The compounds of the formula IV are preferably selected from the group of the compounds of the formulae IV-1 to IV-4,

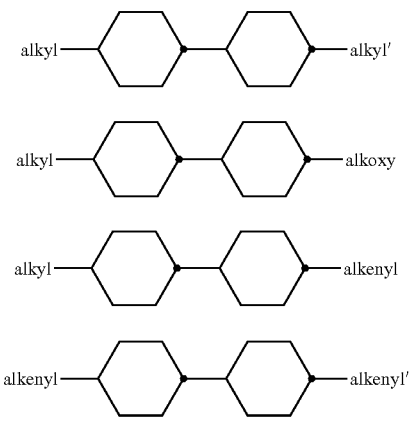

in which alkyl and alkyl', independently of one another, denote alkyl having 1 to 7 C atoms, preferably having 2 to 5 C atoms, alkenyl denotes an alkenyl radical having 2 to 5 C atoms, preferably having 2 to 4 C atoms, particularly preferably 2 C atoms, alkenyl' denotes an alkenyl radical having 2 to 5 C atoms, preferably having 2 to 4 C atoms, particularly preferably having 2 to 3 C atoms, and alkoxy denotes alkoxy having 1 to 5 C atoms, preferably having 2 to 4 C atoms.

Preferably, the LC medium comprises one or more compounds selected from the compounds of the formulae IV-1-1 to IV-1-4

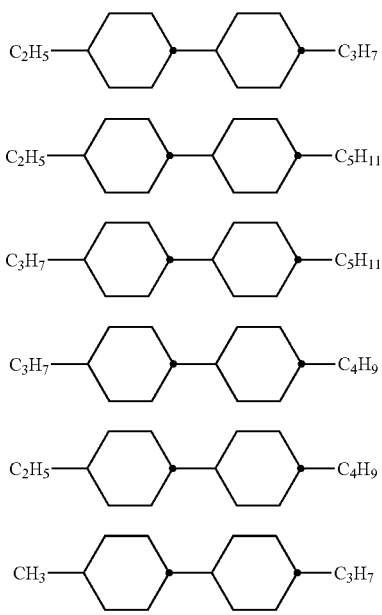

Very preferably, the LC medium according to the invention comprises one or more compounds of the formulae IV-2-1 and/or IV-2-2

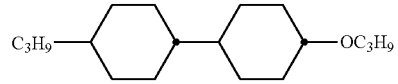

Very preferably, the LC medium according to the invention comprises a compound of formula IV-3, in particular selected from the compounds of the formulae IV-3-1 to IV-3-4

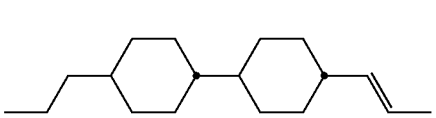

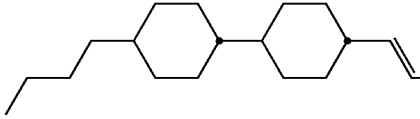

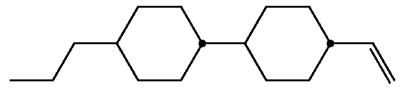

Very preferably, the LC medium according to the invention comprises a compound of formula IV-4, in particular selected from the compounds of the formulae IV-4-1 and IV-4-2

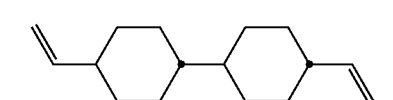

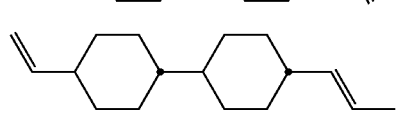

The LC medium preferably additionally comprises one or more compounds of the formula IVa, $$R^{41} - \text{cyclohexane} - Z^4 - A - R^{42} \quad \text{IVa}$$

in which $R^{41}$ and $R^{42}$ each, independently of one another, denote a straight-chain alkyl, alkoxy, alkenyl, alkoxyalkyl or alkoxy radical having up to 12 C atoms, and denotes

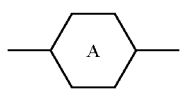

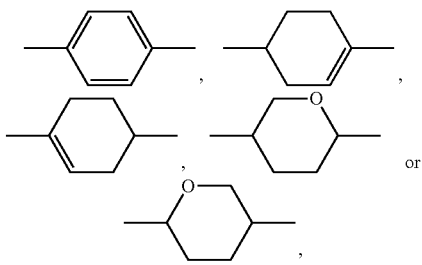

$Z^4$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$— or —CF=CF—.

Preferred compounds of the formula IVa are indicated below:

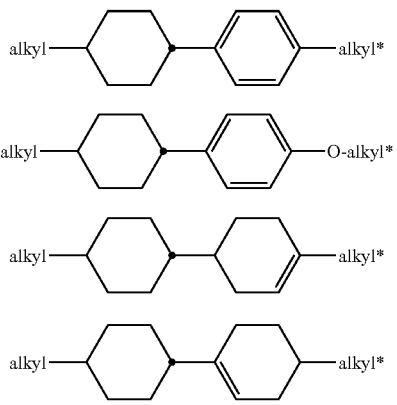

in which alkyl and alkyl* each, independently of one another, denote a straight-chain alkyl radical having 1 to 6 C atoms.

The LC medium according to the invention preferably comprises at least one compound of the formula IVa-1 and/or formula IVa-2.

The proportion of compounds of the formula IVa in the mixture as a whole is preferably at least 5% by weight Preferably, the LC medium comprises one or more compounds of formula

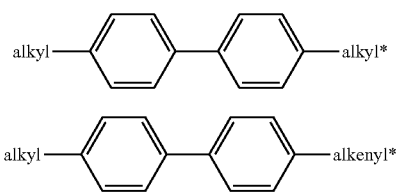

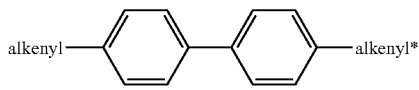

in which
alkyl and alkyl* each, independently of one another, denote a straight-chain alkyl radical having 1 to 6 C atoms, and
alkenyl and alkenyl* each, independently of one another, denote a straight-chain alkenyl radical having 2 to 6 C atoms.

The proportion of the biphenyls of the formulae IV-1 to IV-3 in the mixture as a whole is preferably at least 3% by weight, in particular ≥5% by weight.

Of the compounds of the formulae IVb-1 to IVb-3, the compounds of the formula IVb-2 are particularly preferred.

Particularly preferred biphenyls are

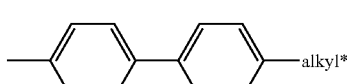

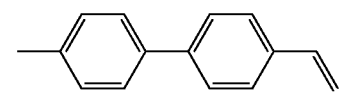

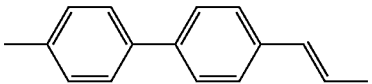

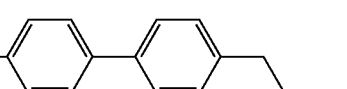

in which alkyl* denotes an alkyl radical having 1 to 6 C atoms and preferably denotes n-propyl.

The LC medium according to the invention particularly preferably comprises one or more compounds of the formulae IVb-1-1 and/or IVb-2-3.

In a preferred embodiment, the LC medium comprises one or more compounds of formula V

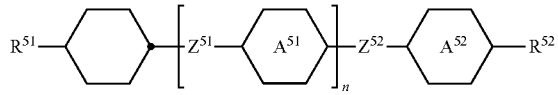

in which
$R^{51}$ and $R^{52}$ independently of one another, have one of the meanings given for $R^{41}$ and $R^{42}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

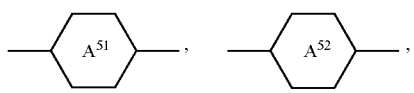

identically or differently, denote in which

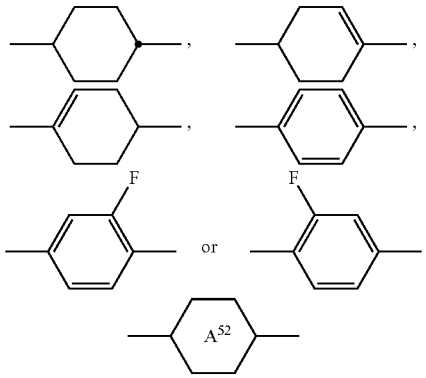

preferably denotes

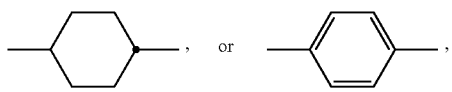

$Z^{51}$, $Z^{52}$ each, independently of one another, denote —CH$_2$—CH$_2$—, —CH$_2$—O—, —CH═CH—, —C≡C—, —COO— or a single bond, preferably —CH$_2$—CH$_2$—, —CH$_2$—O— or a single bond and particularly preferably a single bond, and n is 1 or 2.

The compounds of formula V are preferably selected from the compounds of the formulae V-1 to V-16:

V-1
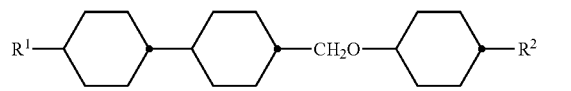

V-2

V-3
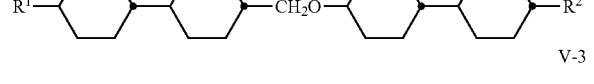

V-4
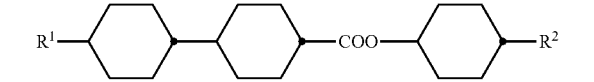

V-5
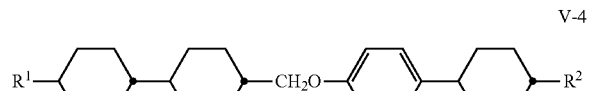

V-6
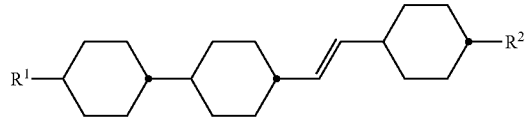

V-7
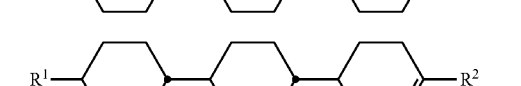

V-8
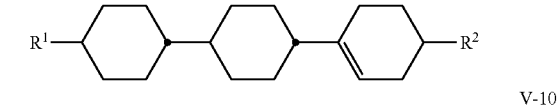

V-9
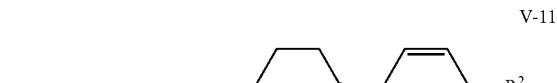

V-10
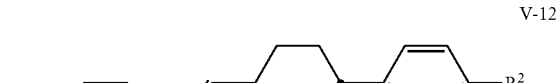

V-11
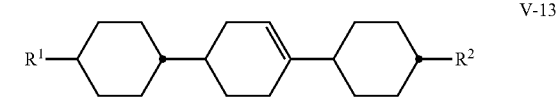

V-12
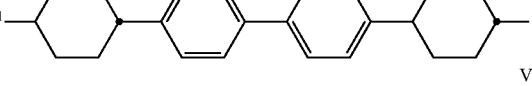

V-13
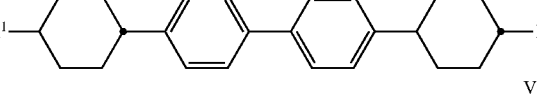

V-14
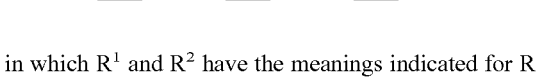

V-15
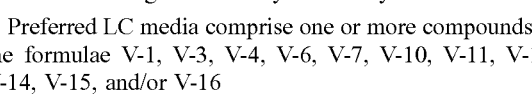

V-16
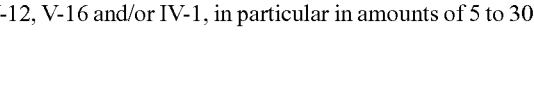

in which $R^1$ and $R^2$ have the meanings indicated for $R^{2A}$ above.

$R^1$ and $R^2$ preferably each, independently of one another, denote straight-chain alkyl or alkenyl.

Preferred LC media comprise one or more compounds of the formulae V-1, V-3, V-4, V-6, V-7, V-10, V-11, V-12, V-14, V-15, and/or V-16

LC media according to the invention very particularly preferably comprise the compounds of the formula V-10, V-12, V-16 and/or IV-1, in particular in amounts of 5 to 30%.

Preferred compounds of the formulae V-10 are indicated below:

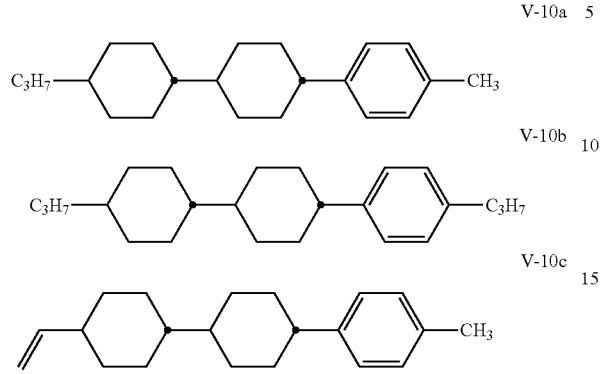

The LC medium according to the invention particularly preferably comprises the tricyclic compounds of the formula V-10a and/or of the formula V-10b in combination with one or more bicyclic compounds of the formulae IV-1 The total proportion of the compounds of the formulae V-10a and/or V-10b in combination with one or more compounds selected from the bicyclohexyl compounds of the formula IV-1 is 5 to 40%, very particularly preferably 15 to 35%.

Very particularly preferred LC media comprise compounds V-10a and IV-1-1

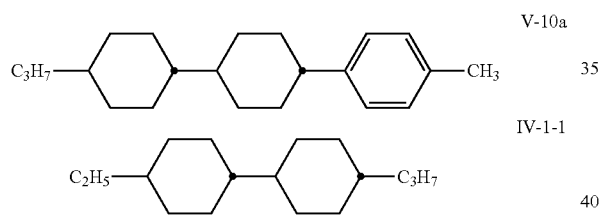

The compounds V-10a and IV-1-1 are preferably present in the mixture in a concentration of 15 to 35%, particularly preferably 15 to 25% and especially preferably 18 to 22%, based on the mixture as a whole.

Very particularly preferred LC media comprise the compounds V-10b and IV-1-1:

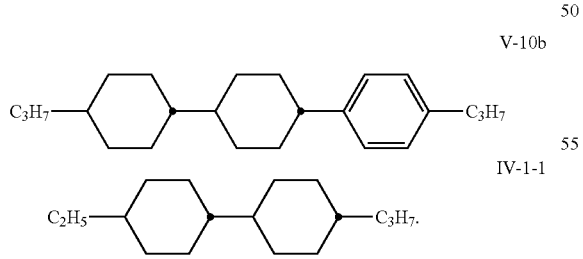

The compounds V-10b and IV-1-1 are preferably present in the mixture in a concentration of 15 to 35%, particularly preferably 15 to 25% and especially preferably 18 to 22%, based on the mixture as a whole.

Very particularly preferred LC media comprise the following three compounds:

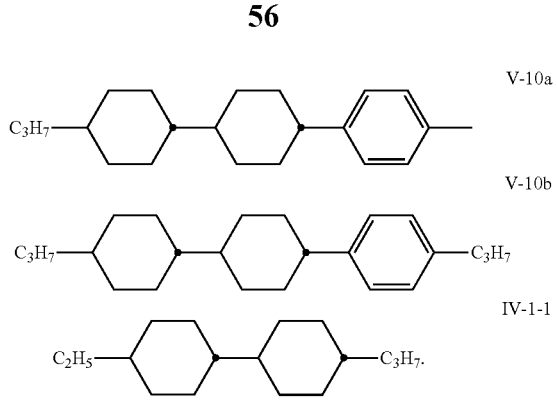

The compounds V-10a, V-10b and IV-1-1 are preferably present in the mixture in a concentration of 15 to 35%, particularly preferably 15 to 25% and especially preferably 18 to 22%, based on the mixture as a whole.

Preferred LC media comprise at least one compound selected from the group of the compounds

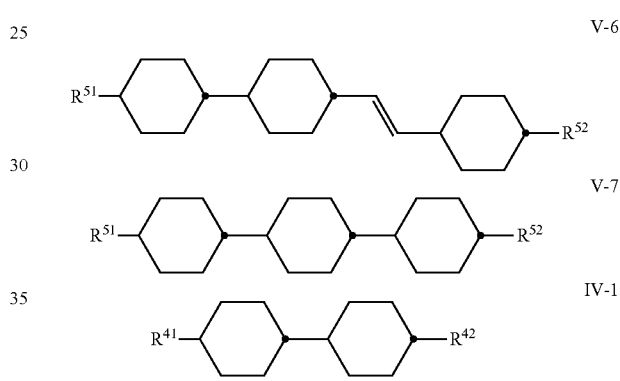

in which $R^{41}$ and $R^{42}$, and $R^{51}$ and $R^{52}$ have the meanings indicated above. Preferably in the compounds V-6, V-7 and IV-1, $R^{41}$ and $R^{51}$ denotes alkyl or alkenyl having 1 to 6 or 2 to 6 C atoms, respectively, and $R^{42}$ and $R^{52}$ denotes alkenyl having 2 to 6 C atoms.

Preferred LC media comprise at least one compound of the formulae V-6a, V-6b, V-7a, V-7b, IV-4-1, IV-4-2, IV-3a and IV-3b:

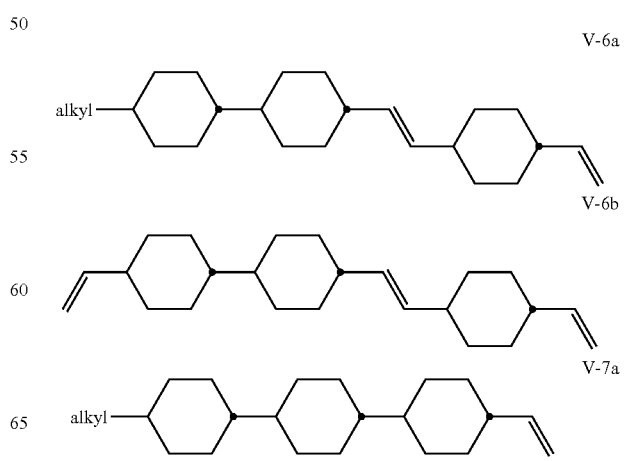

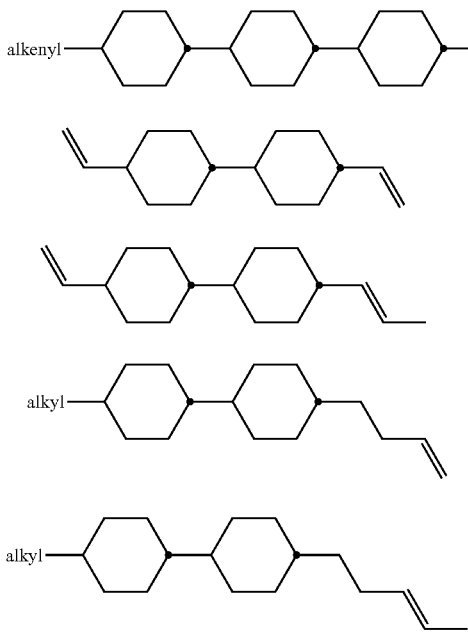

V-7b

IV-4-1

IV-4-2

IV-3a

IV-3b in which alkyl denotes an alkyl radical having 1 to 6 C atoms and alkenyl denotes an alkenyl radical having 2 to 6 C atoms.

The compounds of the formulae V-6a, V-6b, V-7a, V-7b, IV-4-1, IV-4-2, IV-3a and IV-3b are preferably present in the LC media according to the invention in amounts of 1 to 40% by weight, preferably 5 to 35% by weight and very particularly preferably 10 to 30% by weight.

In a preferred embodiment of the present invention the LC medium additionally comprises one or more compounds of the formulae VI-1 to VI-9

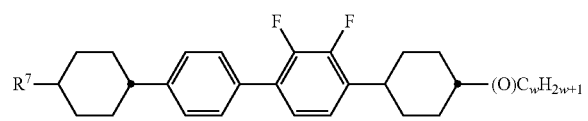

VI-1

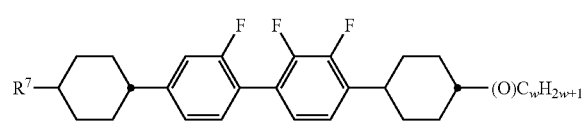

VI-2

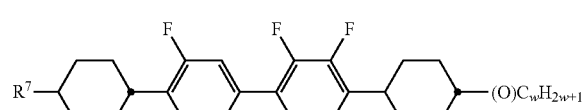

VI-3

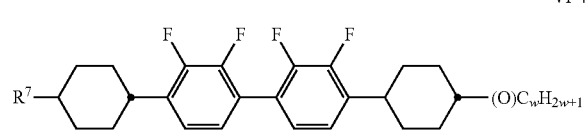

VI-4

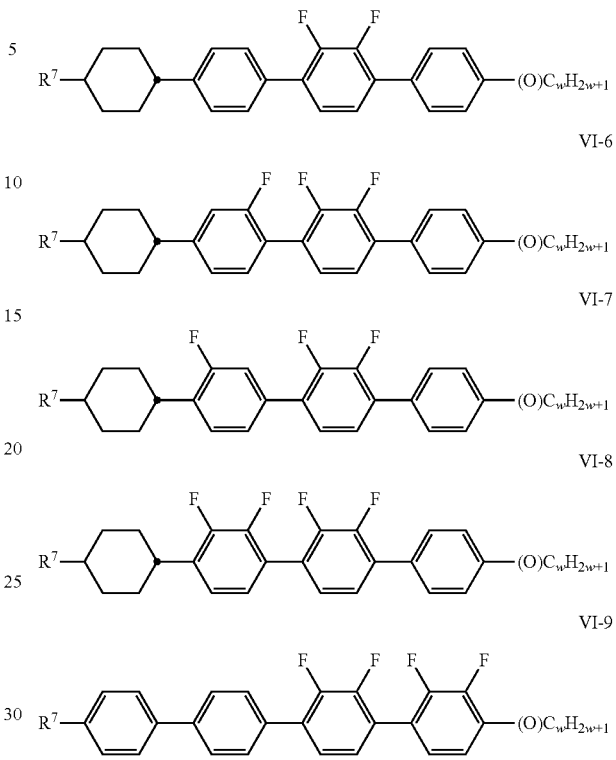

in which

R$^7$ each, independently of one another, have one of the meanings indicated for R$^{2A}$ in formula IIA, and w and x each, independently of one another, denote 1 to 6.

Particular preference is given to LC media comprising at least one compound of the formula V-9.

In a preferred embodiment of the present invention the LC medium additionally comprises one or more compounds of the formulae VII-1 to VII-25,

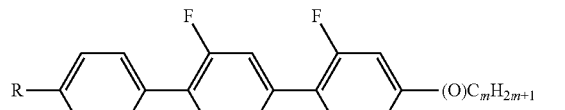

VII-1

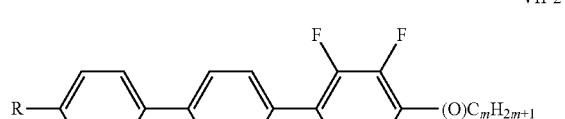

VII-2

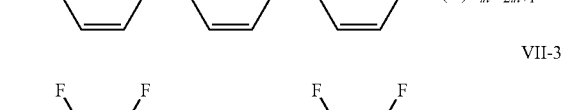

VII-3

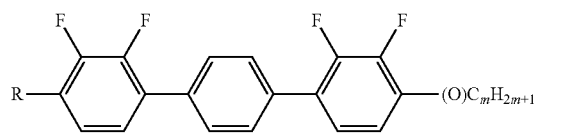

-continued

VII-4
R—⬡—⬡(F)—⬡(F,F)—(O)C_mH_{2m+1}

VII-5
R—⬡—⬡(F)—⬡(F,F)—(O)C_mH_{2m+1}

VII-6
R—⬡(F)—⬡(F)—⬡(F,F)—(O)C_mH_{2m+1}

VII-7
R—⬡—⬡(F,F)—⬡(F,F)—(O)C_mH_{2m+1}

VII-8
R—⬡(F,F)—⬡(F,F)—⬡(F,F)—(O)C_mH_{2m+1}

VII-9
R—⬡(F)—⬡(F,F)—⬡(F)—(O)C_mH_{2m+1}

VII-10
R—⬡(F)—⬡—⬡(F,F)—(O)C_mH_{2m+1}

VII-11
R—⬡(F,F)—⬡—⬡(F,CF_3)—(O)C_mH_{2m+1}

VII-12
R—⬡—⬡—⬡(F,CF_3)—(O)C_mH_{2m+1}

VII-13
R—⬡—⬡—⬡(F,CHF_2)—(O)C_mH_{2m+1}

VII-14
R—⬡—⬡(F,F)—⬡(F)—(O)C_mH_{2m+1}

VII-15
R—⬡—⬡(F,F)—⬡(F)—(O)C_mH_{2m+1}

VII-16
R—⬡(F)—⬡(F,F)—⬡(F)—(O)C_mH_{2m+1}

VII-17
R—⬡(F)—⬡(F,F)—⬡(F)—(O)C_mH_{2m+1}

VII-18
R—⬡(F)—⬡(F,F)—⬡(F)—(O)C_mH_{2m+1}

VII-19
R—⬡(F)—⬡(F)—⬡(F,F)—(O)C_mH_{2m+1}

VII-20
R—⬡—⬡(F)—⬡—(O)C_mH_{2m+1}

VII-21
R—⬡—⬡(F)—⬡—C_nH_{2n}—CH=CH—C_mH_{2m+1}

VII-22
R—⬡—⬡(F)—⬡(F)—X

VII-23
R—⬡(F)—⬡(F)—⬡(L^x)—X

VII-24
R—⬡—⬡(F)—⬡(F)—X

-continued

VII-25
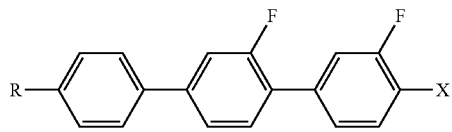

in which

R denotes a straight-chain alkyl or alkoxy radical having 1 to 6 C atoms, (O) denotes —O— or a single bond, X denotes F, Cl, OCF$_3$ or OCHF$_2$, L$^x$ denotes H or F, m is 0, 1, 2, 3, 4, 5 or 6 and n is 0, 1, 2, 3 or 4.

R preferably denotes methyl, ethyl, propyl, butyl, pentyl, hexyl, methoxy, ethoxy, propoxy, butoxy, pentoxy.

X preferably denotes F or OCH$_3$, very preferably F.

The LC medium according to the invention preferably comprises the ter-phenyls of the formulae VII-1 to VII-25 in amounts of 2 to 30% by weight, in particular 5 to 20% by weight.

Particular preference is given to compounds of the formulae VII-1, VII-2, VII-4, VII-20, VII-21, and VII-22 wherein X denotes F. In these compounds, R preferably denotes alkyl, furthermore alkoxy, each having 1 to 5 C atoms. In the compounds of the formula VII-20, R preferably denotes alkyl or alkenyl, in particular alkyl. In the compounds of the formula VII-21, R preferably denotes alkyl. In the compounds of the formulae VII-22 to VII-25, X preferably denotes F.

The terphenyls of formula VII-1 to VII-25 are preferably employed in the LC media according to the invention if the Δn value of the mixture is to be ≥0.1.

Preferred LC media comprise 2 to 20% by weight of one or more terphenyl compounds selected from the group of the compounds of formulae VII-1 to VII-25.

Further preferred embodiments are listed below:

a) LC medium comprising at least one compound of the formulae Z-1 to Z-7,

Z-1
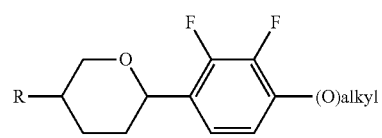

Z-2
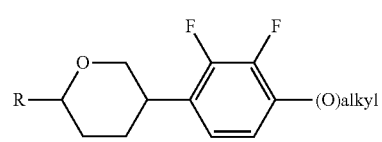

Z-3
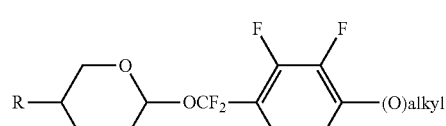

Z-4
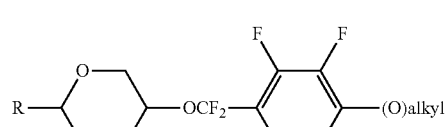

Z-5
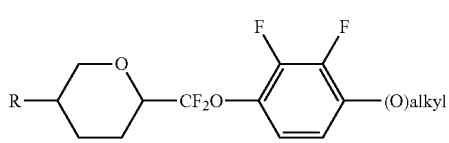

Z-6
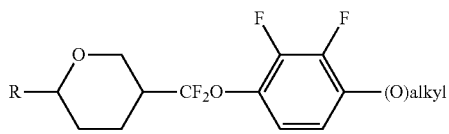

Z-7
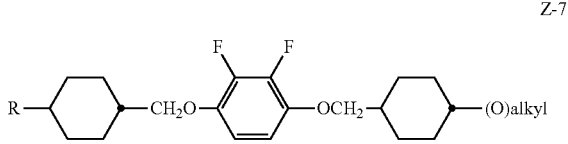

in which R, (O) and alkyl have the meanings indicated above for formula III.

b) Preferred LC media according to the invention comprise one or more substances which contain a tetrahydronaphthyl or naphthyl unit, such as, for example, the compounds of the formulae N-1 to N-5, N-1
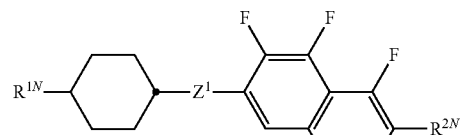

N-2
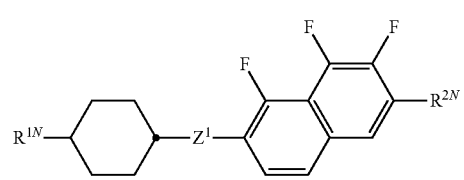

N-3
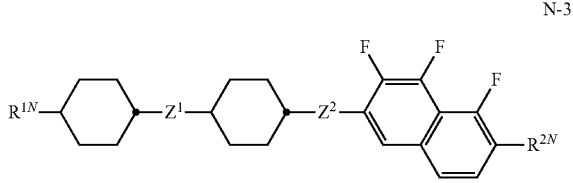

N-4
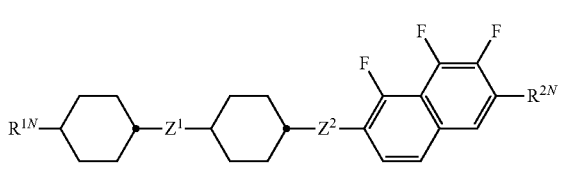

N-5
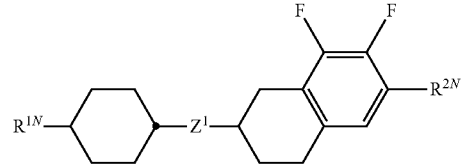

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —O$(CH_2)_3$—, —CH=CHCH$_2$CH$_2$—, —CH$_2$CH$_2$CH=CH—, —CH$_2$O—, —OCH$_2$—, —COO—, —OCO—, —C$_2$F$_4$—, —CF=CF—, —CF=CH—, —CH=CF—, —CF$_2$O—, —OCF$_2$—, —CH$_2$— or a single bond.

c) Preferred LC media comprise one or more compounds selected from the group of the difluorodibenzochroman compounds of the formula BC, chromans of the formula CR, and fluorinated phenanthrenes of the formulae PH-1 and PH-2,

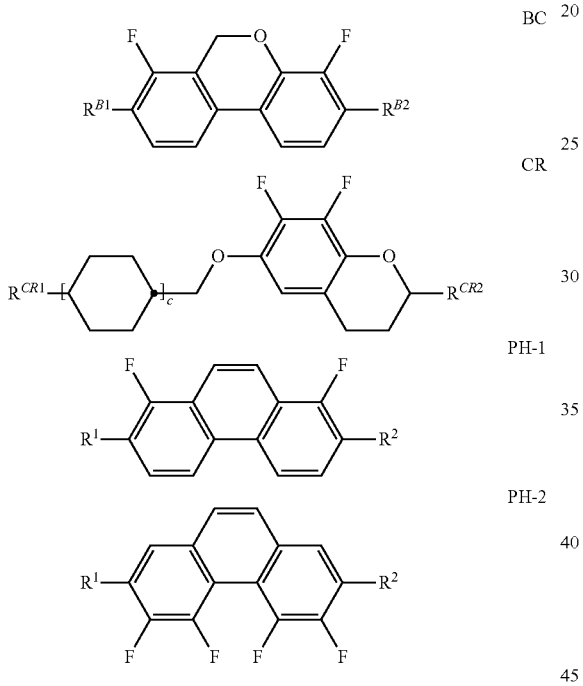

in which $R^{B1}$, $R^{B2}$, $R^{CR1}$, $R^{CR2}$, $R^1$, $R^2$ each, independently of one another, have the meaning of $R^{2A}$. c is 0, 1 or 2. $R^1$ and $R^2$ preferably, independently of one another, denote alkyl or alkoxy having 1 to 6 C atoms.

The LC media according to the invention preferably comprise the compounds of the formulae BC, CR, PH-1, PH-2 in amounts of 3 to 20% by weight, in particular in amounts of 3 to 15% by weight.

Particularly preferred compounds of the formulae BC and CR are the compounds BC-1 to BC-7 and CR-1 to CR-5,

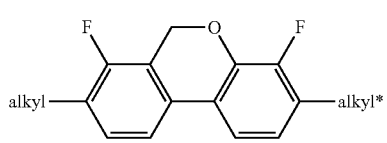

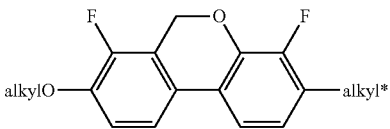

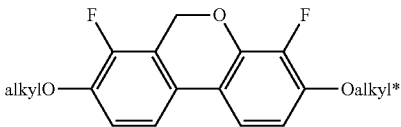

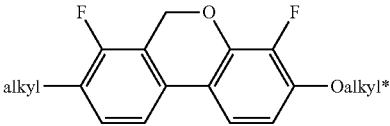

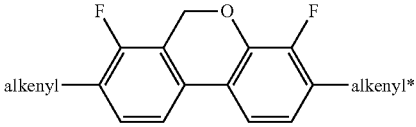

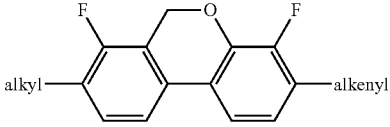

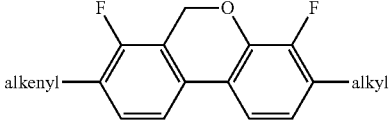

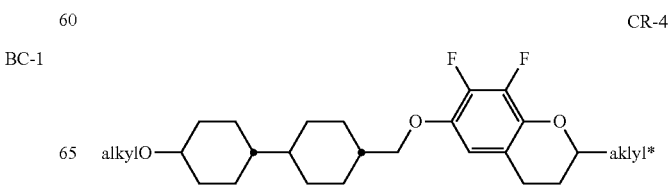

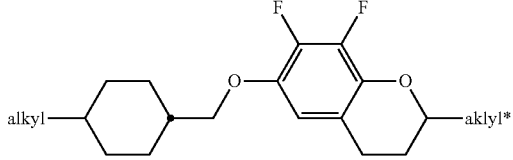

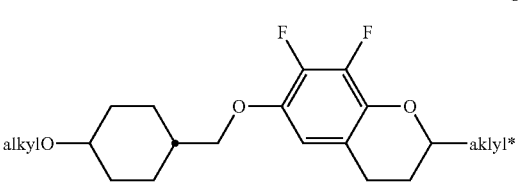

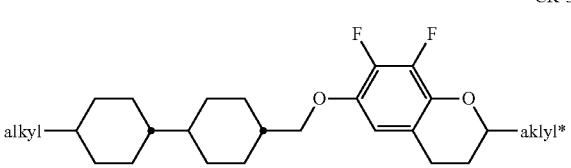

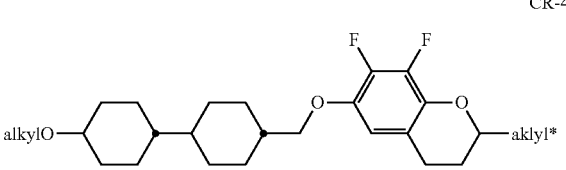

-continued

CR-5

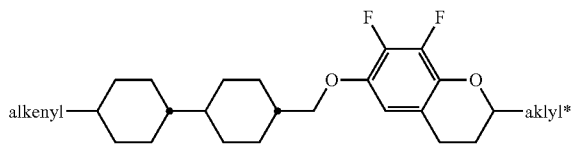

in which
alkyl and alkyl* each, independently of one another, denote a straight-chain alkyl radical having 1 to 6 C atoms, and
alkenyl and
alkenyl* each, independently of one another, denote a straight-chain alkenyl radical having 2 to 6 C atoms.

Very particular preference is given to LC media comprising one, two or three compounds of the formula BC-2, BF-1 and/or BF-2.

d) Preferred LC media comprise one or more indane compounds of the formula In,

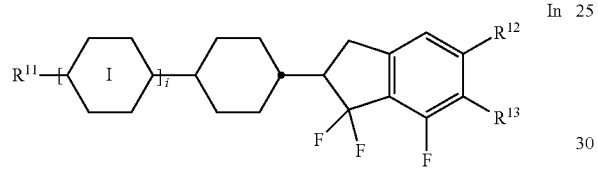

In in which
$R^{11}$, $R^{12}$,
$R^{13}$ each, independently of one another, denote a straight-chain alkyl, alkoxy, alkoxyalkyl or alkenyl radical having 1 to 6 C atoms,
$R^{12}$ and $R_{13}$ additionally denote halogen, preferably F,

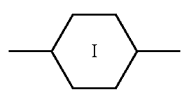

denotes

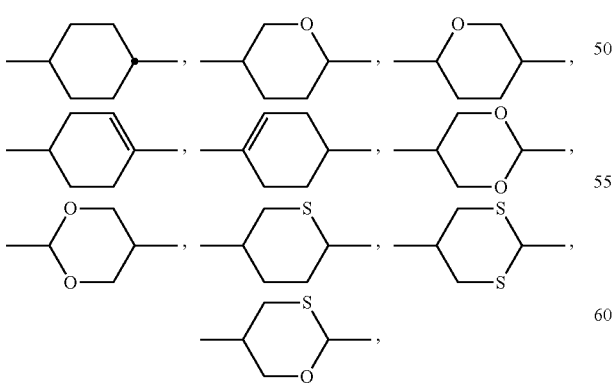

i denotes 0, 1 or 2.
Preferred compounds of the formula In are the compounds of the formulae In-1 to In-16 indicated below:

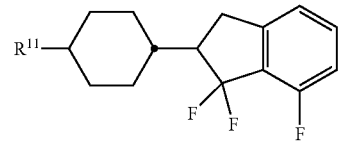

In-1

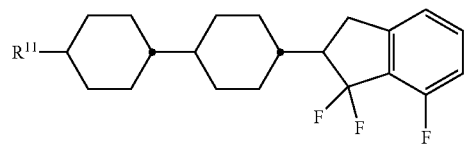

In-2

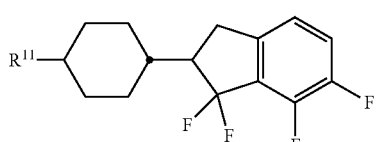

In-3

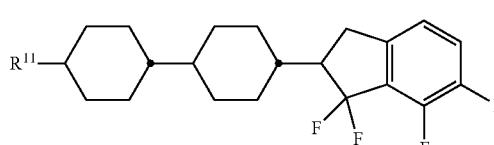

In-4

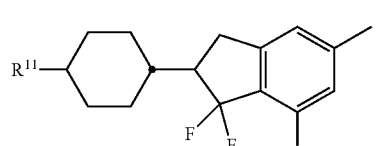

In-5

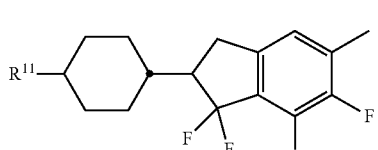

In-6

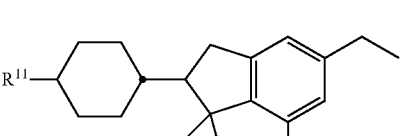

In-7

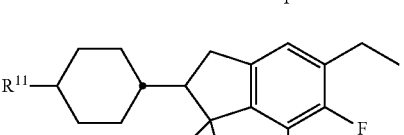

In-8

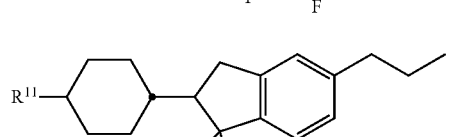

In-9

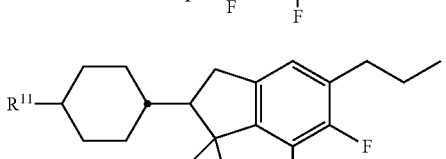

In-10

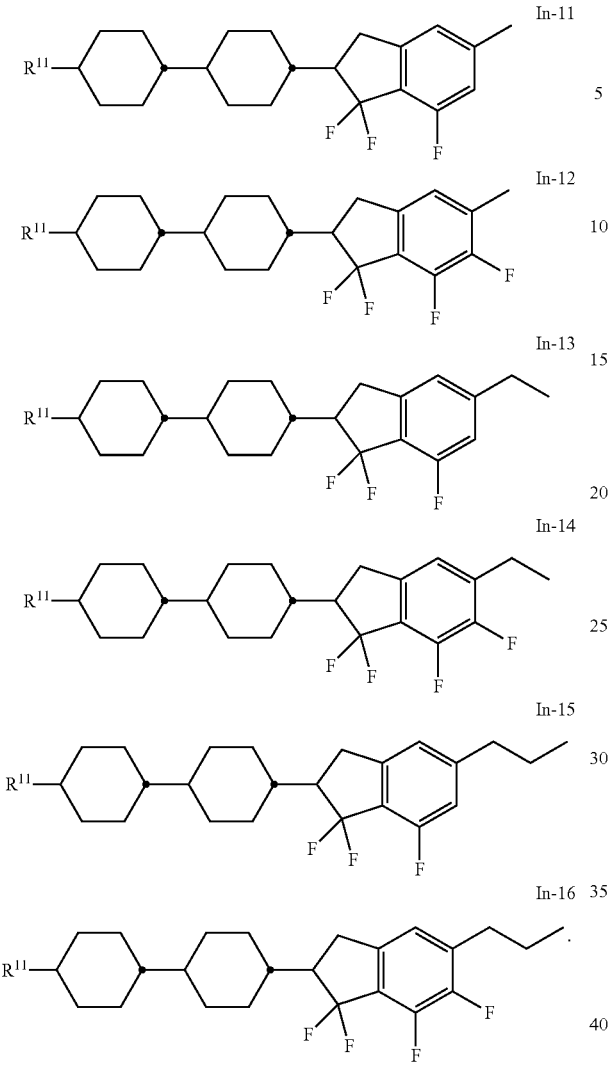

Particular preference is given to the compounds of the formulae In-1, In-2, In-3 and In-4.

The compounds of the formula In and the sub-formulae In-1 to In-16 are preferably employed in the LC media according to the invention in concentrations ≥5% by weight, in particular 5 to 30% by weight and very particularly preferably 5 to 25% by weight.

e) Preferred LC media additionally comprise one or more compounds of the formulae L-1 to L-5,

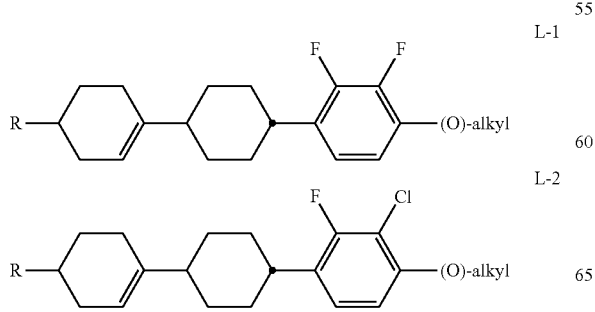

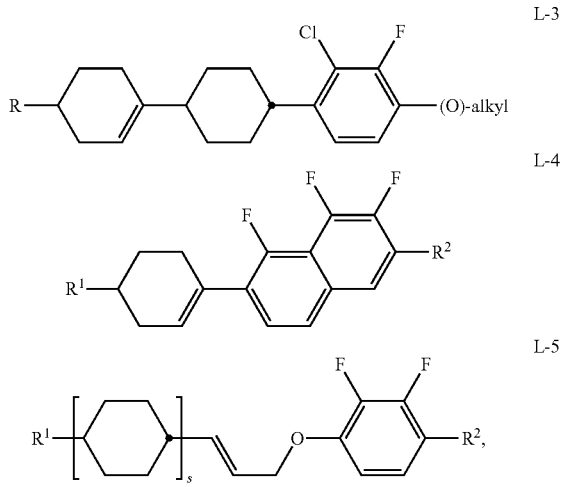

in which

R and $R^1$ each, independently of one another, have the meanings indicated for $R^{2A}$ in formula IIA above, and alkyl denotes an alkyl radical having 1 to 6 C atoms. The parameter s denotes 1 or 2.

The compounds of the formulae L-1 to L-5 are preferably employed in concentrations of 5 to 50% by weight, in particular 5 to 40% by weight and very particularly preferably 10 to 40% by weight.

f) Preferred LC media additionally comprise one or more compounds of formula IIA-Y

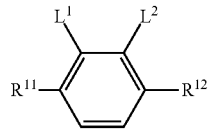

IIA-Y in which $R^{11}$ and $R^{12}$ have one of the meanings given for $R^{2A}$ in formula IIA above, and $L^1$ and $L^2$, identically or differently, denote F or Cl.

Preferred compounds of the formula IIA-Y are selected from the group consisting of the following subformulae

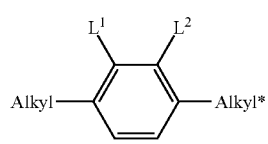

IIA-Y1

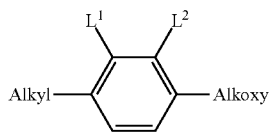

IIA-Y2

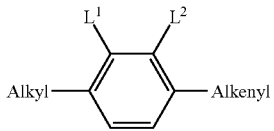

IIA-Y3

IIA-Y4
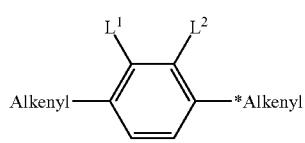

IIA-Y5
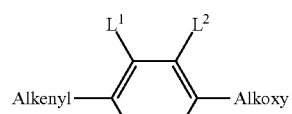

IIA-Y6
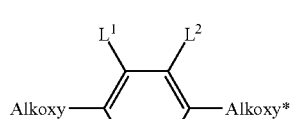

IIA-Y7
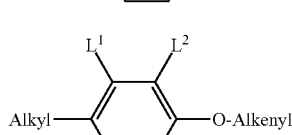

IIA-Y8
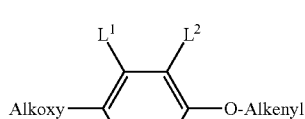

IIA-Y9
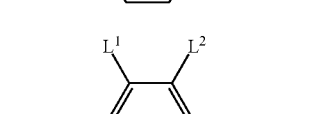

IIA-Y10
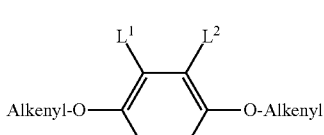

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Particularly preferred compounds of the formula IIA-Y are selected from the group consisting of following subformulae:

IIA-Y6a
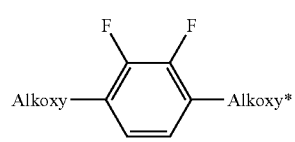

IIA-Y6b
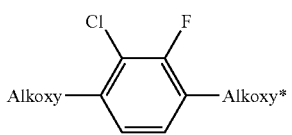

in which Alkoxy and Alkoxy* have the meanings defined above and preferably denote methoxy, ethoxy, n-propyloxy, n-butyloxy or n-pentyloxy.

g) LC medium which additionally comprises one or more quaterphenyl compounds selected from the following formula:

Q
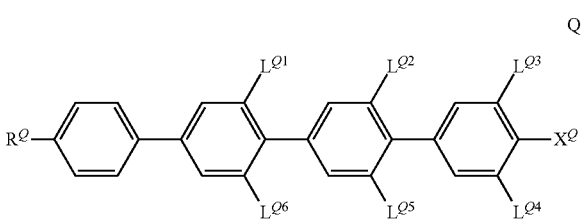

wherein
R$^Q$ is alkyl, alkoxy, oxaalkyl or alkoxyalkyl having 1 to 9 C atoms or alkenyl or alkenyloxy having 2 to 9 C atoms, all of which are optionally fluorinated,
X$^Q$ is F, Cl, halogenated alkyl or alkoxy having 1 to 6 C atoms or halogenated alkenyl or alkenyloxy having 2 to 6 C atoms,
L$^{Q1}$ to L$^{Q6}$ independently of each other are H or F, with at least one of L$^{Q1}$ to L$^{Q6}$ being F.

Preferred compounds of formula Q are those wherein R$^Q$ denotes straight-chain alkyl with 2 to 6 C-atoms, very preferably ethyl, n-propyl or n-butyl.

Preferred compounds of formula Q are those wherein L$^{Q3}$ and L$^{Q4}$ are F. Further preferred compounds of formula Q are those wherein L$^{Q3}$, L$^{Q4}$ and one or two of L$^{Q1}$ and L$^{Q2}$ are F.

Preferred compounds of formula Q are those wherein X$^Q$ denotes F or OCF$_3$, very preferably F.

The compounds of formula Q are preferably selected from the following subformulae Q1
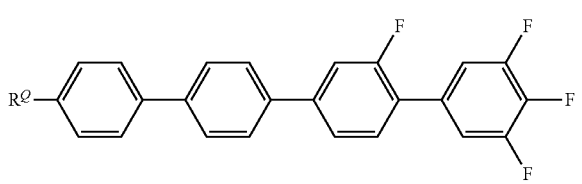

Q2
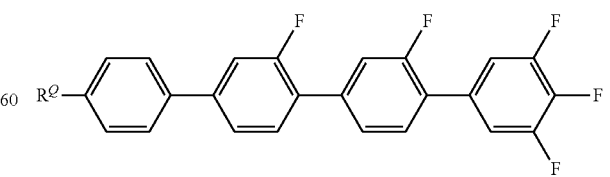

wherein R$^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.05 to 2% by weight, more preferably from 0.1 to 1% by weight, most preferably from 0.1 to 0.8% by weight.

Preferably the LC medium contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerization, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking.

The LC media according to the invention preferably comprise
- one or more compounds of formula M, preferably selected from formulae M1 to M33, preferably in a total concentration in the range of from 0.01% to 2.0%, more preferably from 0.1% to 1.0%, most preferably from 0.2% to 0.8%, and/or
- one or more compounds of formula IIA, preferably in a total concentration in the range of from 5% to 30%, more preferably from 7% to 25%, particularly preferably from 10% to 20%;

and/or
- one or more compounds of formulae IIA and IIB, preferably in a total concentration in the range of from 30% to 45%;

and/or
- one or more compounds of formula IV, preferably in a total concentration in the range of from 35% to 70%, more preferably from 40% to 65%, particularly preferably from 45% to 60%;

and/or
- one or more compounds of formula IV-3, preferably in a total concentration in the range of from 35% to 60%, more preferably from 40% to 55%, particularly preferably from 45% to 50%;

and/or
- one or more compounds of formula III-2, preferably of formula III-2-6, preferably in a total concentration in the range of from 2% to 25%, more preferably from 5% to 15%, particularly preferably from 5 to 12%.

In particular, the medium comprises
- one or more compounds CY-n-Om, in particular CY-3-O4, CY-5-O4 and/or CY-3-O2, preferably in a total concentration in the range of from 5% to 30%, preferably 10% to 20%;

and/or
- one or more compounds PY-n-Om, in particular PY-3-O2 and/or PY-1-O2, preferably in a total concentration in the range of from 5% to 30%, preferably 5% to 20%;

and/or
- CPY-n-Om, in particular CPY-2-O2, CPY-3-O2 and/or CPY-5-O2, preferably in concentrations >5%, in particular 7% to 20%, based on the mixture as a whole, and/or
- one or more compounds CCY-n-Om, preferably CCY-4-O2, CCY-3-O2, CCY-3-O3, CCY-3-O1 and/or CCY-5-O2, preferably in concentrations >3%, in particular 5 to 15%, based on the mixture as a whole;

and/or
- one or more compounds CPY-n-Om, preferably CPY-2-O2 and/or CPY-3-O 2, preferably in concentrations >3%, in particular 5 to 15%, based on the mixture as a whole;

and/or
- CLY-n-Om, preferably CLY-2-O4, CLY-3-O2 and/or CLY-3-O3, preferably in concentrations >5%, in particular 10 to 30%, very preferably 15 to 20%, based on the mixture as a whole;

and/or
- CPY-n-Om and CY-n-Om, preferably in concentrations of 10 to 80%, based on the mixture as a whole, and/or
- CPY-n-Om and PY-n-Om, preferably CPY-2-O2 and/or CPY-3-O2 and PY-3-O2 or PY-1-O2, preferably in concentrations of 5 to 20%, more preferably 10 to 15% to based on the mixture as a whole, and/or
- CC-3-V, preferably in concentrations of 5 to 50%, based on the mixture as a whole.

and/or
- the compound of the formula CC-3-V1 and/or CC-4-V1, in a total concentration in the range of from 5 to 40%, more preferably from 15% to 35%, particularly preferably from 20% to 30%, and/or
- one or more compounds of formula B-nO-Om and/or B(S)-nO-Om, in particular the compound B(S)-2O—O4 and/or B(S)-2O—O5, preferably in a concentration in the range of from 2 to 12%.

and/or
- 0.1% to 3% of the compound PPGU-3-F.

It is advantageous for the LC medium according to the invention to preferably have a nematic phase from ≤−20° C. to ≥70° C., particularly preferably from ≤−30° C. to ≥80° C., very particularly preferably from ≤−40° C. to ≥90° C.

The medium according to the invention has a clearing temperature of 70° C. or more, preferably of 74° C. or more.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of −20° C. in a corresponding test cell is 1000 h or more, the medium is referred to as stable at this temperature. At temperatures of −30° C. and −40° C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The mixture is nematic at a temperature of −20° C. or less, preferably at −30° C. or less, very preferably at −40° C. or less.

The values of the birefringence Δn in the liquid-crystal mixture are generally between 0.07 and 0.16, preferably between 0.08 and 0.15, very preferably between 0.09 and 0.14.

In a preferred embodiment of the present invention, the medium has a birefringence in the range of from 0.090 to 0.110, preferably from 0.095 to 0.105, in particular from 0.100 to 0.105.

In another preferred embodiment, the medium according to the invention has a birefringence of 0.120 or more, preferably in the range of from 0.125 to 0.145, more preferably from 0.130 to 0.140.

The liquid-crystal mixture according to the invention has a dielectric anisotropy Δε of −1.5 to −8.0, preferably of −2.0 to −4.0, in particular −2.5 to −3.5, The rotational viscosity $\gamma_1$ at 20° C. is preferably ≤120 mPa·s, in particular ≤100 mPa·s.

In a preferred embodiment, the rotational viscosity $\gamma_1$ at 20° C. is ≤100 mPa·s, in particular ≤95 mPa·s.

The liquid-crystal media according to the invention have relatively low values for the threshold voltage ($V_0$). They are preferably in the range from 1.7 V to 3.0 V, particularly preferably ≤2.7 V and very particularly preferably ≤2.5 V.

For the present invention, the term "threshold voltage" relates to the capacitive threshold ($V_0$), also called the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a Δε>1.5, the term "dielectrically neutral compounds" denotes those having −1.5≤Δε≤1.5 and the term "dielectrically negative compounds" denotes those having Δε<−1.5. The dielectric anisotropy of the compounds is determined here by dissolving 10% of the compounds in a LC host and determining the capacitance of the resultant mixture in at least one test cell in each case having a layer thickness of 20 μm with homeotropic and with homogeneous surface alignment at 1 KHz. The measurement voltage is typically 0.5 V to 1.0 V, but is always lower than the capacitive threshold of the respective liquid-crystal mixture investigated.

All temperature values indicated for the present invention are in ° C.

The LC media according to the invention are suitable for all VA-TFT (vertical alignment-thin film transistor) applications, such as, for example, VAN (vertically aligned nematic), MVA (√multidomain VA), (S)-PVA (super patterned VA), ASV (advanced super view, or axially symmetric VA), PSA (polymer sustained VA) and PS-VA (polymer stabilized VA). They are furthermore suitable for IPS (in-plane switching) and FFS (fringe field switching) applications having negative Δε.

The nematic LC media in the displays according to the invention generally comprise two components A1 and A2, which themselves consist of one or more individual compounds.

Component A1 has significantly negative dielectric anisotropy and gives the nematic phase a dielectric anisotropy of Δε≤−0.5. Preferably it comprises the compounds of the formulae IIA, IIB and/or IIC, furthermore one or more compounds of the formula IV-1.

The proportion of component A1 is preferably between 45 and 100%, in particular between 60 and 85%.

For component A1, one (or more) individual compound(s) which has (have) a value of Δε≤−0.8 is (are) preferably selected. This value must be more negative, the smaller the proportion A in the mixture as a whole.

Component A2 has pronounced nematogeneity and a flow viscosity of not greater than 30 mm$^2$·s$^{-1}$, preferably not greater than 25 mm$^2$·s$^{-1}$, at 20° C.

A multiplicity of suitable materials is known to the person skilled in the art from the literature. Particular preference is given to compounds of the formula O-17.

Particularly preferred individual compounds in component A2 are extremely low-viscosity nematic liquid crystals having a flow viscosity of not greater than 18 mm$^2$·s$^{-1}$, preferably not greater than 12 mm$^2$·s$^{-1}$, at 20° C.

Component A2 is monotropically or enantiotropically nematic, has no smectic phases and is able to prevent the occurrence of smectic phases down to very low temperatures in LC media. For example, if various materials of high nematogeneity are added to a smectic liquid-crystal mixture, the nematogeneity of these materials can be compared through the degree of suppression of smectic phases that is achieved.

The mixture may optionally also comprise a component A3, comprising compounds having a dielectric anisotropy of Δε≥1.5. These so-called positive compounds are generally present in a mixture of negative dielectric anisotropy in amounts of ≤20% by weight, based on the mixture as a whole.

The LC medium preferably comprises 4 to 15, in particular 5 to 12, and particularly preferably <10, compounds of the formulae IIA, IIB and/or IIC and optionally one or more compounds of the formula IV-1.

Besides compounds of the formulae IIA, IIB and/or IIC and optionally IV-1, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclo-hexyl benzoates, phenyl or cyclohexyl cyclohexanecarboxylates, phenyl-cyclohexanes, cyclohexylbiphenyls, cyclohexylcyclohexanes, cyclo-hexylnaphthalenes, 1,4-biscyclohexylbiphenyls or cyclohexylpyrimidines, phenyl- or cyclohexyldioxanes, optionally halogenated stilbenes, benzyl phenyl ethers, tolanes and substituted cinnamic acid esters.

The most important compounds which are suitable as constituents of liquid-crystal phases of this type can be characterised by the formula OC $$R^{20}\text{-L-G-E-}R^{21} \qquad \text{OC}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetra-hydroquinazoline, G denotes —CH=CH— —N(O)=N—
 —CH=CQ- —CH=N(O)—
 —C=C— —CH$_2$—CH$_2$—
 —CO—O— —CH$_2$—O—
 —CO—S— —CH$_2$—S—
 —CH=N— —COO-Phe-COO—
 —CF$_2$O— —CF=CF—

—OCF$_2$— —OCH$_2$—
—(CH$_2$)$_4$— —(CH$_2$)$_3$O— or a C—C single bond, Q denotes halogen, preferably chlorine, or —CN, and R$^{20}$ and R$^{21}$ each denote alkyl, alkenyl, alkoxy, alkoxyalkyl or alkoxycarbonyl-oxy having up to 18, preferably up to 8, carbon atoms, or one of these radicals alternatively denotes CN, NC, NO$_2$, NCS, CF$_3$, SF$_5$, OCF$_3$, F, Cl or Br.

In most of these compounds, R$^{20}$ and R$^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA, IPS or FFS mixture according to the invention may also comprise compounds in which, for example, H, N, O, Cl and F have been replaced by the corresponding isotopes.

The combination of compounds of the preferred embodiments mentioned above with the polymerized compounds described above causes low threshold voltages, low rotational viscosities and very good low-temperature stabilities in the LC media according to the invention at the same time as constantly high clearing points and high HR values, and allows the rapid establishment of a particularly low tilt angle (i.e. a large tilt) in PSA displays. In particular, the LC media exhibit significantly shortened response times, in particular also the grey-shade response times, in PSA displays compared with the LC media from the prior art.

The LC medium according to the invention may also comprise further additives for example selected from the list including but not limited to antioxidants, free-radical scavengers, surfactants, defoaming agents, wetting agents, lubricating agents, dispersing agents, hydrophobing agents, adhesive agents, flow improvers, deaerators, diluents, reactive diluents, auxiliaries, colourants, dyes, pigments and nanoparticles.

The individual components of the above-listed preferred embodiments of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerizable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

Above and below,

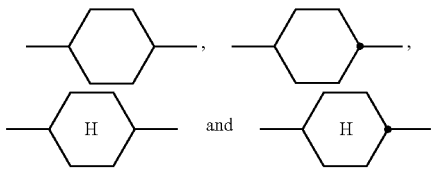

denote a trans-1,4-cyclohexylene ring, and

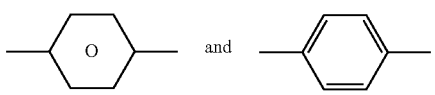

denote a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

—CO—, —C(=O)— and —C(O)— denote a carbonyl group, i.e.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C ($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1': 3', 1"] terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b] thiophene, thieno[3,2b] thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are F, Cl, Br, I, —CN, —$NO_2$, —NCO, —NCS, —OCN, —SCN, —C(=O) N ($R^x$)$_2$, —C(=O) $Y^1$, —C(=O) $R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

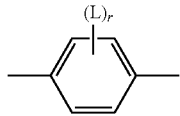

is preferably

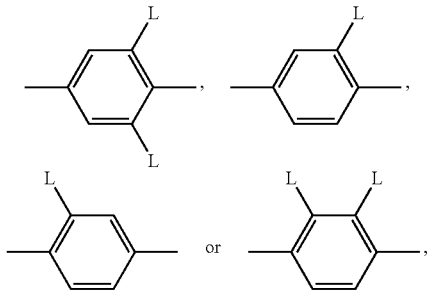

in which L has one of the meanings indicated above.

The polymerizable group P is a group which is suitable for a polymerization reaction, such as, for example, free-radical or ionic chain polymerization, polyaddition or polycondensation, or for a polymer-analogous reaction, for example addition or condensation onto a main polymer chain. Particular preference is given to groups for chain polymerization, in particular those containing a C=C double bond or —C≡C— triple bond, and groups which are suitable for polymerization with ring opening, such as, for example, oxetane or epoxide groups.

Preferred groups P are selected from the group consisting of $CH_2=CW^1$—CO—O—, $CH_2=CW^1$—CO—,

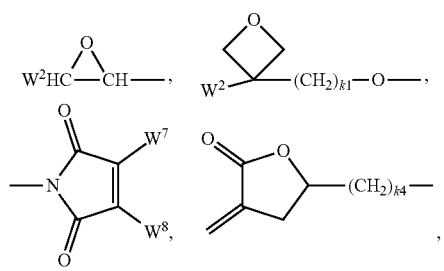

$CH_2=CW^2$—$(O)_{k3}$—, $CW^1$=CH—CO—$(O)_{k3}$—, $CW^1$=CH—CO—NH—, $CH_2=CW^1$—CO—NH—, $CH_3$—CH=CH—O—, $(CH_2=CH)_2CH$—OCO—, $(CH_2=CH$—$CH_2)_2CH$—OCO—, $(CH_2=CH)_2CH$—O—, $(CH_2=CH$—$CH_2)_2N$—, $(CH_2=CH$—$CH_2)_2N$—CO—, HO—$CW^2W^3$—, HS—$CW^2W^3$—, HWAN—, HO—$CW^2W$—NH—, $CH_2=CW$—CO—NH—, $CH_2=CH$—$(COO)_{k1}$-Phe-$(O)_{k2}$—, $CH_2=CH$—$(CO)_{k1}$-Phe-$(O)_{k2}$—, Phe-CH=CH—HOOC—, OCN— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and We each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1$—CO—O—, $CH_2=CW^1$—CO—,

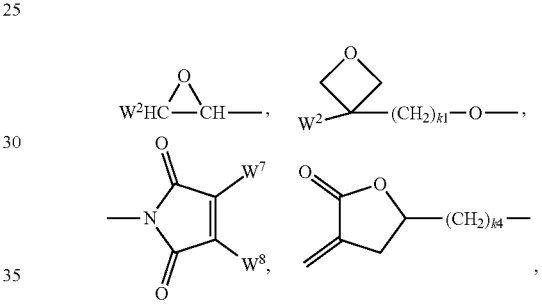

$CH_2=CW^2$—O—, $CH_2=CW^2$—, $CW^1$=CH—CO—$(O)_{k3}$—, $CW^1$=CH—CO—NH—, $CH_2=CW^1$—CO—NH—, $(CH_2=CH)_2CH$—OCO—, $(CH_2=CH$—$CH_2)_2CH$—OCO—, $(CH_2=CH)_2CH$—O—, $(CH_2=CH$—$CH_2)_2N$—, $(CH_2=CH$—$CH_2)_2N$—CO—, $CH_2=CW^1$—CO—NH—, $CH_2=CH$—$(COO)_{k1}$-Phe-$(O)_{k2}$—, $CH_2=CH$—$(CO)_{k1}$-Phe-$(O)_{k2}$—, Phe-CH=CH— and $W^4W^5W^6Si$—, in which $W^1$ denotes H, F, Cl, CN, $CF_3$, phenyl or alkyl having 1 to 5 C atoms, in particular H, F, Cl or $CH_3$, $W^2$ and We each, independently of one another, denote H or alkyl having 1 to 5 C atoms, in particular H, methyl, ethyl or n-propyl, $W^4$, $W^6$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1$—CO—O—, in particular $CH_2=CH$—CO—O—, $CH_2=C(CH_3)$—CO—O— and $CH_2=CF$—CO—O—, furthermore $CH_2=CH$—O—, $(CH_2=CH)_2CH$—O—CO—, $(CH_2=CH)_2CH$—O—,

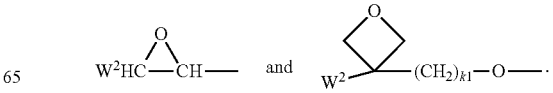

Further preferred polymerizable groups P are selected from the group consisting of vinyloxy, acrylate, methacrylate, fluoroacrylate, chloroacrylate, oxetane and epoxide, most preferably from acrylate and methacrylate.

If Sp is different from a single bond, it is preferably of the formula Sp"-X", so that the respective radical P-Sp-conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(R$^0$)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH═CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH═N—, —N═CH—, —N═N—, —CH═CR$^0$—, —CY$^2$═CY$^3$—, —C≡C—, —CH═CH—CO—O—, —O—CO—CH═CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp and -Sp"-X"— are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Particularly preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table A below.

TABLE A

In Table A, m and n are independently of each other an integer from 1 to 12, preferably 1, 2, 3, 4, 5 or 6, k is 0, 1, 2, 3, 4, 5 or 6, and (O)C$_m$H$_{2m+1}$ means C$_m$H$_{2m+1}$ or OC$_m$H$_{2m+1}$.

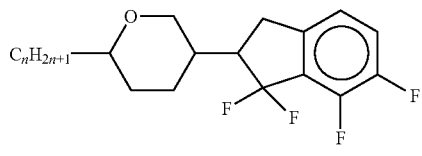

AIK-n-F

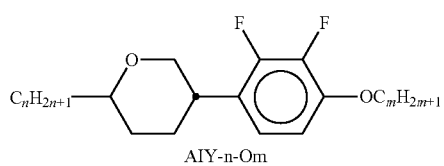

AIY-n-Om

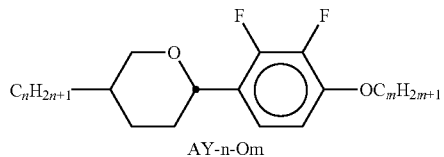

AY-n-Om

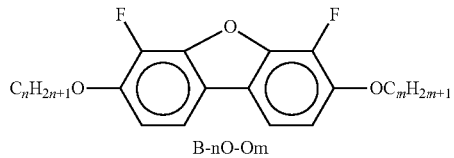

B-nO-Om

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
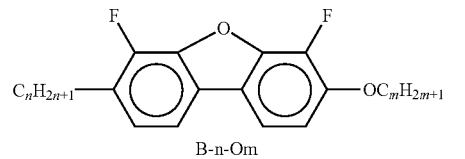
B-n-Om
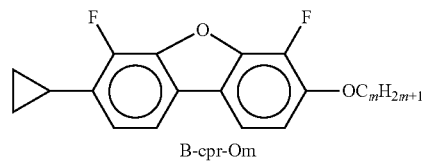
B-cpr-Om
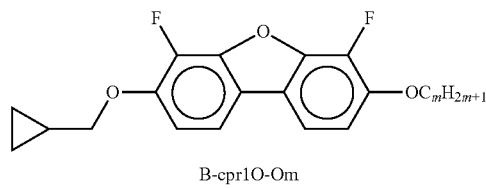
B-cpr1O-Om
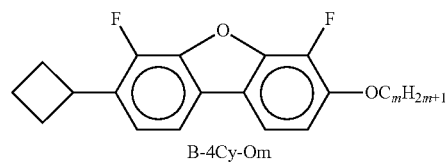
B-4Cy-Om
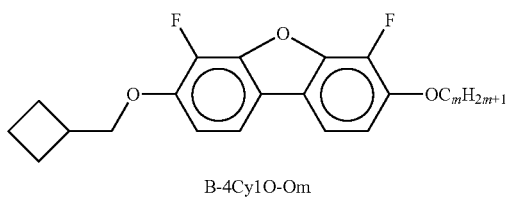
B-4Cy1O-Om
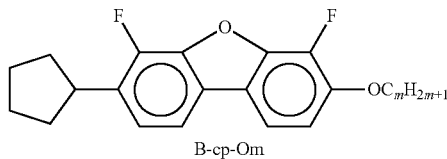
B-cp-Om
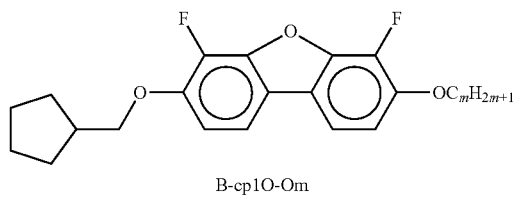
B-cp1O-Om
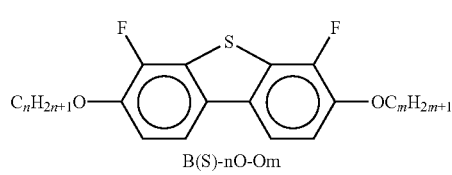
B(S)-nO-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
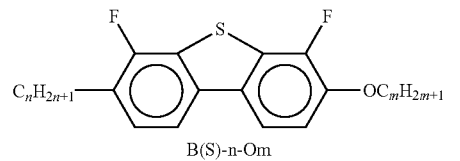
B(S)-n-Om
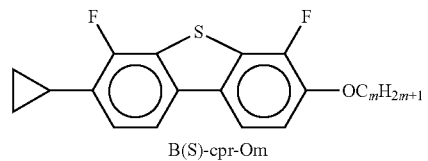
B(S)-cpr-Om
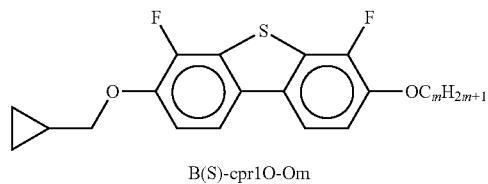
B(S)-cpr1O-Om
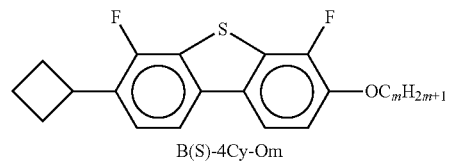
B(S)-4Cy-Om
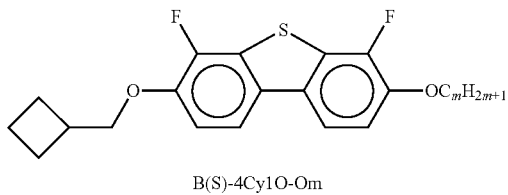
B(S)-4Cy1O-Om
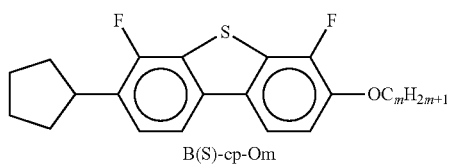
B(S)-cp-Om
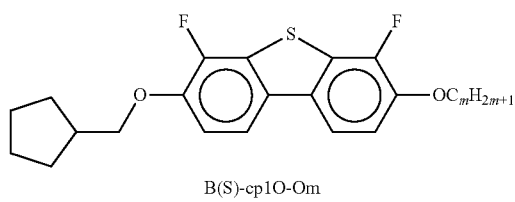
B(S)-cp1O-Om
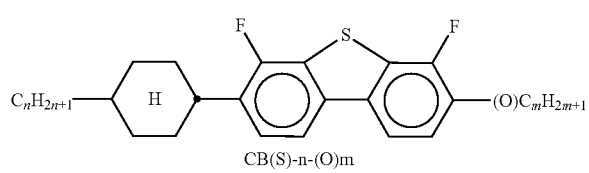
CB(S)-n-(O)m TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
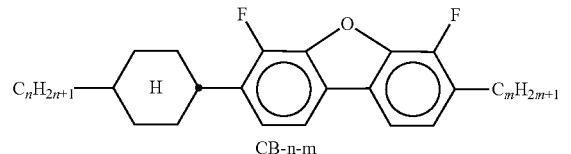
CB-n-m
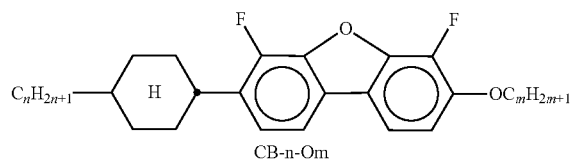
CB-n-Om
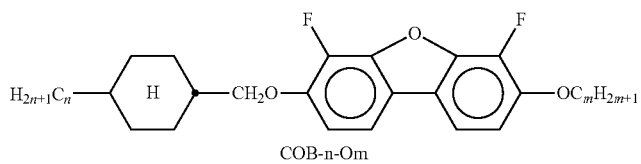
COB-n-Om
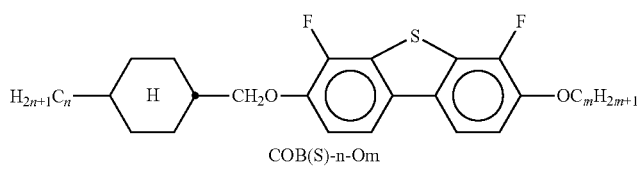
COB(S)-n-Om
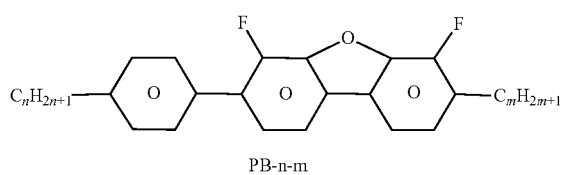
PB-n-m
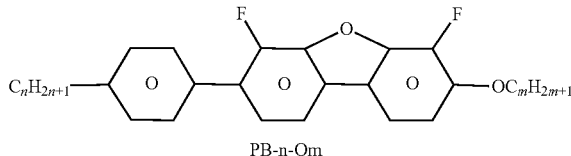
PB-n-Om
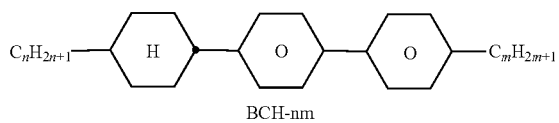
BCH-nm
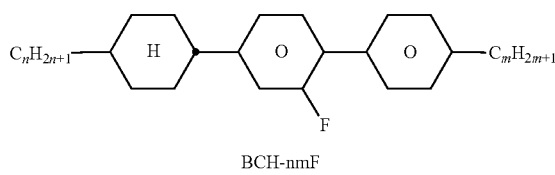
BCH-nmF
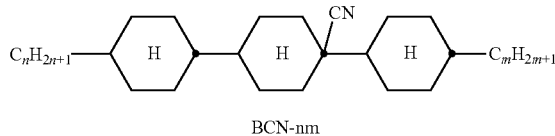
BCN-nm TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
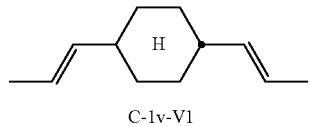
C-1v-V1
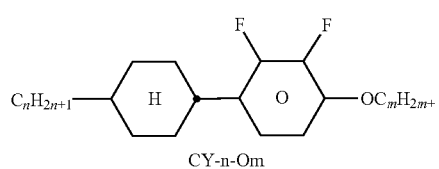
CY-n-Om
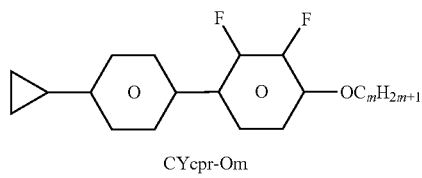
CYcpr-Om
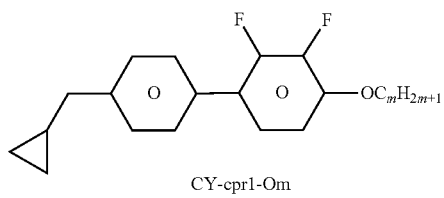
CY-cpr1-Om
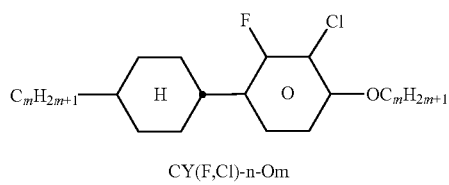
CY(F,Cl)-n-Om
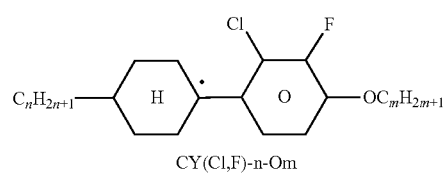
CY(Cl,F)-n-Om
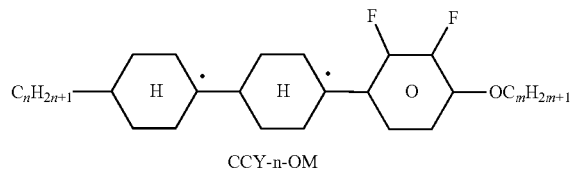
CCY-n-OM
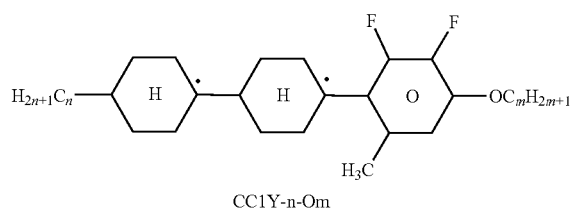
CC1Y-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
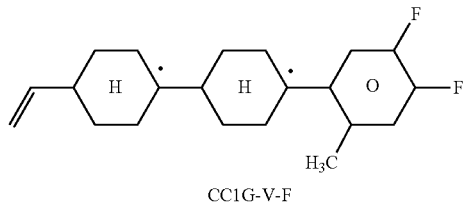
CC1G-V-F
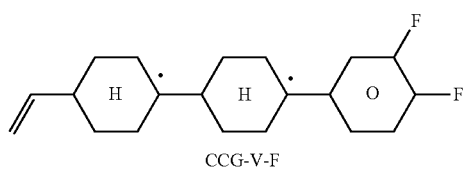
CCG-V-F
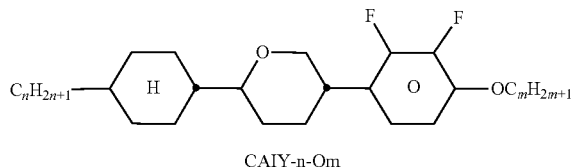
CAIY-n-Om
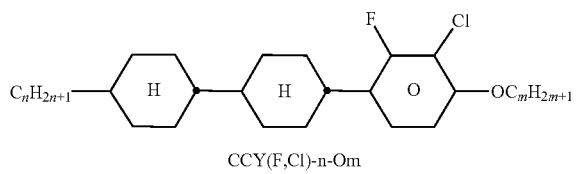
CCY(F,Cl)-n-Om
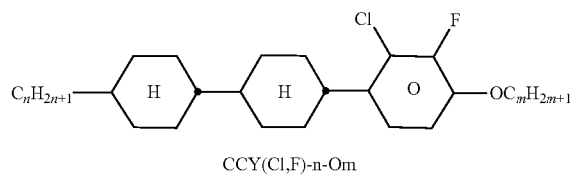
CCY(Cl,F)-n-Om
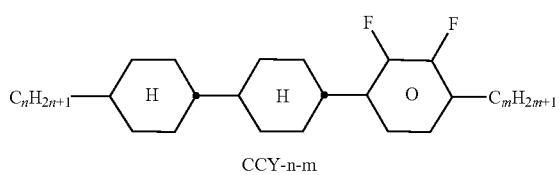
CCY-n-m
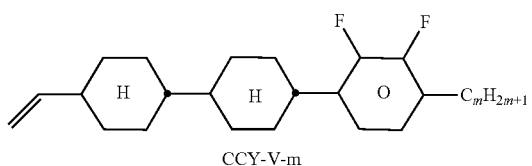
CCY-V-m
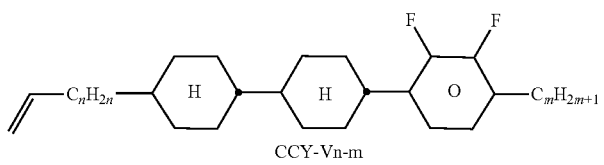
CCY-Vn-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
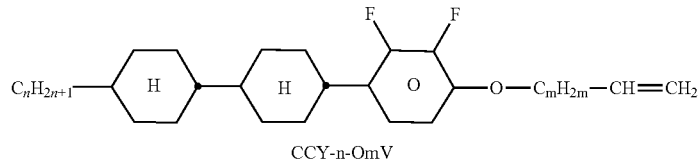
CCY-n-OmV
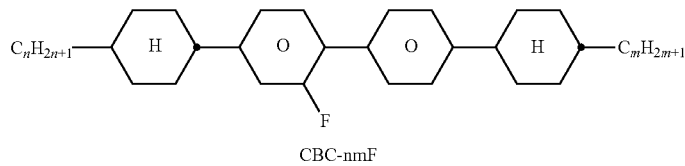
CBC-nmF
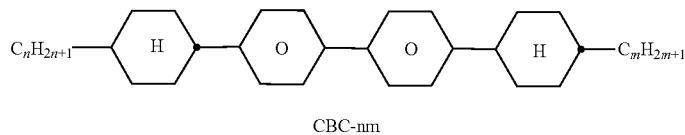
CBC-nm
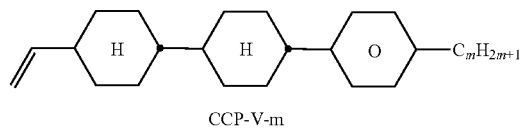
CCP-V-m
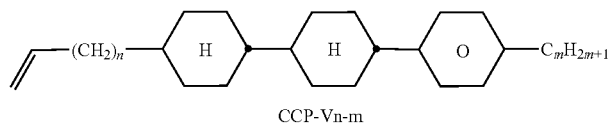
CCP-Vn-m
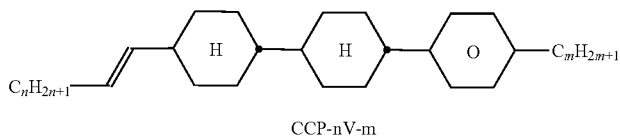
CCP-nV-m
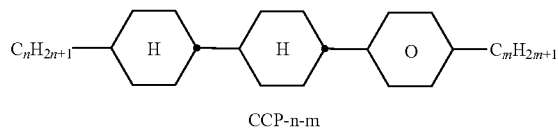
CCP-n-m
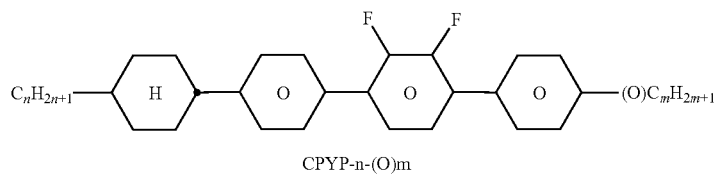
CPYP-n-(O)m
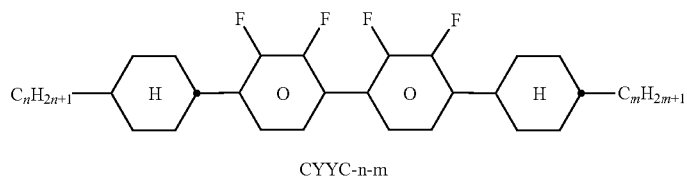
CYYC-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
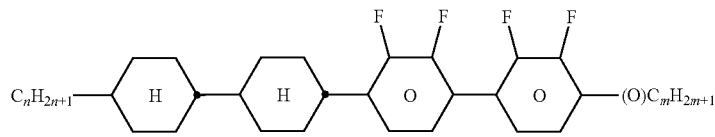
CCYY-n-(O)m
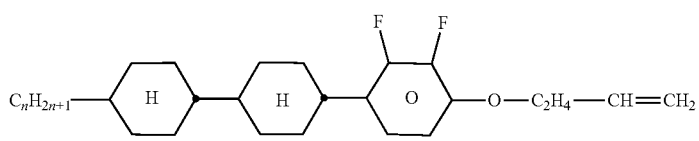
CCY-n-O2V
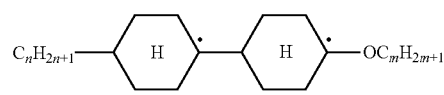
CCH-nOM, CC-n-Om
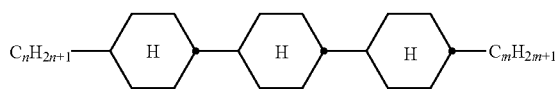
CCC-n-m
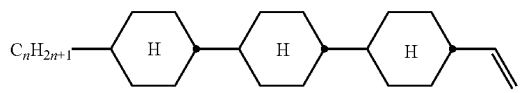
CCC-n-V
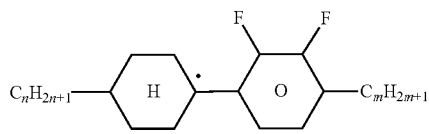
CY-n-m
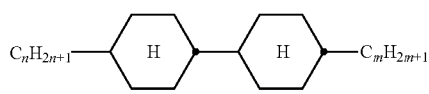
CCH-nm, CC-n-m
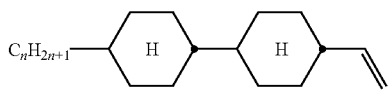
CC-n-V
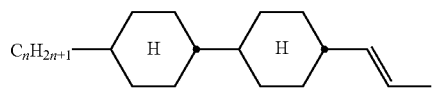
CC-n-V1
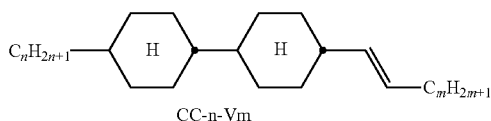
CC-n-Vm TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
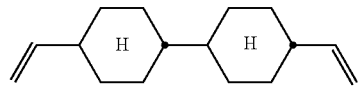
CC-V-V
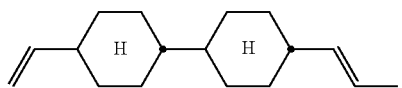
CC-V-V1
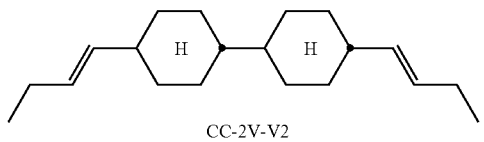
CC-2V-V2
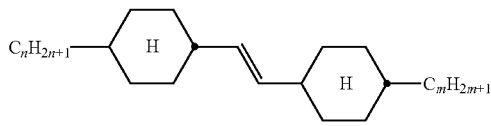
CVC-n-m
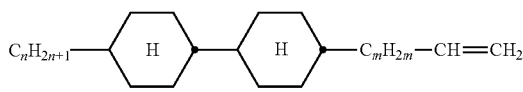
CC-n-mV
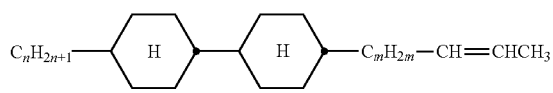
CC-n-mV1
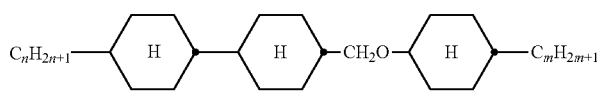
CCOC-n-m
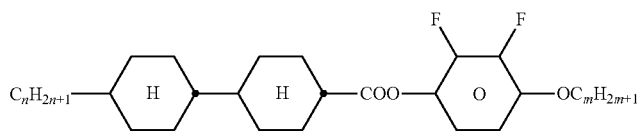
CP-nOmFF
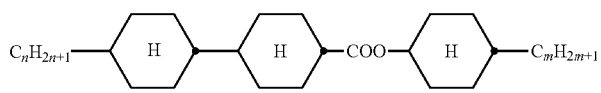
CH-nm
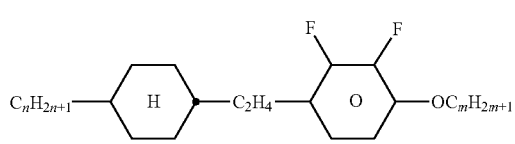
CRY-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
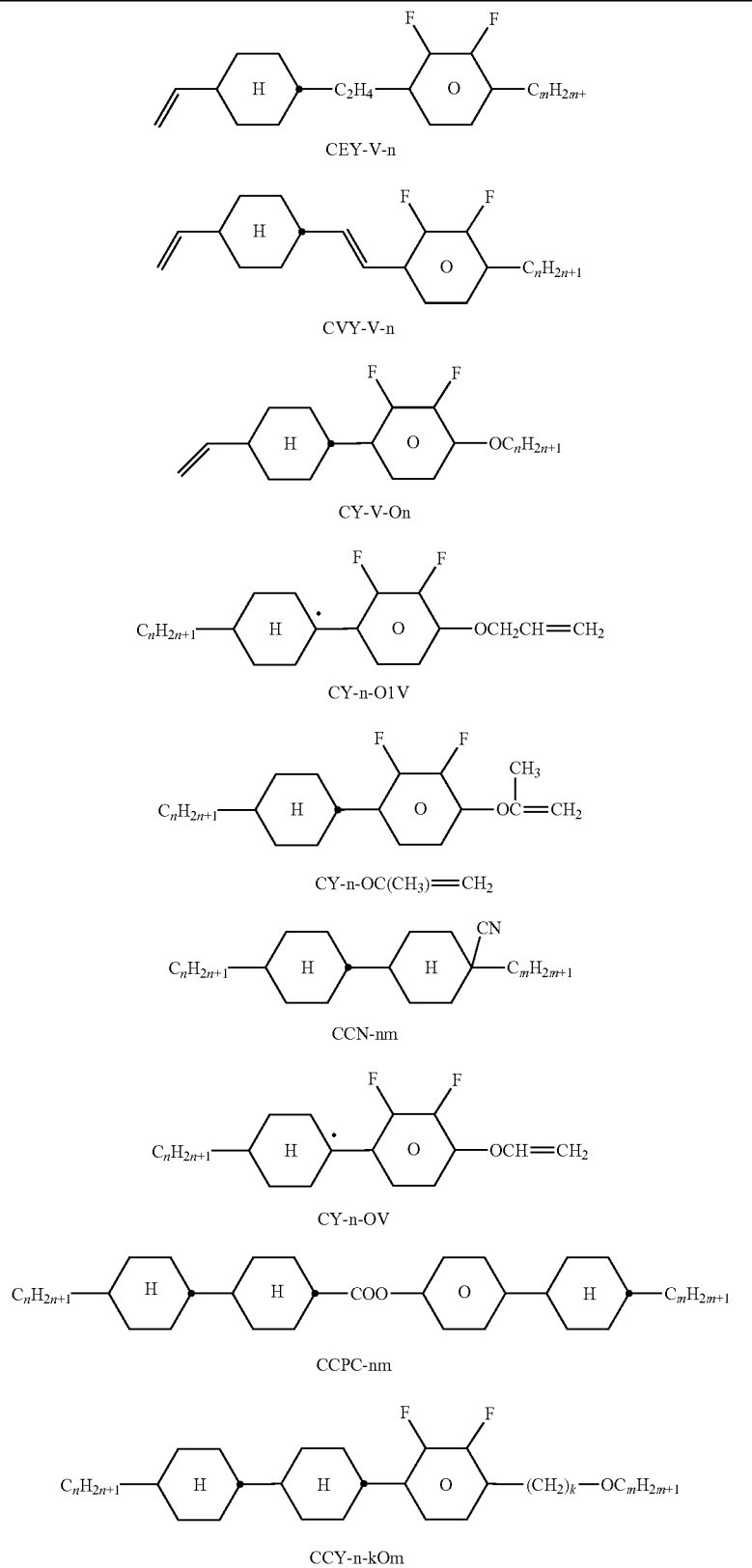

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
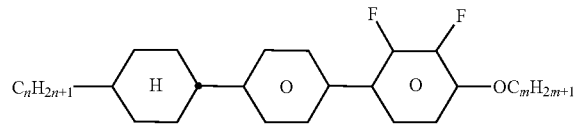
CPY-n-Om
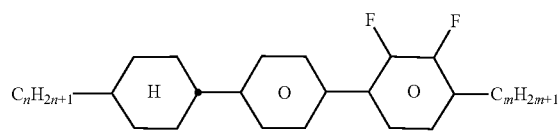
CPY-n-m
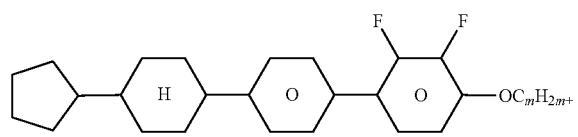
CPY-cp-Om
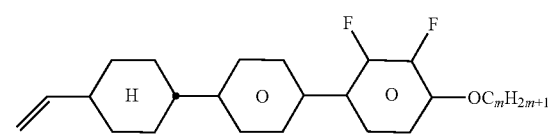
CPY-V-Om
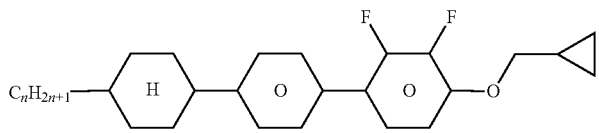
CPY-n-O1cpr
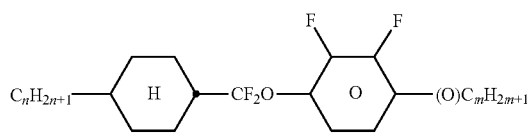
CQY-n-(O)m
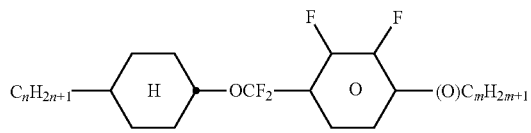
CQIY-n-(O)m
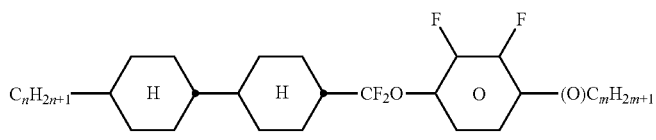
CCQY-n-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
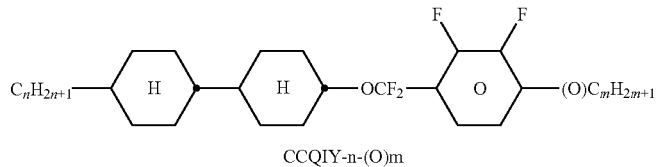
CCQIY-n-(O)m
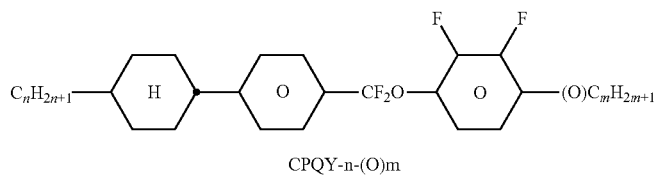
CPQY-n-(O)m
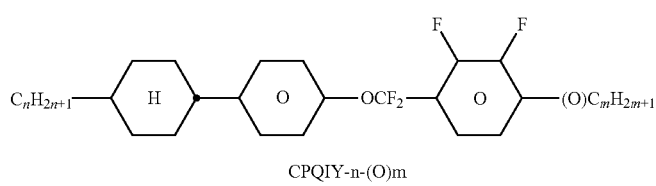
CPQIY-n-(O)m
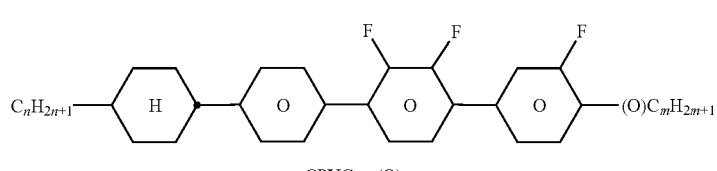
CPYG-n-(O)m
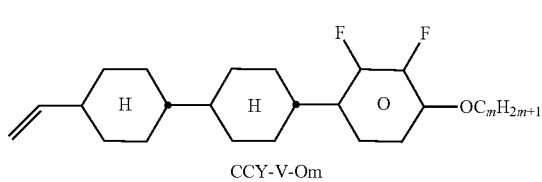
CCY-V-Om
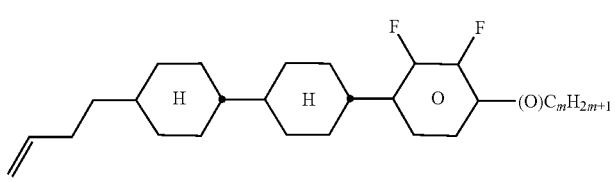
CCY-V2-(O)m
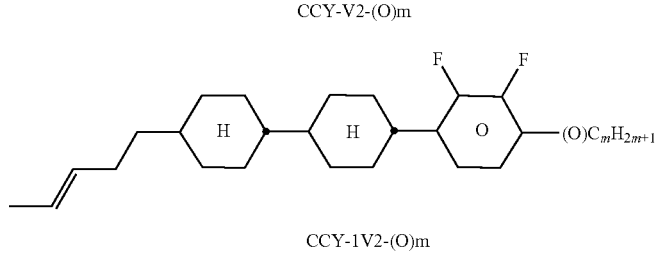
CCY-1V2-(O)m
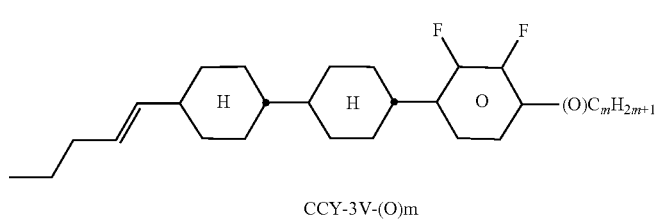
CCY-3V-(O)m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
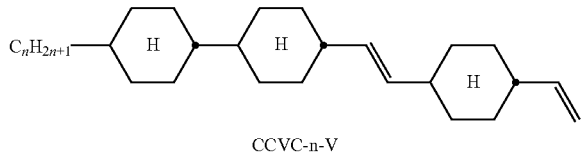
CCVC-n-V
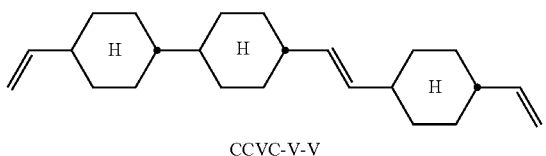
CCVC-V-V
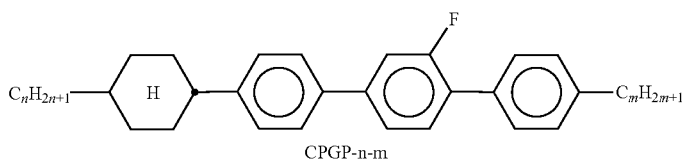
CPGP-n-m
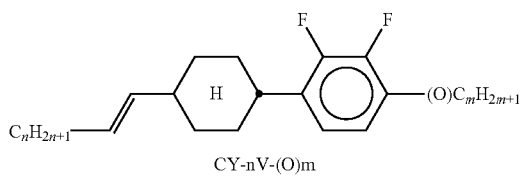
CY-nV-(O)m
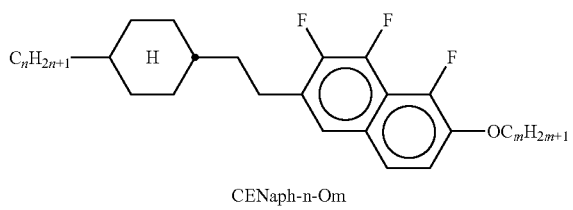
CENaph-n-Om
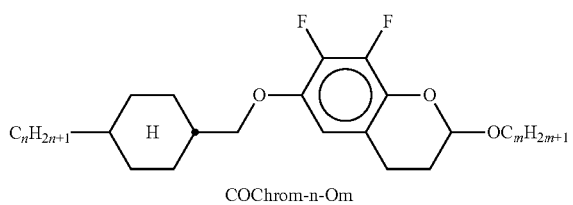
COChrom-n-Om
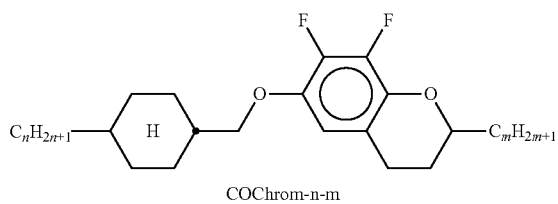
COChrom-n-m
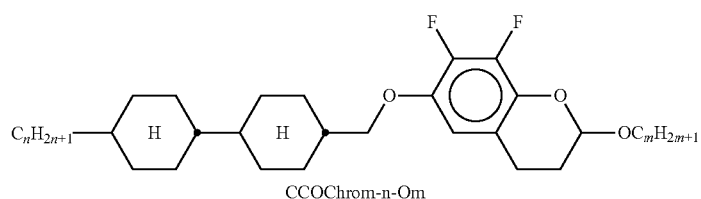
CCOChrom-n-Om TABLE A-continued
In Table A, m and n are independently of each other an integer from 1 to 12, preferably 1, 2, 3, 4, 5 or 6, k is 0, 1, 2, 3, 4, 5 or 6, and (O)$C_mH_{2m+1}$ means $C_mH_{2m+1}$ or $OC_mH_{2m+1}$.
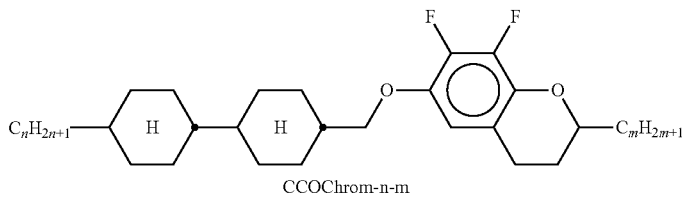
CCOChrom-n-m
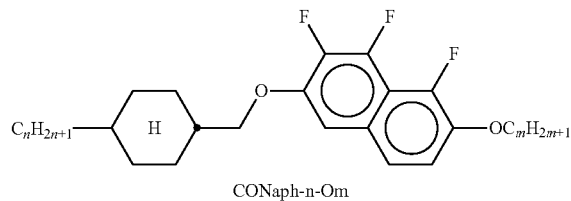
CONaph-n-Om
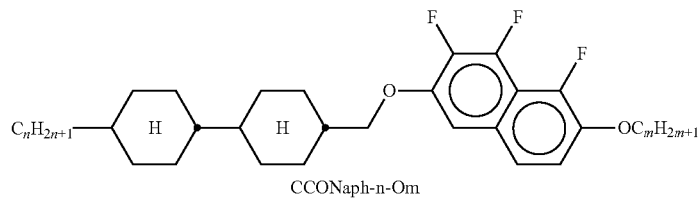
CCONaph-n-Om
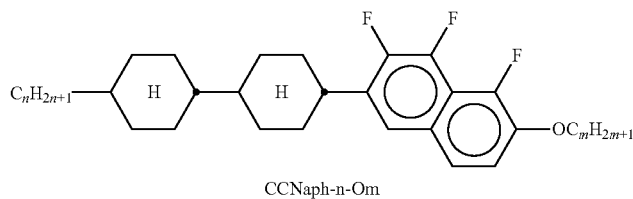
CCNaph-n-Om
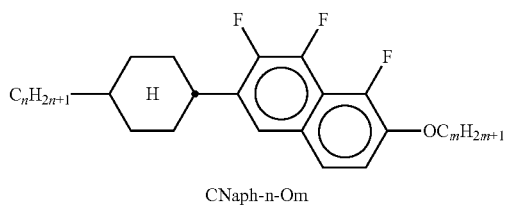
CNaph-n-Om
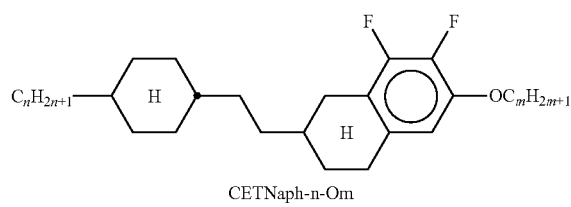
CETNaph-n-Om
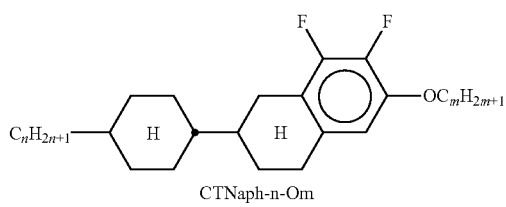
CTNaph-n-Om TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
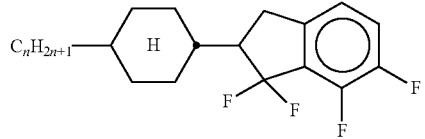
CK-n-F
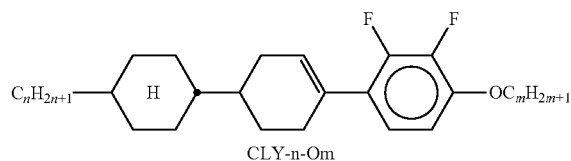
CLY-n-Om
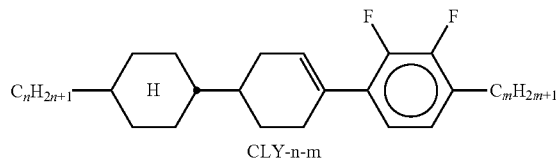
CLY-n-m
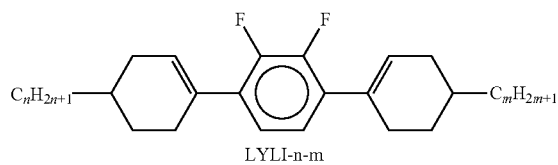
LYLI-n-m
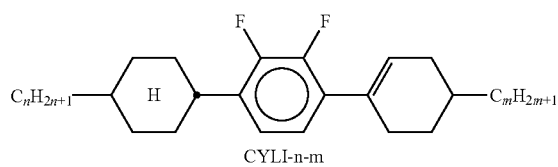
CYLI-n-m
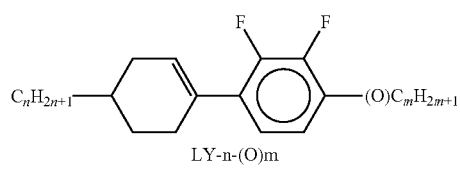
LY-n-(O)m
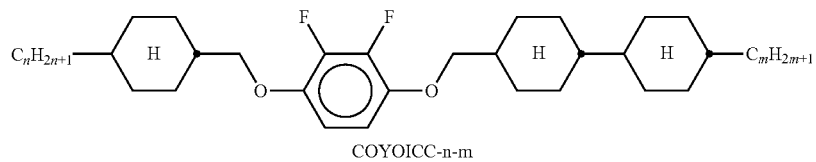
COYOICC-n-m
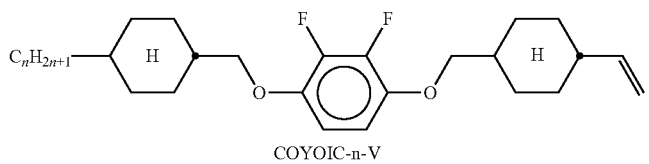
COYOIC-n-V TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
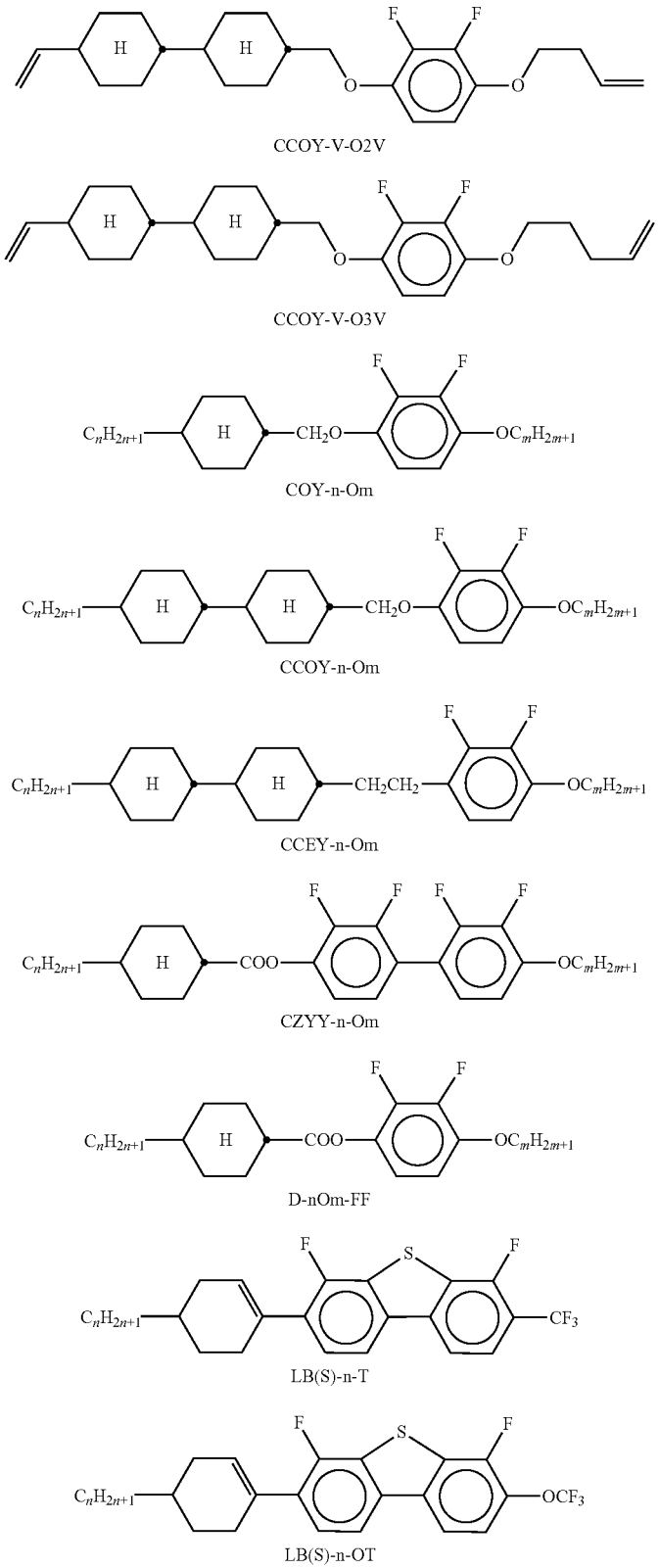

TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
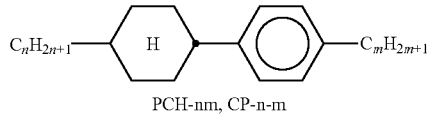
PCH-nm, CP-n-m
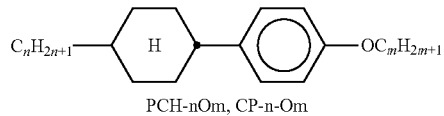
PCH-nOm, CP-n-Om
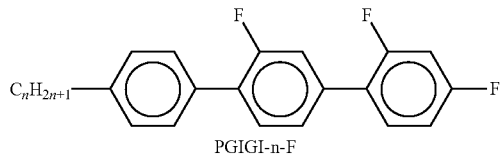
PGIGI-n-F
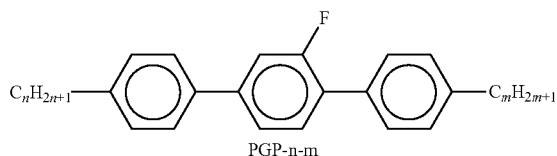
PGP-n-m
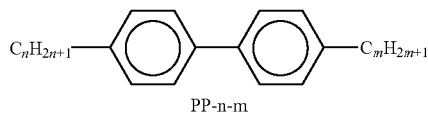
PP-n-m
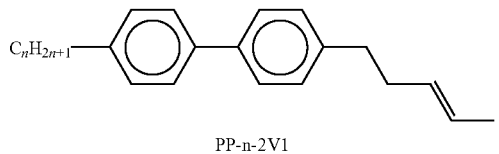
PP-n-2V1
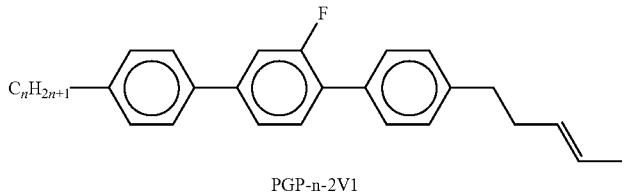
PGP-n-2V1
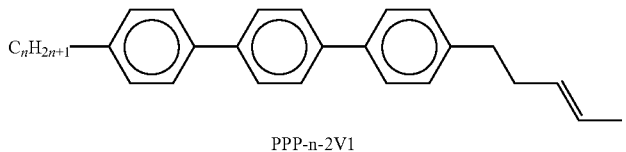
PPP-n-2V1
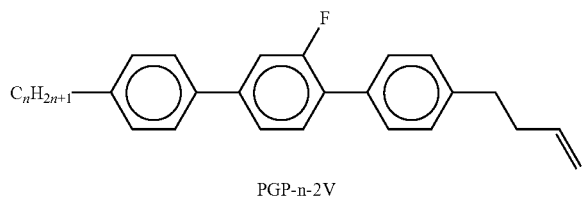
PGP-n-2V TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
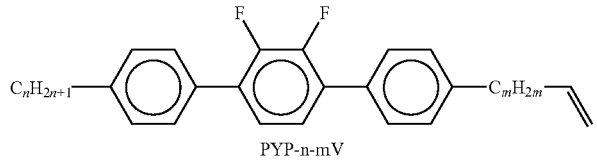
PYP-n-mV
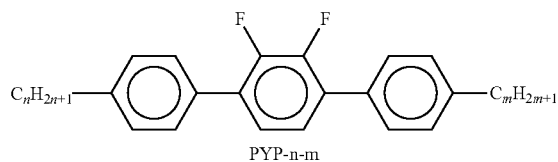
PYP-n-m
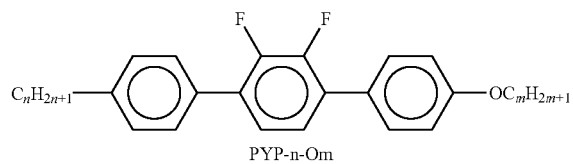
PYP-n-Om
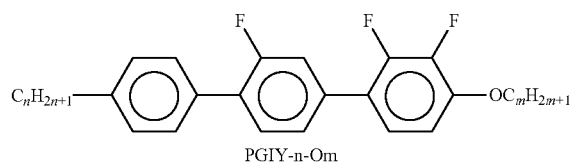
PGIY-n-Om
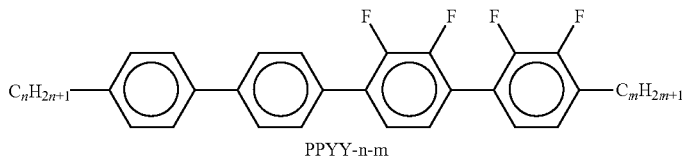
PPYY-n-m
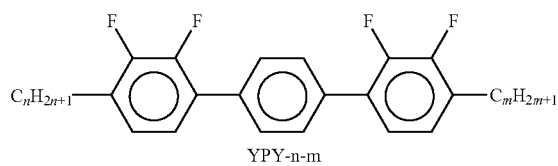
YPY-n-m
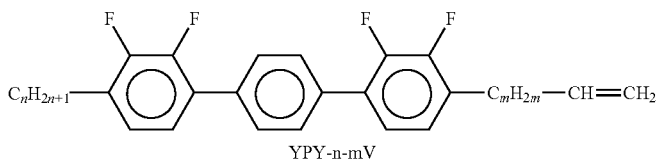
YPY-n-mV
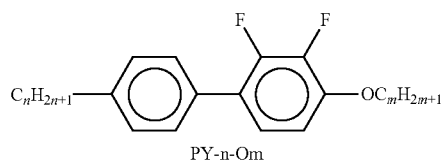
PY-n-Om
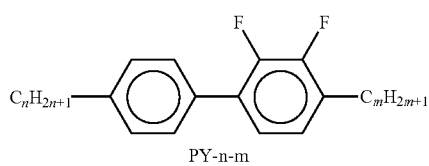
PY-n-m TABLE A-continued
In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.
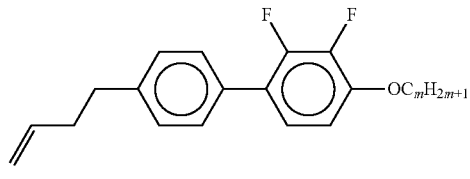
PY-V2-Om
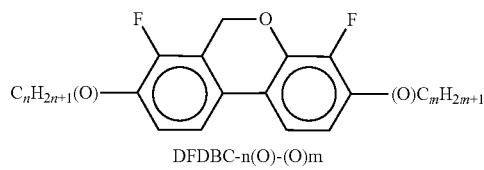
DFDBC-n(O)-(O)m
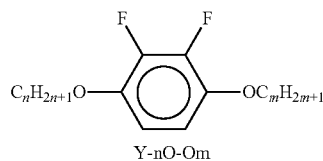
Y-nO-Om
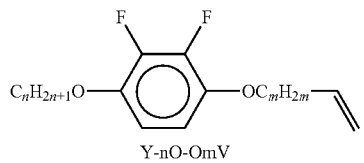
Y-nO-OmV
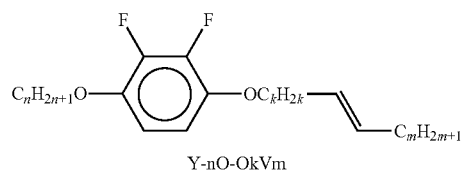
Y-nO-OkVm
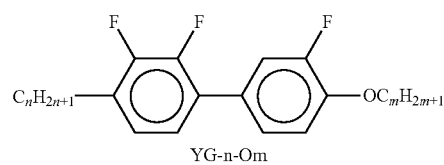
YG-n-Om
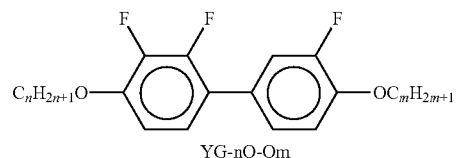
YG-nO-Om
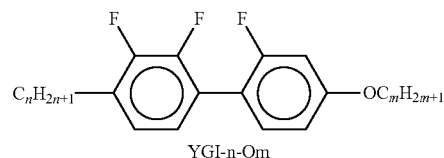
YGI-n-Om TABLE A-continued In Table A, m and n are independently of each other an integer from 1 to 12, preferably 1, 2, 3, 4, 5 or 6, k is 0, 1, 2, 3, 4, 5 or 6, and $(O)C_mH_{2m+1}$ means $C_mH_{2m+1}$ or $OC_mH_{2m+1}$.

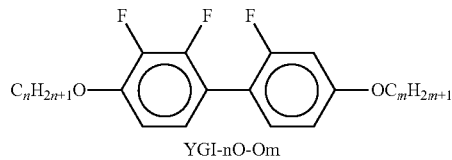

YGI-nO-Om

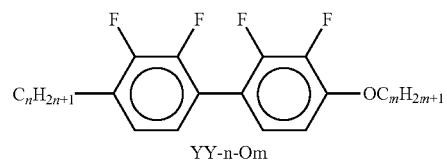

YY-n-Om

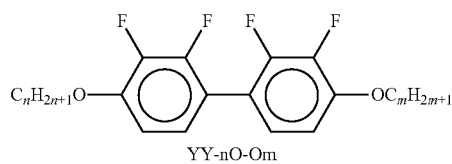

YY-nO-Om

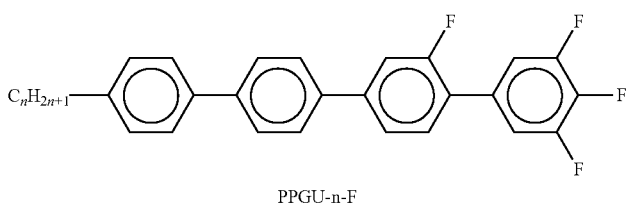

PPGU-n-F

In a preferred embodiment of the present invention, the LC media according to the invention comprise one or more compounds selected from the group consisting of compounds from Table A.

Table B shows possible chiral dopants which can be added to the LC media according to the invention.

TABLE B

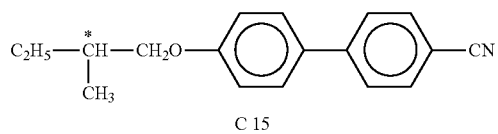

C 15

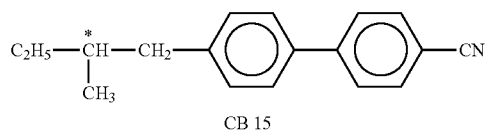

CB 15

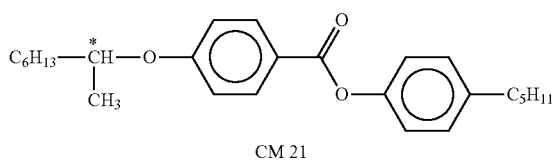

CM 21

TABLE B-continued
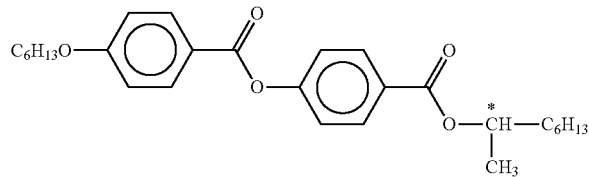
R/S-811
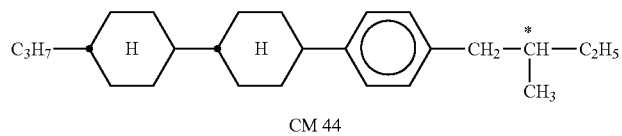
CM 44
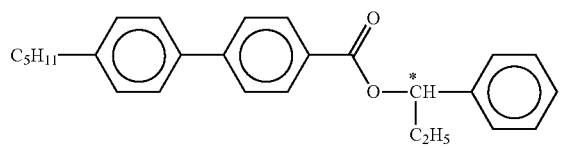
CM 45
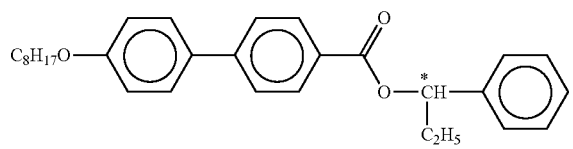
CM 47
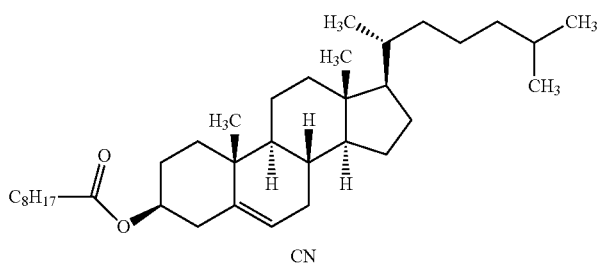
CN
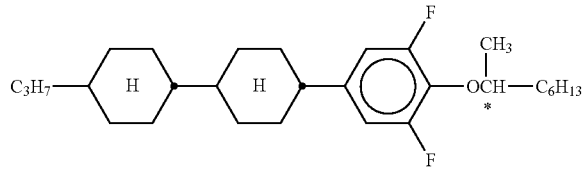
R/S-2011
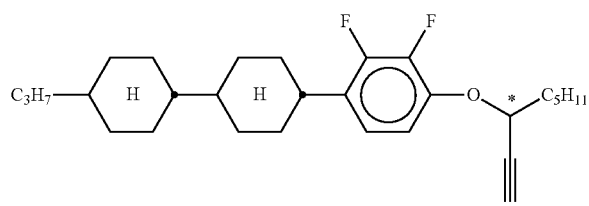
R/S-3011

TABLE B-continued

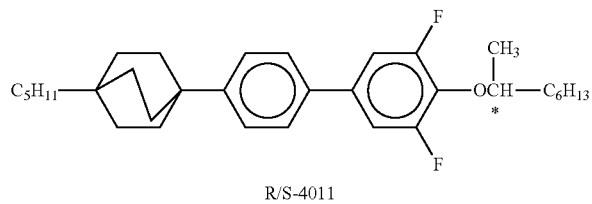

R/S-4011

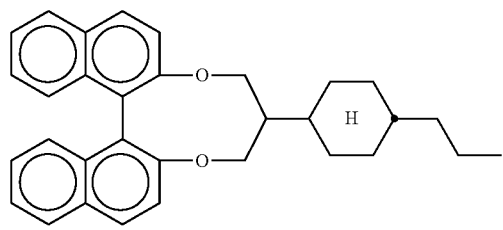

R/S-5011

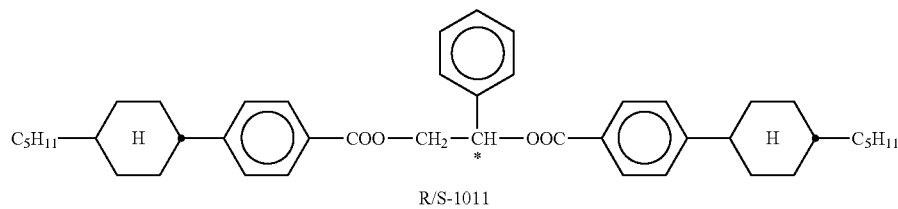

R/S-1011

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

Table C shows possible stabilisers which can be added to the LC media according to the invention. Therein n denotes an integer from 1 to 12, preferably 1, 2, 3, 4, 5, 6, 7 or 8, and terminal methyl groups are not shown.

TABLE C

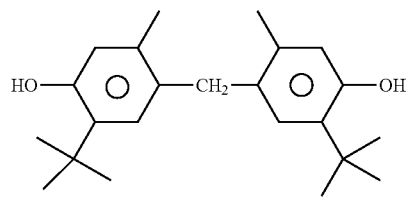 [SMILES: CC1CC(O)C(C(C)(C)C)CC1CC1CC(C(C)(C)C)C(O)CC1C]

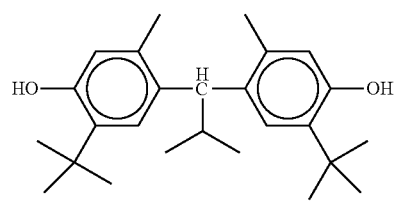

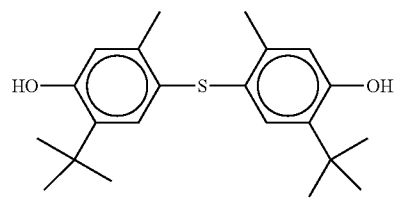

TABLE C-continued
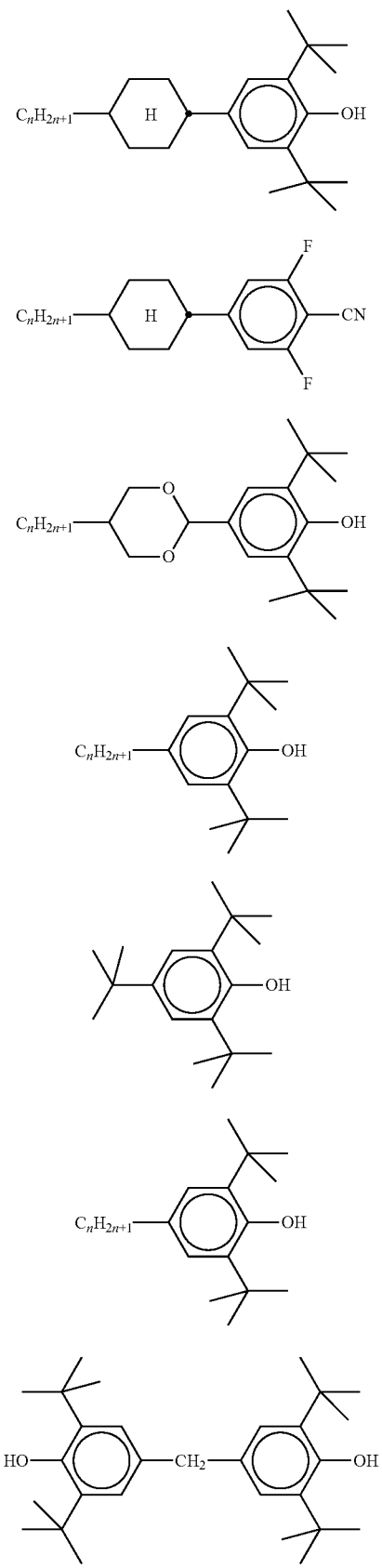

TABLE C-continued
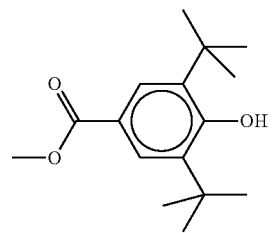
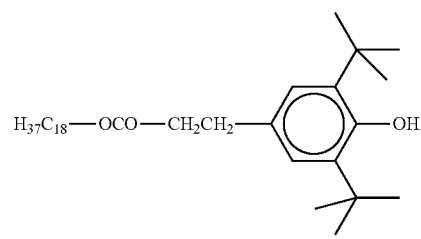
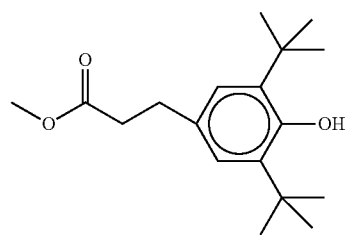
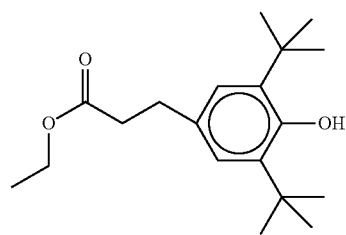
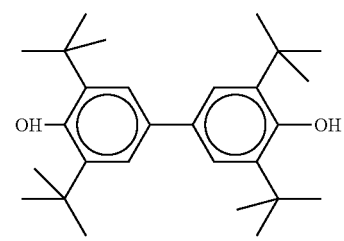

TABLE C-continued
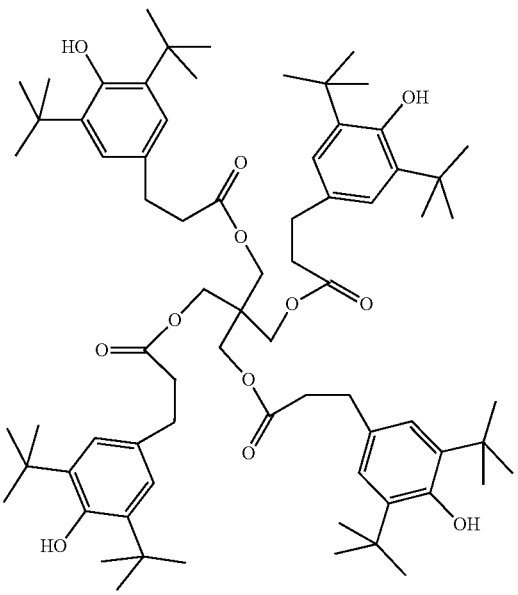 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
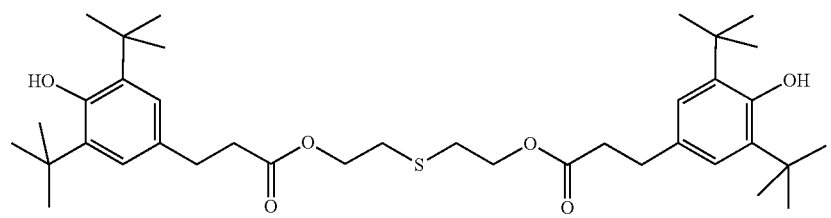 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
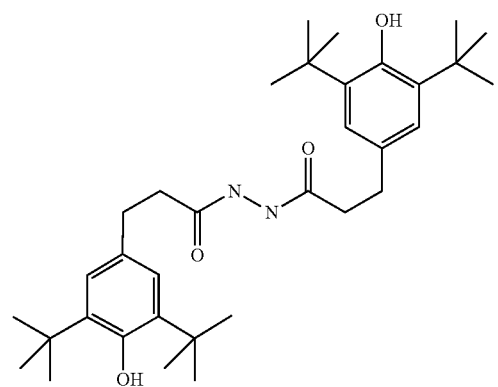
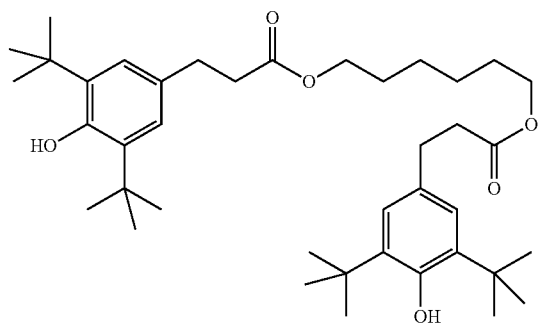 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]

TABLE C-continued
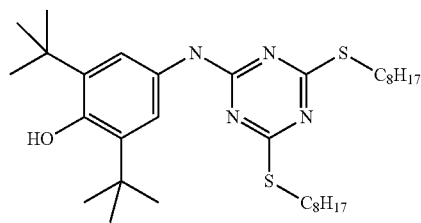
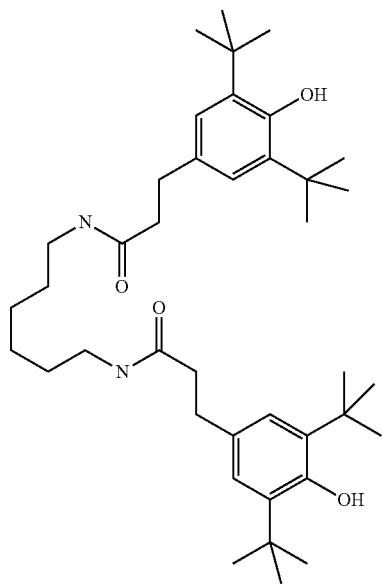
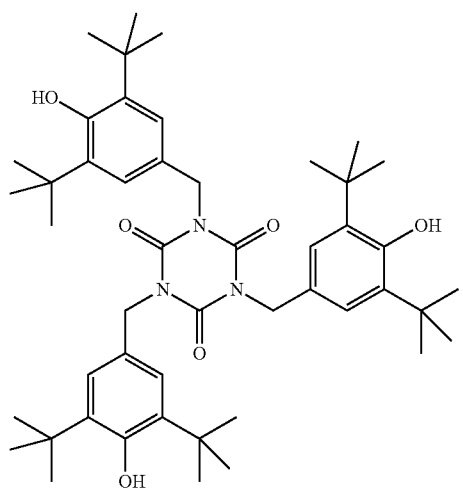 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
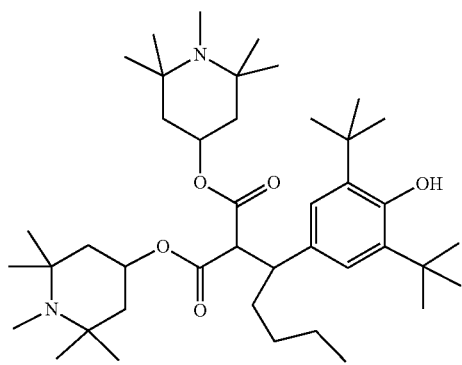 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
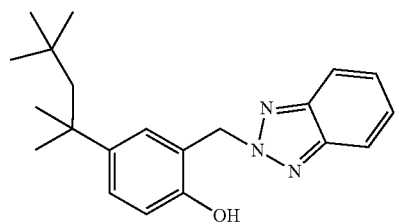 [SMILES: CC(C)(C)CC(C)(C)c1ccc(O)c(Cn2nc3ccccc3n2)c1]
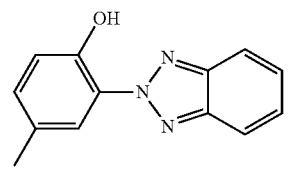 [SMILES: Cc1ccc(O)c(-n2nc3ccccc3n2)c1]
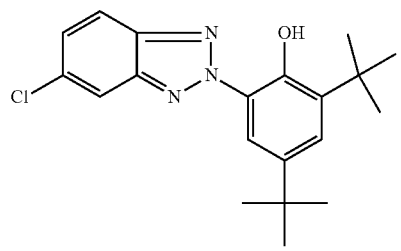 [SMILES: CC(C)(C)c1cc(-n2nc3ccc(Cl)cc3n2)c(O)c(C(C)(C)C)c1]
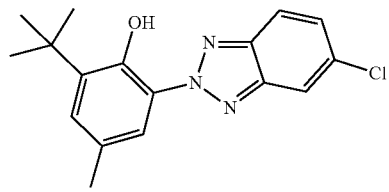 [SMILES: Cc1cc(-n2nc3ccc(Cl)cc3n2)c(O)c(C(C)(C)C)c1]
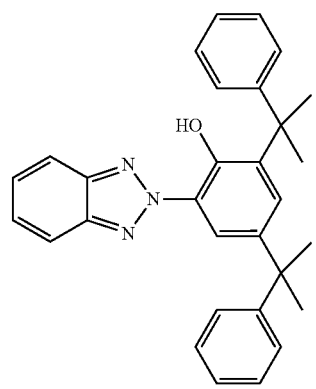 [SMILES: CC(C)(c1ccccc1)c1cc(-n2nc3ccccc3n2)c(O)c(C(C)(C)c2ccccc2)c1]
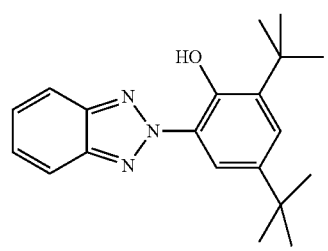

TABLE C-continued
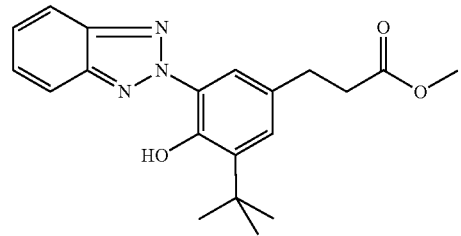 [SMILES: COC(=O)CCc1cc(-n2nc3ccccc3n2)c(O)c(C(C)(C)C)c1]
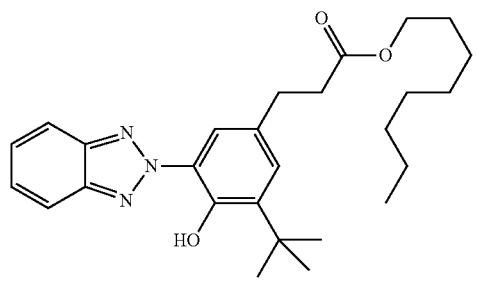
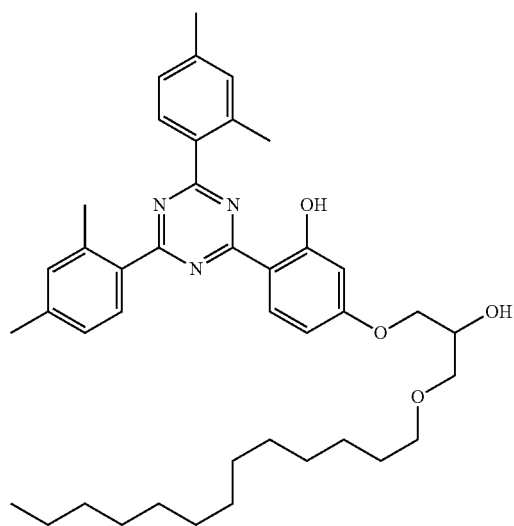 [SMILES: CCCCCCCCCCCCCOCC(O)COc1ccc(-c2nc(-c3ccc(C)cc3C)nc(-c3ccc(C)cc3C)n2)c(O)c1]
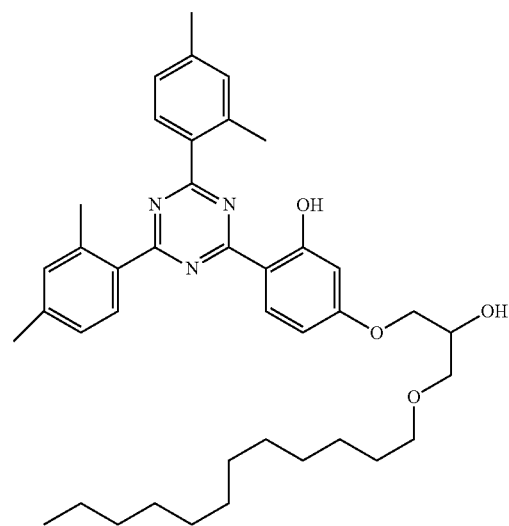 [SMILES: CCCCCCCCCCCCOCC(O)COc1ccc(-c2nc(-c3ccc(C)cc3C)nc(-c3ccc(C)cc3C)n2)c(O)c1]

TABLE C-continued
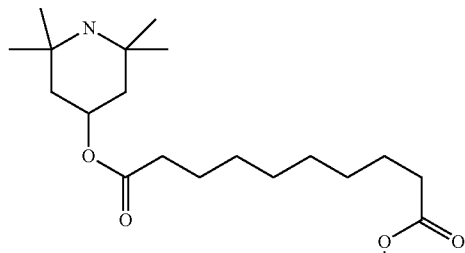
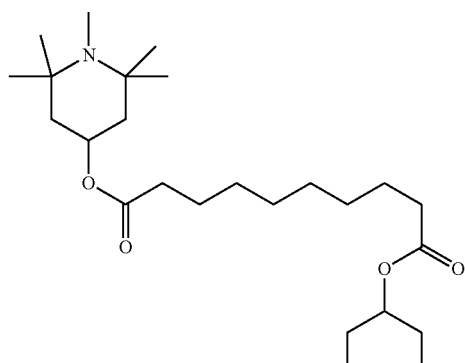
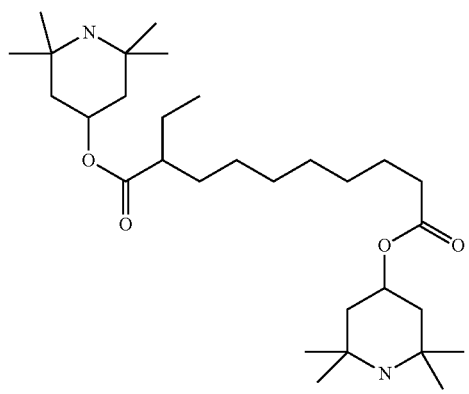
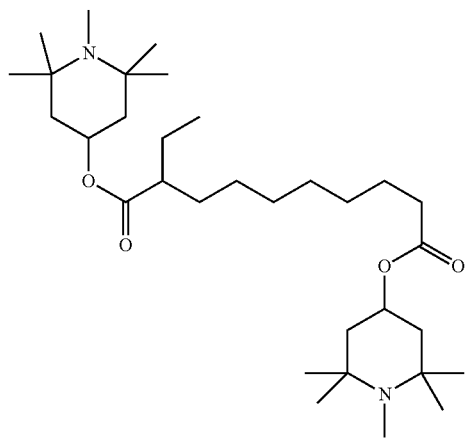

TABLE C-continued
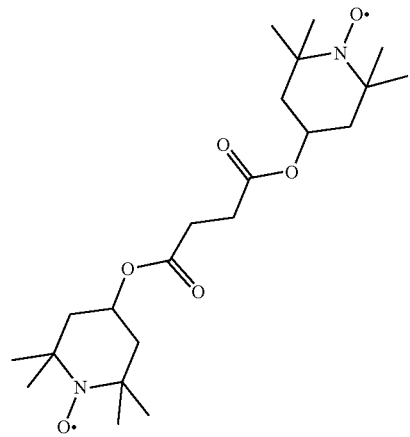
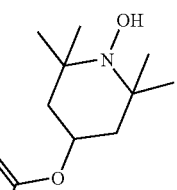
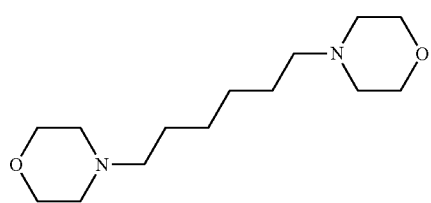 [SMILES: C(CCCN1CCOCC1)CCN1CCOCC1]

TABLE C-continued
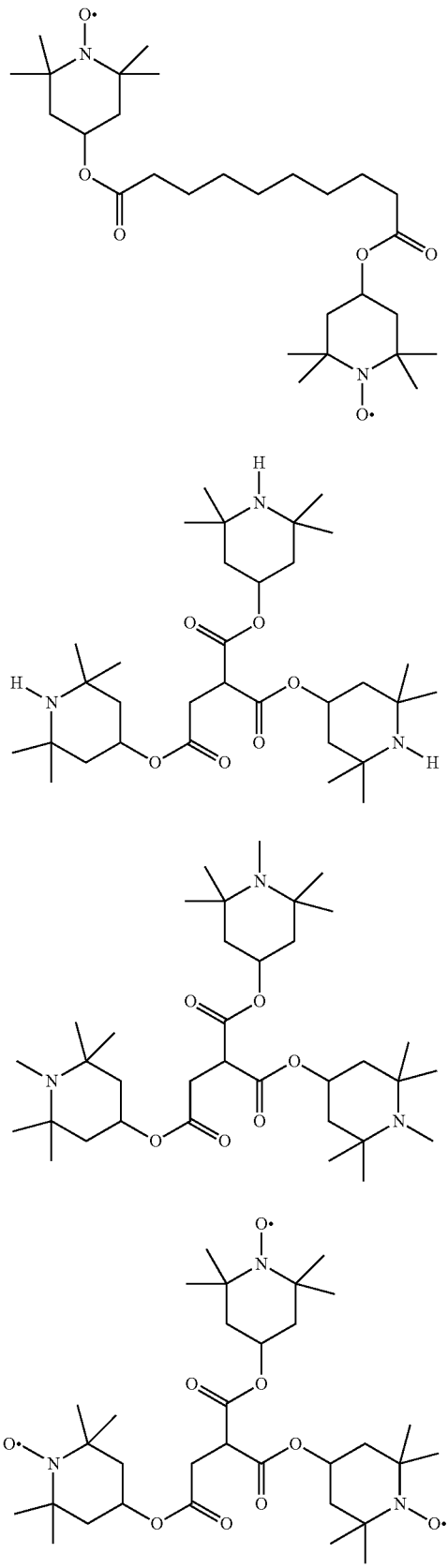

TABLE C-continued
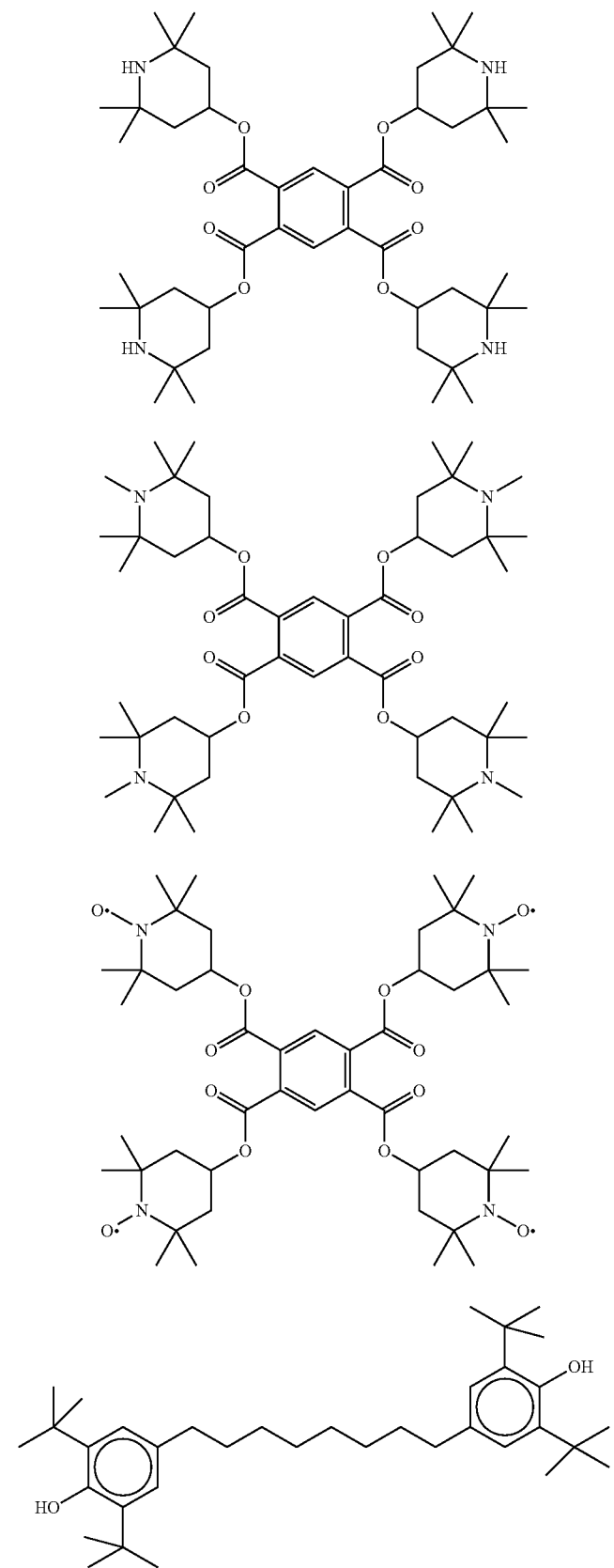

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

Table D shows illustrative reactive mesogenic compounds which can be used in the LC media in accordance with the present invention.

TABLE D

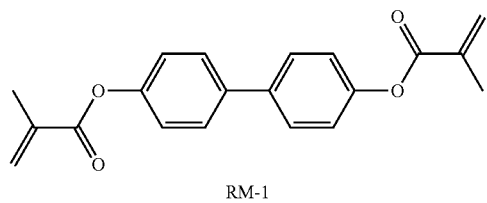

RM-1

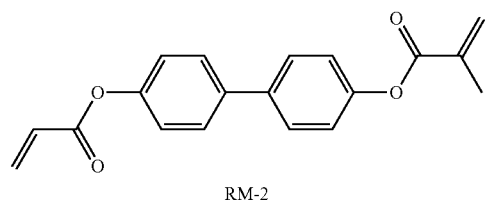

RM-2

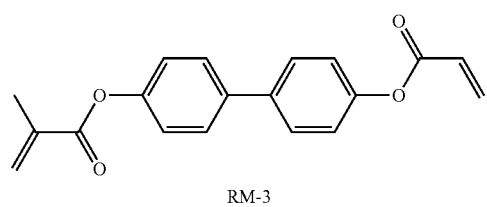

RM-3

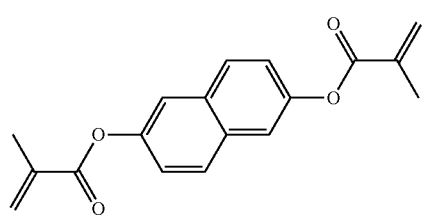

RM-4

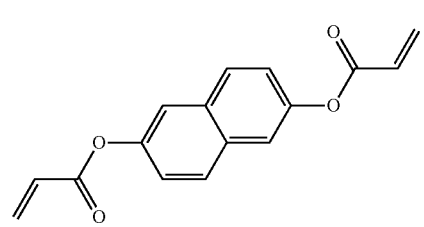

RM-5

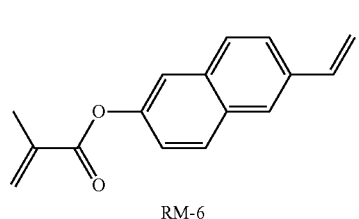

RM-6

TABLE D-continued
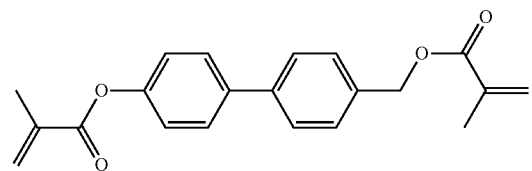
RM-7
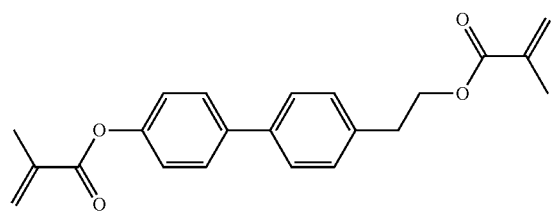
RM-8
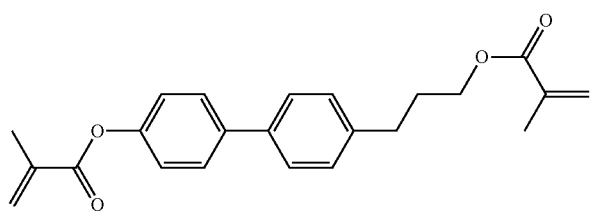
RM-9
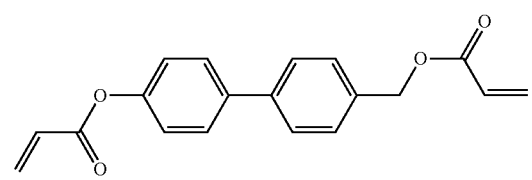
RM-10
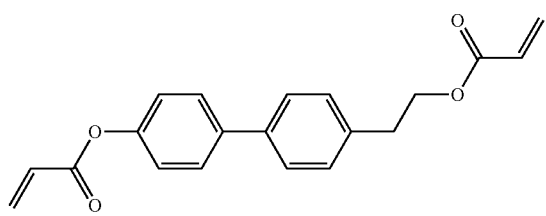
RM-11
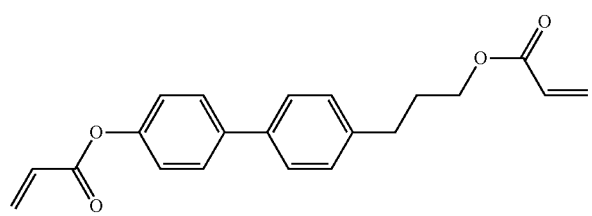
RM-12
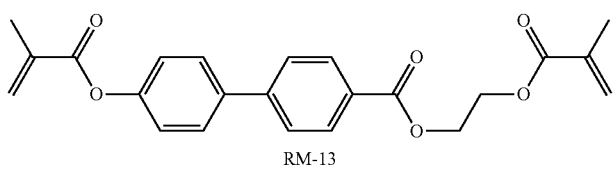
RM-13

TABLE D-continued
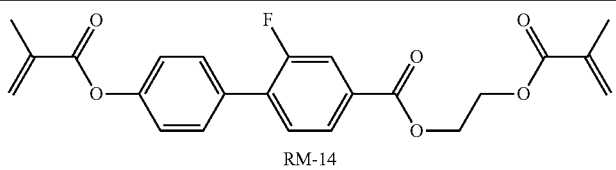
RM-14
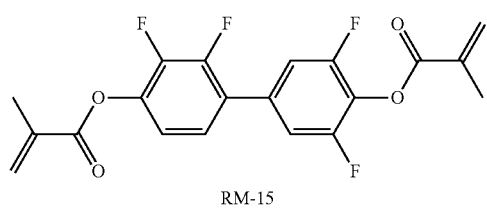
RM-15
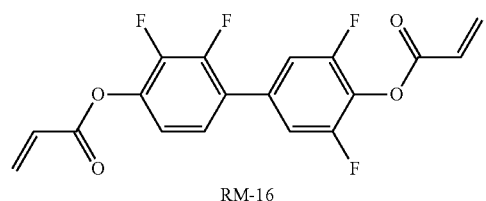
RM-16
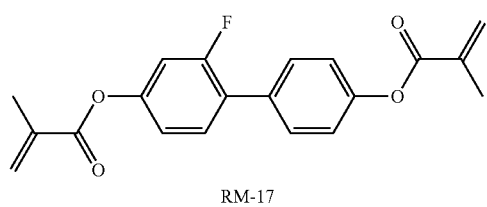
RM-17
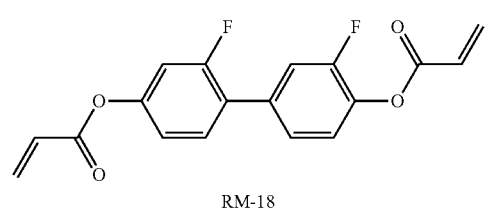
RM-18
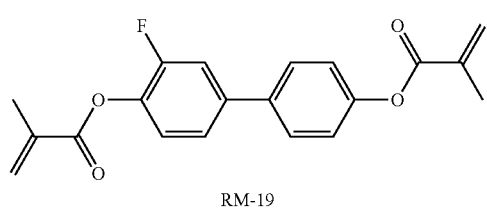
RM-19
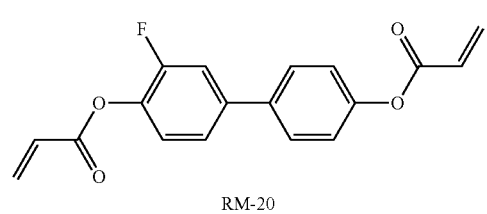
RM-20
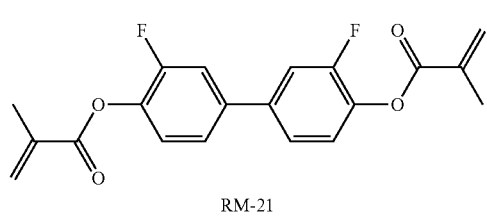
RM-21

TABLE D-continued
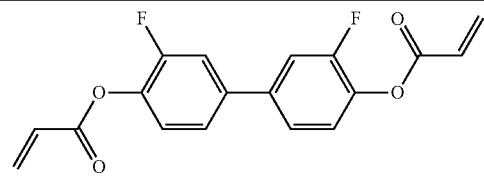
RM-22
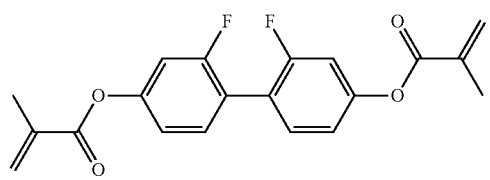
RM-23
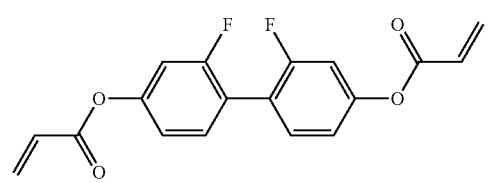
RM-24
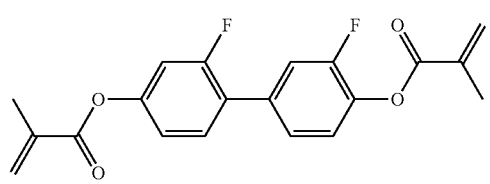
RM-25
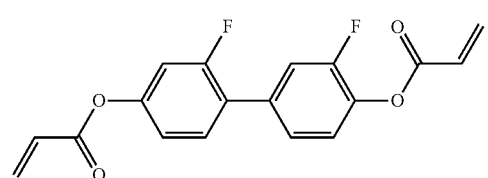
RM-26
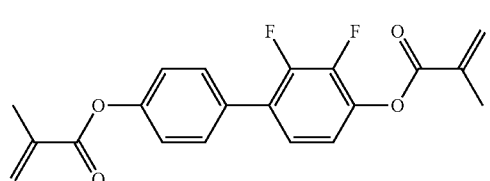
RM-27
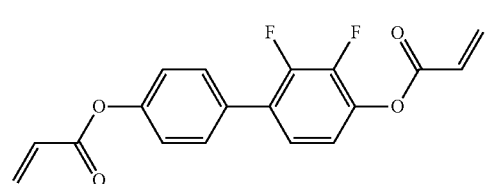
RM-28
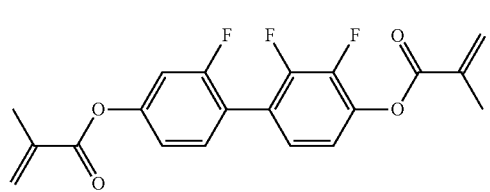 [SMILES: C=C(C)C(=O)Oc1ccc(-c2ccc(OC(=O)C(=C)C)c(F)c2F)c(F)c1]
RM-29

TABLE D-continued
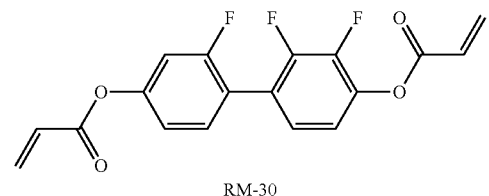
RM-30
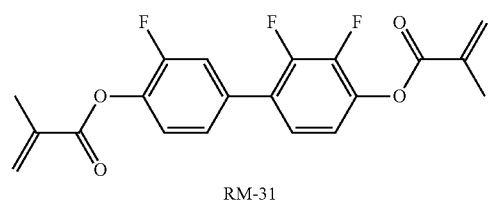
RM-31
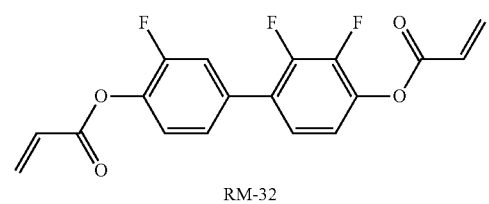
RM-32
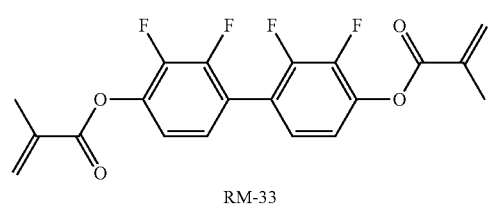
RM-33
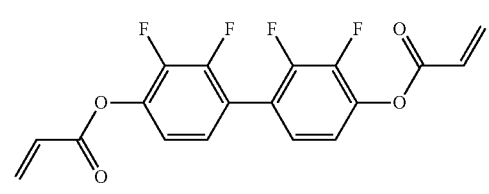 [SMILES: C=CC(=O)Oc1ccc(-c2ccc(OC(=O)C=C)c(F)c2F)c(F)c1F]
RM-34
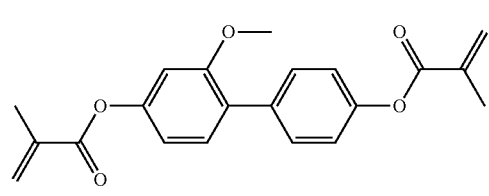 [SMILES: C=C(C)C(=O)Oc1ccc(-c2ccc(OC(=O)C(=C)C)cc2OC)cc1]
RM-35
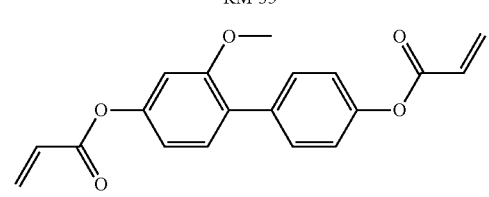
RM-36
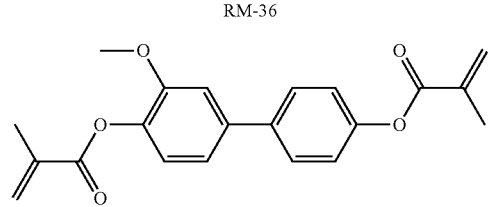
RM-37

TABLE D-continued
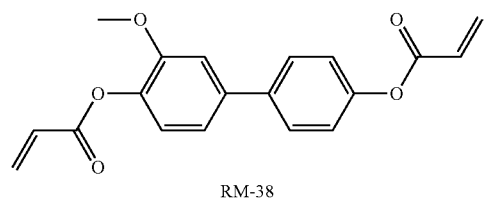
RM-38
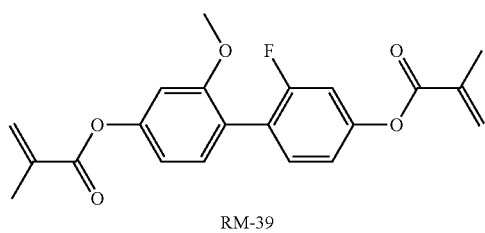
RM-39
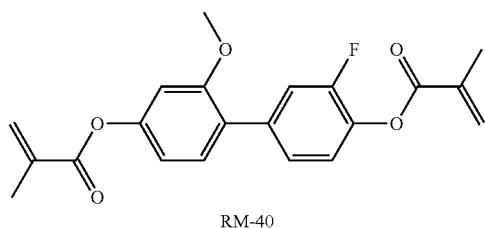
RM-40
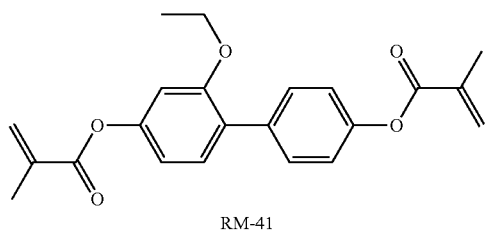
RM-41
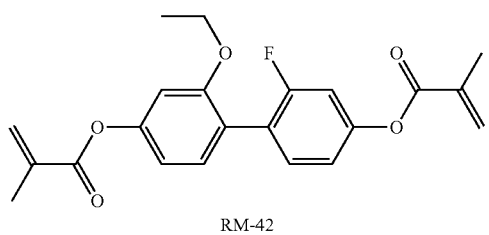
RM-42
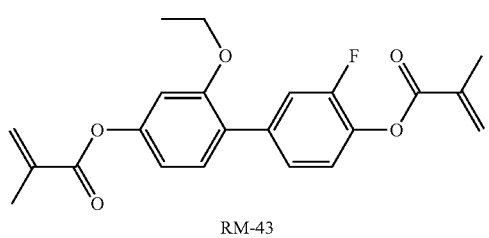
RM-43
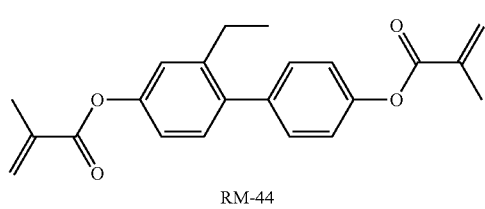
RM-44

TABLE D-continued
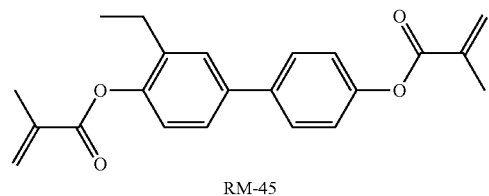
RM-45
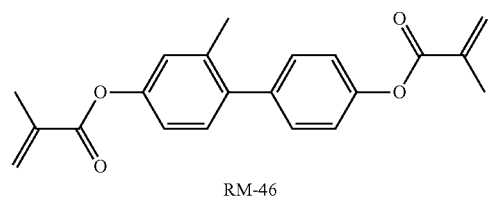
RM-46
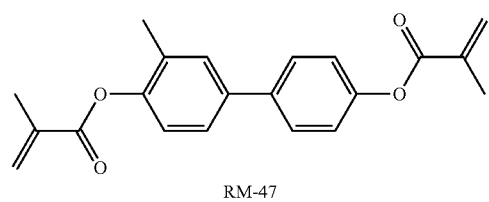
RM-47
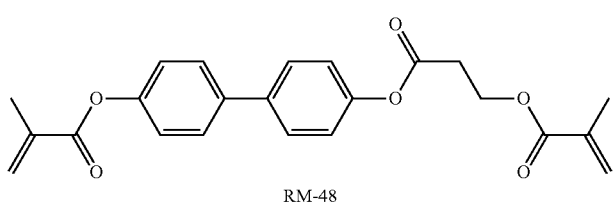
RM-48
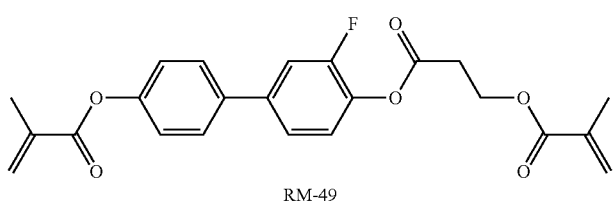
RM-49
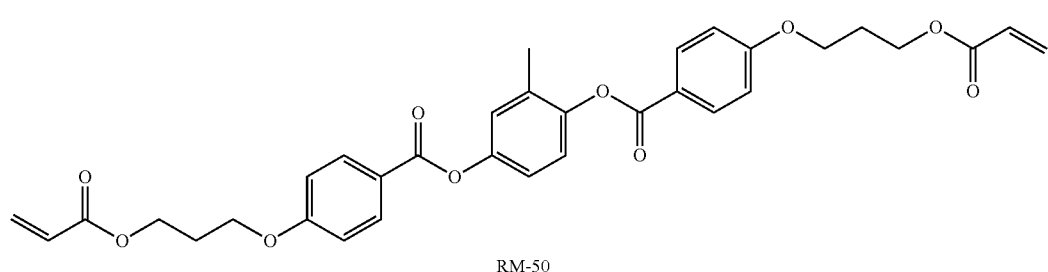
RM-50
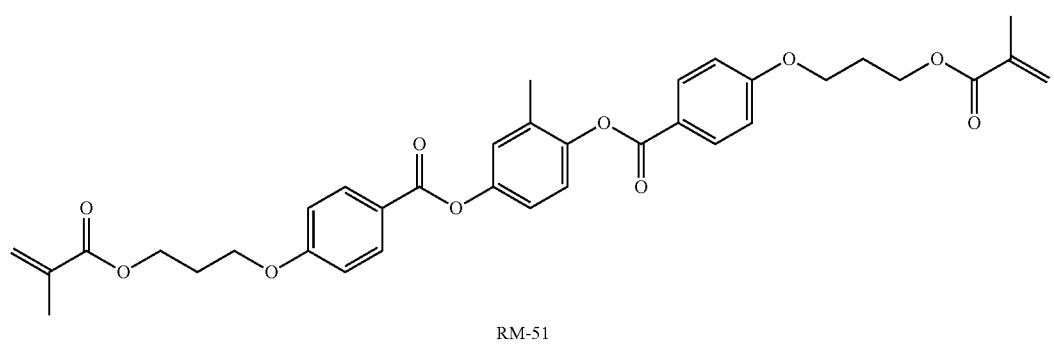
RM-51

TABLE D-continued
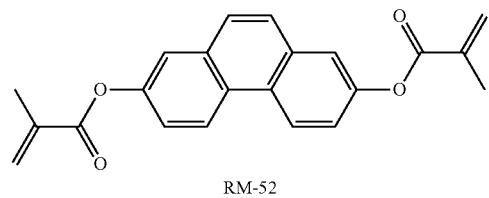
RM-52
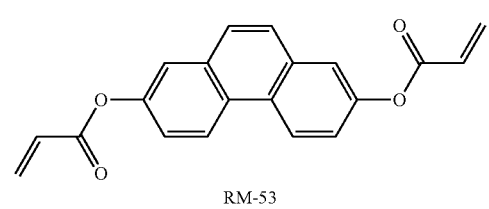
RM-53
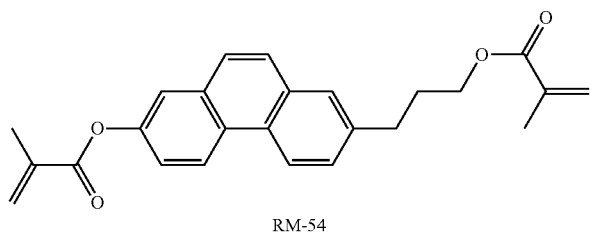
RM-54
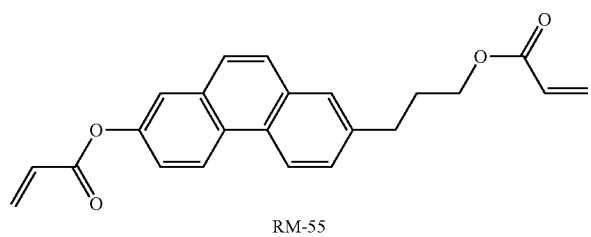
RM-55
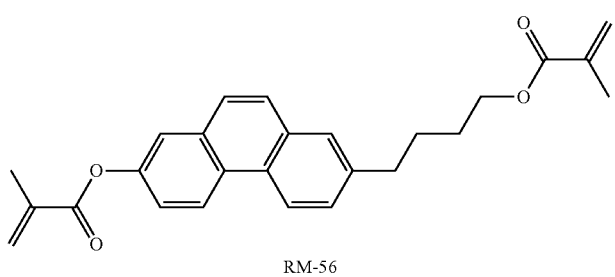
RM-56
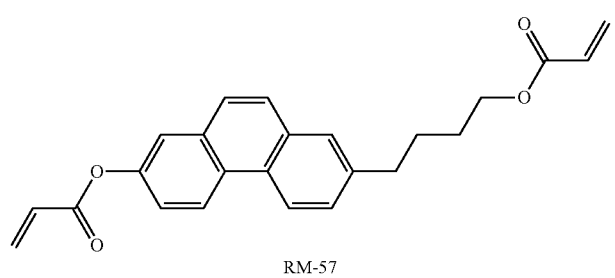
RM-57
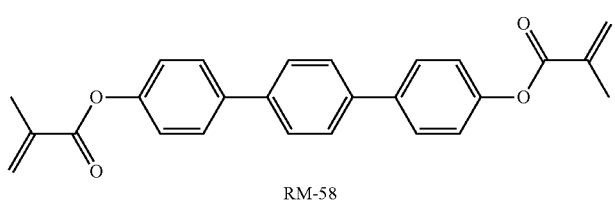
RM-58

TABLE D-continued
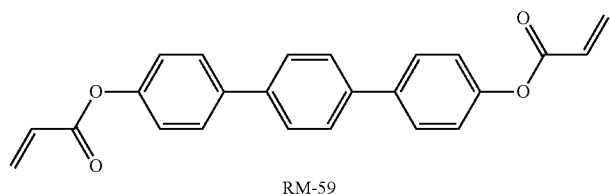
RM-59
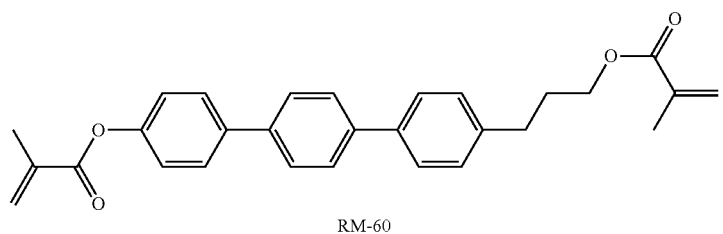
RM-60
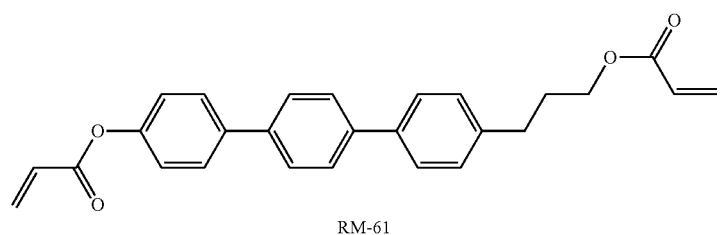
RM-61
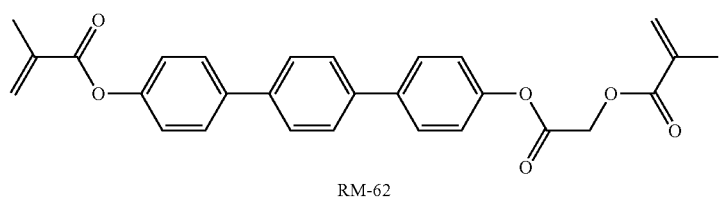
RM-62
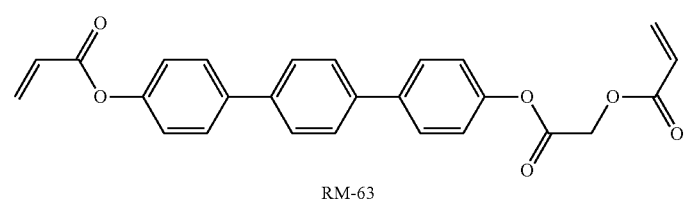
RM-63
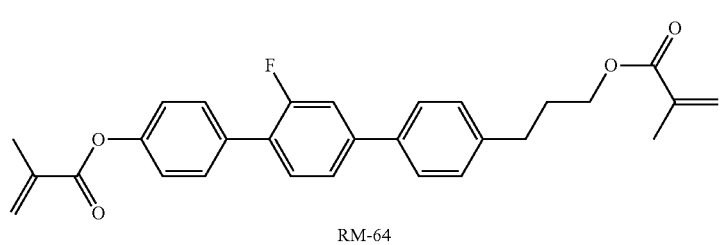
RM-64
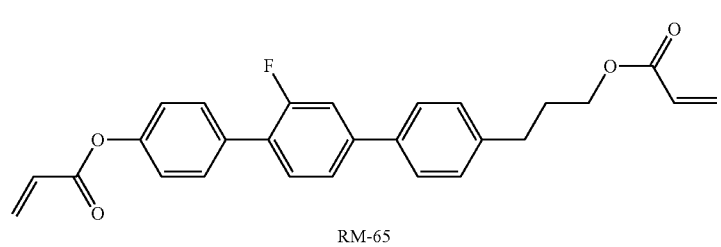
RM-65

TABLE D-continued
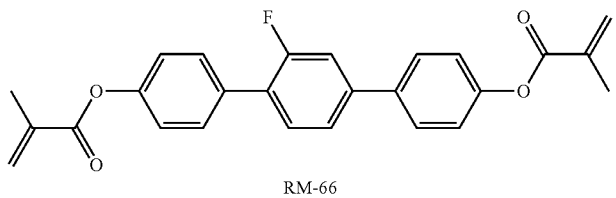
RM-66
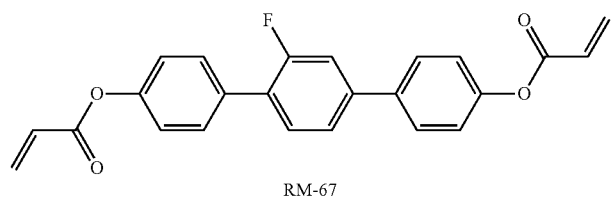
RM-67
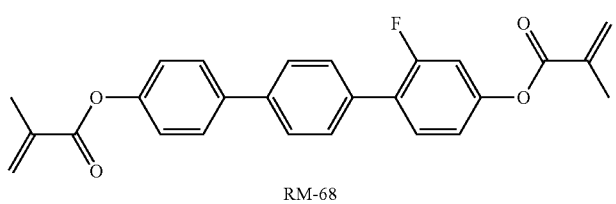
RM-68
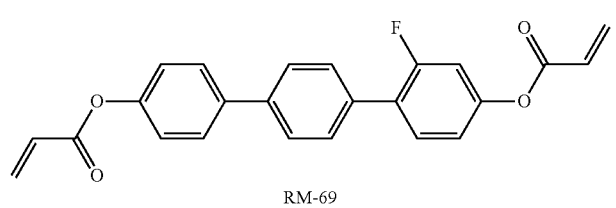
RM-69
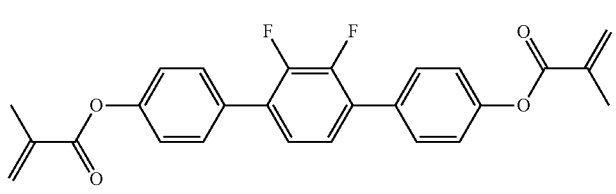 [SMILES: C=C(C)C(=O)Oc1ccc(-c2ccc(-c3ccc(OC(=O)C(=C)C)cc3)c(F)c2F)cc1]
RM-70
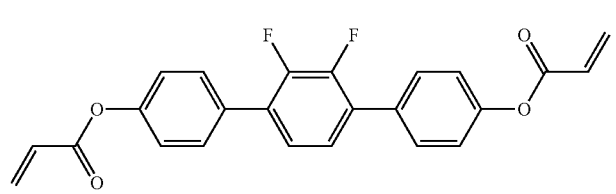 [SMILES: C=CC(=O)Oc1ccc(-c2ccc(-c3ccc(OC(=O)C=C)cc3)c(F)c2F)cc1]
RM-71
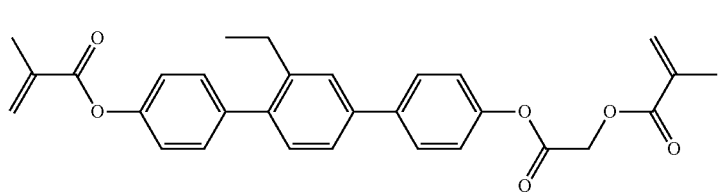 [SMILES: C=C(C)C(=O)OCC(=O)Oc1ccc(-c2ccc(-c3ccc(OC(=O)C(=C)C)cc3)c(CC)c2)cc1]
RM-72
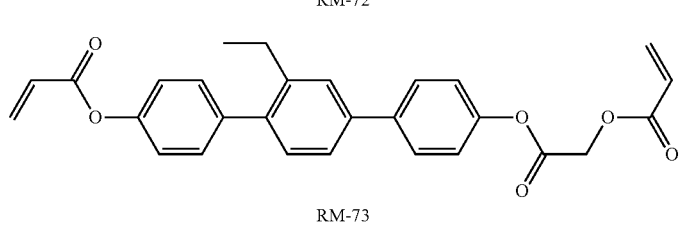
RM-73

TABLE D-continued
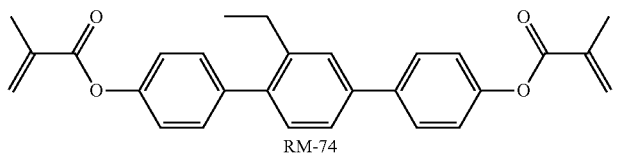
RM-74
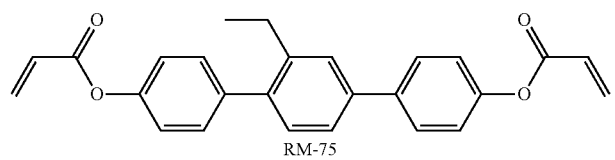
RM-75
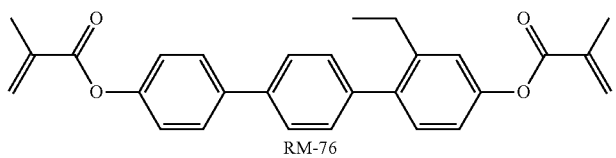
RM-76
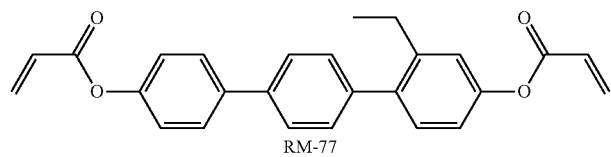
RM-77
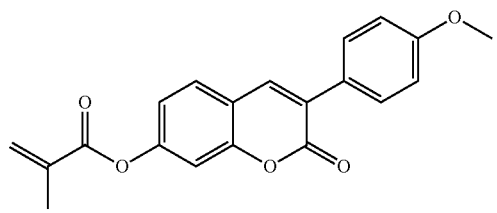 [SMILES: C=C(C)C(=O)Oc1ccc2cc(-c3ccc(OC)cc3)c(=O)oc2c1]
RM-78
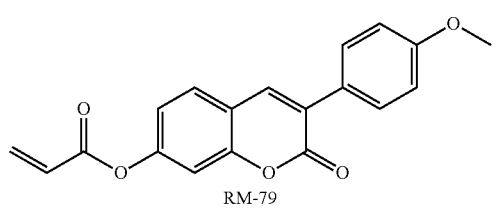
RM-79
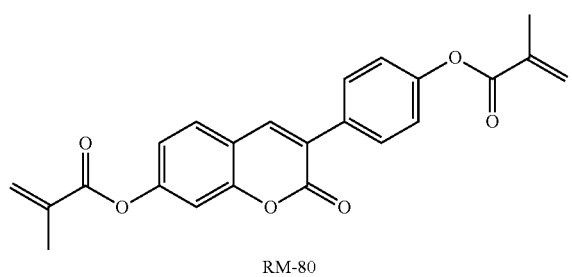
RM-80
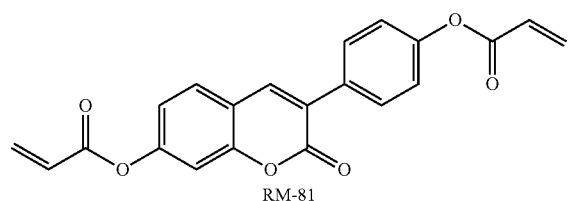
RM-81

TABLE D-continued
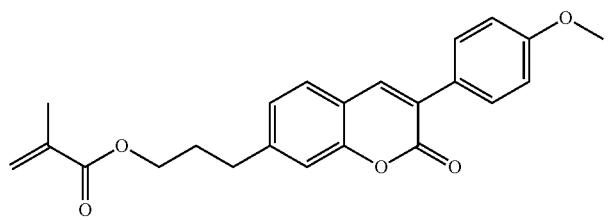 [SMILES: C=C(C)C(=O)OCCCc1ccc2cc(-c3ccc(OC)cc3)c(=O)oc2c1]
RM-82
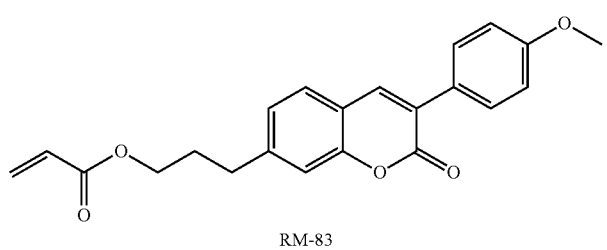
RM-83
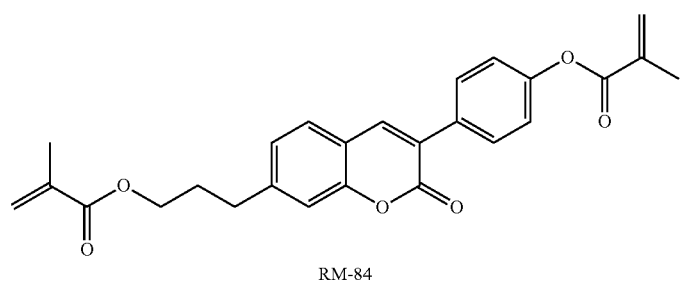
RM-84
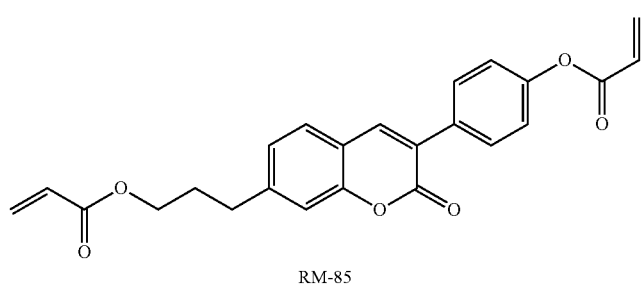
RM-85
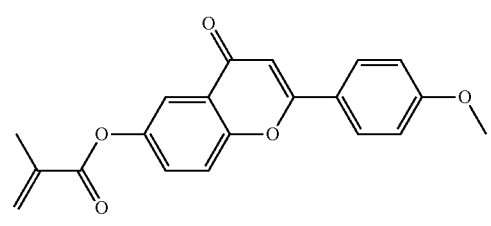 [SMILES: C=C(C)C(=O)Oc1ccc2oc(-c3ccc(OC)cc3)cc(=O)c2c1]
RM-86
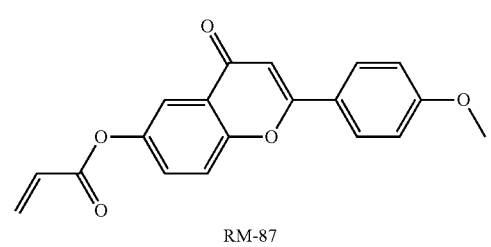
RM-87

TABLE D-continued
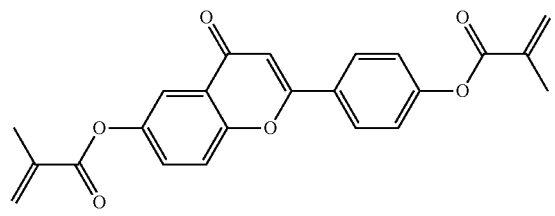 [SMILES: C=C(C)C(=O)Oc1ccc(-c2cc(=O)c3cc(OC(=O)C(=C)C)ccc3o2)cc1]
RM-88
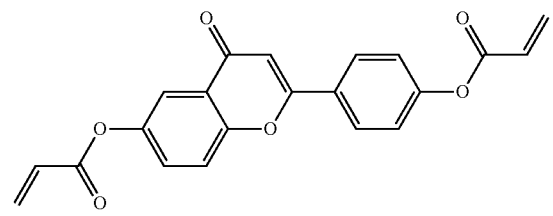 [SMILES: C=CC(=O)Oc1ccc(-c2cc(=O)c3cc(OC(=O)C=C)ccc3o2)cc1]
RM-89
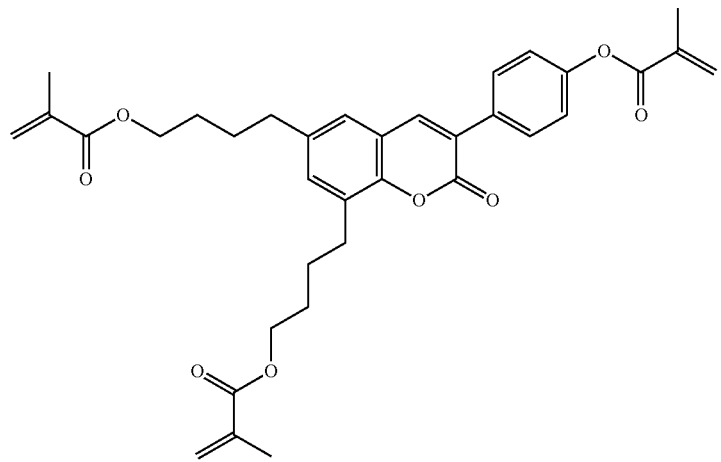 [SMILES: C=C(C)C(=O)OCCCCc1cc(CCCCOC(=O)C(=C)C)c2oc(=O)c(-c3ccc(OC(=O)C(=C)C)cc3)cc2c1]
RM-90
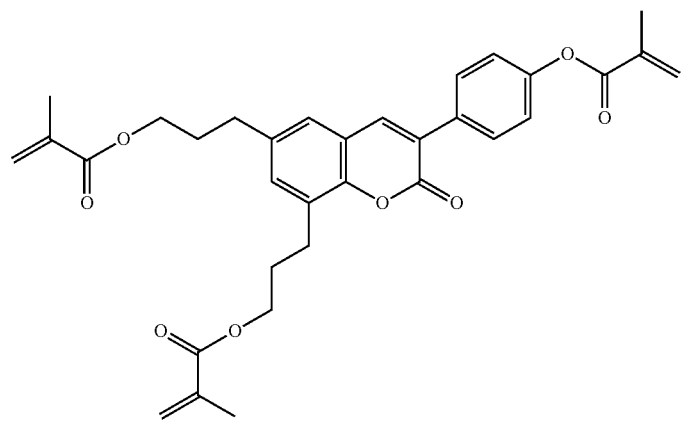 [SMILES: C=C(C)C(=O)OCCCc1cc(CCCOC(=O)C(=C)C)c2oc(=O)c(-c3ccc(OC(=O)C(=C)C)cc3)cc2c1]
RM-91

TABLE D-continued
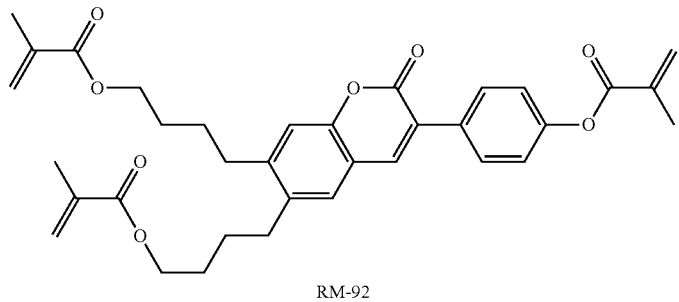
RM-92
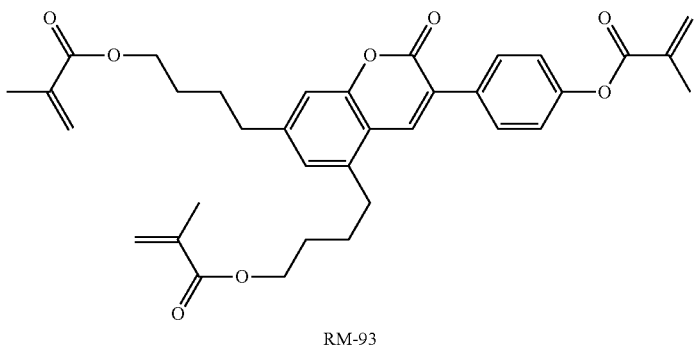
RM-93
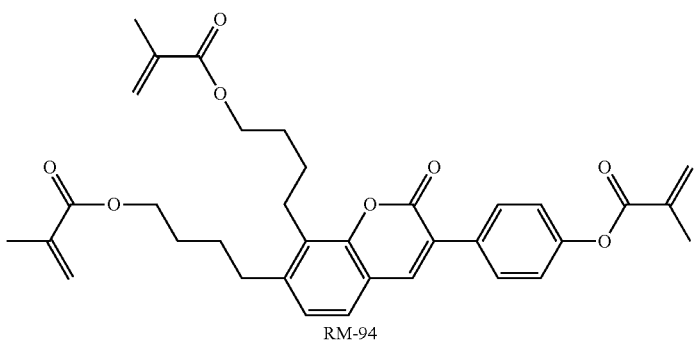
RM-94
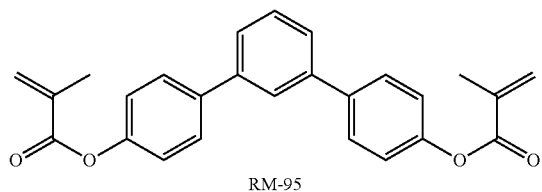
RM-95
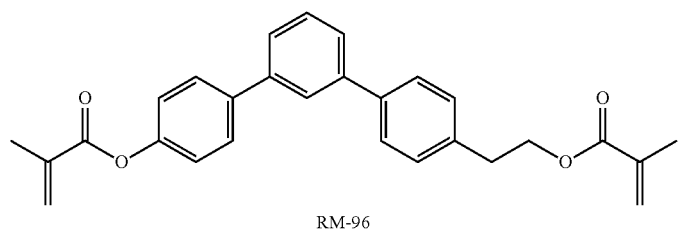
RM-96
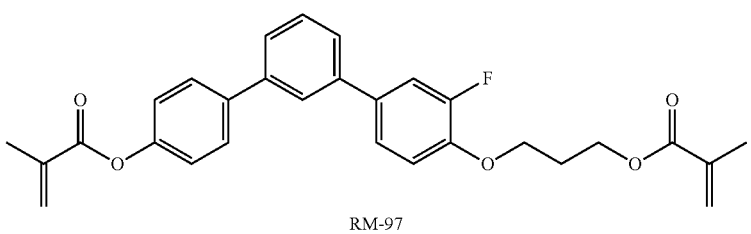
RM-97

TABLE D-continued
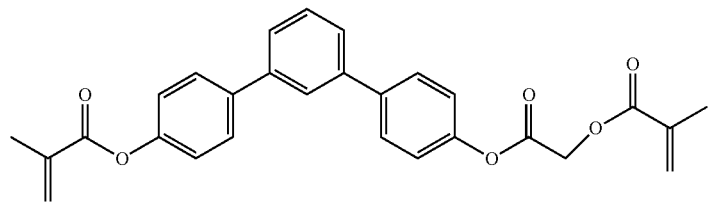 [SMILES: C=C(C)C(=O)OCC(=O)Oc1ccc(-c2cccc(-c3ccc(OC(=O)C(=C)C)cc3)c2)cc1]
RM-98
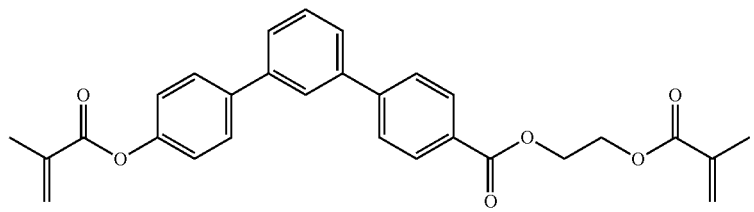 [SMILES: C=C(C)C(=O)OCCOC(=O)c1ccc(-c2cccc(-c3ccc(OC(=O)C(=C)C)cc3)c2)cc1]
RM-99
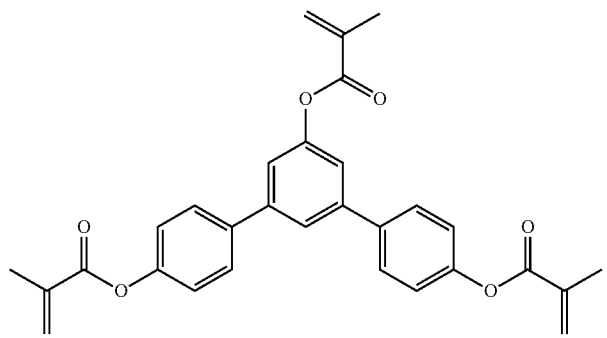 [SMILES: C=C(C)C(=O)Oc1ccc(-c2cc(OC(=O)C(=C)C)cc(-c3ccc(OC(=O)C(=C)C)cc3)c2)cc1]
RM-100
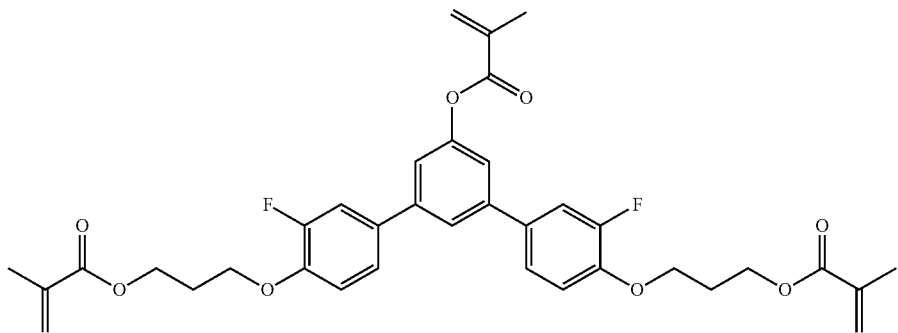 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-101
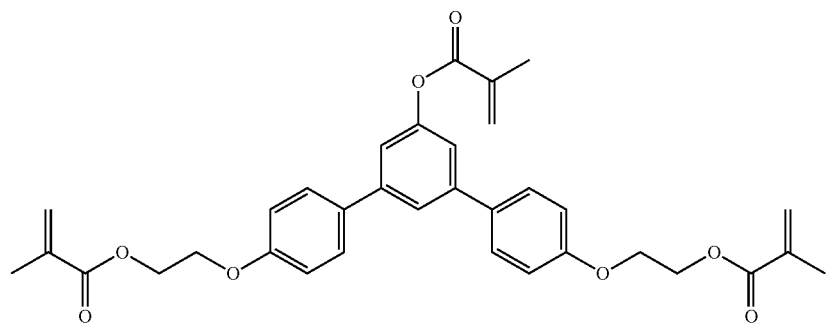 [SMILES: C=C(C)C(=O)OCCOc1ccc(-c2cc(OC(=O)C(=C)C)cc(-c3ccc(OCCOC(=O)C(=C)C)cc3)c2)cc1]
RM-102

TABLE D-continued
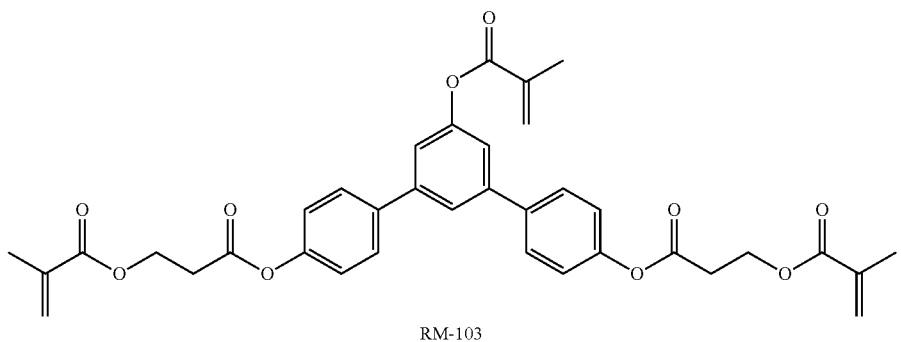
RM-103
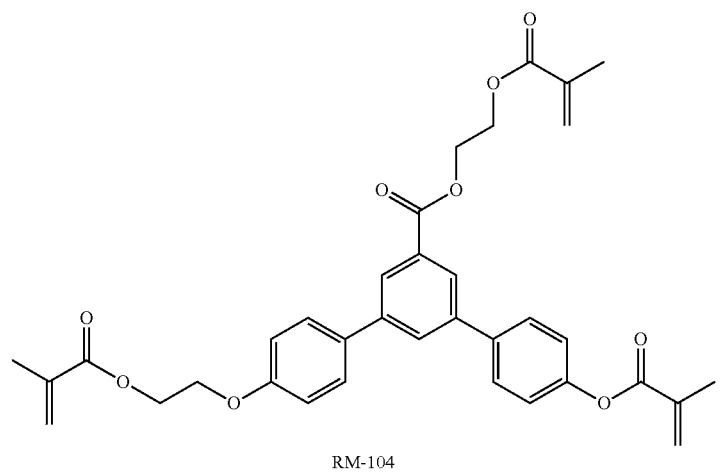
RM-104
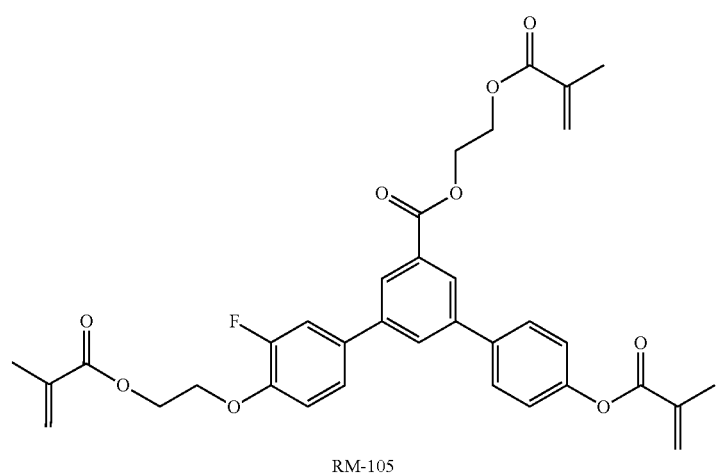
RM-105

TABLE D-continued
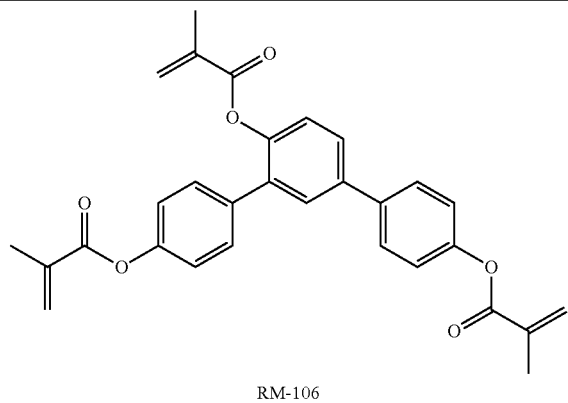
RM-106
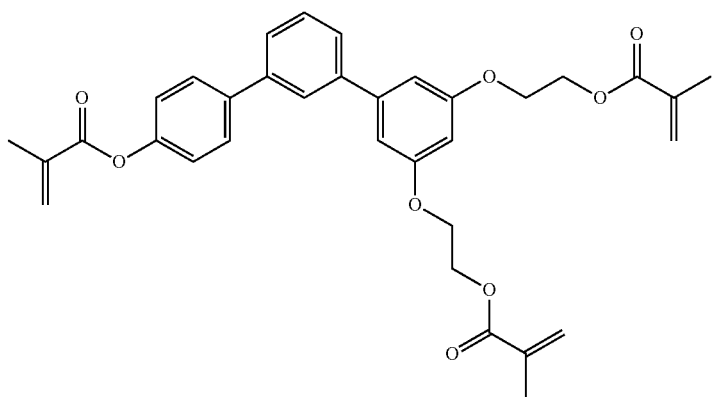 [SMILES: C=C(C)C(=O)OCCOc1cc(OCCOC(=O)C(=C)C)cc(-c2cccc(-c3ccc(OC(=O)C(=C)C)cc3)c2)c1]
RM-107
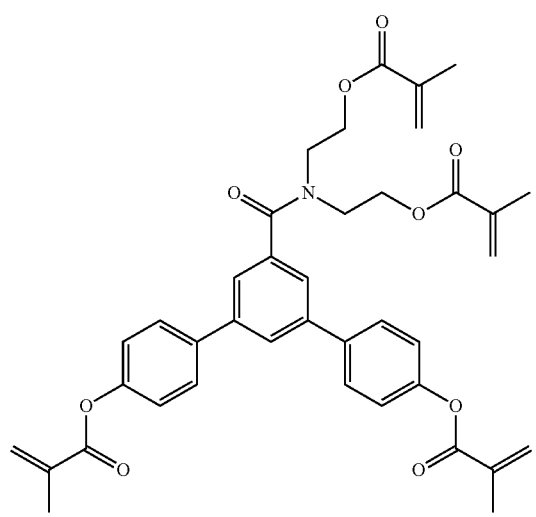 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-108
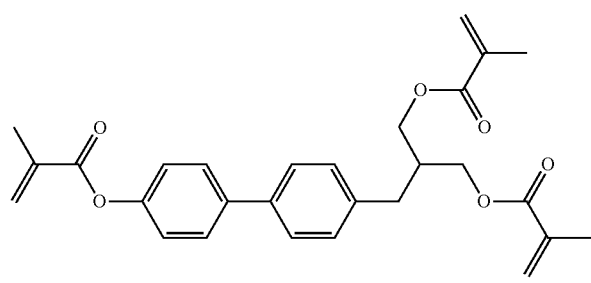 [SMILES: C=C(C)C(=O)OCC(COC(=O)C(=C)C)Cc1ccc(-c2ccc(OC(=O)C(=C)C)cc2)cc1]
RM-109

TABLE D-continued
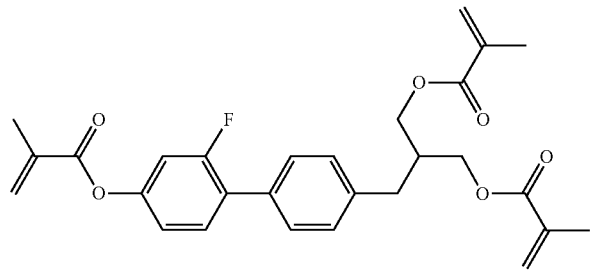 [SMILES: C=C(C)C(=O)OCC(COC(=O)C(=C)C)Cc1ccc(-c2ccc(OC(=O)C(=C)C)cc2F)cc1]
RM-110
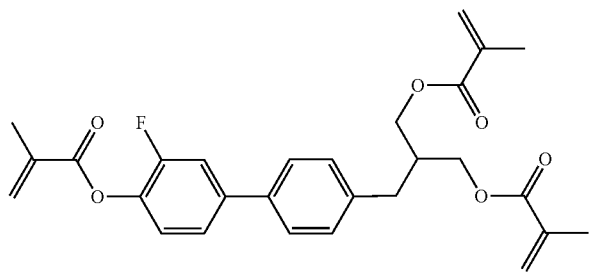 [SMILES: C=C(C)C(=O)OCC(COC(=O)C(=C)C)Cc1ccc(-c2ccc(OC(=O)C(=C)C)c(F)c2)cc1]
RM-111
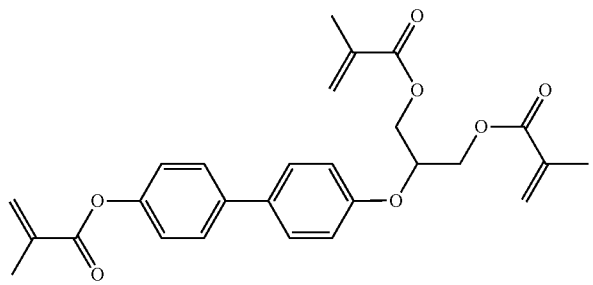
RM-112
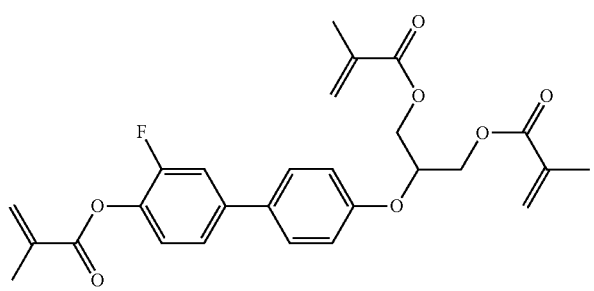 [SMILES: C=C(C)C(=O)OCC(COC(=O)C(=C)C)Oc1ccc(-c2ccc(OC(=O)C(=C)C)c(F)c2)cc1]
RM-113
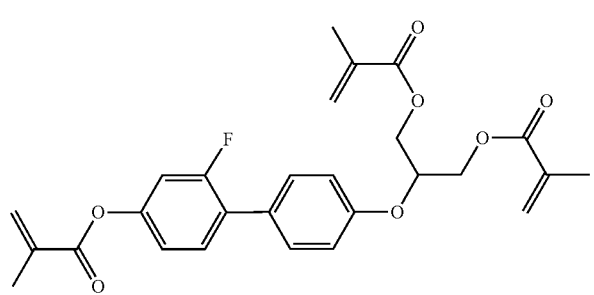 [SMILES: C=C(C)C(=O)OCC(COC(=O)C(=C)C)Oc1ccc(-c2ccc(OC(=O)C(=C)C)cc2F)cc1]
RM-114

TABLE D-continued
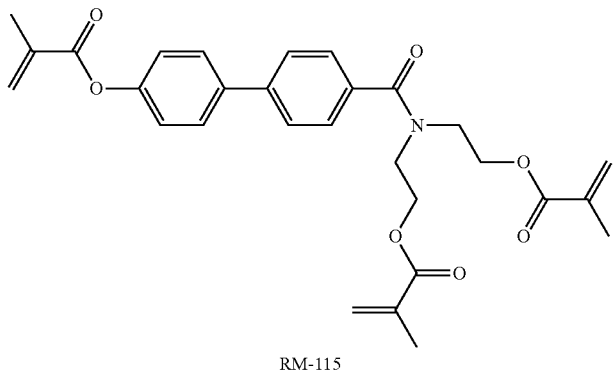
RM-115
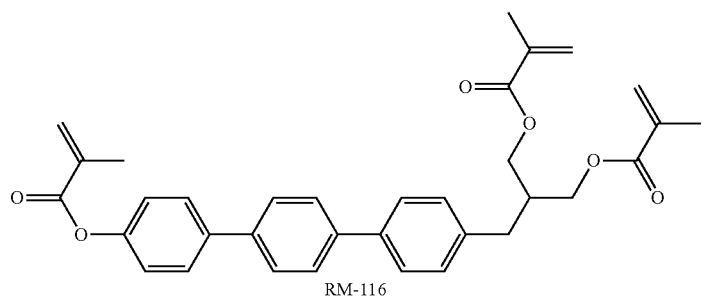
RM-116
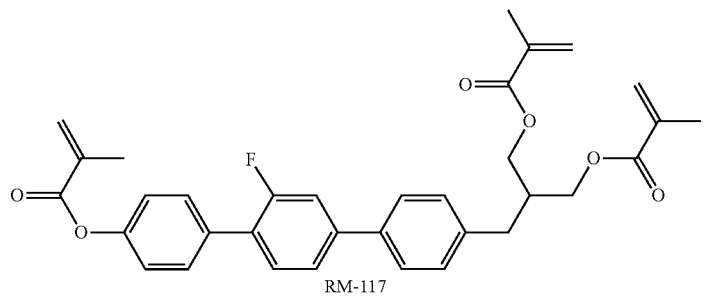
RM-117
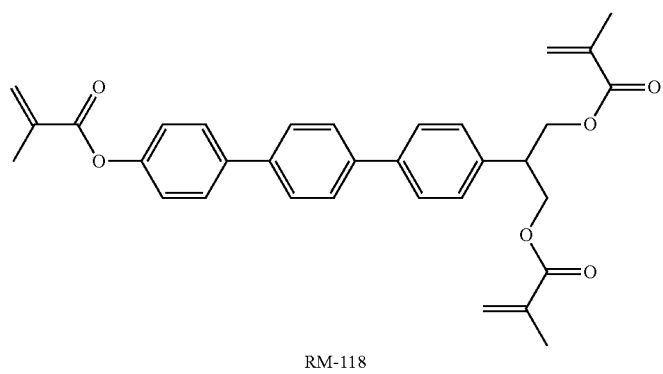
RM-118

TABLE D-continued
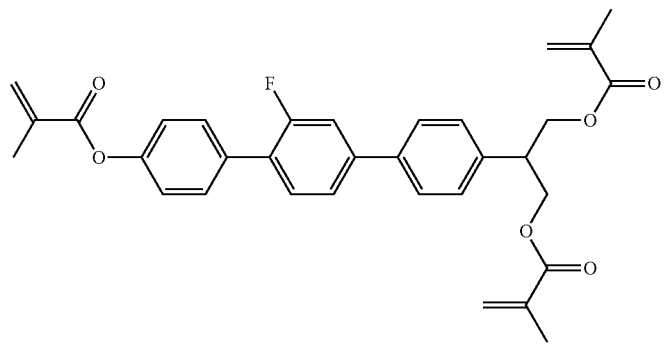 [SMILES: C=C(C)C(=O)OCC(COC(=O)C(=C)C)c1ccc(-c2ccc(-c3ccc(OC(=O)C(=C)C)cc3)c(F)c2)cc1]
RM-119
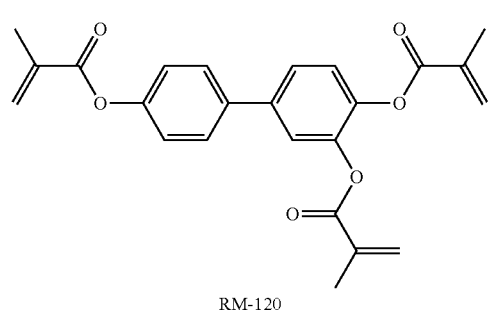
RM-120
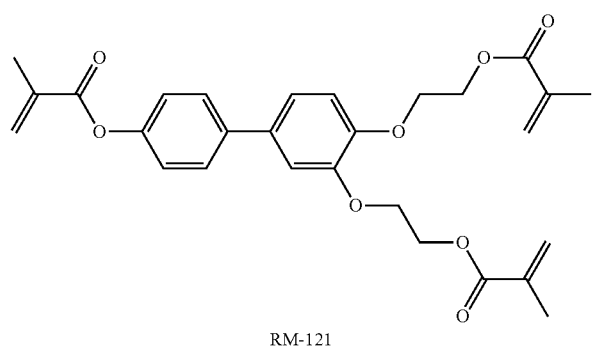
RM-121
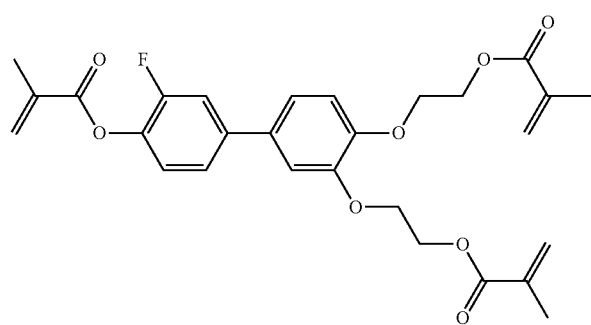 [SMILES: C=C(C)C(=O)OCCOc1ccc(-c2ccc(OC(=O)C(=C)C)c(F)c2)cc1OCCOC(=O)C(=C)C]
RM-122
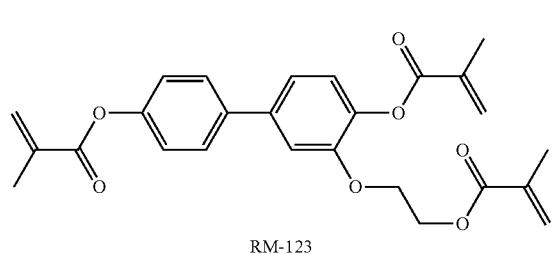
RM-123

TABLE D-continued
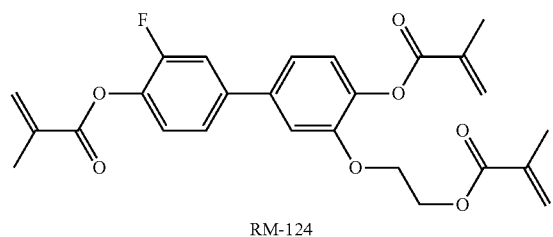
RM-124
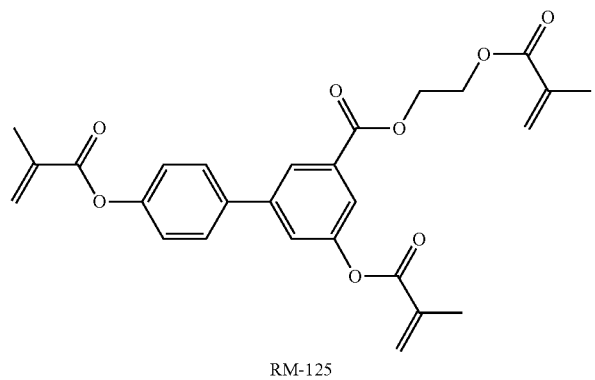
RM-125
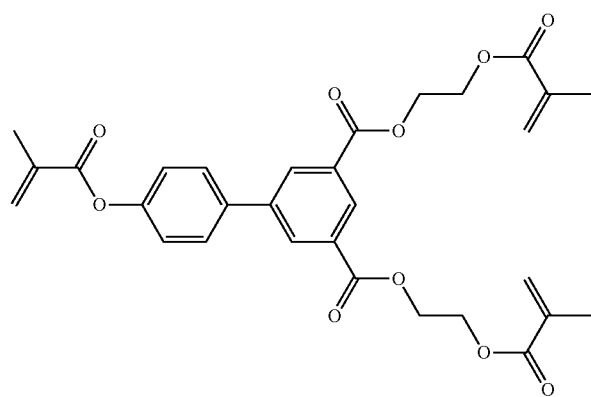 [SMILES: C=C(C)C(=O)OCCOC(=O)c1cc(C(=O)OCCOC(=O)C(=C)C)cc(-c2ccc(OC(=O)C(=C)C)cc2)c1]
RM-126
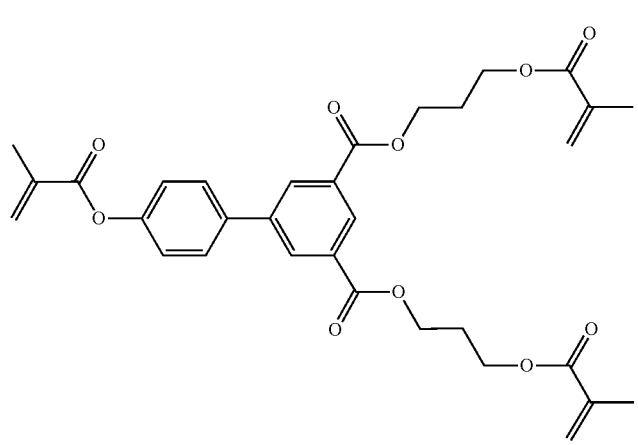 [SMILES: C=C(C)C(=O)OCCCOC(=O)c1cc(C(=O)OCCCOC(=O)C(=C)C)cc(-c2ccc(OC(=O)C(=C)C)cc2)c1]
RM-127

TABLE D-continued
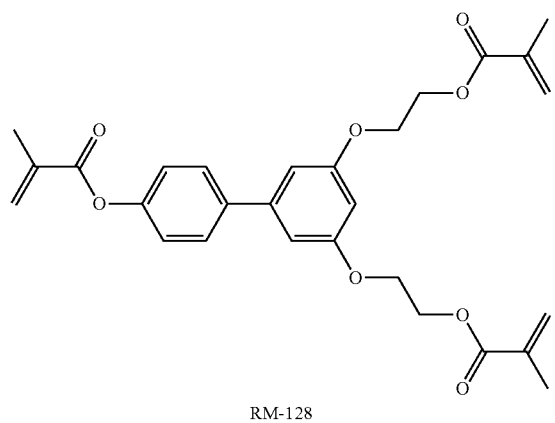
RM-128
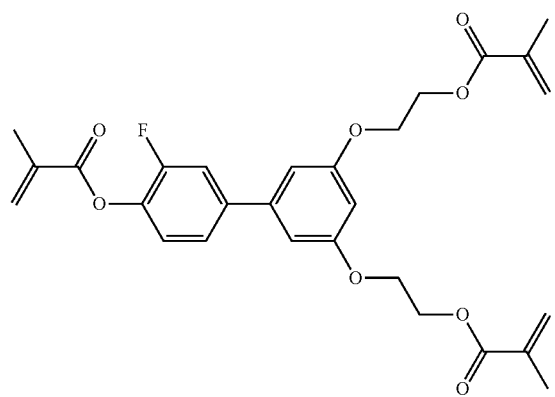 [SMILES: C=C(C)C(=O)OCCOc1cc(OCCOC(=O)C(=C)C)cc(-c2ccc(OC(=O)C(=C)C)c(F)c2)c1]
RM-129
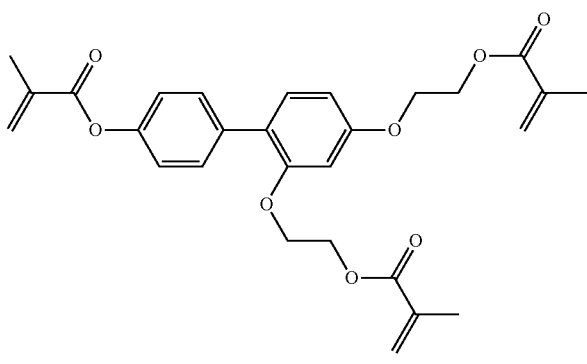 [SMILES: C=C(C)C(=O)OCCOc1ccc(-c2ccc(OC(=O)C(=C)C)cc2)c(OCCOC(=O)C(=C)C)c1]
RM-130
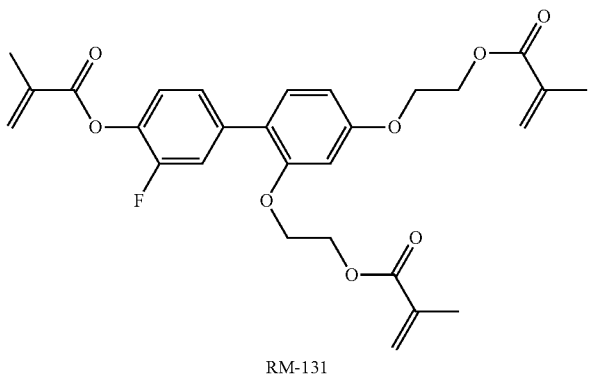
RM-131

TABLE D-continued
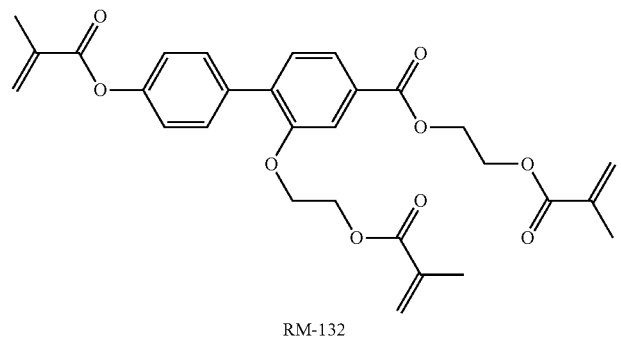
RM-132
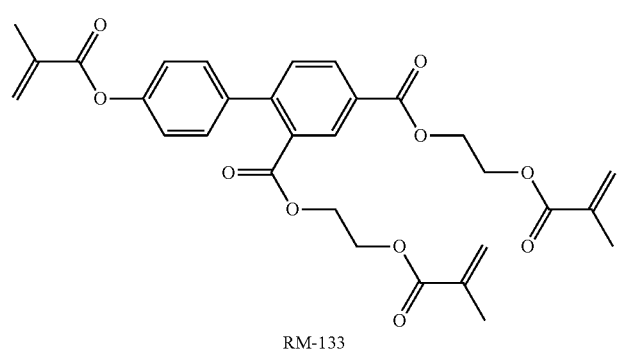
RM-133
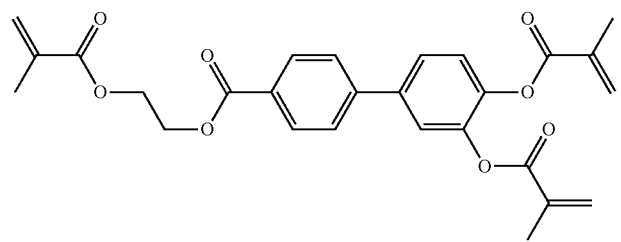 [SMILES: C=C(C)C(=O)OCCOC(=O)c1ccc(-c2ccc(OC(=O)C(=C)C)c(OC(=O)C(=C)C)c2)cc1]
RM-134
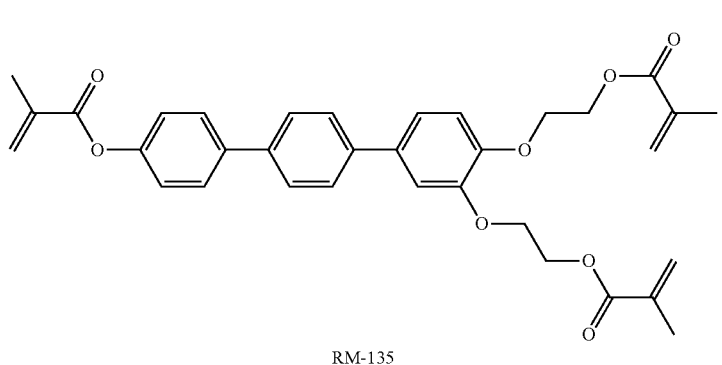
RM-135
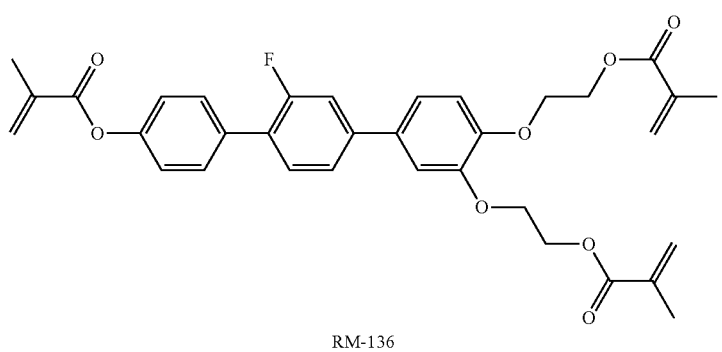
RM-136

TABLE D-continued
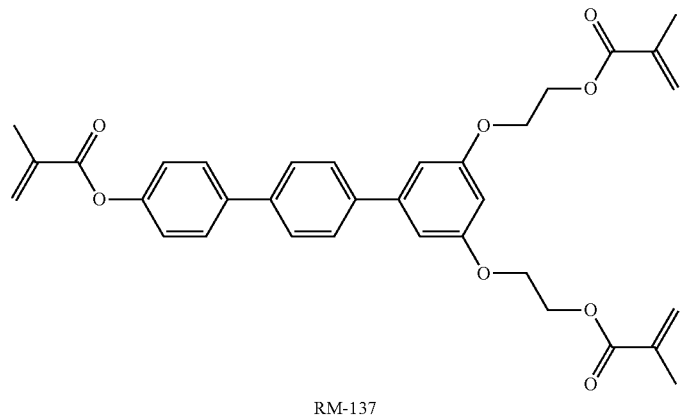
RM-137
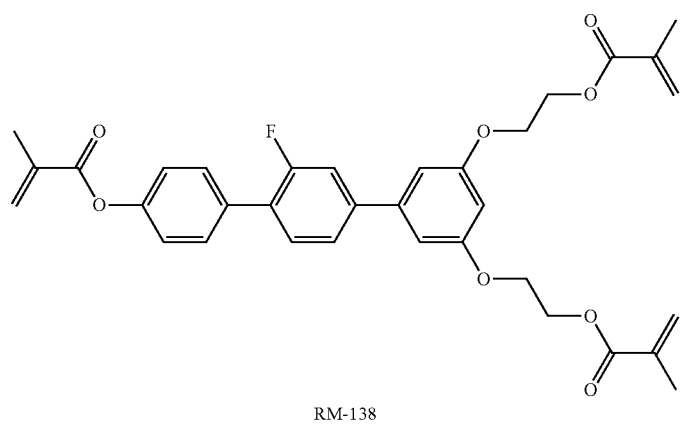
RM-138
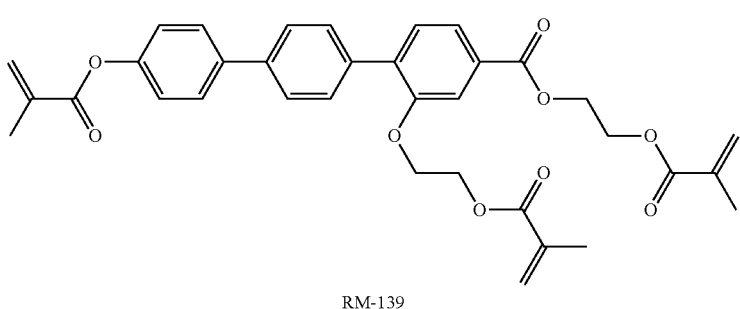
RM-139
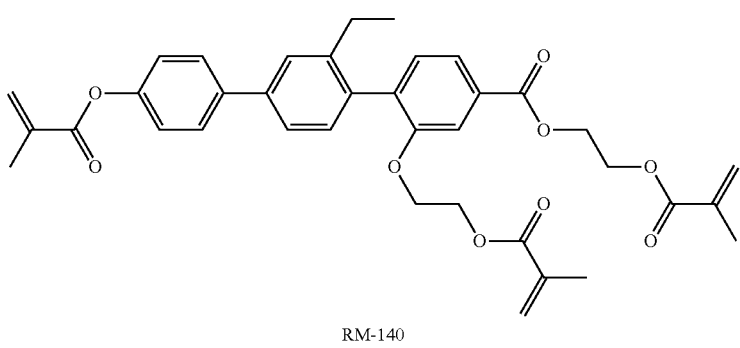
RM-140

TABLE D-continued
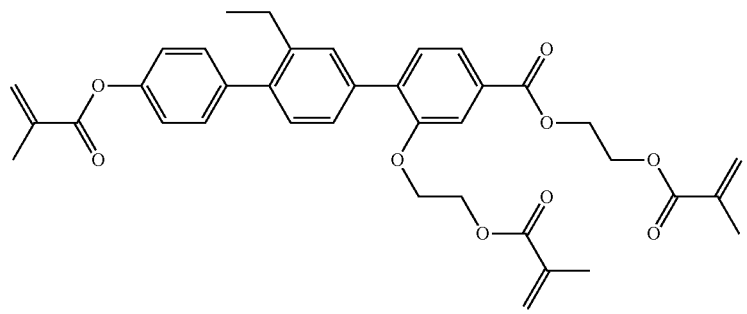 [SMILES: C=C(C)C(=O)OCCOC(=O)c1ccc(-c2ccc(-c3ccc(OC(=O)C(=C)C)cc3)c(CC)c2)c(OCCOC(=O)C(=C)C)c1]
RM-141
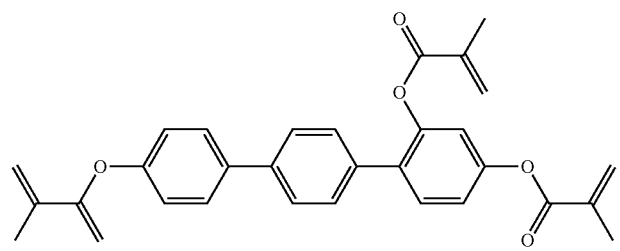 [SMILES: C=C(C)C(=C)Oc1ccc(-c2ccc(-c3ccc(OC(=O)C(=C)C)cc3OC(=O)C(=C)C)cc2)cc1]
RM-142
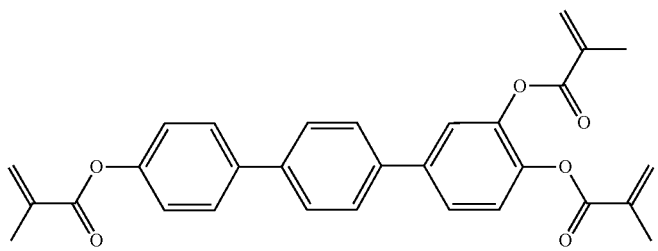 [SMILES: C=C(C)C(=O)Oc1ccc(-c2ccc(-c3ccc(OC(=O)C(=C)C)c(OC(=O)C(=C)C)c3)cc2)cc1]
RM-143
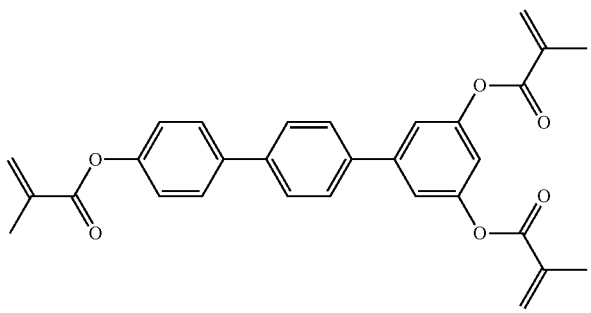 [SMILES: C=C(C)C(=O)Oc1ccc(-c2ccc(-c3cc(OC(=O)C(=C)C)cc(OC(=O)C(=C)C)c3)cc2)cc1]
RM-144
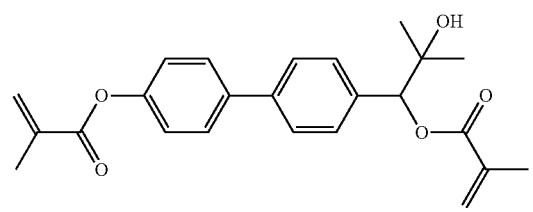 [SMILES: C=C(C)C(=O)Oc1ccc(-c2ccc(C(OC(=O)C(=C)C)C(C)(C)O)cc2)cc1]
RM-145

TABLE D-continued
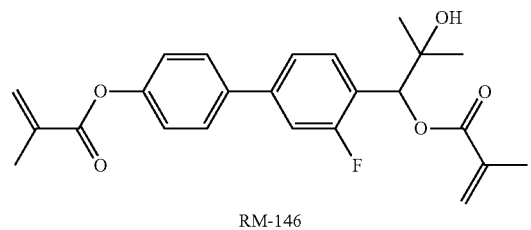
RM-146
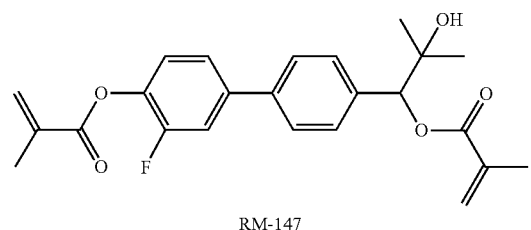
RM-147
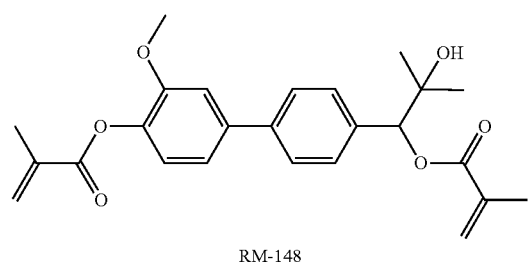
RM-148
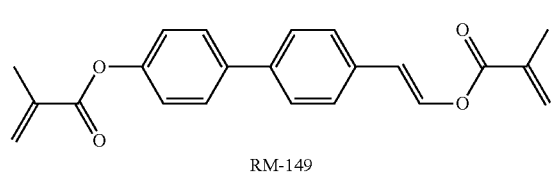
RM-149
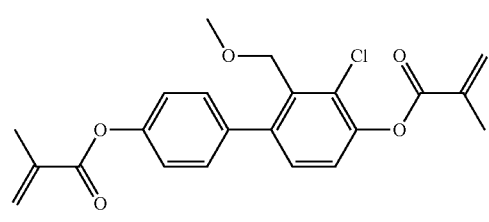 [SMILES: C=C(C)C(=O)Oc1ccc(-c2ccc(OC(=O)C(=C)C)c(Cl)c2COC)cc1]
RM-150
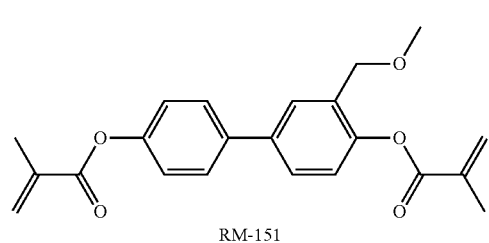
RM-151
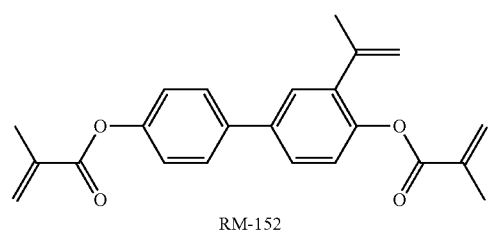
RM-152

TABLE D-continued
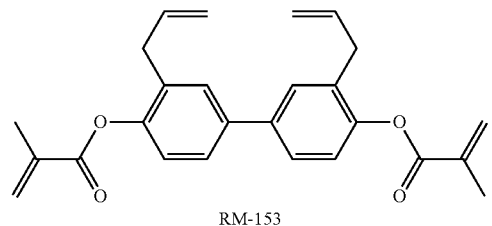
RM-153
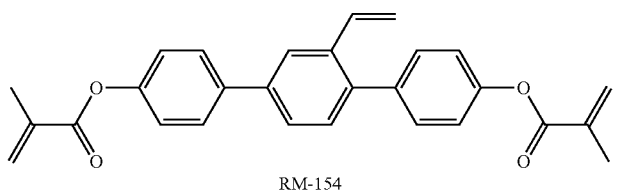
RM-154
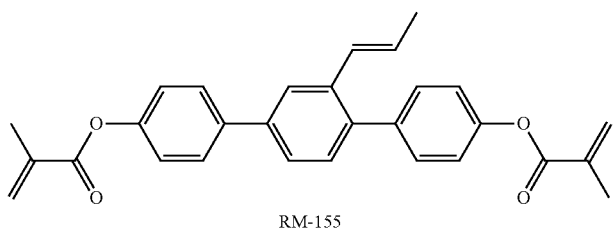
RM-155
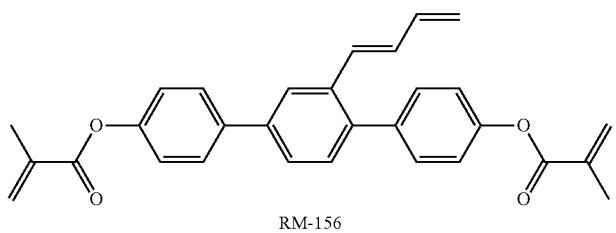
RM-156
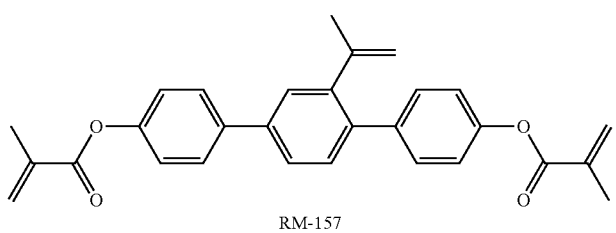
RM-157
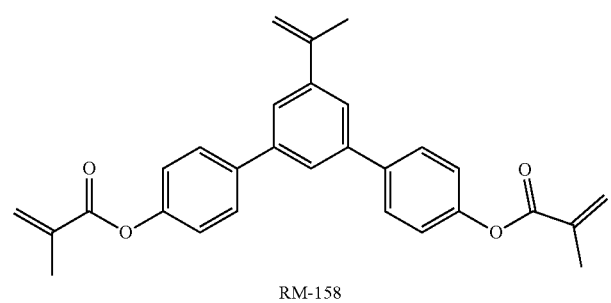
RM-158
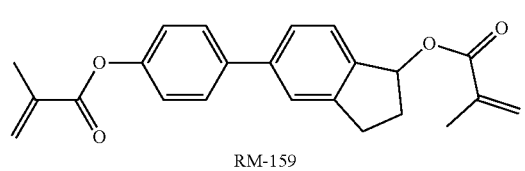
RM-159

TABLE D-continued
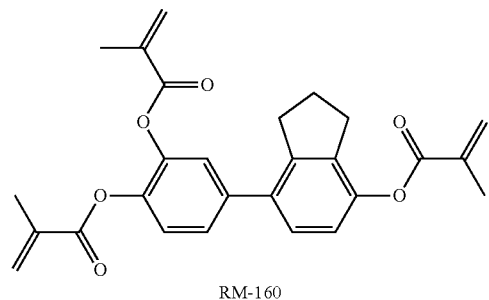
RM-160
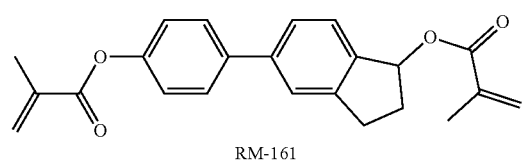
RM-161
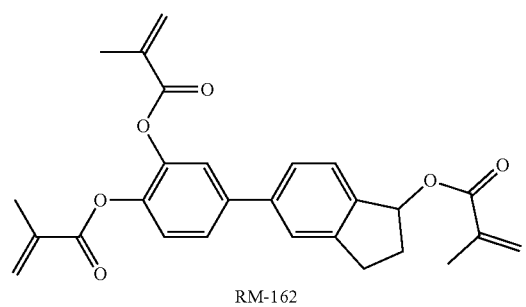
RM-162
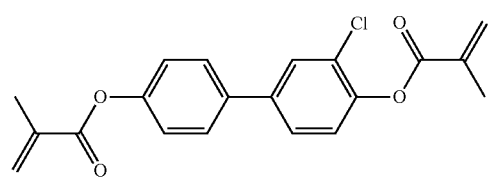 [SMILES: C=C(C)C(=O)Oc1ccc(-c2ccc(OC(=O)C(=C)C)c(Cl)c2)cc1]
RM-163
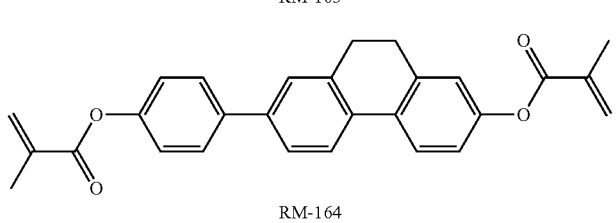
RM-164
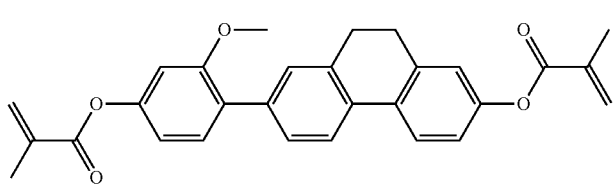 [SMILES: C=C(C)C(=O)Oc1ccc2c(c1)CCc1cc(-c3ccc(OC(=O)C(=C)C)cc3OC)ccc1-2]
RM-165
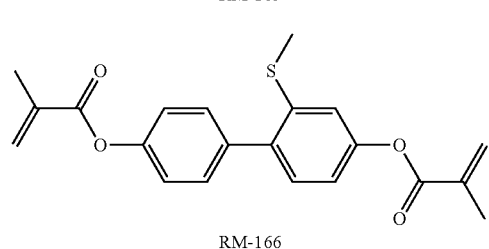
RM-166

TABLE D-continued
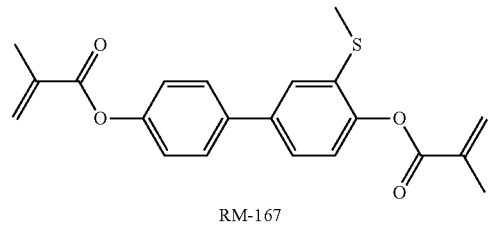
RM-167
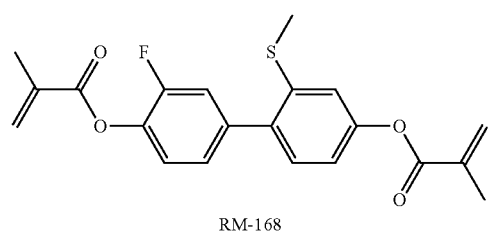
RM-168
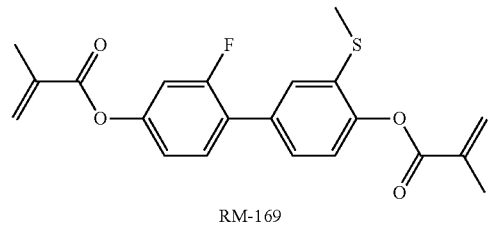
RM-169
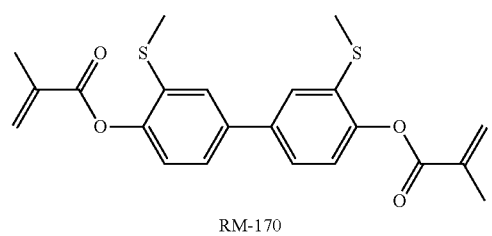
RM-170
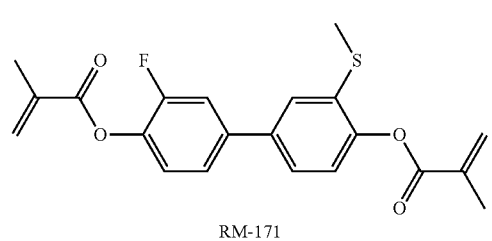
RM-171
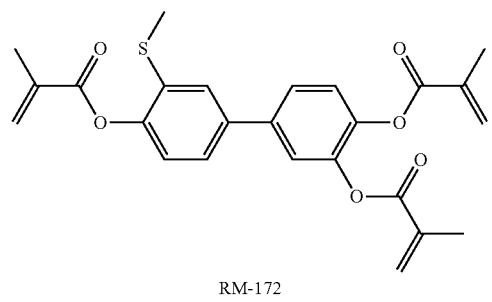
RM-172

TABLE D-continued
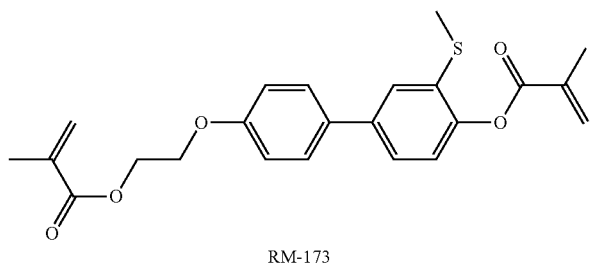
RM-173
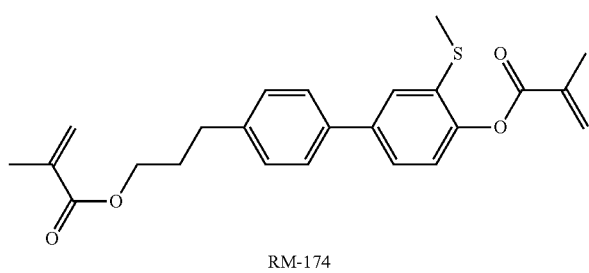
RM-174
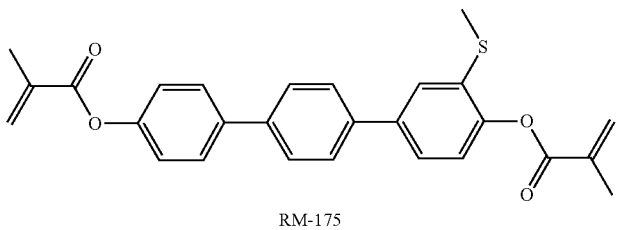
RM-175
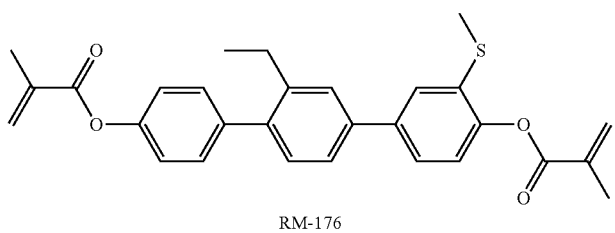
RM-176
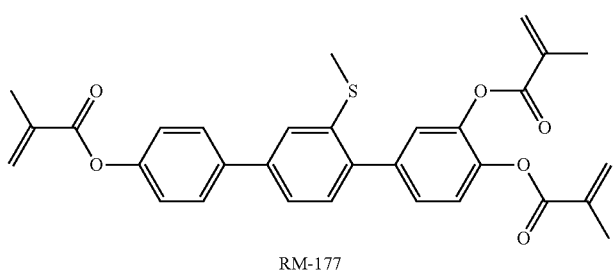
RM-177
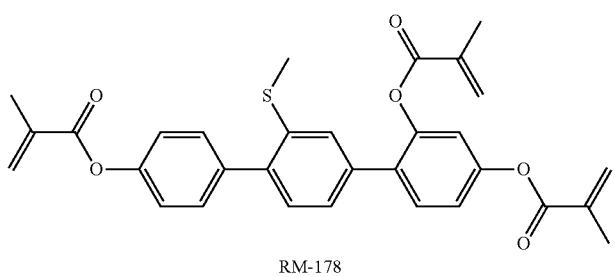
RM-178
In a preferred embodiment, the mixtures according to the invention comprise one or more polymerizable compounds, preferably selected from the polymerizable compounds of the formulae RM-1 to RM-178. Of these, compounds RM-1, RM-4, RM-8, RM-17, RM-19, RM-35, RM-37, RM-39, RM-40, RM-41, RM-48, RM-52, RM-54, RM-57, RM-64, RM-74, RM-76, RM-88, RM-102, RM-103, RM-109, RM-117, RM-120, RM-121, RM-122, R-139, RM-142, RM-143, RM-148 to RM-158, RM-164, RM-165 and RM-166 to RM-178 are particularly preferred.
Table E shows self-alignment additives for vertical alignment which can be used in LC media for SA-VA and SA-FFS displays according to the present invention together with the polymerizable compounds of formula M:
TABLE E
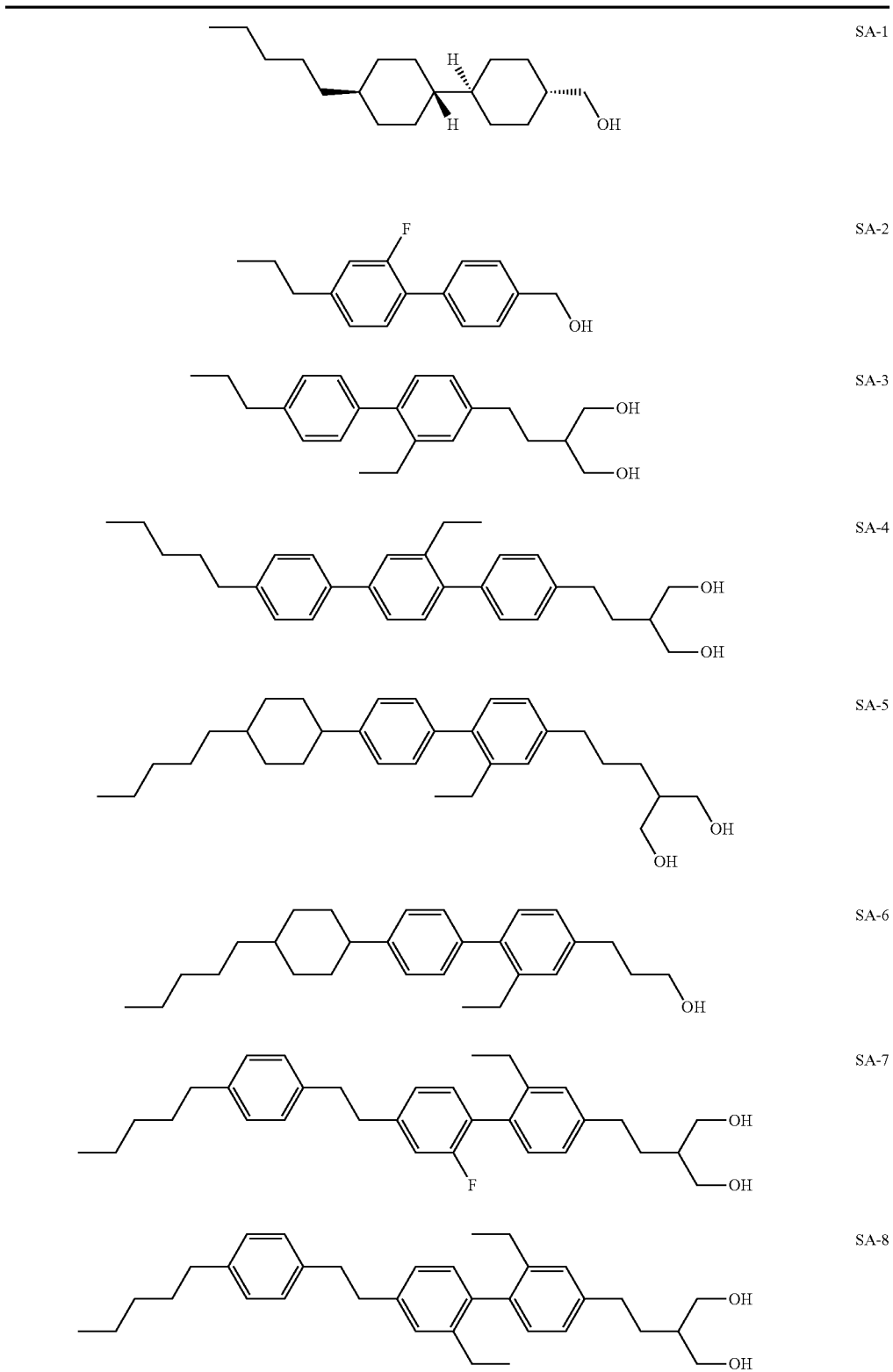

TABLE E-continued
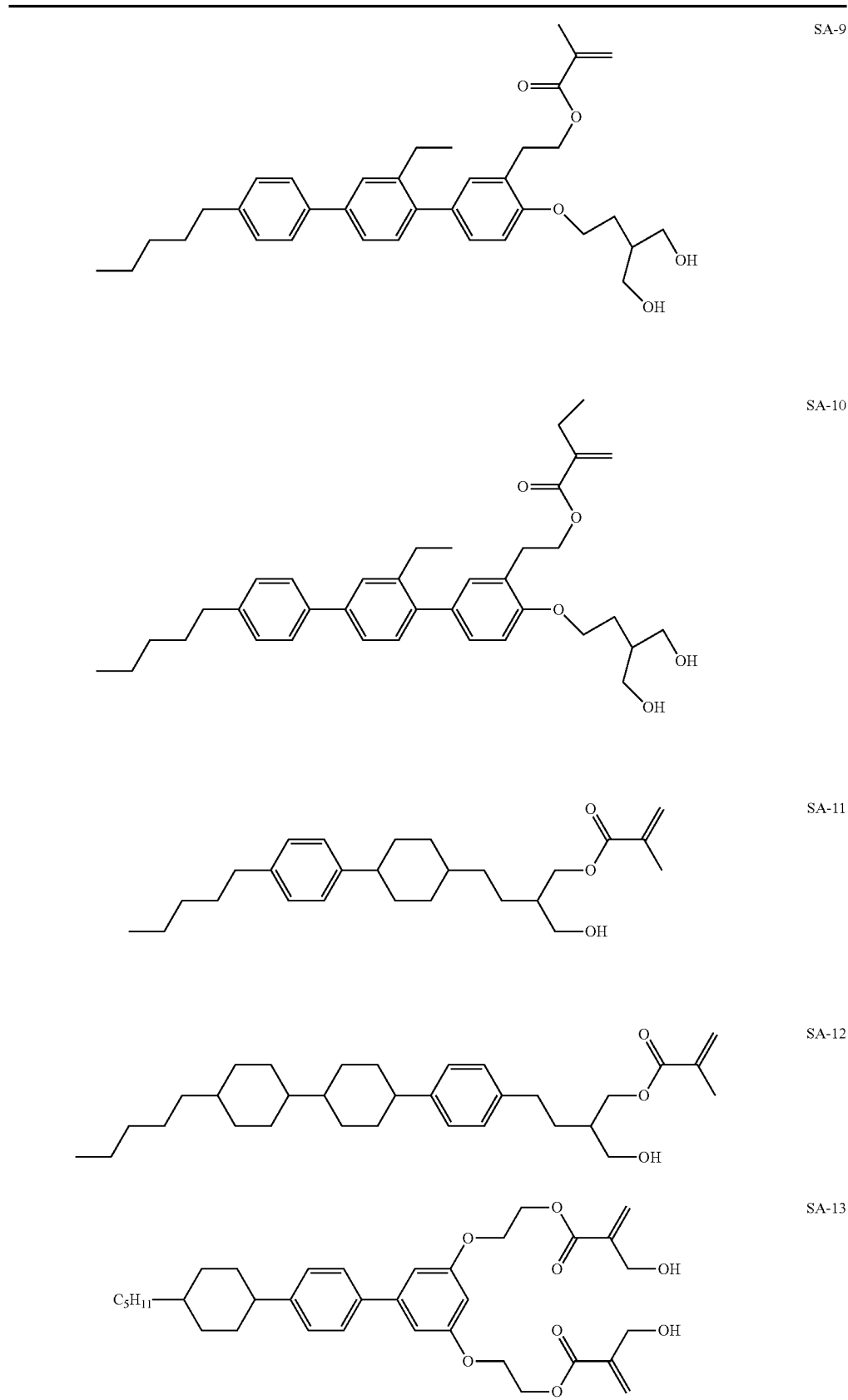

TABLE E-continued
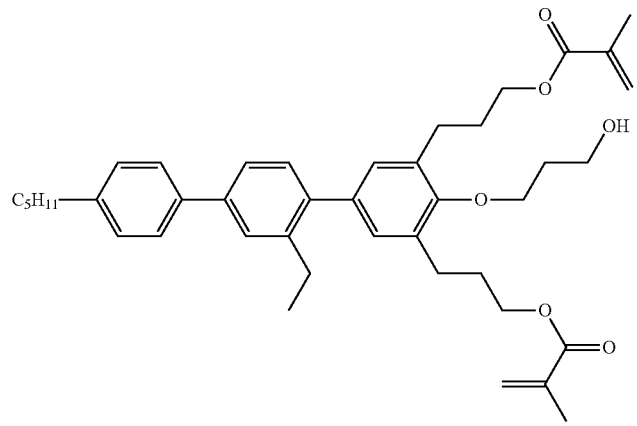
SA-14
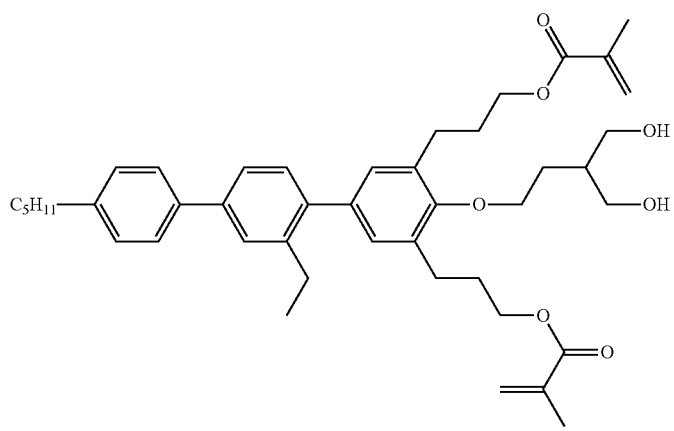
SA-15
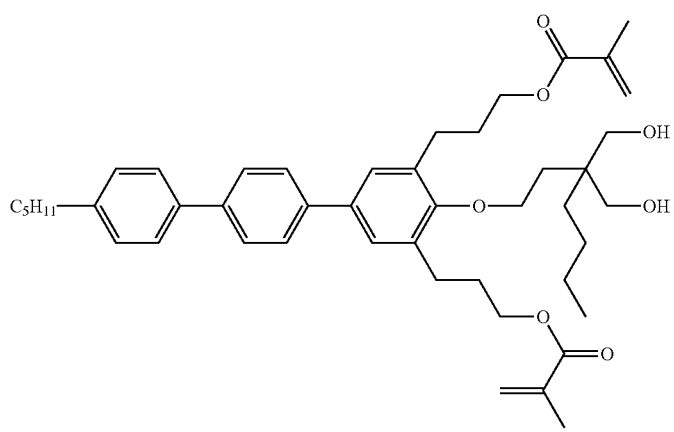
SA-16

TABLE E-continued
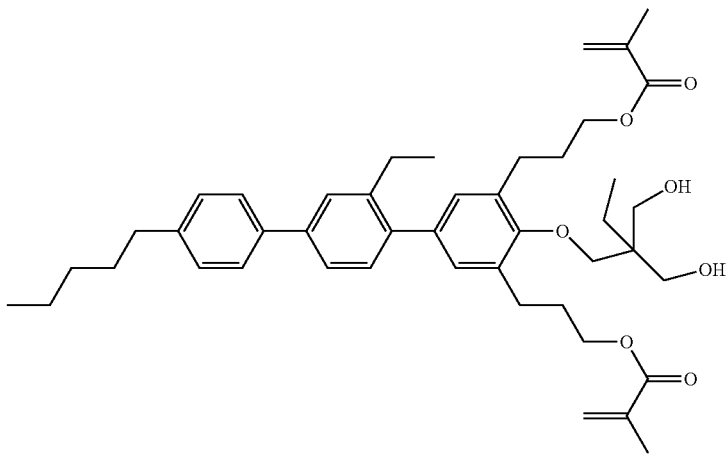 [SMILES: C=C(C)C(=O)OCCCc1cc(-c2ccc(-c3ccc(CCCCC)cc3)cc2CC)cc(CCCOC(=O)C(=C)C)c1OCC(CC)(CO)CO]
SA-17
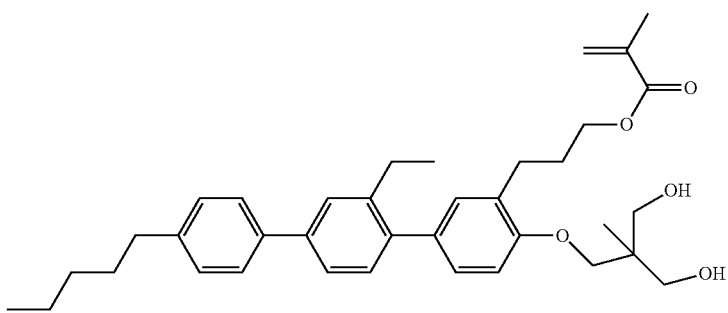 [SMILES: C=C(C)C(=O)OCCCc1cc(-c2ccc(-c3ccc(CCCCC)cc3)cc2CC)ccc1OCC(C)(CO)CO]
SA-18
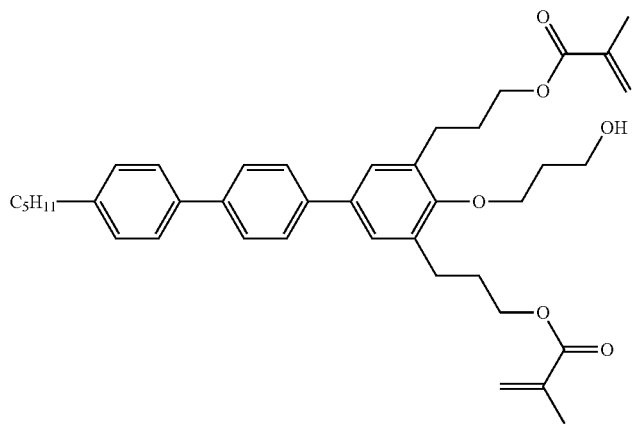
SA-19
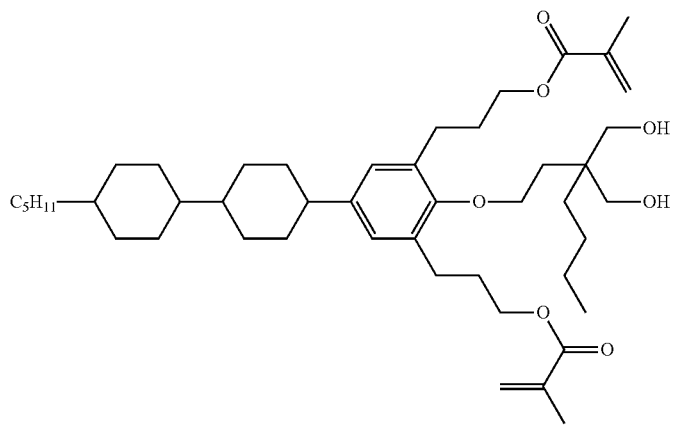
SA-20

TABLE E-continued
SA-21
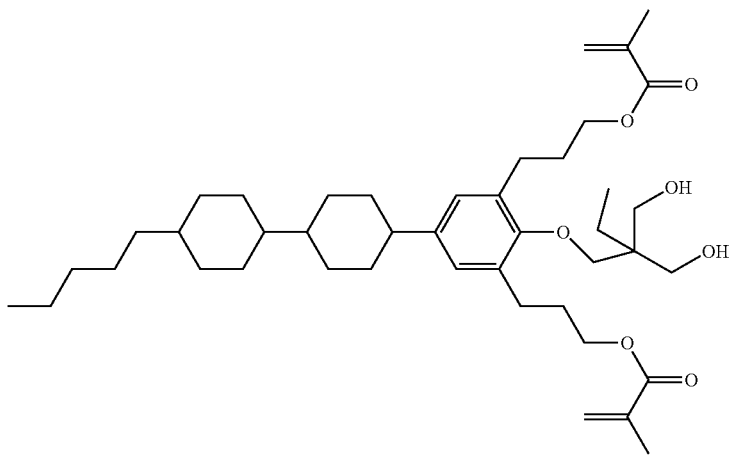 [SMILES: C=C(C)C(=O)OCCCc1cc(C2CCC(C3CCC(CCCCC)CC3)CC2)cc(CCCOC(=O)C(=C)C)c1OCC(CC)(CO)CO]
SA-22
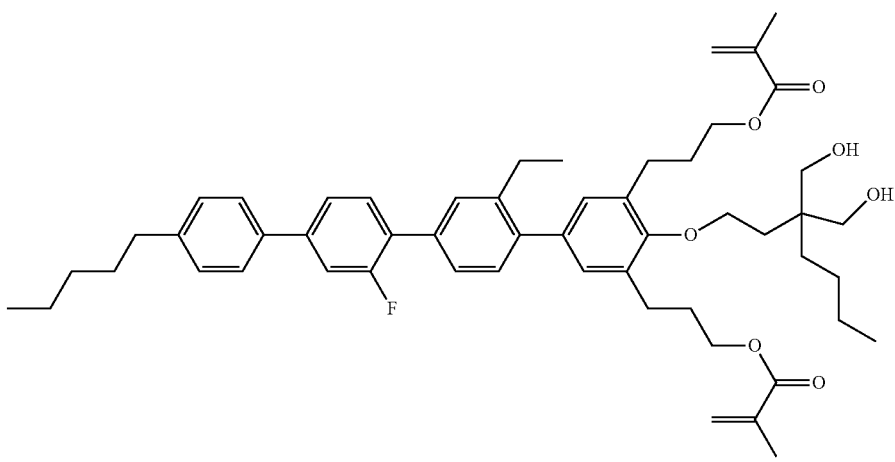 [SMILES: C=C(C)C(=O)OCCCc1cc(-c2ccc(-c3ccc(-c4ccc(CCCCC)cc4)cc3F)cc2CC)cc(CCCOC(=O)C(=C)C)c1OCCC(CO)(CO)CCCC]
SA-23
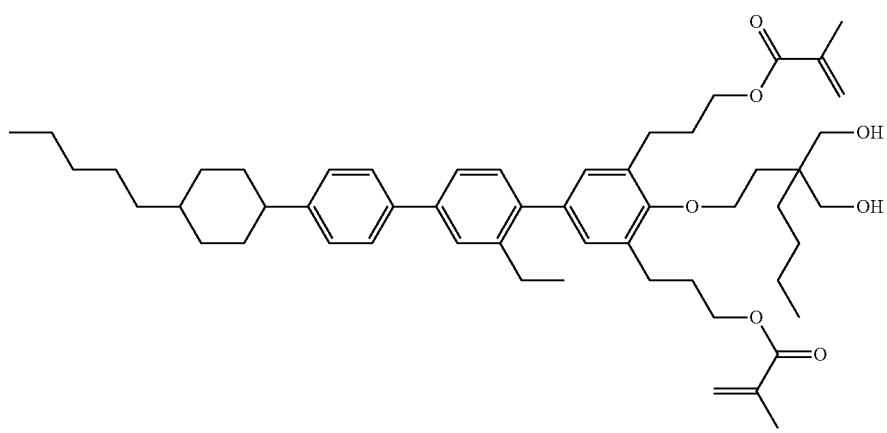 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]

TABLE E-continued
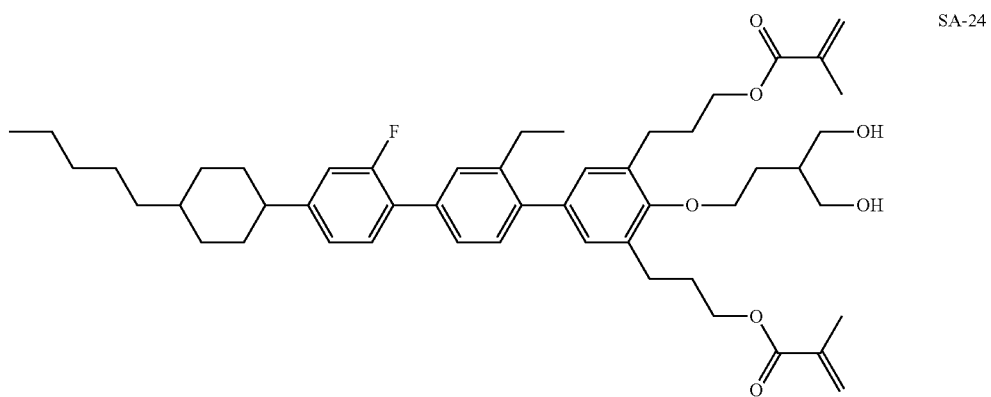
SA-24
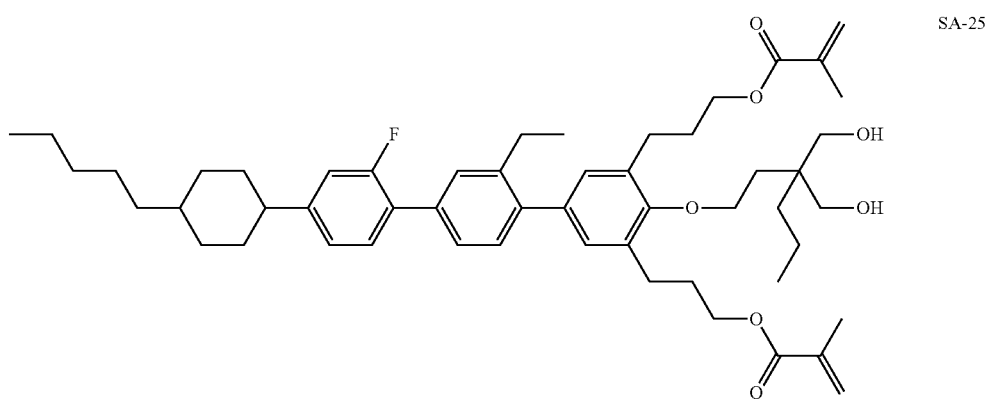
SA-25
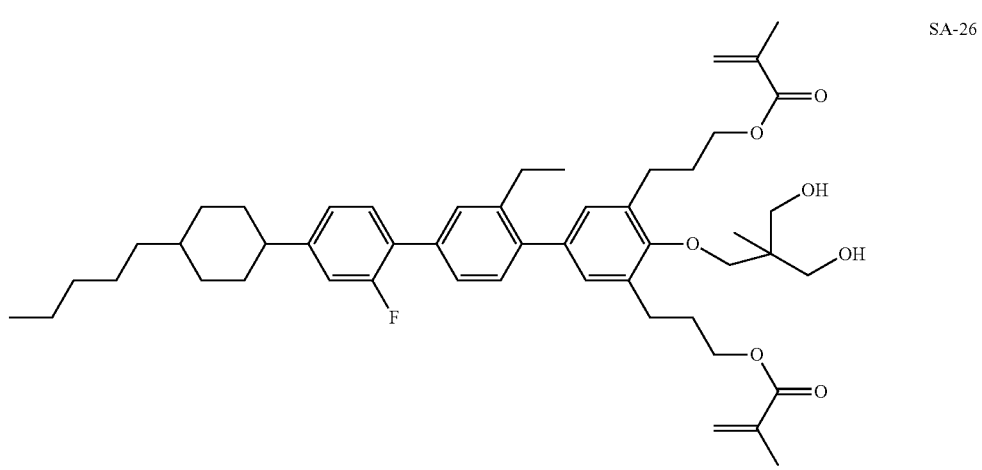
SA-26

TABLE E-continued
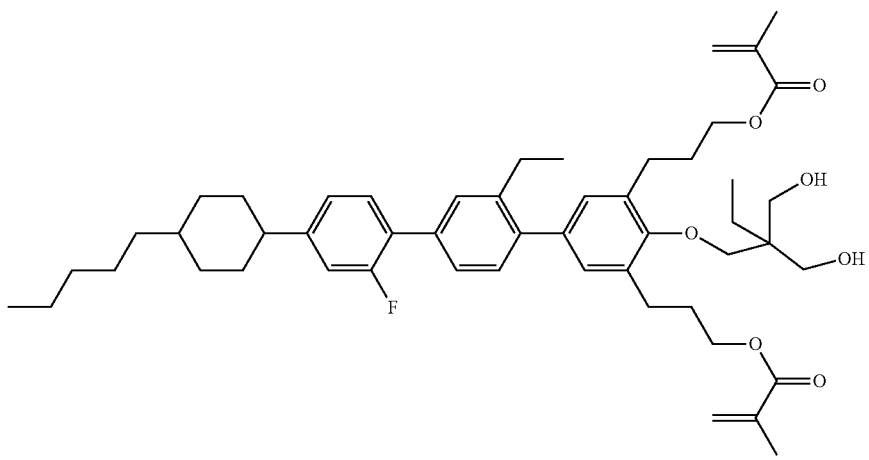 [SMILES: C=C(C)C(=O)OCCCc1cc(-c2ccc(-c3ccc(C4CCC(CCCCC)CC4)cc3F)cc2CC)cc(CCCOC(=O)C(=C)C)c1OCC(CC)(CO)CO]
SA-27
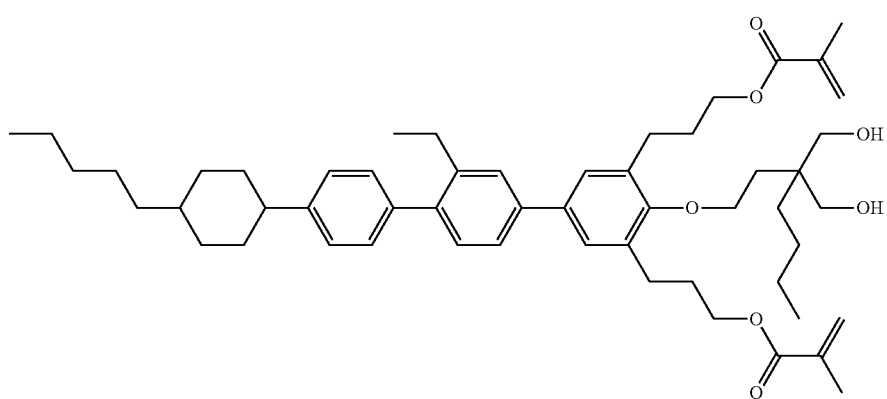 [SMILES: C=C(C)C(=O)OCCCc1cc(-c2ccc(-c3ccc(C4CCC(CCCCC)CC4)cc3)c(CC)c2)cc(CCCOC(=O)C(=C)C)c1OCCC(CO)(CO)CCCC]
SA-28
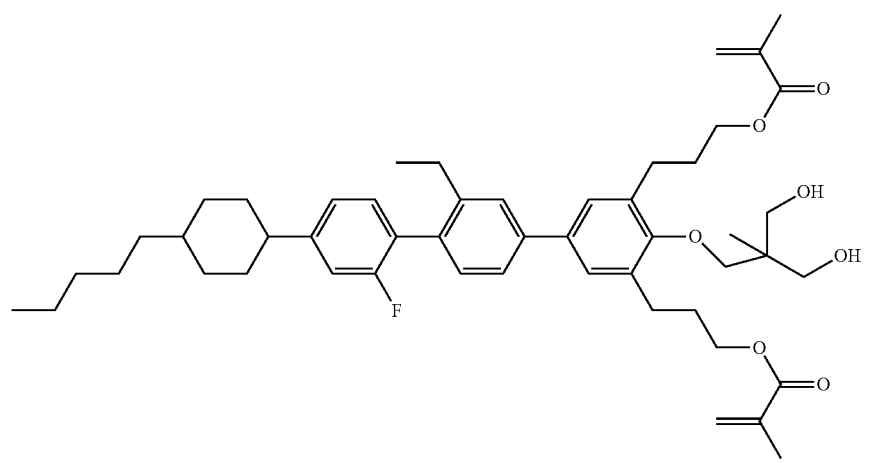 [SMILES: C=C(C)C(=O)OCCCc1cc(-c2ccc(-c3ccc(C4CCC(CCCCC)CC4)cc3F)c(CC)c2)cc(CCCOC(=O)C(=C)C)c1OCC(C)(CO)CO]
SA-29

TABLE E-continued
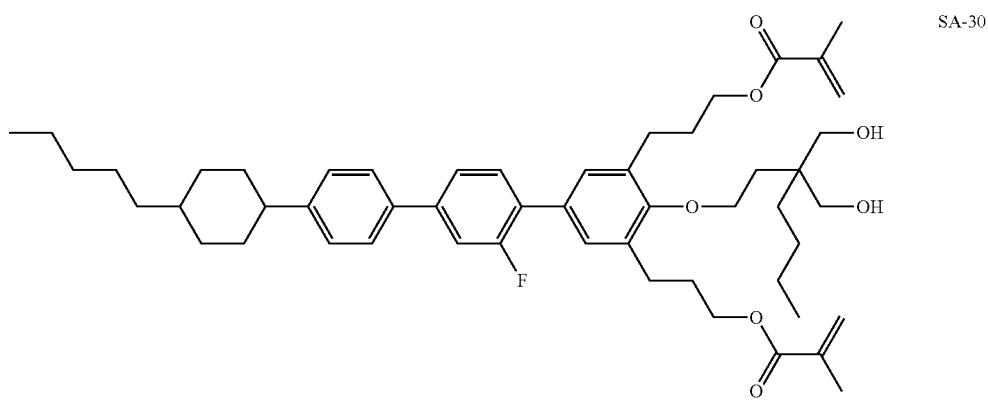
SA-30
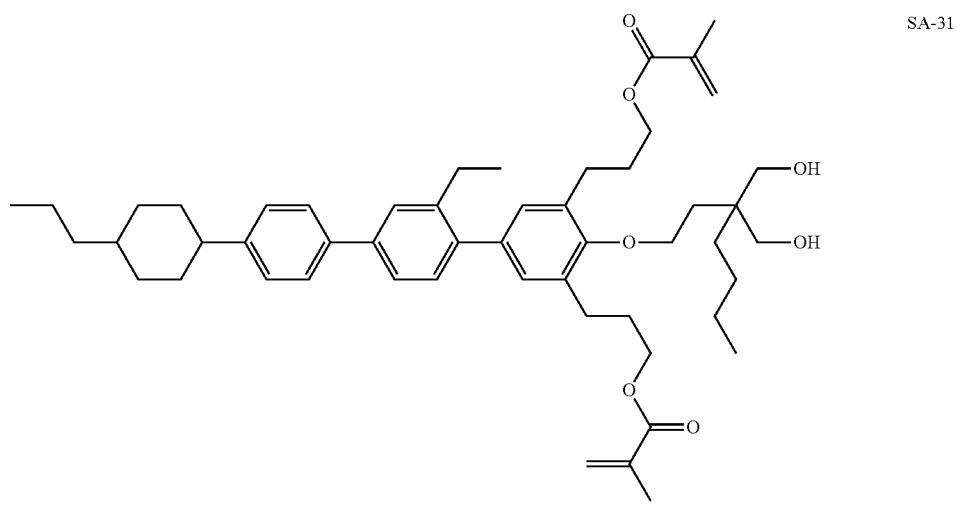
SA-31
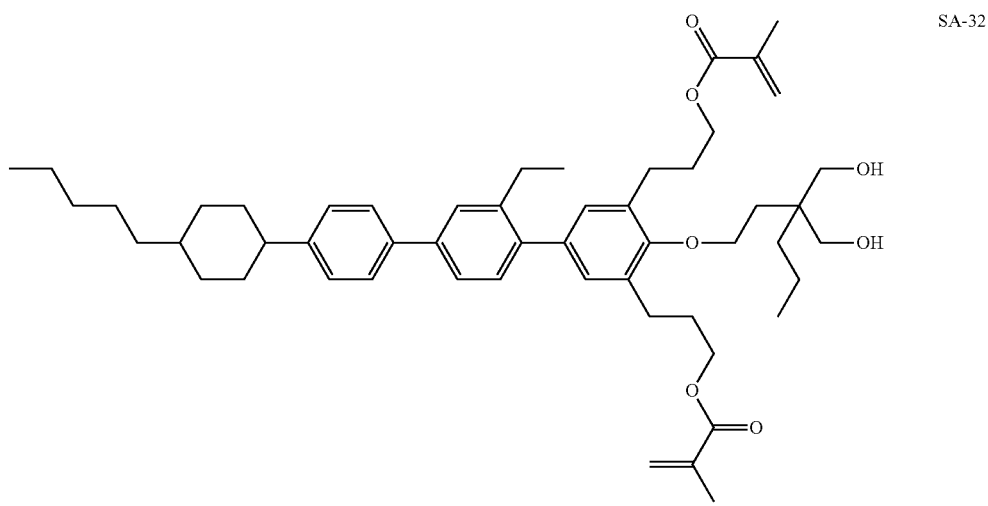
SA-32

TABLE E-continued
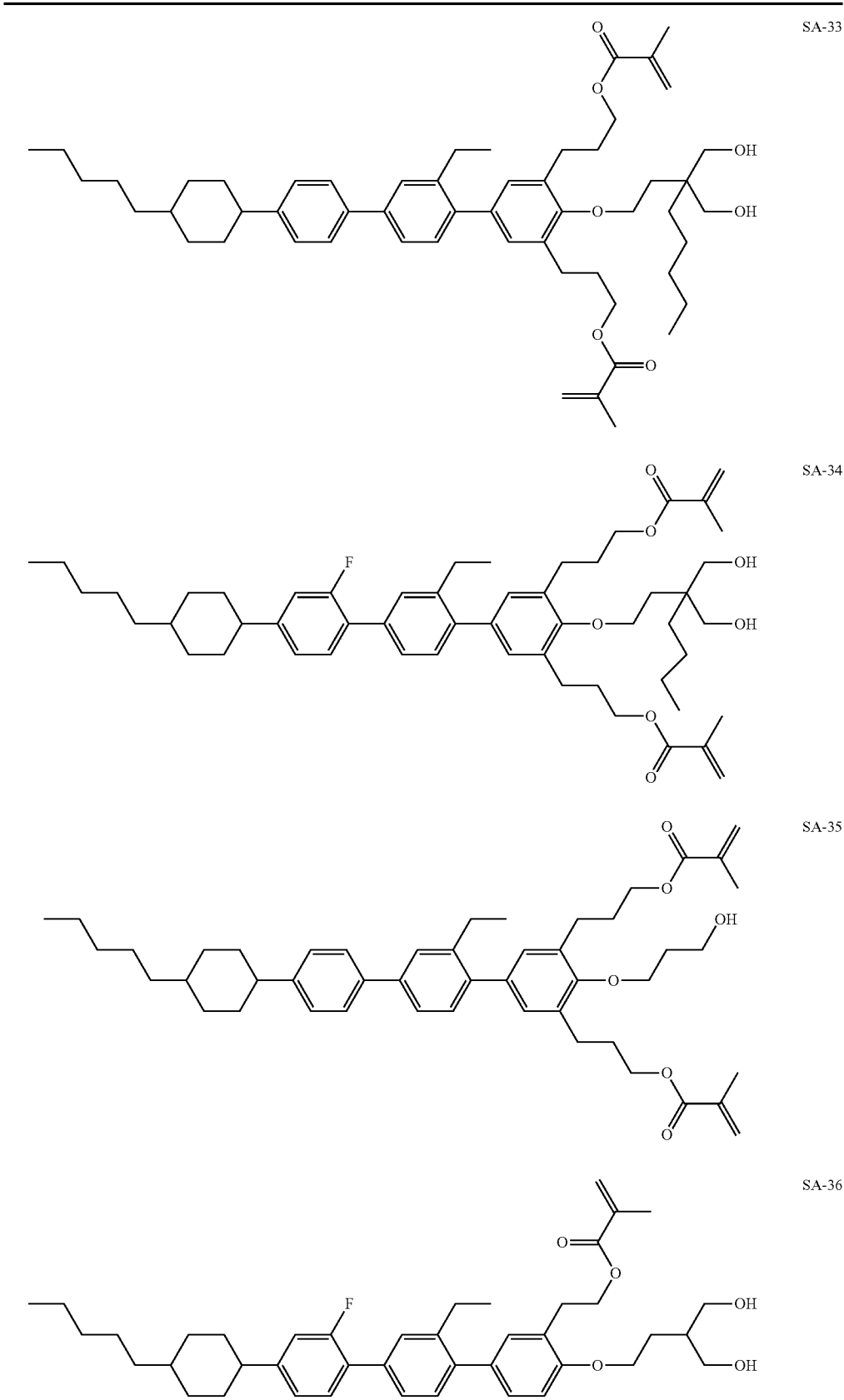

TABLE E-continued
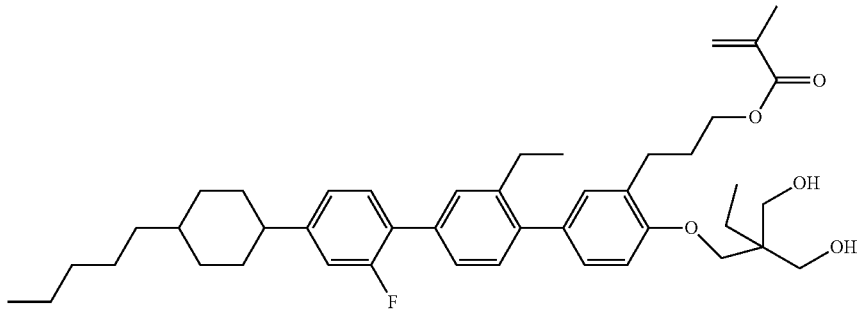 [SMILES: C=C(C)C(=O)OCCCc1cc(-c2ccc(-c3ccc(C4CCC(CCCCC)CC4)cc3F)cc2CC)ccc1OCC(CC)(CO)CO]
SA-37
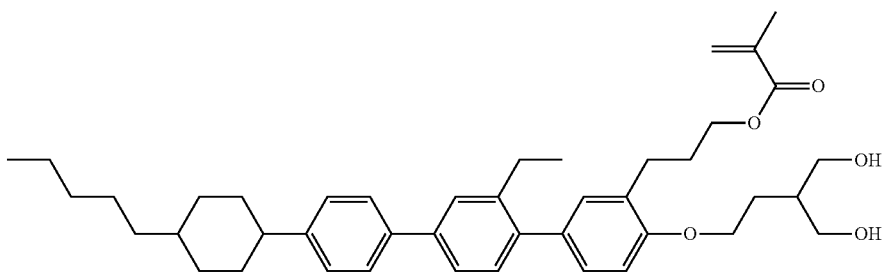 [SMILES: C=C(C)C(=O)OCCCc1cc(-c2ccc(-c3ccc(C4CCC(CCCCC)CC4)cc3)cc2CC)ccc1OCCC(CO)CO]
SA-38
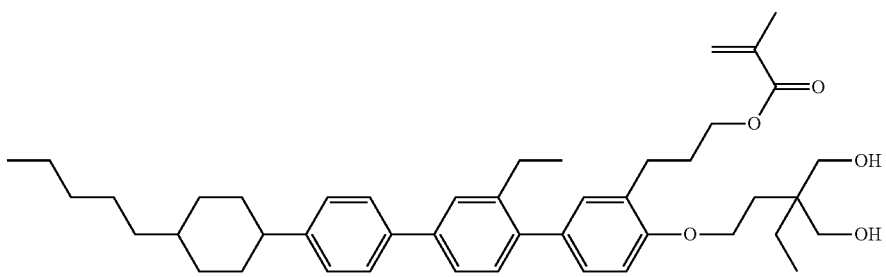
SA-39
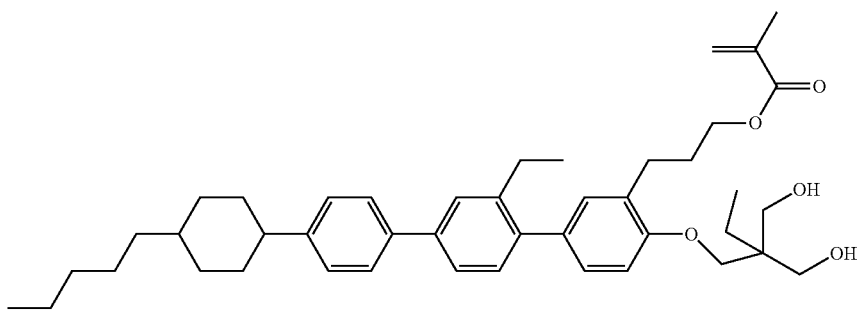 [SMILES: C=C(C)C(=O)OCCCc1cc(-c2ccc(-c3ccc(C4CCC(CCCCC)CC4)cc3)cc2CC)ccc1OCC(CC)(CO)CO]
SA-40
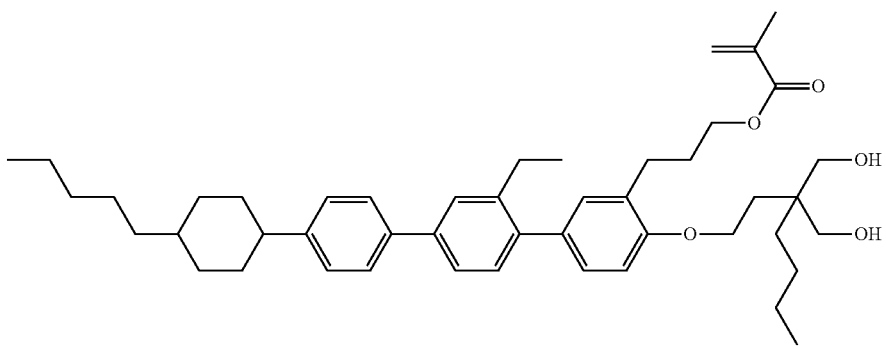 [SMILES: C=C(C)C(=O)OCCCc1cc(-c2ccc(-c3ccc(C4CCC(CCCCC)CC4)cc3)cc2CC)ccc1OCCC(CO)(CO)CCCC]
SA-41

TABLE E-continued
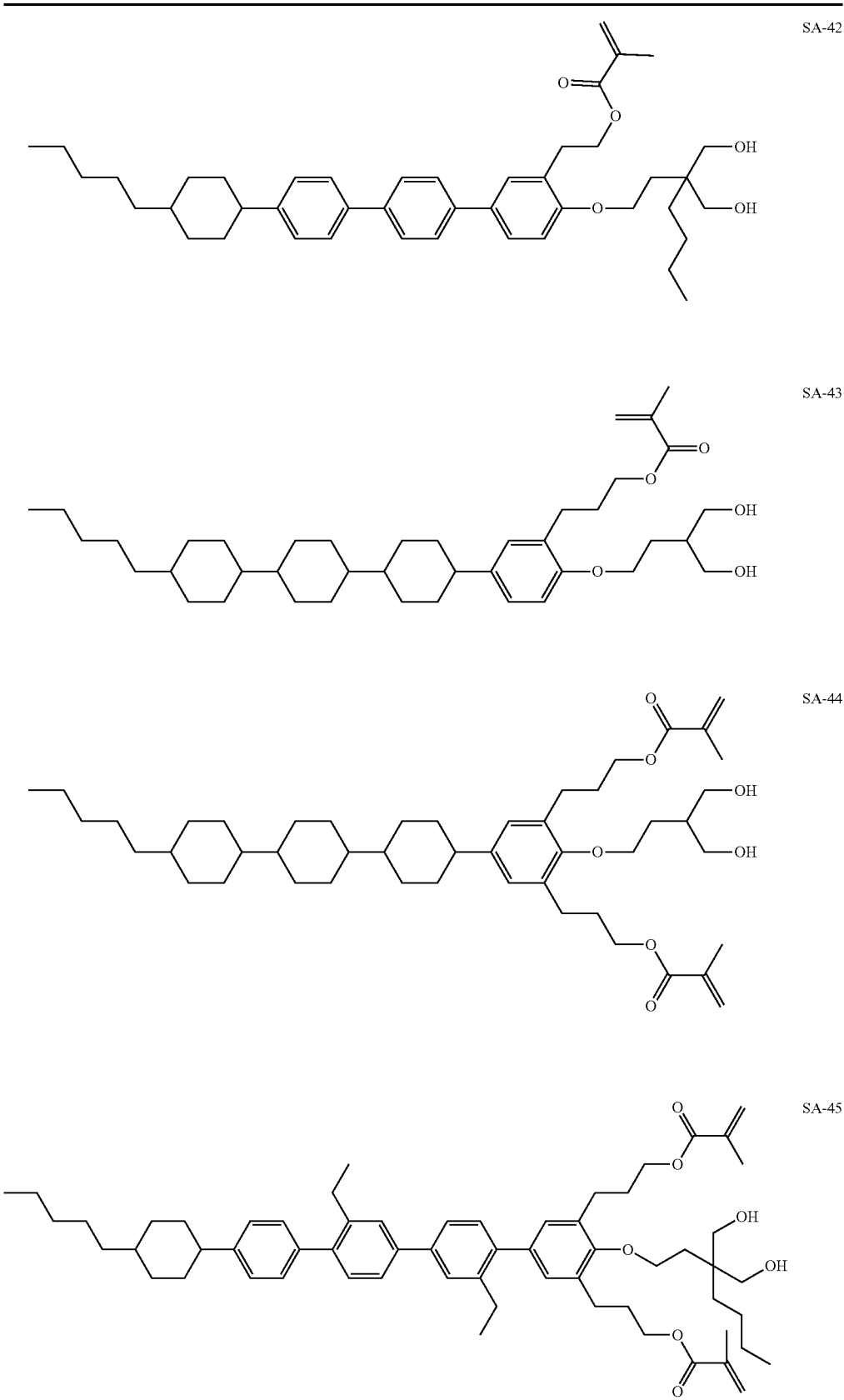

TABLE E-continued

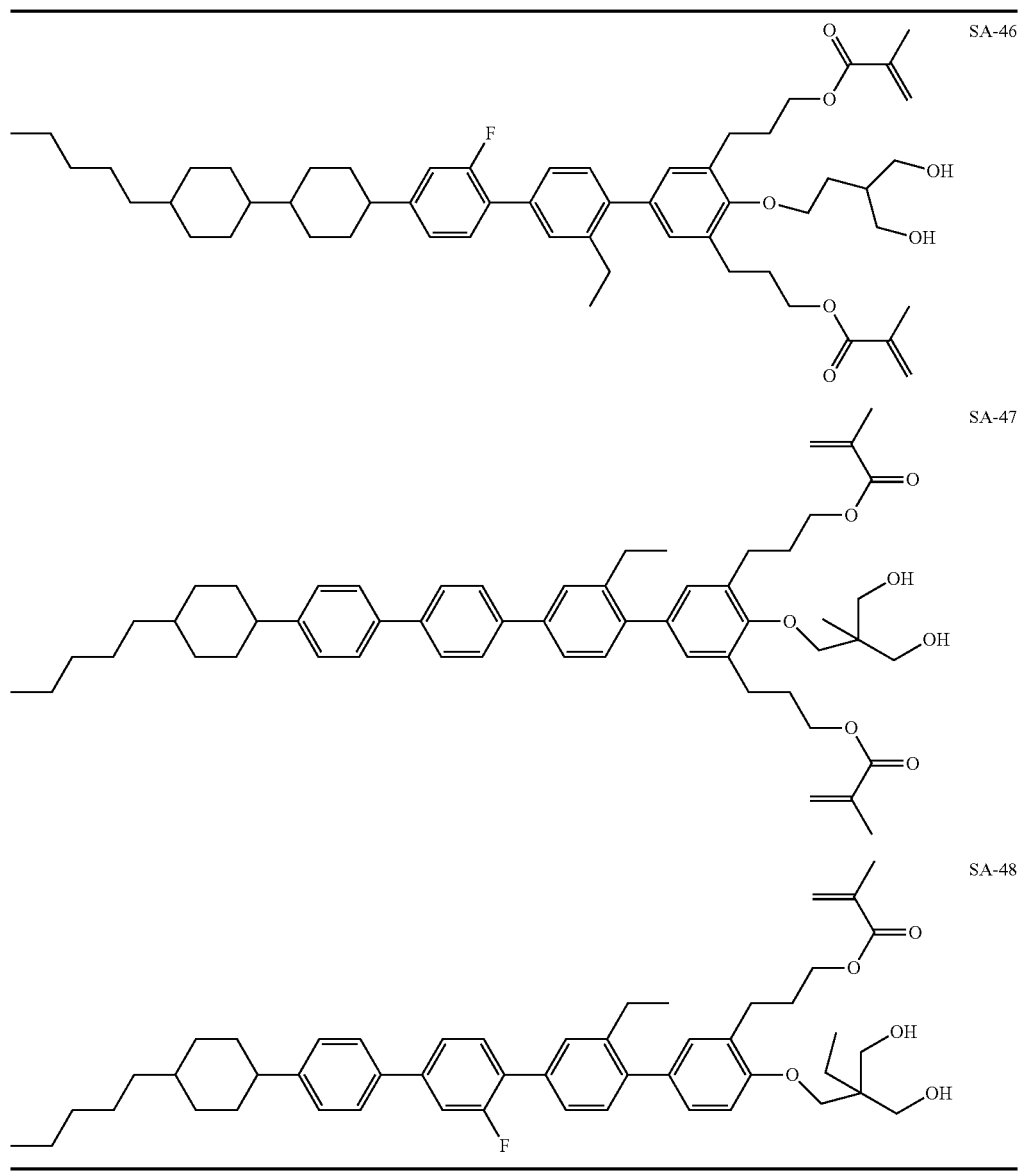

In a preferred embodiment, the LC media, SA-VA and SA-FFS displays according to the present invention comprise one or more SA additives selected from formulae SA-1 to SA-48, preferably from formulae SA-14 to SA-48, very preferably from formulae SA-20 to SA-34 and SA-44, in combination with one or more RMs of formula M.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta\varepsilon$ dielectric anisotropy at 20° C. and 1 kHz,
cl.p, T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic(S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta_\varepsilon$ at 1 KHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerizing the polymerizable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The polymerizable compounds are usually polymerized in the display or test cell by irradiation with UV light of defined intensity for a prespecified time, with a voltage simultaneously being applied to the display (usually 10 V to 30 V alternating current, 1 kHz).

The intensity is measured using a standard meter (Hoenle UV-meter high end with UV sensor).

The tilt angle is usually determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1

The nematic LC host mixture N1 is formulated as follows:

| B(S)-2O-O4 | 5.00% | cl.p. | +74.3° C. |
|---|---|---|---|
| B(S)-2O-O5 | 5.00% | $n_e$ | 1.6250 |
| BCH-32 | 9.00% | $n_o$ | 1.4948 |
| CC-3-V | 15.00% | $\Delta n$ | 0.1302 |
| CC-3-V1 | 7.50% | $\Delta\varepsilon$ | -2.9 |
| CC-4-V1 | 13.00% | $\varepsilon_\parallel$ | 3.6 |
| CCP-3-1 | 10.00% | $\varepsilon_\perp$ | 6.5 |
| CLY-3-O2 | 2.50% | $\gamma_1$ | 89 mPa · s |
| CPY-3-O2 | 2.00% | $K_1$ | 15.1 |
| PY-1-O2 | 12.00% | $K_3$ | 15.0 |
| PY-3-O2 | 10.00% | | |
| PYP-2-3 | 9.00% | | |

Polymerizable LC mixture C1 is prepared by adding to the LC host mixture N1 0.3% of the monomer RM-35.

Chiral polymerizable LC mixture M1 is prepared by adding to the LC host mixture N1 0.91% of the chiral dopant S-4011 and 0.3% of the monomer RM-35.

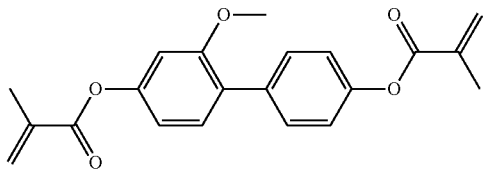

RM-35

Comparison Example 1

A C-PSVA display according to a conventional design (i.e. without a third electrode) as shown in FIG. 6a is assembled as follows.

The display consists of two plane-parallel glass subtrates which are held apart at a distance (cell gap) of 3.3 µm by spacers. The top substrate is equipped with a first ITO electrode (thickness 50 nm) which is a continuous (i.e. unpatterned) electrode, and a polyimide alignment layer (thickness 100 nm). The bottom substrate is equipped with a second ITO electrode (thickness 50 nm) having a fishbone pattern as shown in FIG. 1(a) and with an alignment layer of unrubbed polyimide (thickness 100 nm).

The polymerizable LC mixture C1 is filled into the display by vacuum injection and the display is sealed. The LC layer has a retardation of 340 nm at a wavelength λ of 589 nm.

The patterned bottom electrode provides a specific electric field to align the LC molecules in different azimuthal direction upon application of a voltage, also known as multi-domain alignment.

The PSA process is then carried out as illustrated in FIG. 6(a-d). A voltage is applied to the electrodes and the display is exposed to UV light causing photopolymerization of the monomer while, thereby fixing the alignment direction of the LC molecules at the surfaces and generating a tilt angle.

After UV exposure the tilt angle and the multidomain orientation will force the LC molecules into a fixed direction when being reoriented into planar alignment upon driving the display (i.e. applying a voltage to selected pixels).

UV photopolymerization is carried out in two steps, the first step (UV1) for generating a tilt angle and the second step (UV2) for polymerizing any residual monomer that was not polymerized in the first step. In UV1 step a voltage is applied (30 $V_{pp}$ square wave, 60 Hz). In UV2 step no voltage is applied. The other conditions are as follows:

UV1 (C-type lamp): 4.5 mW/cm² at room temperature for 30-200s

UV2 (B-type lamp): 2.5 mW/cm² at RT, 120 min

A tilt angle could be generated in the test cells after the UV1 step above, which could be confirmed by measurement using an Otsuka T_RETS-10 system.

Comparison Example 2

A C-PSVA display according to a conventional design (i.e. without a third electrode) is assembled as described in Comparison Example 1.

The chiral polymerizable LC medium M1 is filled into the display by vacuum injection and the display is sealed. The LC layer has a retardation of 450 nm at a wavelength λ of 589 nm and a helical pitch of ~13 µm.

The display is then subjected to a PSA process with including exposure to UV light in a two step process under the conditions as described in Comparison Example 1, to generate a tilt angle and polymerize the residual monomer.

A tilt angle could be generated in the test cells after the UV1 step, which could be confirmed by measurement using an Otsuka T_RETS-10 system.

Example 1

A C-PSVA display according to the present invention with an additional third electrode is assembled as follows.

The display consists of two plane-parallel glass subtrates which are held apart at a distance (cell gap) of 3.5 µm by spacers. The top substrate is equipped with a first ITO electrode (thickness 50 nm), which is a continuous (i.e. unpatterned) electrode, and an alignment layer of unrubbed polyimide (thickness 100 nm). The bottom substrate is equipped with an additional third ITO electrode (thickness 50 nm), which is a continuous electrode, followed by an isolation layer of SiNx (thickness 300 nm), a second ITO electrode (thickness 50 nm) having a fishbone pattern as shown in FIG. 1(a), and an alignment layer of unrubbed polyimide (thickness 100 nm).

The chiral polymerizable LC medium M1 is filled into the display by vacuum injection and the display is sealed. The LC layer has a retardation of 450 nm at a wavelength λ of 589 nm and a helical pitch of ~13 µm.

The PSA process is then carried out as illustrated in FIG. 7(a-e). In the beginning (FIG. 7b) the additional third electrode is grounded, and a voltage of $30V_{pp}$ square wave, 60 Hz, is applied for 40 seconds to the first (top) and second (bottom) electrodes to align the LC molecules into the multidomain orientation.

The electric potential of the third electrode is then switched from ground to the same potential as the second electrode (FIG. 7c).

As a result, the alignment of the LC molecules is improved to be more uniform.

UV photopolymerization is then carried (FIG. 7d) out in two steps UV1 and UV2 as described for Comparison Example 1, but wherein in step UV1 step a voltage is applied to the first, second and third electrode as described above and in UV2 step no voltage is applied, to generate a tilt angle and polymerize the residual monomer. The other conditions are as follows:

UV1 (C-type lamp): 4.5 mW/cm$^2$ at room temperature for 30-200s

UV2 (B-type lamp): 2.5 mW/cm$^2$ at RT, 120 min

A tilt angle could be generated in the test cells after the UV1 step, which could be confirmed by measurement using an Otsuka T_RETS-10 system.

During display operation the second and third electrode will be set at the same electric potential for driving the display.

By using the third electrode and the PSA process as described above, the transmittance of the display is increased both in the trunk dark lines and edge dark lines areas, and in addition in the whole pixel area because of the even straight electric field generated by the third electrode.

Figure 2:
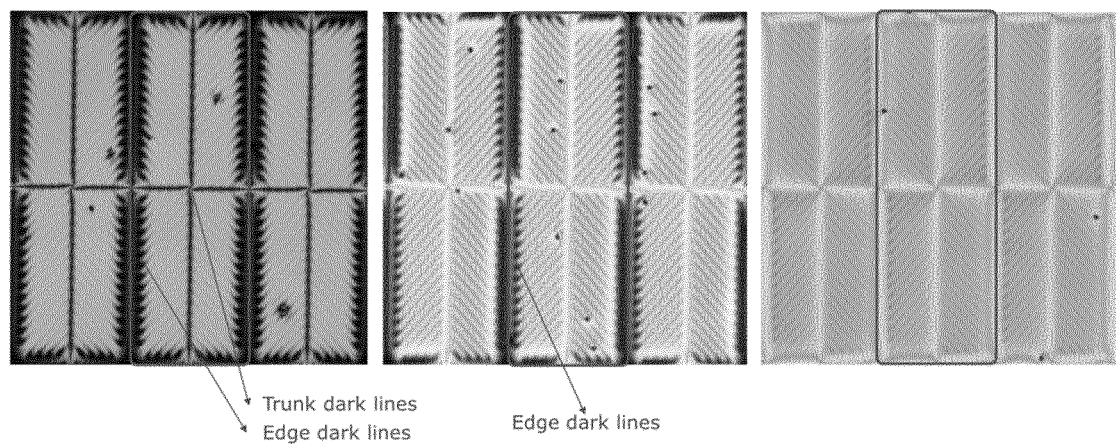
FIG. 2(a)-(c) shows microscope images of a PSA display of prior art (a), of a C-PSA dispay of prior art (b) and of a C-PSA display according to the present invention (c), in the addressed state.
Figure 8:
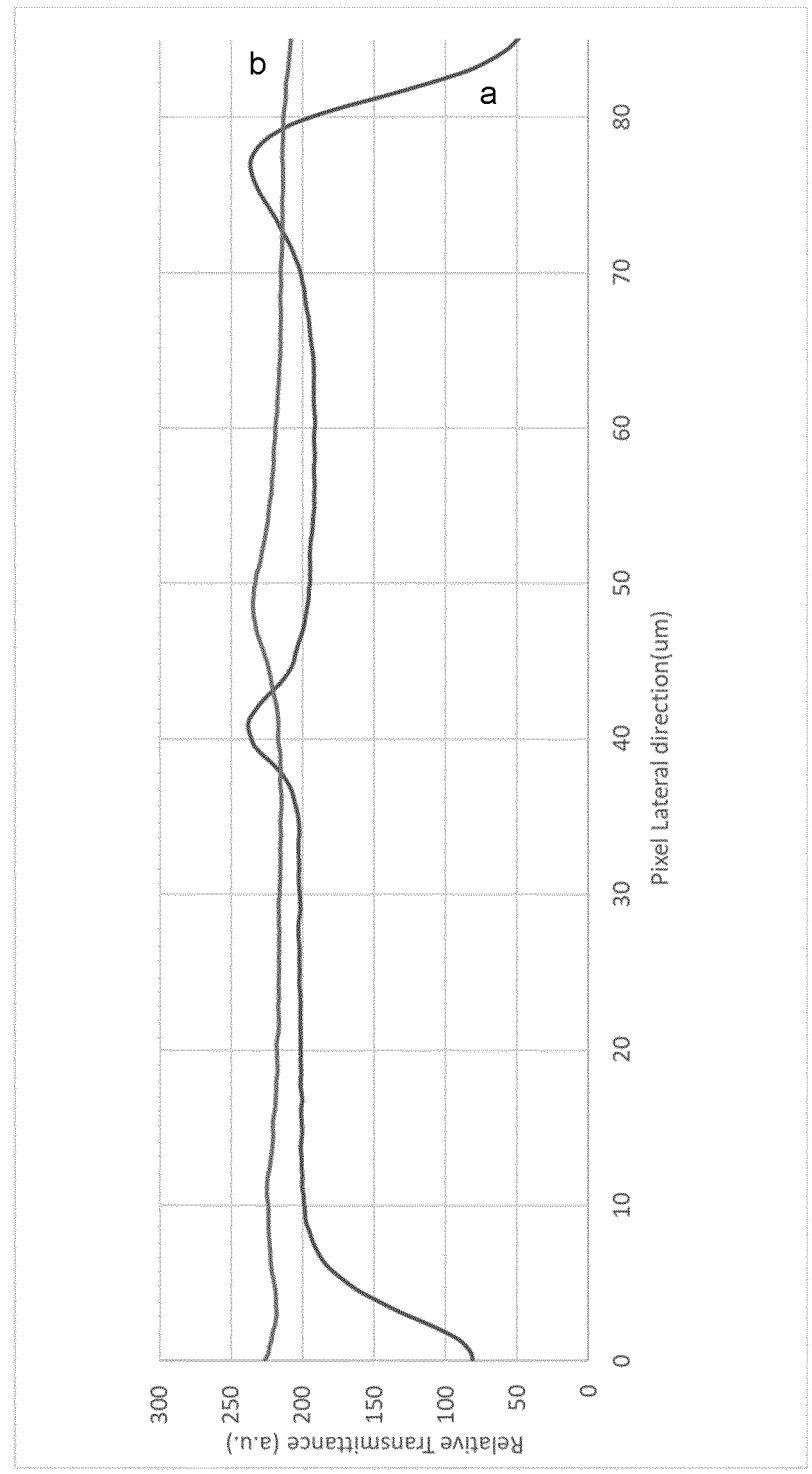
FIG. 8 shows the transmittance of a C-PSA display according to Comparison Example 1 (Graph a) and Example 1 (Graph b) of the present invention.

These advantageous effects are also illustrated in FIG. 2 and FIG. 8.

FIG. 2(a) shows the microscope image of the display according to Comparison Example 1 with conventional electrode design and without chiral dopant in the LC medium. The appearance of dark trunk lines and dark edge lines between the individual pixels upon driving the display can clearly be observed.

FIG. 2(b) shows the microscope image of the display according to Comparison Example 2 with the conventional electrode design and with a chiral dopant in the LC medium. It can be seen that the appearance of the dark trunk lines upon driving the display is suppressed, however the dark edge lines are still visible.

FIG. 2(c) shows the microscope image of the display according to Display Example 1 of the present invention with an additional third electrode and with a chiral dopant in the LC medium. It can be seen that the appearance of both dark trunk lines and dark edge lines upon driving the display is suppressed and the transmittance is higher.

FIG. 8 shows the relative transmittance (in %) versus the lateral pixel dimensions in a display according to Comparison Example 1 (Graph a) and in a display according to Example 1 (Graph b).

It can be seen that the display according to Example 1 has significantly higher transmittance. The whole area transmittance after integrating the graph for the display according to Example 1 is about 10% higher compared to the display according to Comparison Example 1.

The invention claimed is:

1. An LC display of the chiral polymer-stabilized vertically aligned (C-PSVA) mode comprising, in the following sequence:
   a) a first substrate, being equipped with a first electrode, said first electrode optionally having a pattern and optionally being divided into multiple pixels,
   b) a layer comprising a nematic LC medium having negative dielectric anisotropy and a permanently fixed pretilt and multidomain alignment, containing a chiral additive, and further comprising a polymer formed by one or more polymerizable compounds,
   c) a second substrate being equipped with a second electrode, said second electrode having a fishbone pattern and being divided into multiple pixels, and
   d) optionally a colour filter,
   wherein the second substrate is further equipped with a third electrode and an electrically isolating layer between the second and third electrodes, said third electrode being a continuous electrode or having a patterned structure corresponding to individual pixels,
   wherein the display further comprises non-linear elements for electronically addressing the individual pixels, said non-linear elements contacting the second and/or third electrode or contacting the first electrode, and
   wherein, after the LC medium has been dispensed between the two substrates and a voltage has been applied to the first and second electrodes while the third electrode is grounded, the said one or more polymerizable compounds in the LC medium have been polymerized in situ to create the permanently fixed pretilt and multidomain alignment while applying a voltage to the first, second, and third electrodes, wherein the third electrode is switched to the same potential as the second electrode.

2. The display according to claim 1, wherein each of the first and the second substrates is equipped with an alignment layer which is located such that it is in contact with the LC medium.

3. The display according to claim 1, wherein the first and third electrodes are not patterned.

4. The display according to claim 1, wherein the third electrode has a pattern and the first electrode is not patterned.

5. The display according to claim 1, wherein the first substrate is a top substrate, and the non-linear elements for electronically addressing the individual pixels are contacting the second electrode and optionally the third electrode.

6. The display according to claim 1, wherein the second substrate is a top substrate, and the non-linear elements for electronically addressing the individual pixels are contacting the first electrode.

7. The LC display according to claim 1, wherein the LC medium additionally comprises one or more additives selected from the group consisting of stabilizers, polymerization initiators and self-alignment additives.

8. The display according to claim 1, wherein the polymer is formed by UV photopolymerization of the said one or more polymerizable compounds.

9. The display according to claim 1, wherein the display additionally comprises a first compensation film and a second compensation film sandwiching the display, wherein the first and second compensation films are selected from biaxial compensation films.

10. A method of manufacturing the display according to claim 1, comprising the following steps:
   a) providing the first substrate and the second substrate, the first substrate being equipped with the first electrode, the second substrate being equipped with the second electrode, the third electrode, the electrically isolating layer between the second and third electrodes, and optionally the colour filter,
   wherein the first and second substrates are fixed at a constant distance relative to each other and with their planes parallel to each other, wherein the second electrode has the fishbone pattern and is divided into multiple pixels, and the first electrode optionally has the pattern and is optionally divided into multiple pixels, and the third electrode is a continuous electrode or has a patterned structure corresponding to individual pixels,
   wherein the display further comprises the non-linear elements for electronically addressing the individual pixels, said non-linear elements either contacting the second and/or third electrode or contacting the first electrode,
   b) dispensing the nematic LC medium between the first and the second substrates,
   wherein the LC medium has negative dielectric anisotropy and comprises:
      A) a liquid crystal component A comprising mesogenic or liquid-crystalline molecules,
      B) a polymerizable component B comprising one or more polymerizable compounds,
      C) one or more chiral additives, and
      D) optionally one or more further additives,
   c) applying a voltage to the first and second electrodes while the third electrode is grounded, and then applying a voltage to the first, second, and third electrodes, wherein the third electrode is switched to the same potential as the second electrode,
   d) while applying the voltage to the first, second, and third electrodes, polymerizing the polymerizable compounds of the polymerizable component B of the LC medium between the first and second substrates to produce the permanently fixed pretilt and multidomain alignment, and
   e) optionally subjecting the LC medium to a second polymerization step, without applying a voltage to the first, second, or third electrodes, thereby polymerizing any polymerizable compounds which have not reacted in step d).

11. The method of claim 10, wherein each of the first and second substrates is equipped with an alignment layer which is located such that it is in contact with the LC medium.

* * * * *